US006594028B1

(12) United States Patent
Hamamoto et al.

(10) Patent No.: US 6,594,028 B1
(45) Date of Patent: Jul. 15, 2003

(54) STATUS-BASED CONTROL OVER PRINTER

(75) Inventors: Akihiko Hamamoto, Irvine, CA (US);
Peter L. Cheng, Newport Beach, CA (US); Steven Noyes, Fountain Valley, CA (US); Tetsu Kaneko, Irvine, CA (US); Takao Aichi, Irvine, CA (US); Kazuyuki Masumoto, Irvine, CA (US); Akitoshi Yamada, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/291,010

(22) Filed: Apr. 14, 1999

(51) Int. Cl.[7] .......................... G06E 15/00; G06K 1/00
(52) U.S. Cl. ...................... 358/1.15; 358/1.9; 358/1.13; 358/1.1; 347/14; 347/16; 347/15; 347/17
(58) Field of Search ................................ 358/1.15–1.18; 347/14.17

(56) References Cited

U.S. PATENT DOCUMENTS

| | | | |
|---|---|---|---|
| 5,228,118 A | * 7/1993 | Sasaki | 395/112 |
| 5,351,068 A | 9/1994 | Moon et al. | 347/101 |
| 5,388,167 A | * 2/1995 | Koga | 382/50 |
| 5,442,385 A | 8/1995 | Moon et al. | 347/43 |
| 5,455,607 A | 10/1995 | Rhoads et al. | 347/8 |
| 5,527,121 A | 6/1996 | Santon | 400/323 |
| 5,568,169 A | 10/1996 | Dudek et al. | 347/43 |
| 5,619,233 A | 4/1997 | Harrington | 347/37 |
| 5,659,342 A | 8/1997 | Lund et al. | 347/35 |
| 5,699,495 A | * 12/1997 | Snipp | 395/114 |
| 5,853,256 A | 12/1998 | Kim | 400/624 |
| 6,046,816 A | * 4/2000 | Rawal | 358/1.12 |
| 6,211,970 B1 | * 4/2001 | Cornell et al. | 358/1.9 |
| 6,219,153 B1 | * 4/2001 | Kawanabe et al. | 358/1.16 |
| 6,283,650 B1 | * 9/2001 | Yamada et al. | 400/120.14 |
| 6,308,184 B1 | * 10/2001 | Hewitt | 707/205 |
| 2002/0044297 A1 | * 4/2002 | Tanaka | 358/1.15 |

OTHER PUBLICATIONS

Search results from Canon patent database (Search terms: Nozzle+Forward+Black+Text+Printer+[(Ink+Jet)or Ink-jet]+ Canon+B41J).
Search results from Canon patent database (Search terms: [(Ink+Jet) or Inkjet]+Printer+Pre–Ejection+Canon +B41J).
Search results from Canon patent database (Search terms: [(Ink+Jet) or Inkjet]+Printer+Pulse+Width+Canon+B41J).
Search results from Canon patent database (Search terms: Dye+Pigment+Black+Printer+[(Ink+Jet) or Inkjet]+Canon+B41J).
Search result from Canon patent database (Search terms: Five+Color+Printer+[(Ink+Jet) or Inkjet]+Canon+B41J).
Canon Computer Systems, Inc. press release, "Canon Introduces Fastest Color Bubble Jet 'Sprinter' for Monochrome Printing", Mar. 2, 1999, three pages.
Search results from Canon patent database (Search terms: Paper+Printer+(Feed or Load)+[(Ink+Jet) or Inkjet]+Speed+Canon+B41J).
Search results from Canon patent database (Search terms: Carriage+Printer+(Scan or Margin)+[Ink+Jet) or Inkjet]+Canon+B41J).

(List continued on next page.)

Primary Examiner—Edward Coles
Assistant Examiner—Saeid Ebrahimi
(74) Attorney, Agent, or Firm—Fitzpatrick, Cella, Harper & Scinto

(57) ABSTRACT

A printer driver executable in a computer connectable to a driven printer. In response to initiation of a print job, the print driver obtains current status of the printer. Based on the status of the printer, the print driver modifies operational parameters of the printer prior to commencement of the print job, so that the operational parameters are different from default ones of such parameters. In addition, the print driver modifies its own operational sequence based on the printer status, so that the operational sequence of the printer is different from a default sequence without such status information.

15 Claims, 80 Drawing Sheets

OTHER PUBLICATIONS

Search results from Canon patent database (Search terms: (Printer or Print or Head or [Print+Head or Printhead])+[Ink+Jet) or Inkjet]+(Alignment or Align)+Canon +B41J).

Search results from Canon patent database (Search terms: Printer+ [(Ink+ Jet) or Inkjet]+ (Bleed or Smear or Load)+Temperature+Canon+B41J).

Search results from Canon patent database (Search terms: Black+Text+Printer+ [(Ink +Jet) or Inkjet]+Canon+B41J).

Search results from Canon patent database (Search terms: Forward+Black+Text+Printer+[Ink+Jet) or Inkjet]+Canon+B41J).

* cited by examiner

THE SAMPLE COMMAND FLOW IN CASE OF BC-21 x 2, COLOR MODE, 360 dpi AND 8.5" OF PRINT BUFFER IS MENTIONED BELOW.

| | |
|---|---|
| [UCT] | UNIVERSAL COORDINATED TIME (SET CURRENT TIME0 |
| [RESET] | PRINTER RESET (SOFTWARE RESET) |
| [COMPRESS] | SELECT DATA COMPRESSION (BYTE PACKING MODE) |
| [BTM_MARGIN] | SELECT BOTTOM MARGIN |
| [DEFINE_BUF] | DEFINE PRINT BUFFER A |
| [DEFINE_BUF] | DEFINE PRINT BUFFER B |
| [DEFINE_COLOR] | DEFINE PRINT COLOR |
| [DEFINE_PULSE] | DEFINE HEAT PULSE TABLE |
| [DEFINE_CONTROL] | DEFINE BUFFER CONTROL TABLE |
| [LOAD] | PAPER LOAD |
| [SKIP] | RASTER SKIP TO THE PRINT POSITION FOR THE 1ST SCAN |
| [DIRECTION] | SET PRINT DIRECTION FOR THE 1ST SCAN |
| [EDGE] | SET LEFT AND RIGHT EDGE OF HEAD A FOR THE 1ST SCAN |
| [EDGE] | SET LEFT AND RIGHT EDGE OF HEAD B FOR THE 1ST SCAN |

LOOP 1:BEGIN REPEAT UNTIL [EJECT] COMMAND
    [SPEED]                             SELECT PRINT SPEED FOR THE 1ST SCAN
    [SIZE]                              SELECT DROPLET SIZE OF HEAD A FOR THE 1ST SCAN
    [SIZE]                              SELECT DROPLET SIZE OF HEAD B FOR THE 1ST SCAN
    [SELECT_PULSE]               SELECT HEAT PULSE TABLE xx FOR NEXT SCAN
    [SELECT_CONTROL]           SELECT BUFFER CONTROL TABLE xx OF HEAD A FOR THE 1ST SCAN
    [SELECT_CONTROL]           SELECT BUFFER CONTROL TABLE xx OF HEAD B FOR THE 1ST SCAN

LOOP 2:BEGIN REPEAT 18 TIMES FOR 9 BLOCK (4.5 INCH/0.5 INCH) x 2 HEAD (HEAD A AND HEAD B)
            [BLOCK]                        SELECT PRINT BLOCK

LOOP 3:BEGIN REPEAT 4 TIMES FOR 4 COLOR (YELLOW, MAGENTA, CYAN, BLACK)
                [COLOR]                    SELECT PRINT COLOR
                [DATA]                     IMAGE DATA TRANSMISSION
            LOOP 3:END

LOOP 2:END

[DIRECTION]                   SET PRINT DIRECTION FOR THE 2ND SCAN
    [EDGE]                              SET LEFT AND RIGHT EDGE OF HEAD A FOR THE 2ND SCAN
    [EDGE]                              SET LEFT AND RIGHT EDGE OF HEAD B FOR THE 2ND SCAN
    [SCAN_MARGIN]               SET BACKWARD DIRECTION SCAN MARGIN FOR 2ND SCAN
    [AT_DELAY]                     SET AUTO TRIGGER DELAY FOR 1ST SCAN
    [PRINT]                             PRINT EXECUTION FOR THE 1ST SCAN
    [SKIP]                               RASTER SKIP TO THE PRINT POSITION FOR THE 2ND SCAN

LOOP 1:END

[EJECT]                                  PAPER EJECT (EJECT ONLY)

FIG. 14

| High Speed ED (Default) | | Regular | | | Photo Realistic | | |
|---|---|---|---|---|---|---|---|
| Print Mode | Factor | Plain | Special 1 | Special 2 | Plain | Special 1 | Special 2 |
| Draft | Rast. Res. | 360x360dpi | N/A | N/A | N/A | N/A | N/A |
| | Print. Res. | 360x360dpi | | | | | |
| | Pass/Dir | 1pass_U/B*1 | | | | | |
| | ASF Speed | High | | | | | |
| | LF Speed | High | | | | | |
| | CR Speed | High | | | | | |
| Standard | Rast. Res. | 360x360dpi | 360x360dpi | 360x360dpi | 360x360dpi | Same as Plain Paper | Same as Plain Paper |
| | Print. Res. | 360x360dpi | 720x720dpi | 720x720dpi | 720x720dpi | | |
| | Pass/Dir | 1pass_U/B*1 | 2pass_Bi | 2pass_Uni | 2pass_Uni | | |
| | ASF Speed | High | Normal | Normal | 4pass_Uni | | |
| | LF Speed | High | Normal | Nornal | Normal | | |
| | CR Speed | Normal | Slow | Slow | Slow | | |
| High | Rast. Res. | 360x360dpi | 360x360dpi | 360x360dpi | 360x360dpi | Same as Plain Paper | Same as Plain Paper |
| | Print. Res. | 720x720dpi | 720x1440dpi | 720x1440dpi | 720x1440dpi | | |
| | Pass/Dir | 2pass_Bi | 4pass_Bi | 4pass_Uni | 4pass_Uni | | |
| | ASF Speed | Normal | Normal | Normal | Normal | | |
| | LF Speed | Nornal | Nornal | Nornal | Nornal | | |
| | CR Speed | Slow | Slow | Slow | Slow | | |

Bold: Different from Error Diffusion (or Dither) mode

FIG. 27C

| ASF Speed | High | 6750pps | |
|---|---|---|---|
| | Normal | 2280pps | |
| LF Speed | High | 7200pps | |
| | Normal | 3400pps | |
| CR Speed | High | 1111pps | (10.0KHz) |
| | Normal | 723pps | (6.51KHz) |
| | Slow | 555pps | (5.0KHz) |

FIG. 27D

| Plain | Plain Paper, Bubble Jet Paper, Brochure Paper, Greeting Cards |
|---|---|
| Special 1 | HR-101 |
| Special 2 | Other than Plain and Special 1 |

FIG. 27E

| 1pass_U/B*1: | | Head | Ink | Isolated Bk | Continuous B | In Color |
|---|---|---|---|---|---|---|
| | | BC-21e | Color | N/A | N/A | 23 Bi |
| | | | Black | 63 Bi | 63 Uni | 23 Bi |
| | | BC-23 | Black | 127 Bi | 127 Fwd-Uni | 46 Fwd-Uni |
| In Case of BC-21e/21e D => 1pass Bi | | BC-21e | Color | N/A | N/A | 23 Bi |
| | | | Black | 63 Bi | 63 Bi | 23 Bi |

In Case of BC-23/23, multi-pass is always printed by Uni-direction ( 2pass_Uni & 4pass Uni )
In Case of BC-23/23, Draft mode is always printed by Bi-direction ( 1pass_Bi )

FIG. 27F

| ED | | Regular | | | Photo Realistic | | |
|---|---|---|---|---|---|---|---|
| Print Mode | Factor | Plain | Special 1 | Special 2 | Plain | Special 1 | Special 2 |
| Draft | Rast. Res. | 360x360dpi | N/A | N/A | N/A | N/A | N/A |
| | Print. Res. | 360x360dpi | | | | | |
| | Pass/Dir | 1pass_Uni | | | | | |
| | ASF Speed | High | | | | | |
| | LF Speed | High | | | | | |
| | CR Speed | High | | | | | |
| Standard | Rast. Res. | 360x360dpi | 720x720dpi | Same as Special 1 | 720x720dpi | Same as Plain Paper | Same as Plain Paper |
| | Print. Res. | 360x360dpi | 720x720dpi | | 720x720dpi | | |
| | Pass/Dir | 1pass_Uni | 2pass_Uni | | 2pass_Uni | | |
| | ASF Speed | High | Normal | | 4pass_Uni | | |
| | LF Speed | High | Normal | | Normal | | |
| | CR Speed | Normal | Slow | | Slow | | |
| High | Rast. Res. | 720x720dpi | 720x720dpi | Same as Special 1 | 720x720dpi | Same as Plain Paper | Same as Plain Paper |
| | Print. Res. | 720x720dpi | 720x1440dpi | | 720x1440dpi | | |
| | Pass/Dir | 2pass_Uni | 4pass_Uni | | 4pass_Uni | | |
| | ASF Speed | Normal | Normal | | Normal | | |
| | LF Speed | Nomal | Nomal | | Nomal | | |
| | CR Speed | Slow | Slow | | Slow | | |

FIG. 27G

Print Mode with alignment

385

| Print Mode | Factor | Regular Mode | | | Photo Realistic |
| --- | --- | --- | --- | --- | --- |
| | | Plain Paper | High Resolution | Glossy | |
| Draft | Rast. Res. | 360x360dpi | N/A | N/A | N/A |
| | Print. Res. | 360x360dpi | | | |
| | Pass/Dir | 1pass_U/B*1 | | | |
| Standard | Print. Res. | 360x360dpi | 720x720dpi | 720x720dpi | 720x720dpi |
| | Pass/Dir | 1pass_U/B*1 | 2pass_Bi | 2pass_Uni | 2pass_Uni |
| High | Print. Res. | 720x720dpi | 720x1440dpi | 720x1440dpi | 720x1440dpi |
| | Pass/Dir | 2pass_Bi | 4pass_Bi | 4pass_Uni | 4pass_Uni |

386

| 1pass_U/B*1: | Head | Ink | Isolated Bk | Continuous Bk | In Color |
| --- | --- | --- | --- | --- | --- |
| | BC-21e | Color | N/A | N/A | 23 Bi |
| | | Black | 63 Bi | 63 Uni | 23 Bi |
| | BC-23 | Black | 127 Bi | 127 Fwd-Uni | 46 Fwd-Uni |

Print Mode without alignment

387

| Print Mode | Factor | Regular Mode | | | Photo Realistic |
| --- | --- | --- | --- | --- | --- |
| | | Plain Paper | High Resolution | Glossy | |
| Draft | Print. Res. | 360x360dpi | N/A | N/A | N/A |
| | Pass/Dir | 1pass_U/B*2 | | | |
| Standard | Print. Res. | 360x360dpi | 720x720dpi | 720x720dpi | N/A |
| | Pass/Dir | 1pass_U/B*2 | 2pass_Uni | 2pass_Uni | |
| High | Print. Res. | 720x720dpi | 720x1440dpi | 720x1440dpi | N/A |
| | Pass/Dir | 2pass_Uni | 4pass_Uni (2pass_Uni) | 4pass_Uni (2pass_Uni) | |

388

| 1pass_U/B*2: | Head | Ink | Isolated | Continuous | In Color |
| --- | --- | --- | --- | --- | --- |
| | BC-21e | Color | N/A | N/A | 23 Uni |
| | | Black | 63 Bi | 63 Uni | 23 Uni |
| | BC-23 | Black | 127 Bi | 127 Fwd-Uni | N/A |

FIG. 44

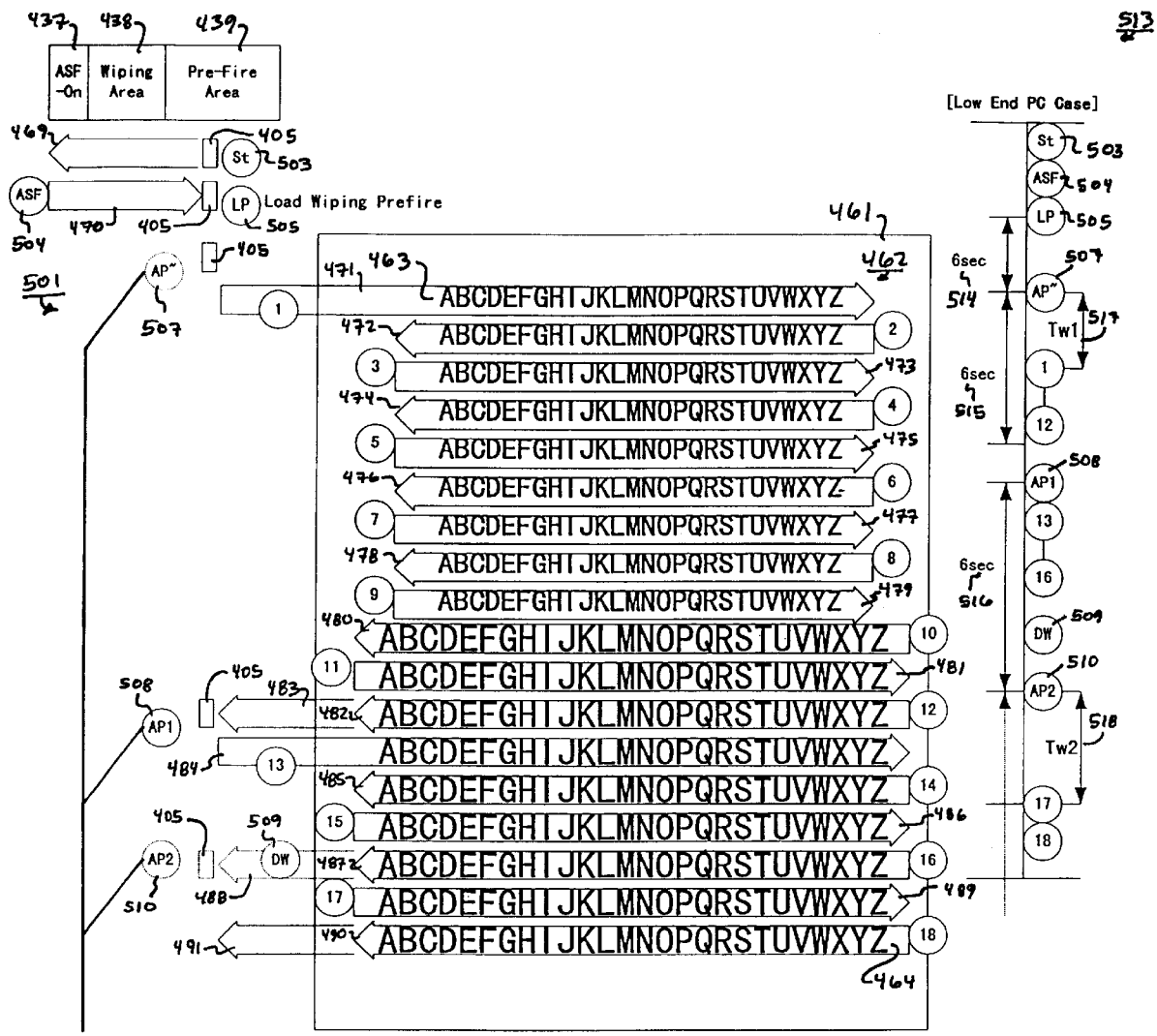
Printing Auto Prefire 6sec Cycle
(AP1 and AP2 executed slow PC case only)
PRIOR ART
FIG. 48
FIG. 49A     FIG. 49B     FIG. 49C

[WithOut PWM Case]

[With PWM Case]

STATUS-BASED CONTROL OVER PRINTER

BACKGROUND OF THE INVENTION

1. Field of the Invention

The present invention relates to a print driver executing in a computer which controls a printer based on status of the printer.

2. Description of the Related Art

Printers today are designed to work in a broad range of environmental and configurational situations. For example, commercial printers are often designed to work in a temperature range extending from around 5° C. to around 50° C.

Because of the wide extremes over which printers are designed to operate, large design margins are built into the initial design of the printer. Such large design margins often result in undesirable tradeoffs in operating performance at the most commonly encountered operational and configurational environments.

One example of such tradeoffs can be found in the case of a bubble jet printer, which forms images by ejecting ink droplets from multiple small ink jet nozzles in an ink jet head moved reciprocally with respect to a recording medium. Such a bubble jet printer is most ordinarily and typically used in a home environment where temperature and humidity, together with other environmental and configurational situations, are nominal. However, since the printer is designed to work at temperature extremes, performance at nominal temperature is often adversely affected. At temperature extremes, for example, ink viscosity may be extremely high for color temperatures or extremely low for hot temperatures. As a consequence, operational parameters such as nozzle cleaning operations, feed speed for recording media, paper ejection interval and the like must be selected at design time with adequate margins to accommodate such extremes. Such large design margins, however, adversely effect performance of the printer at nominal conditions in which the printer will operate most often.

SUMMARY OF THE INVENTION

It is an object of the invention to address the foregoing situation, by providing a print driver which modifies operational parameters of the printer, as well as modifying operations by which the print driver derives print data for transmission to the printer, based on status of the printer, with such modifications resulting in behavior that is different from default behavior and which is better able to obtain more optimum performance for the particular status of the printer at print time.

Thus, in one aspect the invention is a print driver executable on computing equipment connectable to a driven printer, with the print driver querying the printer for current status in response to initiation of a print job, and with the print driver modifying operational parameters of the printer and/or modifying operation of the print driver itself, in accordance with the current status. In preferred forms, status of the printer includes temperature, firmware capability and configuration, firmware version, status of on-going operations in the printer (such as cleaning and recovery operations, and printing and feeding operations) and data transfer configuration. Based on such status, the print driver modifies operational parameters of the printer. Operational parameters of the printer preferably include parameters relating to printer recovery and maintenance operations (such as purge intervals and pre-firing intervals), speed for sheet feeding, purge speed, smear reduction time intervals, and the like. A print driver of the invention may also modify its own operational flow sequence based on the printer status. Such operational modifications may include, for example, calculation and derivation of print data differently based on the printer status, transmission of data differently based on the printer status, and different user interactions based on the printer status.

According to the invention, it is also possible for the print driver to obtain current configuration information of the computing equipment within which the print driver is executing, such as time, location and date. In combination with printer status, the print driver of the invention may modify operational parameters of the printer, or its own operation, based on printer status alone, or based on printer status and current configuration of the computing equipment.

In other aspects, the invention also contemplates methods performed by such a print driver, a computer-readable storage medium storing process steps comprising such a print driver, as well as the computer executable process steps comprising such a print driver.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 14 depicts a table showing command flow during a printing sequence.

FIGS. 27C to 27G are tables for determining print direction and other print information based on print mode, head type, paper type, and print data type.

FIG. 44 is a series of print mode tables for printing with alignment and without alignment pursuant to the printer driver software alignment process of FIG. 43.

FIGS. 48 and 49A to 49C are diagrams for describing image degradation that can result from inadequate prefiring.

DETAILED DESCRIPTION OF THE PREFERRED EMBODIMENT

This detailed description of the preferred embodiment is organized into sections, as follows:
1.0 Mechanical
   1.1 Structure
   1.2 Cleaning
   1.3 Ink Cartridge
   1.4 Print Head Structure
   1.5 Print Modes
2.0 Electrical
   2.1 System Architecture
   2.2 System Function
   2.3 Control Logic
   2.4 General Operation
3.0 Architecture of Printer Software
   3.1 Operating System
   3.2 Initialization
   3.3 Tasks
   3.4 Interrupt Handlers
   3.5 Cyclic Handlers
   3.6 Commands To And From The Host Processor
      3.6.1 Control Commands
      3.6.2 Setting Commands
      3.6.3 Maintenance Commands
4.0 Automatic Sheet Feed Control
   4.1 ASF, Line Feed and Eject Speed Selection
   4.2 Early Determination of Paper Load Success
   4.3 Print Head Maintenance During Paper Load
5.0 Carriage Control
   5.1 Margin And Direction Control
      5.1.1 Printer Driver Initiated Operation
      5.1.2 Print Control Operation
   5.2 Automatic Ink Ejection and Satelliting Control
6.0 Printer Control Based On Head Alignment
7.0 Dual Head Multicolor Printing
8.0 Prefiring and Pulse Width Modulation
   8.1 Prefire Control
      8.1.1 Prefire Timing
      8.1.2 Embodiment
   8.2 Pulse Width Modulation Control
9.0 Color Printing Using Multiple Inks
10.0 Status-Based Control Over Printer
   10.1 Obtaining Status
   10.2 Bleed Reduction
   10.3 Smear Reduction
   10.4 Automatic Sheet Feed (ASF) Speed
   10.5 Prefire Timing
   10.6 Delay of Manual Feed
   10.7 Purge Speed
   10.8 Compression Mode 1.0 Mechanical This section describes the mechanical layout and functionality of a printer which includes the inventions described herein.

1.1 Structure

Figure 1:
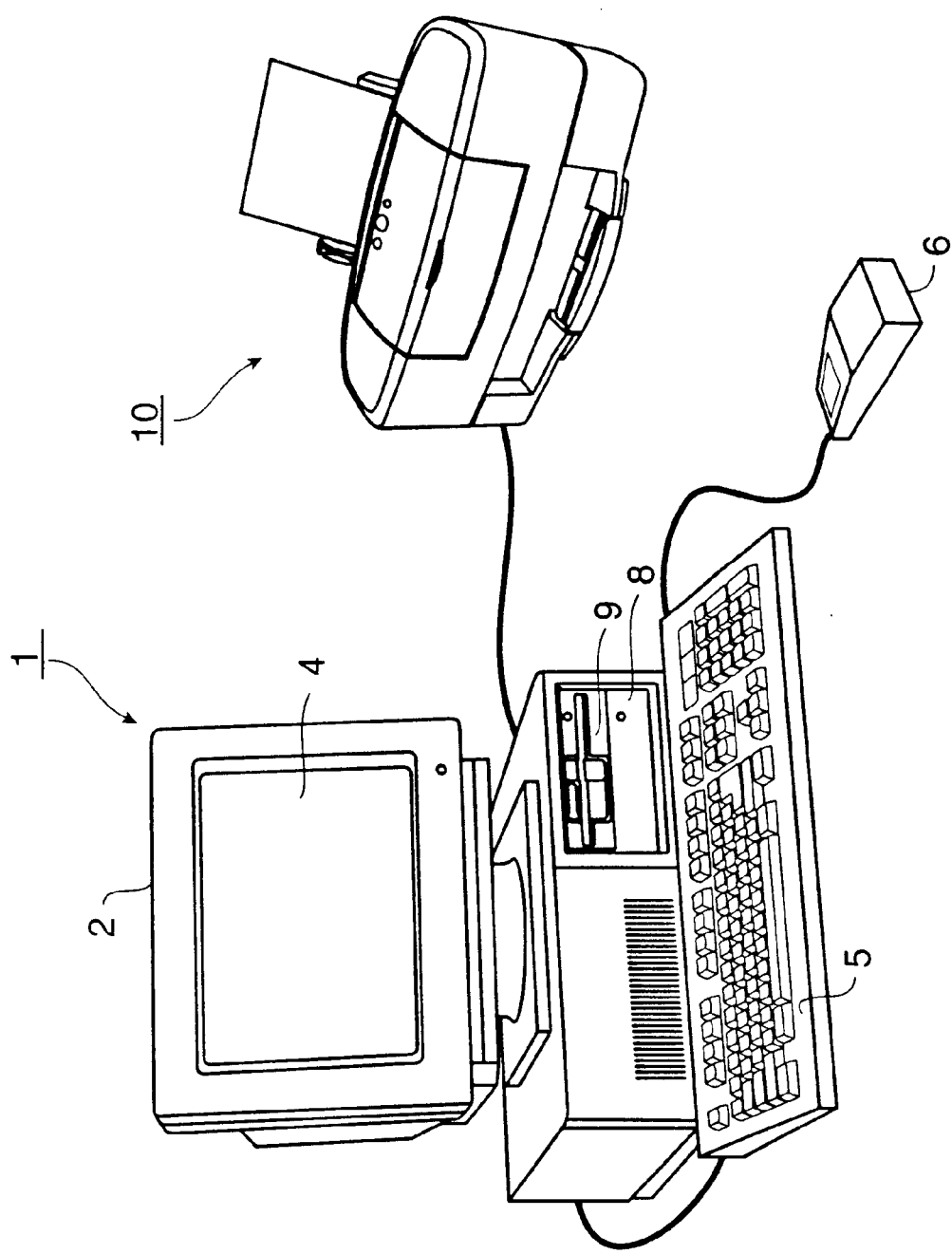
FIG. 1 shows a perspective view of computing equipment used in connection with the printer of the present invention.

FIG. 1 is a view showing the outward appearance of computing equipment used in connection with the inventions described herein. Computing equipment 1 includes host processor 2. Host processor 2 comprises a personal computer (hereinafter "PC"), preferably an IBM PC-compatible computer having a windowing environment, such as Microsoft® Windows95. Provided with computing equipment 1 are display 4 comprising a color monitor or the like, keyboard 5 for entering text data and user commands, and pointing device 6. Pointing device 6 preferably comprises a mouse for pointing and for manipulating objects displayed on display 4.

Computing equipment 1 includes a computer-readable memory medium, such as fixed computer disk 8, and floppy disk interface 9. Floppy disk interface 9 provides a means whereby computing equipment 1 can access information, such as data, application programs, etc., stored on floppy disks. A similar CD-ROM interface (not shown) may be provided with computing equipment 1, through which computing equipment 1 can access information stored on CD-ROMs.

Disk 8 stores, among other things, application programs by which host processor 2 generates files, manipulates and stores those files on disk 8, presents data in those files to an operator via display 4, and prints data in those files via printer 10. Disk 8 also stores an operating system which, as noted above, is preferably a windowing operating system such as Windows95. Device drivers are also stored in disk 8. At least one of the device drivers comprises a printer driver which provides a software interface to firmware in printer 10. Data exchange between host processor 2 and printer 10 is described in more detail below.

In preferred embodiments of the invention, printer 10 is a multi-head serial printer. Accordingly, although the inventions described herein are not limited to use with such a printer, the inventions will be described in the context of a such a printer.

Figure 2:
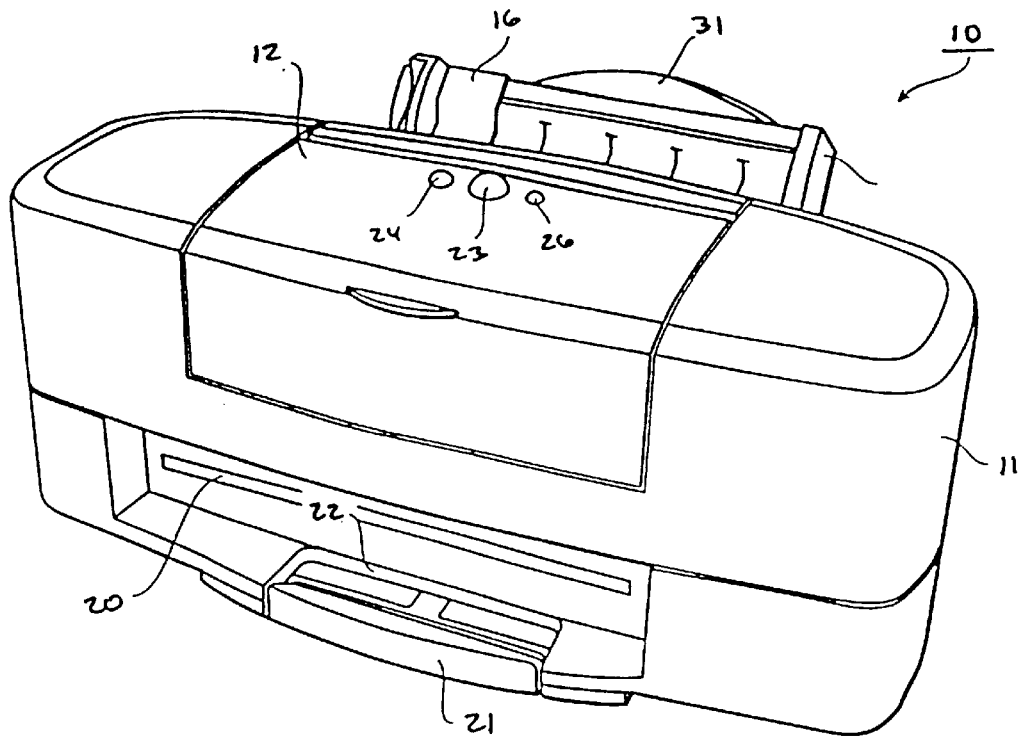
FIG. 2 is a front perspective view of the printer shown in FIG. 1.
Figure 3:
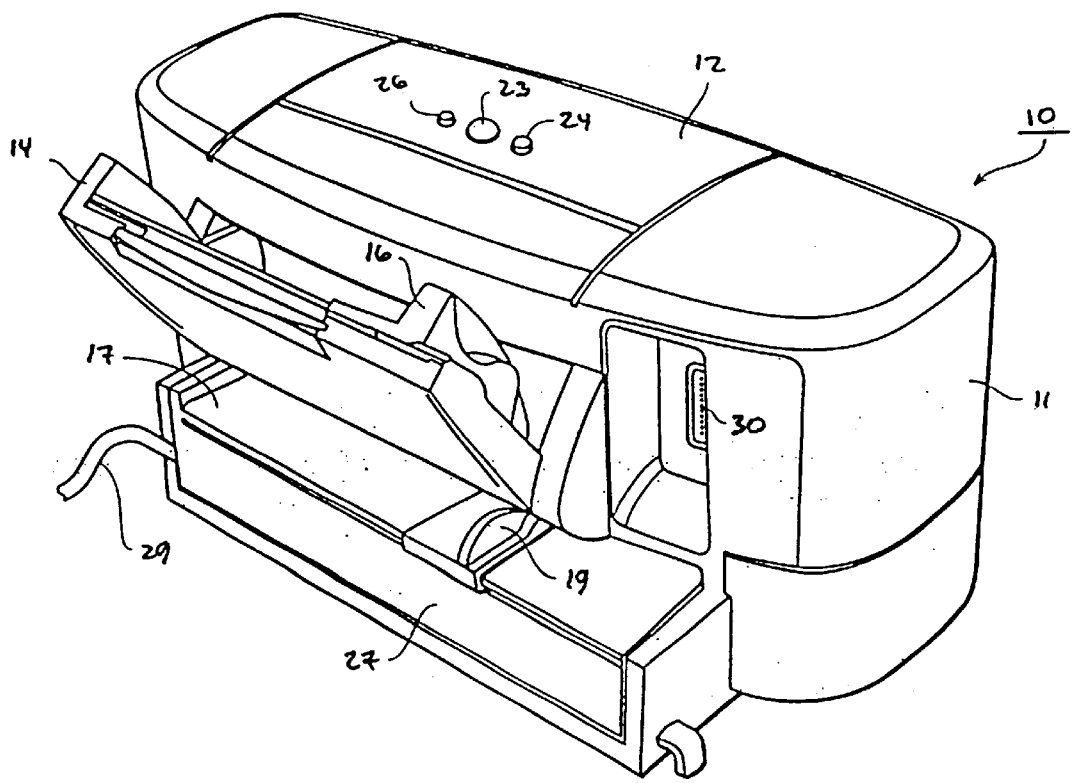
FIG. 3 is a back perspective view of the printer shown in FIG. 1.

In this regard, FIGS. 2 and 3 show close-up perspective front and back views, respectively, of printer 10. In physical structure, the preferred embodiment of printer 10 is similar to the printer disclosed in U.S. patent application Ser. No. 08/972,113, entitled "Multi-Head Printing With Differing Resolutions", filed on Nov. 17, 1997, which is incorporated herein by reference.

As shown in these FIGS. 2 and 3, printer 10 includes housing 11, access door 12, automatic feeder 14, automatic feed adjuster 16, manual feeder 17, manual feed adjuster 19, media eject port 20, ejection tray 21, tray receptacle 22, indicator light 23, power button 24, resume button 26, power supply 27, power cord 29, and parallel port connector 30.

Housing 11 is approximately 498 mm in width by 271 mm in depth by 219 mm in height, and houses the internal workings of printer 10, including the print engine described below which prints images onto recording media. Included on housing 11 is access door 12. Access door 12 is manually openable and closeable so as to permit a user to access the internal workings of printer 10 and, in particular, to access print cartridges installed in printer 10 so as to allow the user to change or replace print cartridges.

Disposed on the top of access door 12 is a front panel comprising indicator light 23, power button 24, and resume button 26. Power button 24 is a control by which a user can turn printer 10 on and off. Additional functions, however, are also available through power button 24. For example, a test print function can be selected by holding down power button 24 until a speaker (not shown) in printer 10 emits a sound, such as one beep. In response to this test print function, printer 10 prints a test pattern.

Resume button 26 provides control by which an operator can resume printing after an error condition has occurred. In addition, resume button 26 can be used to activate other functions. For example, a print head cleaning function can be activated by holding down resume button 26 until the speaker in printer 10 produces a beep.

In this regard, printer 10 is able to provide a variety of consecutive beeping sounds. Each of these sounds indicates a different type of error, such as paper empty, paper jam, etc.

Indicator light 23 is comprised of a single light pipe, a green light emitting diode (hereinafter "LED"), and an orange LED. Indicator light 23 provides a user with an indication of the operational state of printer 10. Specifically, when indicator light 23 is off, this indicates that printer 10 is powered off. When indicator light 23 is illuminated green (i.e., the green LED is activated), this indicates that printer 10 is powered on and is ready for printing. When indicator light 23 is green and blinking, this indicates an operational state of the printer, such as that the printer is currently powering on.

Indicator light 23 can also be illuminated orange by the orange LED. When indicator light 23 is illuminated orange, this indicates that a recoverable error, i.e., an operator call error, has occurred in printer 10. Recoverable errors comprise paper empty, paper jam, defective cartridge installed in printer 10, cartridge replacement in process, etc. It is possible to distinguish the type of recoverable error based on a number of beeps from printer 10's speaker. By counting these beeps when indicator LED is continuously orange, a user can determine which error has occurred and act accordingly.

When indicator light 23 is orange and blinking, this indicates that a fatal error, i.e., a service call error, has occurred in printer 10. It is possible to distinguish the type of fatal error that has occurred merely by counting how many times the orange light has blinked.

As shown in FIGS. 2 and 3, automatic feeder 14 is also included on housing 11 of printer 10. Automatic feeder 14 defines a media feed portion of printer 10. That is, automatic feeder 14 stores recording media onto which printer 10 prints images. In this regard, printer 10 is able to print images on a variety of types of recording media. These types include, but are not limited to, plain paper, high resolution paper, transparencies, glossy paper, glossy film, back print film, fabric sheets, T-shirt transfers, bubble jet paper, greeting cards, brochure paper, banner paper, thick paper, etc.

Automatic feeder 14 is able to accommodate a recording media stack which is approximately 13 mm thick. This means that automatic feeder 14 can hold, e.g., approximately 130 sheets of paper having a density of 64 g/m$^2$ or approximately 15 envelopes. During printing, individual sheets which are stacked within automatic feeder 14 are fed from automatic feeder 14 through printer 10. Specifically, rollers (described below) in printer 10 draw individual media from automatic feeder 14 into printer 10. These individual media are then fed in a "J" type path through the rollers to eject port 20 shown in FIG. 2.

Automatic feeder 14 includes automatic feed adjuster 16. Automatic feed adjuster 16 is laterally movable to accommodate different media sizes within automatic feeder 14. Automatic feeder 14 also includes backing 31, which is extendible to support recording media held in automatic feeder 14. When not in use, backing 31 is stored within a slot in automatic feeder 14, as shown in FIG. 2.

Individual sheets also can be fed through printer 10 via manual feeder 17 shown in FIG. 3, which also defines a media feed portion of printer 10. In preferred embodiments, manual feeder 17 can accommodate media having a density of at least between 64 g/m$^2$ and 550 g/m$^2$, and having a thickness of 0.8 mm. Sheets fed through manual feeder 17 are fed straight through the rollers in printer 10 to eject port 20. As was the case with automatic feeder 14, manual feeder 17 includes manual feed adjuster 19. By sliding manual feed adjuster 19 laterally, a user can vary the media which manual feeder 17 can accommodate.

Using manual feeder 17 and automatic feeder 14, printer 10 can print images on media having a variety of different sizes. These sizes include, but are not limited to, letter, legal, A4, A3, A5, B4, B5, tabloid, #10 envelope, DL envelope, banner, wide banner, and LTR full bleed. Custom-sized recording media can also be used with printer 10.

As noted above, media are fed through printer 10 and ejected from eject port 20 into ejection tray 21. Ejection tray 21 includes spring-biased flaps which support media ejected from printer 10, and which move downwardly as more media are piled thereon. When not in use, ejection tray 21 is stored within tray receptacle 22 of printer 10, as shown in FIG. 2.

Power cord 29 connects printer 10 to an external AC power source. Power supply 27 is used to convert AC power from the external power source, and to supply the converted power to printer 10. Parallel port 30 connects printer 10 to host processor 2. Parallel port 30 preferably comprises an IEEE-1284 bi-directional port, over which data and commands, such as those described below in section 3.0, are transmitted between printer 10 and host processor 2.

Figure 4:
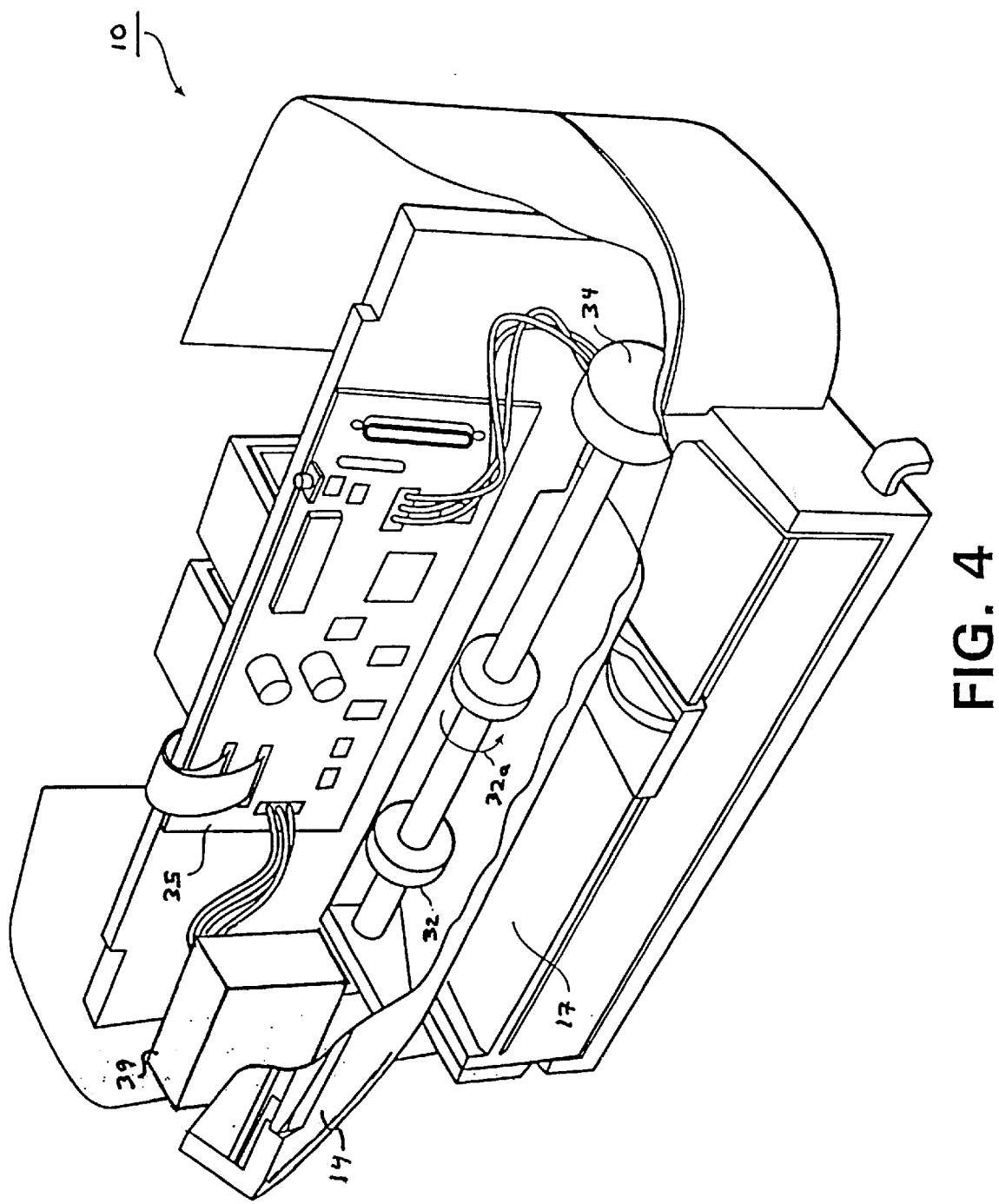
FIG. 4 is a back, cut-away perspective view of the printer shown in FIG. 1.
Figure 5:
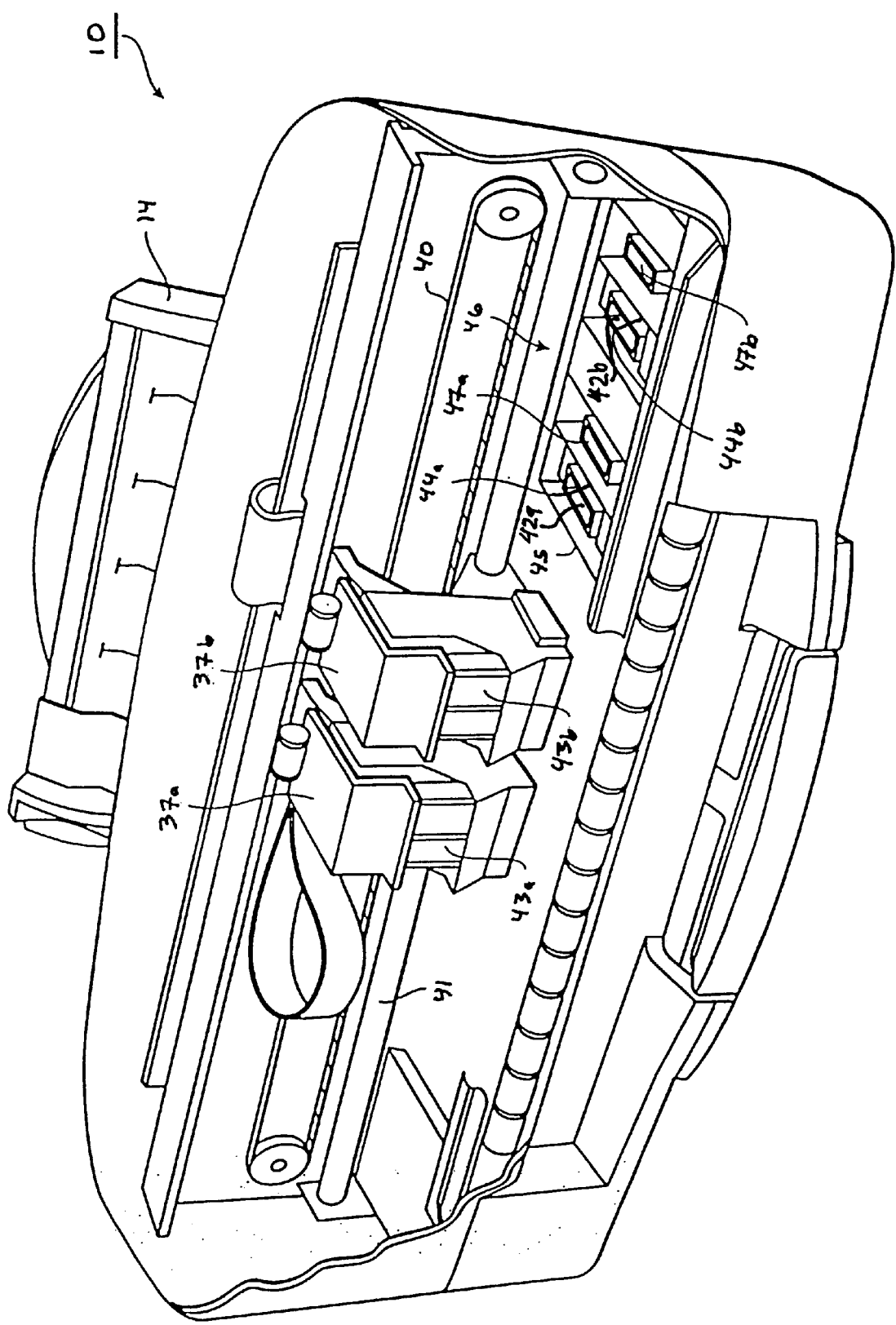
FIG. 5 is a front, cut-away perspective view of the printer shown in FIG. 1.

FIGS. 4 and 5 show back and front cut-away perspective views, respectively, of printer 10. As shown in FIG. 4, printer 10 includes rollers 32, noted above, for transporting media from either automatic feeder 14 or manual feeder 17 through printer 10 to media eject port 20. Rollers 32 rotate in a counterclockwise direction during media transport, as indicated by arrow 32a shown in FIG. 4.

Line feed motor 34 controls the rotation of rollers 32. The arrangement shown in FIG. 4 for depicting the operational relationship between line feed motor 34 and rollers 32 is a simplified arrangement for purposes of the present discussion. A more detailed description of this relationship can be found in FIGS. 5A and 5B and in the corresponding descriptions for these figures presented below. Line feed motor 34 preferably comprises a 96-step, 2 phase pulse motor and is controlled in response to signal commands received from circuit board 35. Line feed motor 34 is driven by a motor driver having four-level current control, with the four levels preferably set at 0, 40, 70 and 100 percent of maximum current.

In preferred embodiments, line feed motor 34 is able to cause rollers 32 to rotate so that a recording medium is fed through printer 10 at 238 mm/sec at the maximum speed of line feed motor 34. In a primary mode of operation for printer 10, line feed resolution is (1/720)inches/pulse (2-2 phase), and in a 1440 dpi mode, line resolution is (1/1440) inches/pulse (1-2 phase). Print modes are described in more detail below.

As shown in FIG. 5, printer 10 is a dual-cartridge printer which prints images using two print heads (i.e., one head per cartridge). Specifically, these cartridges preferably are held side-by-side by cartridge receptacles 37a and 37b such that respective print heads on the cartridges are offset horizontally from each other. Carriage motor 39, shown in FIG. 4, controls the motion of cartridge receptacles 37a and 37b in response to signal commands received from circuit board 35. Specifically, carriage motor 39 controls the motion of belt 40, which in turn controls the movement of cartridge receptacles 37a and 37b along carriage 41. In this regard, carriage motor 39 provides for bi-directional motion of belt 40, and thus of cartridge receptacles 37a and 37b. By virtue of this feature, printer 10 is able to print images from both left to right and right to left.

Carriage motor 39 comprises a 96-step, 2 phase pulse motor resulting in a carriage resolution of (9/360)inches/ pulse. Carriage motor 39 is driven by a motor driver having four-level current control. When printer 10 is printing in a 360 dpi standard default mode, carriage motor 39 is driven to cause cartridge receptacles 37a and 37b to move along carriage 41 at a speed of 22.5 inches/sec, which corresponds to a print head heat pulse frequency of 6.51 KHz. When printer 10 is printing in a 360 dpi draft mode, carriage motor 39 is driven to cause cartridge receptacles 37a and 37b to move along carriage 41 at a speed of 27.5 inches/sec, which corresponds to a print head heat pulse frequency of 10.0 KHz. In contrast, when printer 10 is printing in a 720 dpi mode, carriage motor 39 is driven to cause cartridge receptacles 37a and 37b to move along carriage 41 at a default speed of 13.8 inches/sec (10.0 KHz).

Cartridge receptacles 37a and 37b are used to hold ink cartridges 43a and 43b (which each include a print head and can include one or more removable ink reservoirs for storing ink) in printer 10. A representative ink cartridge is described below in Section 1.3 with reference to FIG. 6.

Returning to FIG. 5, printer 10 preferably includes pre-fire receptacles 42a and 42b, wipers 44a and 44b and ink cleaning mechanism 45. Ink cleaning mechanism 45 is disposed at home location 46 and comprises a rotary pump (not shown) and print head connection caps 47a and 47b. Print head connection caps 47a and 47b connect to print heads of cartridges installed in cartridge receptacles 37a and 37b, respectively, during print head cleaning and at other times, such as when printer 10 is powered off, so as to protect the print heads.

Line feed motor 34 drives the rotary pump of ink cleaning mechanism 45 so as to suction excess ink from a print head connected to either of print head connection caps 47a and 47b. Preferably, ink can be suctioned from one cartridge at a time.

Wipers 44a and 44b can comprise blades or the like which are driven by carriage motor 39 to wipe excess ink from cartridge print heads. Specifically, wipers 44a and 44b are lifted to contact a print head after a predetermined condition has occurred. For example, wipers 44a and 44b can be lifted after a predetermined number of dots have been printed by a print head.

Figure 5A:
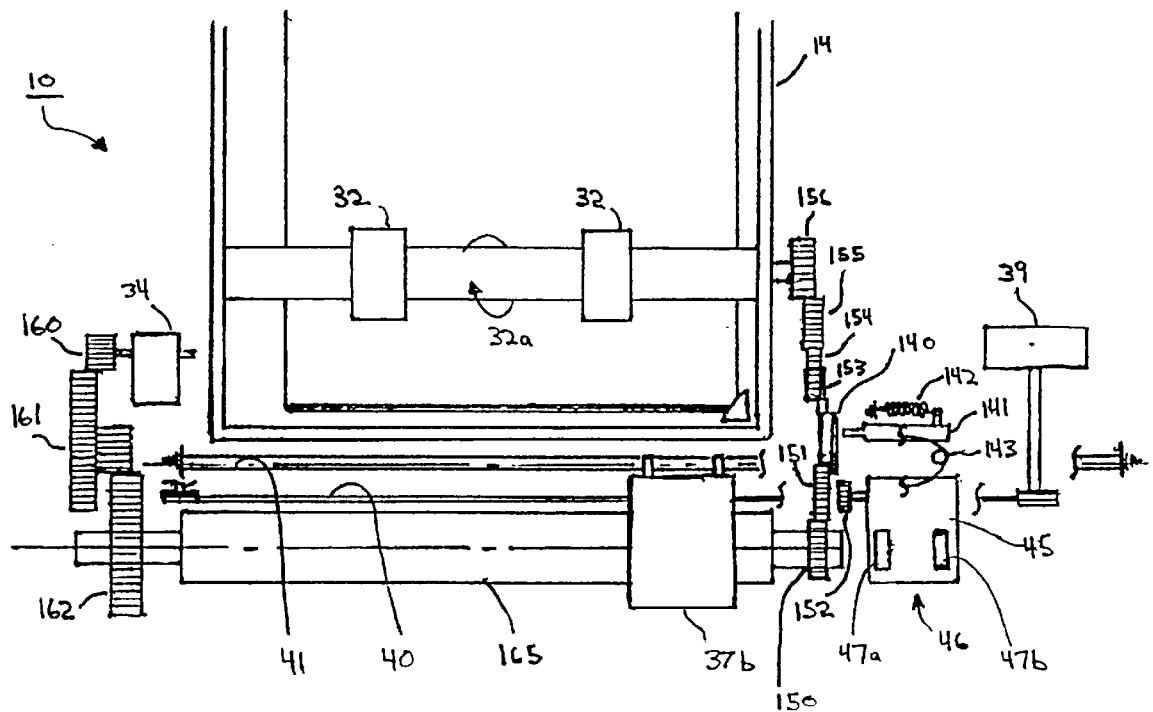
FIG. 5A is a top-down plan view of the printer shown in FIG. 1.

FIG. 5A shows the interoperation of line feed motor 34 and of carriage motor 39 for the operation of the automatic feeder rollers 32 and the ink cleaning mechanism 45. Specifically referring to FIG. 5A, the line feed motor 34 operates line feed roller 165 through gears 160, 161 and 162. Clutch unit 140 is driven by line feed roller 165 through gears 150 and 151. Clutch unit 140 and control rod 141 operate in cooperation with line feed motor 34 and carriage motor 39 to position clutch unit 140 in one of several positions corresponding to either: (1) a neutral position for normal printing; (2) a position for operation of the automatic feeder; or (3) a position for operation of the ink cleaning mechanism.

As shown in FIG. 5A, carriage motor 39 drives belt 40 to move cartridge receptacle 37b in a linear motion along carriage 41. The movement of cartridge receptacle 37b past the home position 46 towards the right end of carriage 41 allows cartridge receptacle 37b to translate control rod 141 away from clutch unit 140 so as to disengage the pin-shaped end of control rod 141 from clutch unit 140. Line feed motor 34 is then turned for a limited rotation in a given direction to re-engage clutch unit 140 in a new position so as to drive either the automatic feed rollers 32 or the ink cleaning mechanism 45.

Figure 5B:
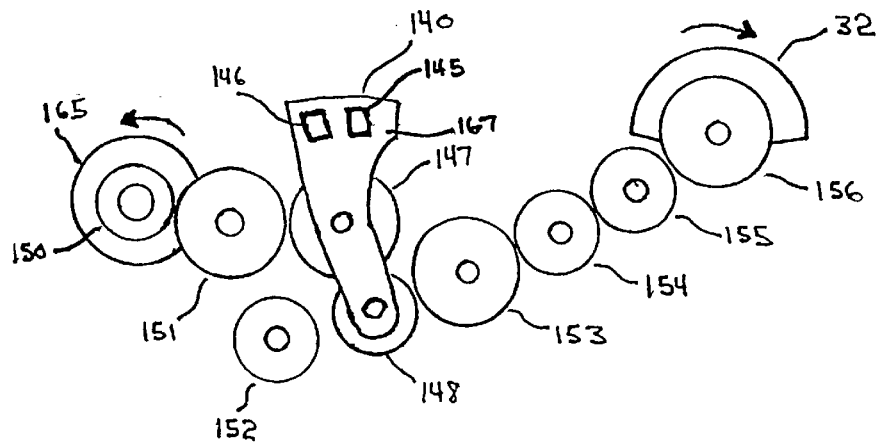
FIG. 5B shows a face-on view of clutch plate and gears operated by both line feed motor and carriage motor of the printer shown in FIG. 1.

FIG. 5B provides a more detailed view of clutch unit 140 and the surrounding gears provided for the operation of automatic feeder rollers 32 or for the operation of ink cleaning mechanism 45. Specifically, clutch unit 140 consists of two separate and mutually exclusive slots, 145 and 146, for the engagement of the pin-shaped end of control rod 141, gear 147 for rotation by line feed roller 165 through gears 150 and 151, and gear 148 for rotation by gear 147. Gear 148 is the driving gear of clutch unit 140 and either spins freely in the neutral position, or is engaged with input gear 152 when driving the purge pump (not shown) in ink cleaning mechanism 45 or is engaged with gear 153 when driving automatic feeder rollers 32.

During neutral operation of clutch unit 140, slot 145 of clutch unit 140 is engaged by control rod 141. In this position, gear 148 is disengaged from both of gears 152 and 153, thereby preventing the operation of ink cleaning mechanism 45 and automatic feeder rollers 32. During operation of ink cleaning mechanism 45, slot 146 of clutch unit 140 is engaged by control rod 141, thereby biasing gear 148 to engage with input gear 152. Input gear 152 thereupon operates ink cleaning mechanism 45 to remove excess ink from the print heads. During operation of automatic feeder rollers 32, control rod 141 is positioned directly on front plate 167 of clutch unit 140, thereby biasing gear 148 to engage with gear 153 so as to drive automatic feeder rollers 32 via gears 153 through 156.

Figure 5C:
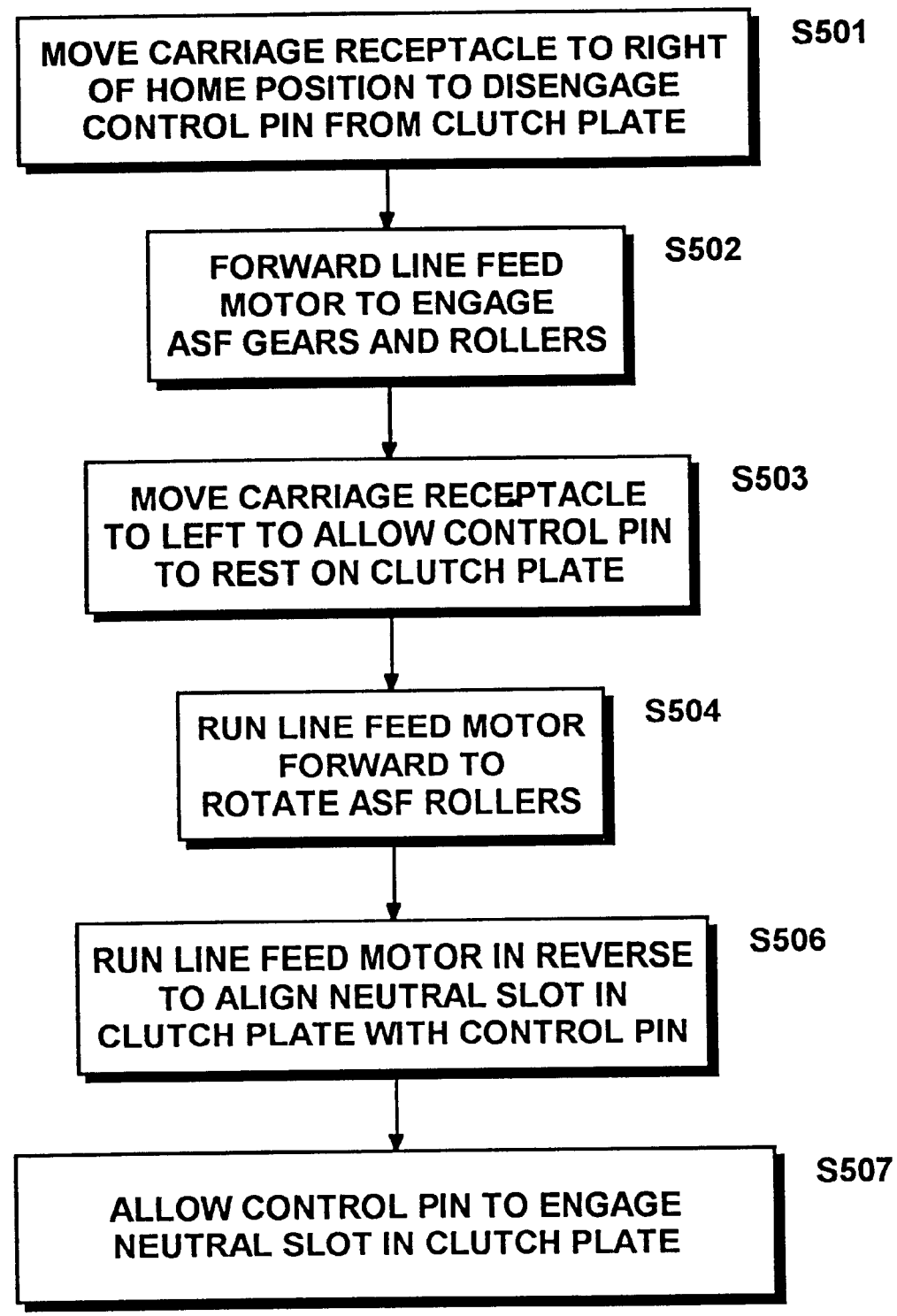
FIG. 5C is a flow diagram which depicts operation of the automatic sheet feeder process for the printer of the present invention.

FIG. 5C provides the detailed steps for engaging clutch unit 140 so as to operate automatic feeder rollers 32. As shown in FIG. 5C, the first step S501 consists of disengaging clutch unit 140. This is performed by moving the carriage receptacle 37b past home position 46 so as to disengage control rod 141 from clutch unit 140. Next, step S502 consists of moving line feed motor 34 in the forward direction so as to engage gear 148 of clutch unit 140 with gear 153 for driving automatic feeder rollers 32 via gears 153 through 156. In step S503, cartridge receptacle 37b is moved to the left of home position 46 so as to allow control spring 142 to bias control rod 141 against front plate 167 of clutch unit 140. In step S504, line feed motor 34 is then operated in forward, thereby causing the rotation of automatic feeder rollers 32. Line feed motor 34 is then operated in the reverse direction in step S506 so as to align neutral slot 145 of clutch unit 140 with control rod 141, thereby disengaging automatic feeder rollers 32 from line feed motor 34. Control rod 141 is then biased by spring 142 (step S507) to engage neutral slot 145 so as to return clutch unit 140 to a neutral position.

Figure 5D:
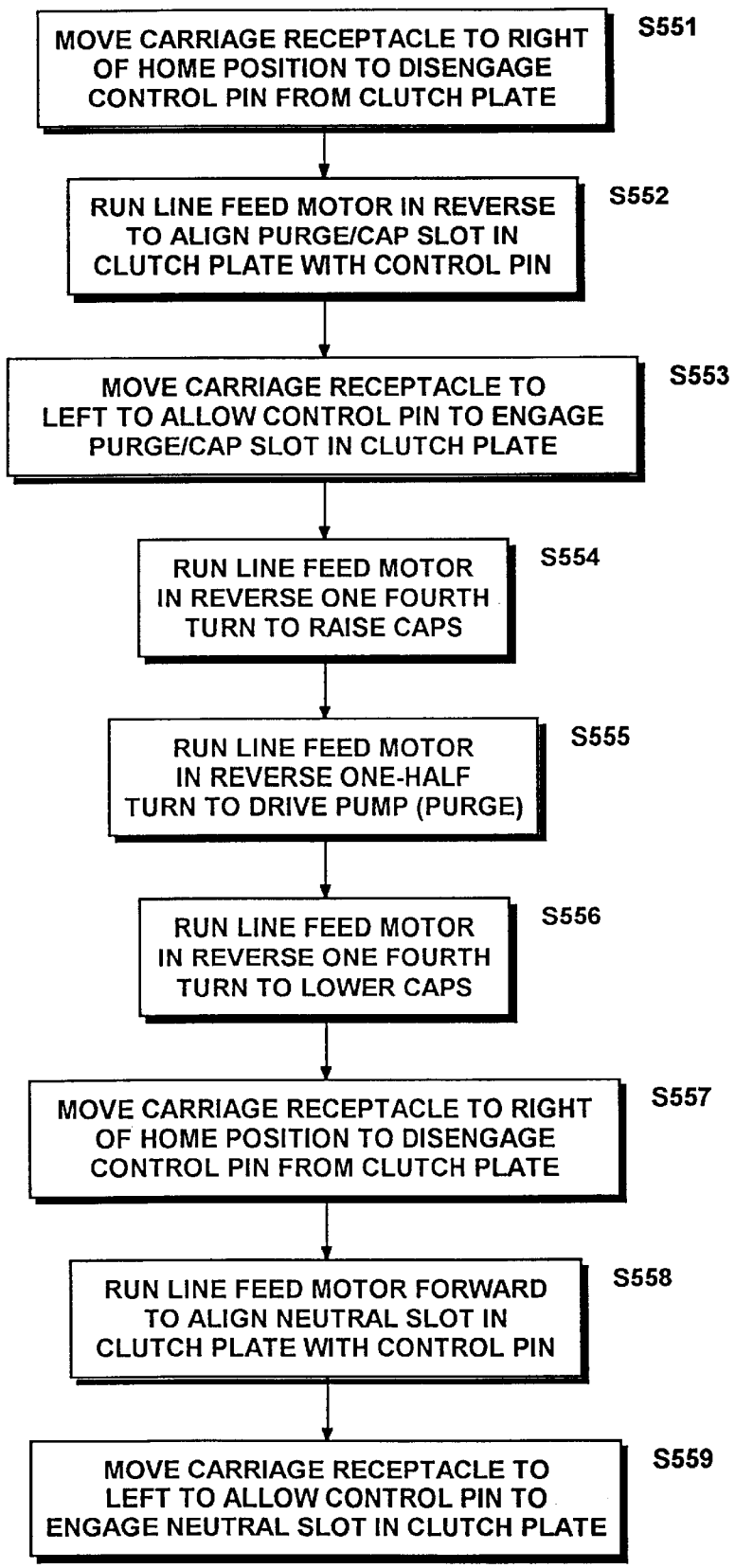
FIG. 5D is a flow diagram which depicts operation of the capping and purge process for the printer of the present invention.

FIG. 5D provides the detailed steps for engaging clutch unit 140 so as to operate ink cleaning mechanism 45. As shown in FIG. 5D, step S551 consists of disengaging clutch unit 140. This is performed by moving carriage receptacle 37b past home position 46 so as to disengage control rod 141 from clutch unit 140. Next, step S552 consists of moving line feed motor 34 in the reverse direction to align slot 146 of clutch unit 140 with control rod 141, thereby engaging gear 148 of clutch unit 140 with input gear 152 for driving ink cleaning mechanism 45. Step S553 then comprises moving cartridge receptacle 37b to the left of home position 46 so as to allow control spring 142 to bias control rod 141 for engagement with slot 146 of clutch unit 140. In step S554, line feed motor 34 is then operated in the reverse position for one-quarter rotation so as to raise print head connection caps 47a and 47b for engagement with the print heads. In step S555, line feed motor 34 is operated in the reverse position for one-half rotation so as to drive the rotary pump of ink cleaning mechanism 45 to remove excess ink from the print heads. Print head connection caps 47a and 47b are then lowered in step S556 by operating line feed motor 34 in the reverse position for one-quarter rotation. Clutch unit 140 is returned to the neutral position in step S557 by moving cartridge receptacle 37b past home position 46 to disengage control pin 141 from clutch unit 140. Line feed motor 34 is then operated in the forward direction in S558 so as to align neutral slot 145 of clutch unit 140 with control rod 141. Cartridge receptacle 37b is then moved to the left of home position 46 in step S559, thereby allowing control rod 141 to engage slot 145 so as to return clutch unit 140 to a neutral position.

1.2 Cleaning

Printer 10 includes a manual cleaning function which can be activated via its front panel. Specifically, manual cleaning is activated by pressing resume button 26 until printer 10 emits a beep which is two seconds long. To indicate that manual cleaning has been activated, indicator light 23 blinks. Any medium in the process of printing is then ejected from eject port 20. Ink cleaning mechanism 45 then cleans, e.g., suctions ink from and wipes ink off of, the print heads of ink cartridges stored in cartridge receptacles 37a and 37b, and the suctioned and wiped ink is stored in a waste ink storage area. Thereafter, indicator light 23 stops blinking and is turned on if no errors have occurred. In the event that a waste ink error has occurred, e.g., the waste ink storage area is near capacity, the orange LED will illuminate indicator light 23 and printer 10 will emit six beeping sounds.

1.3 Ink Cartridge

The printer described herein can use ink cartridges which include removable ink reservoirs for storing different types of ink.

Figure 6:
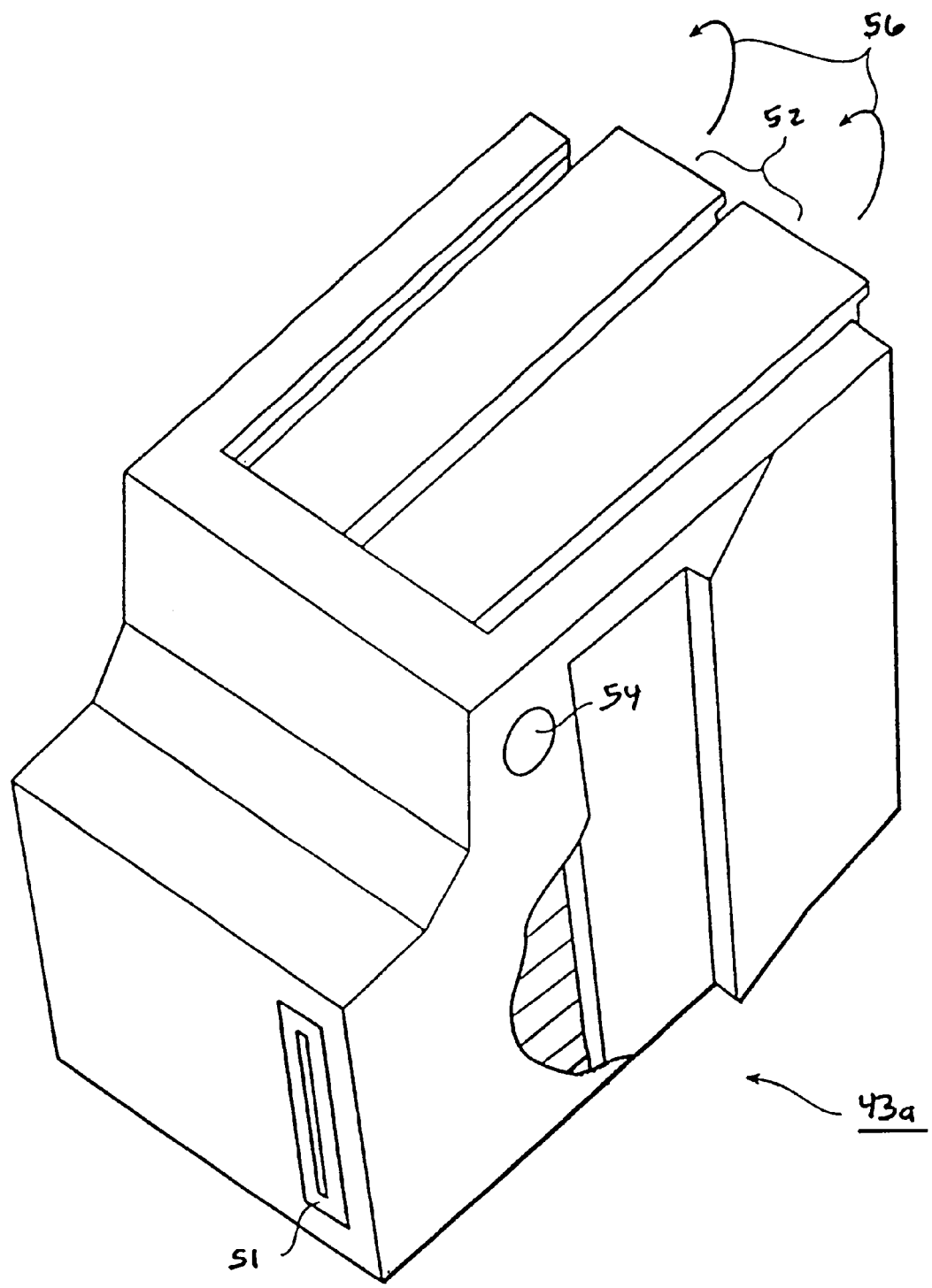
FIG. 6 shows an example of a disposable ink cartridge used with the present invention.

FIG. 6 shows the configuration of ink cartridge 43a which may be installed within cartridge receptacle 37a (see FIG. 5). Ink cartridge 43b may be configured identically to ink cartridge 43a. Therefore, for the sake of brevity, only ink cartridge 43a is described herein.

As shown in FIG. 6, ink cartridge 43a comprises print head 51, ink reservoirs 52, and cartridge hole 54. At this point, it is noted that the present invention can also be used with ink cartridges that do not contain removable ink reservoirs, but instead store all ink internally.

Ink reservoirs 52 are removable from ink cartridge 43a and store ink used by printer 10 to print images. Specifically, ink reservoirs 52 are inserted within cartridge 43a and can be removed by pulling along the direction of arrows 56, as shown in FIG. 6. Reservoirs 52 can store color (e.g., cyan, magenta and yellow) ink and/or black ink, as described in more detail below. Print head 51 includes a plurality of nozzles (not shown) which eject ink from ink reservoirs 52 during printing. Cartridge hole 54 mates to a pin (not shown) on cartridge receptacle 37a so as to hold ink cartridge 43a in place.

In general, printer 10 can operate with a variety of different cartridge types. For example, printer 10 can use a cartridge which stores dye-based black ink and which has a print head with 128 nozzles extending in the vertical direction. An example of such a cartridge is a Canon BC-20 cartridge. A similar type cartridge may also be used which stores pigment black ink. An example of such a cartridge is a Canon BC-23 cartridge. In this regard, generally speaking, dye-based black ink has high penetration characteristics relative to a recording medium. On the other hand, pigment-based black ink generally has low penetration characteristics (and in some cases no penetration) relative to a recording medium.

Printer 10 can also operate with color ink cartridges. For example, printer 10 can operate with an ink cartridge which stores cyan, magenta, yellow and black inks, and which includes 136 nozzles extending in the vertical direction. In such a cartridge, 24 nozzles print with cyan ink, 24 nozzles print with magenta ink, 24 nozzles print with yellow ink, and 64 nozzles print with black ink. An example of such a cartridge is a Canon BC-1(e) cartridge.

Still another example of an ink cartridge that may be used with printer 10 stores reduced optical density (e.g., "photo")

ink, and includes 136 nozzles arranged in the vertical direction. Such a cartridge also has the same nozzle configuration as the color cartridge described above. An example of such a cartridge is a Canon BC-22 cartridge.

1.4 Print Head Structure

Figure 7:
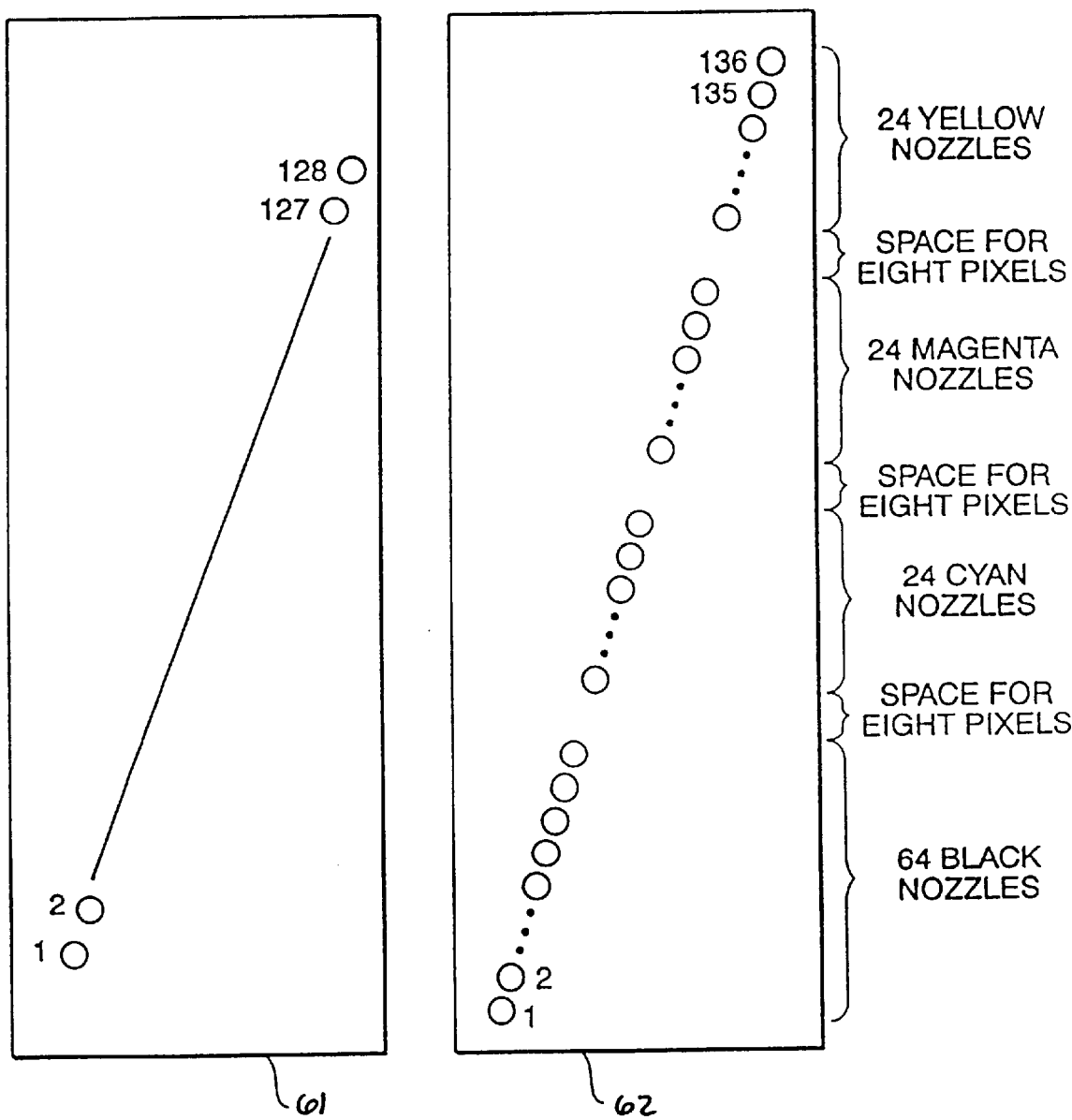
FIG. 7 shows a face-on view of head configurations for print heads used with the present invention.

With regard to the physical construction of the print heads of cartridges that may be used with the present invention, FIG. 7 shows a close-up, face-on view of nozzle configurations for a case in which printer 10 includes print head 61 having 128 nozzles and arranged near-vertical, with each nozzle closely spaced to adjacent nozzles. Such an arrangement is preferred for single color (such as black) printing. The nozzles are preferably arranged at a slight oblique slant so that as the print head is moved across the recording medium, it is possible to fire the nozzles in rapid succession, rather than all at once, so as to print a vertical line. The power and control requirements for firing nozzles in rapid succession are significantly reduced relative to those for firing all at once. One preferable arrangement of slant angle would correspond to a one pixel horizontal change for every 16 vertical nozzles, at 360 dpi resolution.

Print head 62 has 136 nozzles, with 24 nozzles preferably for yellow ink, 24 nozzles preferably for magenta ink, 24 nozzles preferably for cyan ink, and 64 nozzles preferably for black ink, arranged at a slight slant angle to vertical, one on top of another. Each color group of nozzles is separated from an adjacent group by a vertical gap corresponding to 8 nozzles. The slight slant angle is, again, arranged to provide one pixel of horizontal change for every 16 vertical nozzles, at 360 dpi.

1.5 Print Modes

During its operation, printer 10 includes different modes which may be set via commands issued to printer 10 by host processor 2 (see FIG. 1). In these modes, cartridges installed in printer 10 may eject different-sized ink droplets to form images having different resolutions. Whether certain modes of printer 10 are available depends, in part, on the type of cartridge installed in printer 10. That is, print heads on some types of cartridges are capable of ejecting different-sized droplets, e.g., large or small ink droplets, whereas print heads on other types of cartridges are capable of ejecting droplets having a single size.

As noted above, different ink droplet sizes are used during different printer operational modes to form images having different resolutions. More specifically, ink jet printers create images by forming dots on a page. The resolution of a formed image corresponds in part to the number of dots formed and in part to the arrangement in which those dots are formed. In the printer of the present invention, images can be formed at a variety of different resolutions using either the large or small ink droplets described above.

At this point, it is noted that dot allocation and arrangement during printing is limited, in part, based upon the type of paper used during printing. Specifically, plain paper can absorb approximately a maximum of four small droplets in a 360 dpi pixel, whereas high resolution (hereinafter "HR-101") paper can absorb a maximum of 6 small droplets in a 360 dpi pixel.

2.0 Electrical

As described in section 1.0 above, printer 10 may use multiple print heads in different combinations, such as black-black, black-color, color-color, or color-photo, so that several print modes may be executed at different resolutions (e.g., 180 dpi, 360 dpi, 720 dpi). Further, print head combinations may be changed for different print modes, such as text, text and color, color and high quality color. As a result, printing tasks for the different modes require complex operations that vary based on the print head combination, recording media and print quality. In the information processing system of FIG. 1, printer parameters relating to print head configuration, print head alignment, etc. are stored in printer 10 and sent to host processor 2 based on data obtained by printer 10. Preferably, a printer driver in host processor 2 performs the complex processing of print data and printer set up for the various print modes and sends dictated command sequences to the printer that simplify printing execution.

2.1 System Architecture

Figure 8:
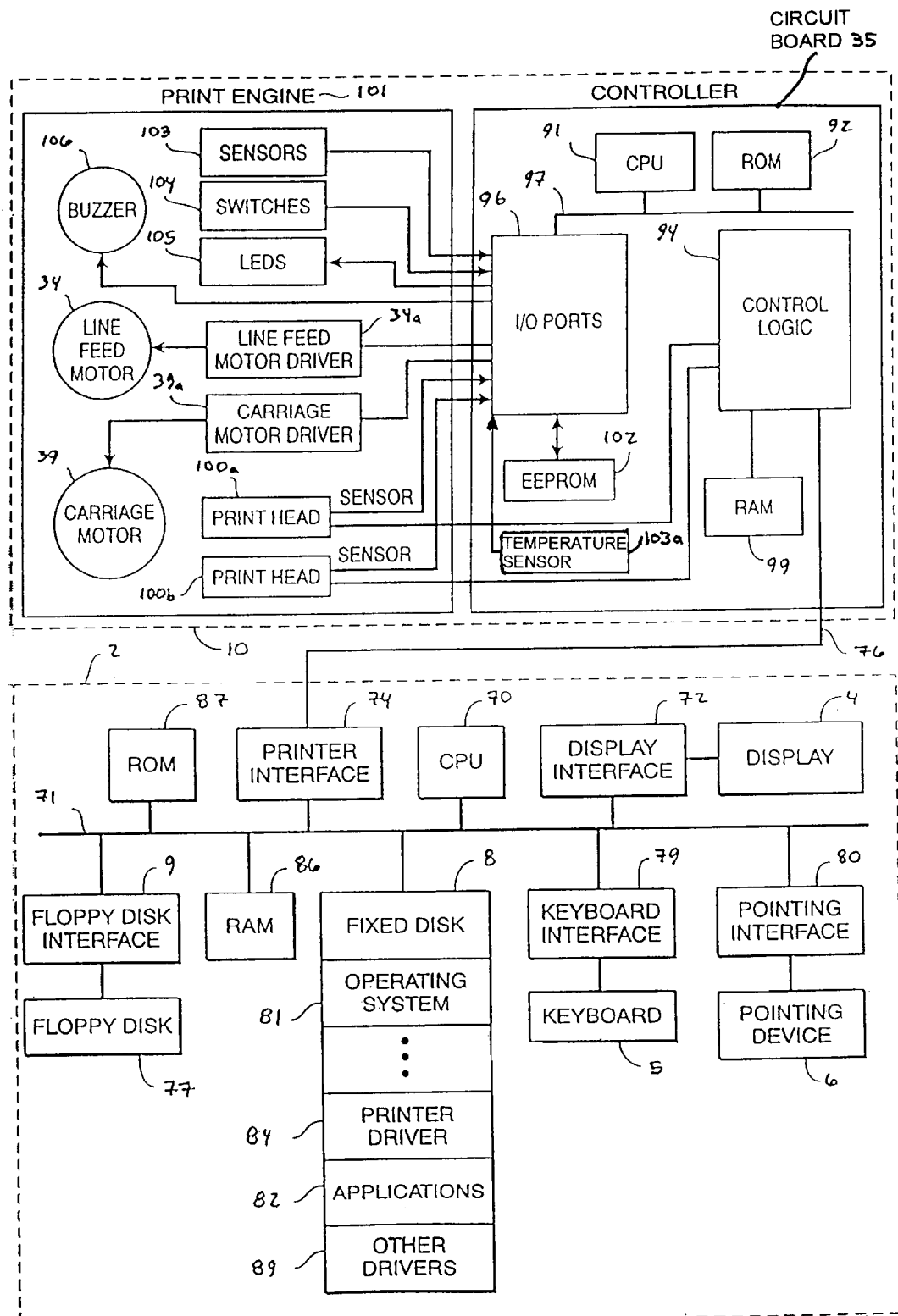
FIG. 8 is a block diagram showing the hardware configuration of a host processor interfaced to the printer of the present invention.

FIG. 8 is a block diagram showing the internal structures of host processor 2 and printer 10. In FIG. 8, host processor 2 includes a central processing unit 70 such as a programmable microprocessor interfaced to computer bus 71. Also coupled to computer bus 71 are display interface 72 for interfacing to display 4, printer interface 74 for interfacing to printer 10 through bi-directional communication line 76, floppy disk interface 9 for interfacing to floppy disk 77, keyboard interface 79 for interfacing to keyboard 5, and pointing device interface 80 for interfacing to pointing device 6. Disk 8 includes an operating system section for storing operating system 81, an applications section for storing applications 82, and a printer driver section for storing printer driver 84.

A random access main memory (hereinafter "RAM") 86 interfaces to computer bus 71 to provide CPU 70 with access to memory storage. In particular, when executing stored application program instruction sequences such as those associated with application programs stored in applications section 82 of disk 8, CPU 70 loads those application instruction sequences from disk 8 (or other storage media such as media accessed via a network or floppy disk interface 9) into random access memory (hereinafter "RAM") 86 and executes those stored program instruction sequences out of RAM 86. RAM 86 provides for a print data buffer used by printer driver 84 according to the invention, as described more fully hereinbelow. It should also be recognized that standard disk-swapping techniques available under the windowing operating system allow segments of memory, including the aforementioned print data buffer, to be swapped on and off of disk 8. Read only memory (hereinafter "ROM") 87 in host processor 2 stores invariant instruction sequences, such as start-up instruction sequences or basic input/output operating system (BIOS) sequences for operation of keyboard 5.

As shown in FIG. 8, and as previously mentioned, disk 8 stores program instruction sequences for a windowing operating system and for various application programs such as graphics application programs, drawing application programs, desktop publishing application programs, and the like. In addition, disk 8 also stores color image files such as might be displayed by display 4 or printed by printer 10 under control of a designated application program. Disk 8 also stores a color monitor driver in other drivers section 89 which controls how multi-level RGB color primary values are provided to display interface 72. Printer driver 84 controls printer 10 for both black and color printing and supplies print data for print out according to the configuration of printer 10. Print data is transferred to printer 10, and control signals are exchanged between host processor 2 and printer 10, through printer interface 74 connected to line 76 under control of printer driver 84. Other device drivers are also stored on disk 8, for providing appropriate signals to various devices, such as network devices, facsimile devices, and the like, connected to host processor 2.

Ordinarily, application programs and drivers stored on disk 8 need first to be installed by the user onto disk 8 from other computer-readable media on which those programs and drivers are initially stored. For example, it is customary for a user to purchase a floppy disk, or other computer-readable media such as CD-ROM, on which a copy of a printer driver is stored. The user would then install the printer driver onto disk 8 through well-known techniques by which the printer driver is copied onto disk 8. At the same time, it is also possible for the user, via a modem interface (not shown) or via a network (not shown), to download a printer driver, such as by downloading from a file server or from a computerized bulletin board.

Referring again to FIG. 8, printer 10 includes a circuit board 35 on which are mounted CPU 91 such as an 8-bit or a 16-bit microprocessor including programmable timer and interrupt controller, ROM 92, control logic 94, and I/O ports unit 96 connected to bus 97. Also connected to control logic 94 is RAM 99. Control logic 94 includes controllers for line feed motor 34, for print image buffer storage in RAM 99, for heat pulse generation, and for head data. Control logic 94 also provides control signals for nozzles in print heads 100a and 100b of print engine 101, carriage motor 39, line feed motor 34, and print data for print heads 100a and 100b, and receives information from print engine 101 for alignment of print heads 100a and 100b through I/O ports unit 96. EEPROM 102 is connected to I/O ports unit 96 to provide non-volatile memory for printer information such as print head configuration and print head alignment parameters. EEPROM 102 also stores parameters that identify the printer, the driver, the print heads, alignment of the print heads, the status of ink in the cartridges, etc., which are sent to printer driver 84 of host processor 2 to inform host processor 2 of the operational parameters of printer 10.

I/O ports unit 96 is coupled to print engine 101 in which a pair of print heads 100a and 100b (which would be stored in cartridge receptacles 37a and 37b, respectively) perform recording on a recording medium by scanning across the recording medium while printing using print data from a print buffer in RAM 99. Control logic 94 is also coupled to printer interface 74 of host processor 2 via communication line 76 for exchange of control signals and to receive print data and print data addresses. ROM 92 stores font data, program instruction sequences used to control printer 10, and other invariant data for printer operation. RAM 99 stores print data in a print buffer defined by printer driver 84 for print heads 100a and 100b and other information for printer operation.

Print heads 100a and 100b of print engine 101 correspond to ink cartridges that are stored in cartridge receptacles 37a and 37b, respectively. Sensors, generally indicated as 103, are arranged in print engine 101 to detect printer status and to measure temperature and other quantities that affect printing. In particular, a temperature sensor 103a which is mounted on circuit board 35, measures ambient environmental temperature. A low precision thermistor, which measures temperature to within plus or minus three degrees Celsius is suitable for temperature sensor 103a. A photo sensor (e.g., an automatic alignment sensor) in cartridge receptacles 37a and/or 37b measures print density and dot locations for automatic alignment. Sensors 103 are also arranged in print engine 101 to detect other conditions such as the open or closed status of access door 12, presence of recording media, etc. In addition, diode sensors, including a thermistor, are located in print heads 100a and 100b to measure print head temperature, which is transmitted to I/O ports unit 96.

I/O ports unit 96 also receives input from switches 104 such as power button 24 and resume button 26 and delivers control signals to LEDs 105 to light indicator light 23, to buzzer 106, and to line feed motor 34 and carriage motor 39 through line feed motor driver 34a and carriage motor driver 39a, respectively. As described above, buzzer 106 may comprise a speaker.

Although FIG. 8 shows individual components of printer 10 as separate and distinct from one another, it is preferable that some of the components be combined. For example, control logic 94 may be combined with I/O ports 96 in an ASIC to simplify interconnections for the functions of printer 10.

2.2 System Function

Figure 9:
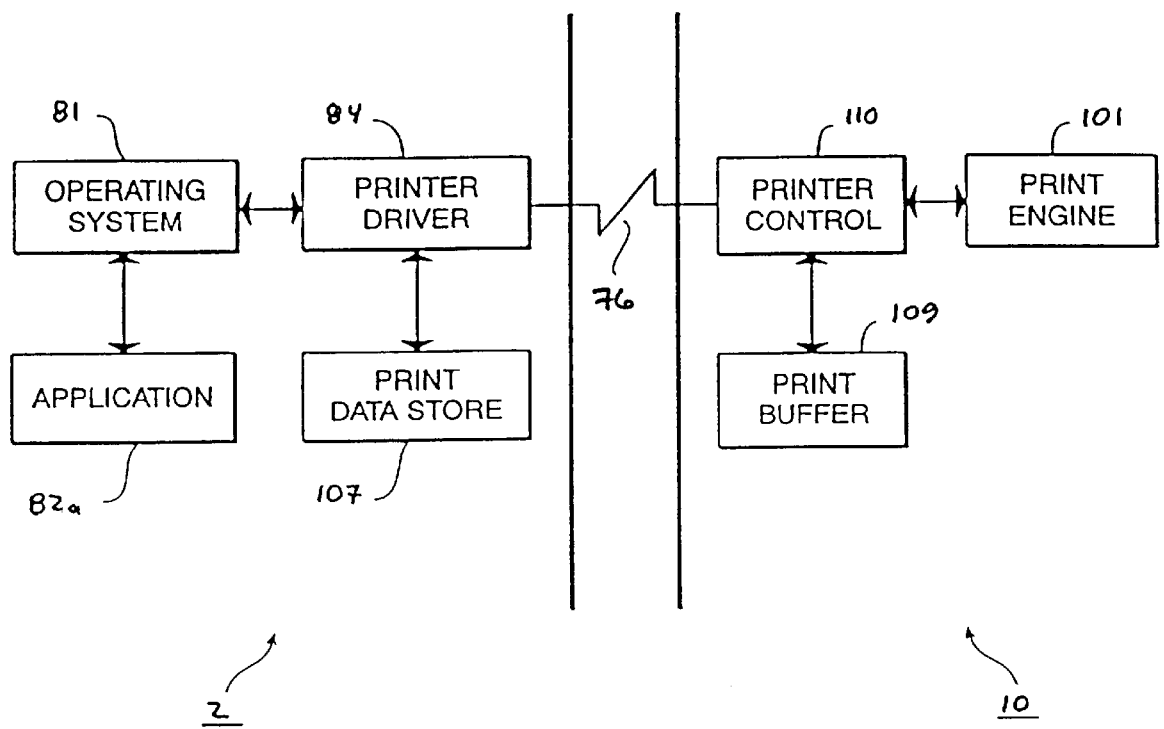
FIG. 9 shows a functional block diagram of the host processor and printer shown in FIG. 8.

FIG. 9 shows a high-level functional block diagram that illustrates the interaction between host processor 2 and printer 10. As illustrated in FIG. 9, when a print instruction is issued from image processing application program 82a stored in application section 82 of disk 8, operating system 81 issues graphics device interface calls to printer driver 84. Printer driver 84 responds by generating print data corresponding to the print instruction and stores the print data in print data store 107. Print data store 107 may reside in RAM 86 or in disk 8, or through disk swapping operations of operating system 81 may initially be stored in RAM 86 and swapped in and out of disk 8. Thereafter, printer driver 84 obtains print data from print data store 107 and transmits the print data through printer interface 74, to bi-directional communication line 76, and to print buffer 109 through printer control 110. Print buffer 109 resides in RAM 99, and printer control 110 resides in firmware implemented through control logic 94 and CPU 91 of FIG. 8. Printer control 110 processes the print data in print buffer 109 responsive to commands received from host processor 2 and performs printing tasks under control of instructions stored in ROM 92 (see FIG. 8) to provide appropriate print head and other control signals to print engine 101 for recording images onto recording media.

Print buffer 109 has a first section for storing print data to be printed by one of print heads 100a and 100b, and a second section for storing print data to be printed by the other one of print heads 100a and 100b. Each print buffer section has storage locations corresponding to the number of print positions of the associated print head. These storage locations are defined by printer driver 84 according to a resolution selected for printing. Each print buffer section also includes additional storage locations for transfer of print data during ramp-up of print heads 100a and 100b to printing speed. Print data is transferred from print data store 107 in host processor 2 to storage locations of print buffer 109 that are addressed by printer driver 84. As a result, print data for a next scan may be inserted into vacant storage locations in print buffer 109 both during ramp up and during printing of a current scan.

2.3 Control Logic

Figure 10:
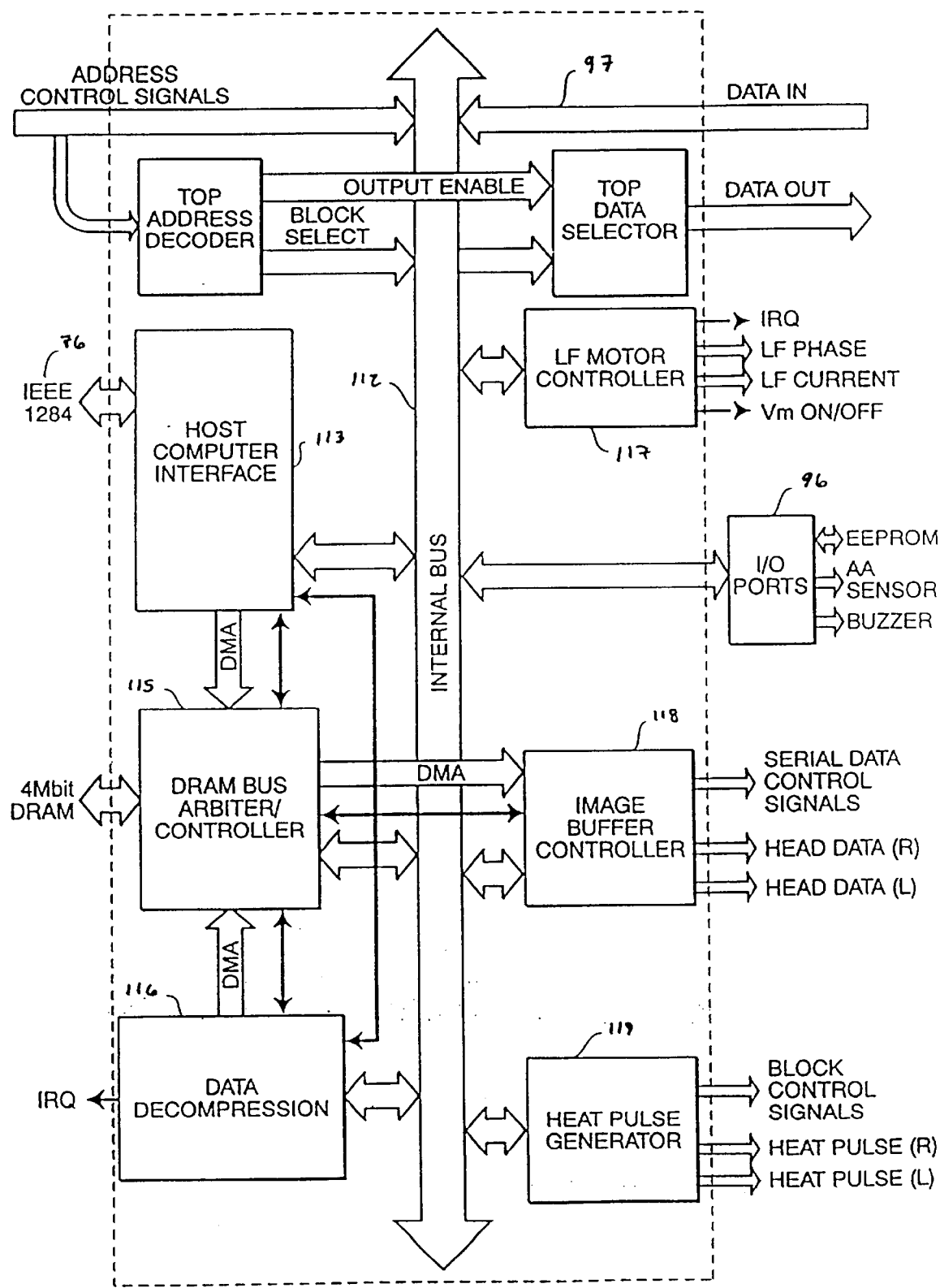
FIG. 10 is a block diagram showing the internal configuration of the gate array shown in FIG. 8.

FIG. 10 depicts a block diagram of control logic 94 and I/O ports unit 96 from FIG. 8. As mentioned above, I/O ports unit 96 may be, alternatively, included within control logic 94. In FIG. 10, internal bus 112 is connected to printer bus 97 for communication with printer CPU 91. Bus 112 is coupled to host computer interface 113 which is connected to bi-directional line 76 for carrying out bi-directional such as IEEE-1284 protocol communication. Accordingly, bi-directional communication line 76 is also coupled to printer interface 74 of host processor 2. Host computer interface 113 is connected to bus 112 and to DRAM bus arbiter/controller 115 for controlling RAM 99 which includes print buffer 109 (see FIGS. 8 and 9). Data decompressor 116 is connected between bus 112 and DRAM bus arbiter/controller 115 to decompress print data when processing. Also coupled to bus 112 are line feed motor controller 117 that is connected to line feed motor driver 34a of FIG. 8, image buffer controller 118 which provides serial control signals and head data signals for each of print heads 100a and 100b, and heat pulse generator 119 which provides block control signals and analog heat pulses for each of print heads 100a and 100b. Carriage motor control is performed by CPU 91 through I/O ports unit 96 and carriage motor driver 39a since line feed motor 34 and carriage motor 39 may operate concurrently.

Control logic 94 operates to receive commands from host processor 2 for use in CPU 91, and to send printer status and other response signals to host processor 2 through host computer interface 113 and bidirectional communication line 76. Print data and print buffer memory addresses for print data received from host processor 2 are sent to print buffer 109 in RAM 99 via DRAM bus arbiter/controller 115, and the addressed print data from print buffer 109 is transferred through controller 115 to print engine 101 for printing by print heads 100a and 100b. In this regard, heat pulse generator 119 generates analog heat pulses required for printing the print data.

Figure 11:
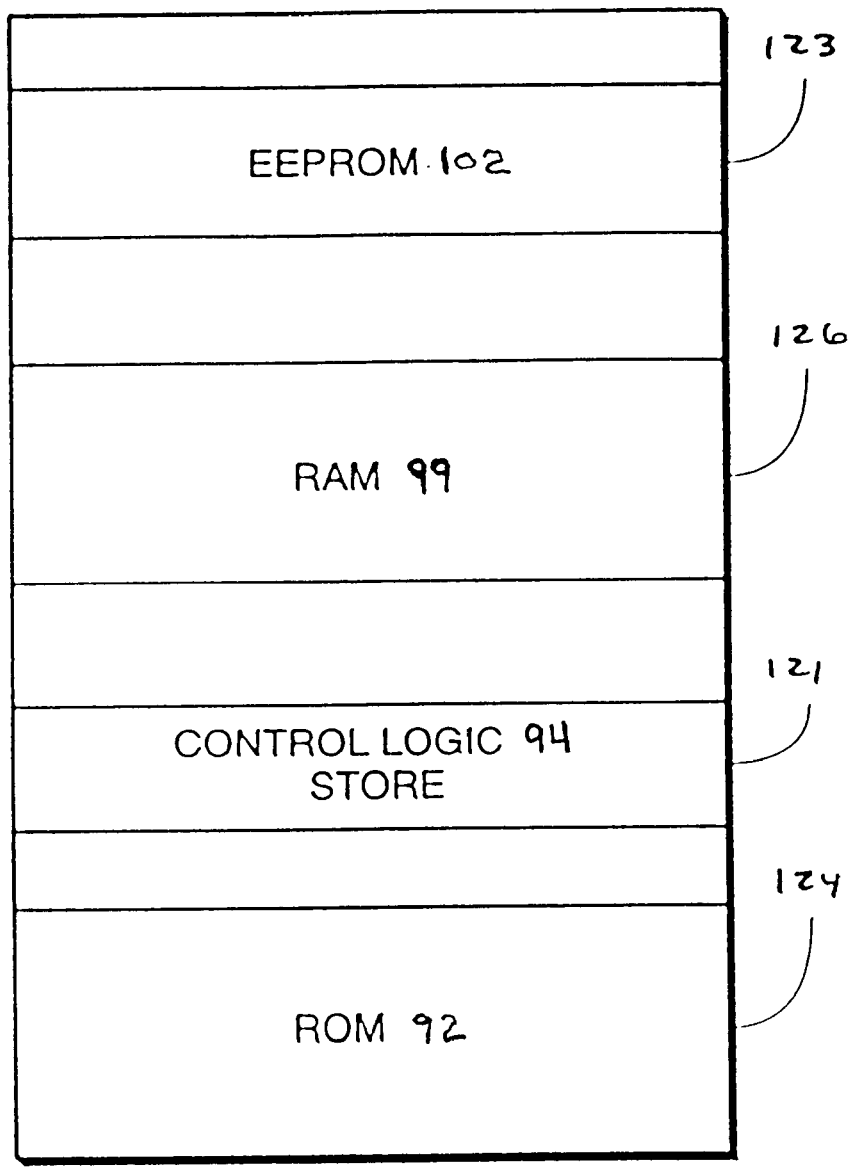
FIG. 11 shows the memory architecture of the printer of the present invention.

FIG. 11 shows the memory architecture for printer 10. As shown in FIG. 11, EEPROM 102, RAM 99, ROM 92 and temporary storage 121 for control logic 94 form a memory structure with a single addressing arrangement. Referring to FIG. 11, EEPROM 102, shown as non-volatile memory section 123, stores a set of parameters that are used by host processor 2 and that identify printer and print heads, print head status, print head alignment, and other print head characteristics. EEPROM 102 also stores another set of parameters, such as clean time, auto-alignment sensor data, etc., which are used by printer 10. ROM 92, shown as memory section 124, stores information for printer operation that is invariant, such as program sequences for printer tasks and print head operation temperature tables that are used to control the generation of nozzle heat pulses, etc. A random access memory section 121 stores temporary operational information for control logic 94, and memory section 126 corresponding to RAM 99 includes storage for variable operational data for printer tasks and print buffer 109.

2.4 General Operation

Figure 12:
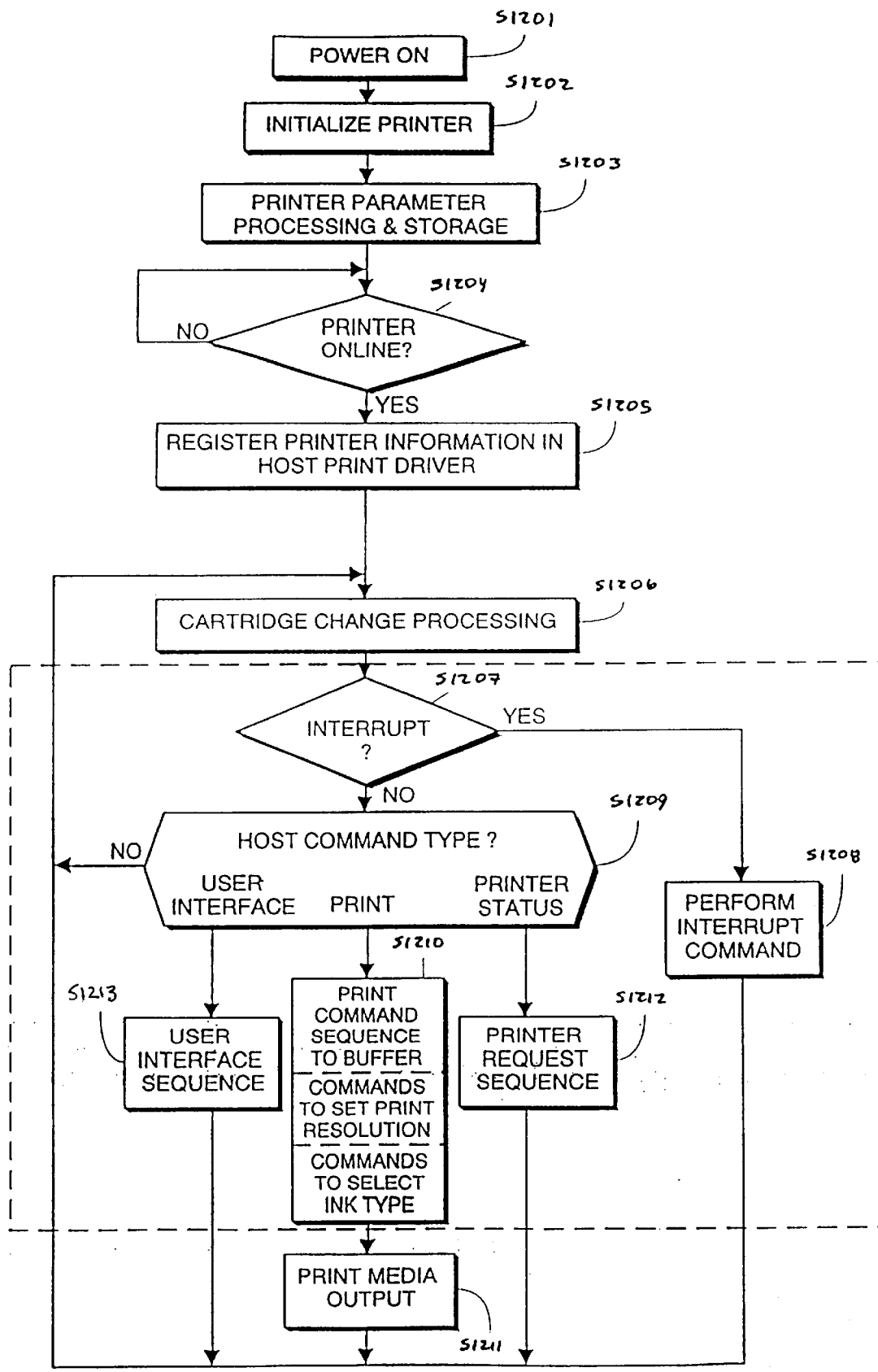
FIG. 12 shows an overall system flowchart detailing the operation of the printer of the present invention.

FIG. 12 is a flowchart illustrating the general operation of the information processing system shown in the block diagram of FIG. 8. After power is turned on in printer 10 in step S1201 of FIG. 12, printer 10 is initialized in step S1202. In the initialization, as discussed in greater detail in section 3.2 below, CPU 91, control logic 94 and a system timer are set to an initial state. In addition, ROM 92, RAM 99 and EEPROM 102 of printer 10 are checked and interrupt request levels in CPU 91 are assigned on application of power to printer 10. When printer 10 is set to its on state, EEPROM 102 is read by printer driver 84, controller tasks are started by printer CPU 91 such as resetting the printer, determining if print head cleaning should be performed based on the system timer, etc. Also in the initialization process of step S1202, a data compression mode is selected, heat pulses for print heads 100a and 100b are defined, buffer control is defined, print buffer 109 is cleared, and messages are displayed indicating the status of printer 10.

Next, step S1203 is performed. In step S1203, printer driver 84 calculates printer parameters from data obtained by printer CPU 91 based on printer measurements related to head configuration and alignment if it is determined that the print head configuration has changed. The alignment system is described more fully in U.S. patent application Ser. No. 08/901,560, entitled "Auto-Alignment System For A Printing Device", filed on Jul. 28, 1997, which is incorporated herein by reference.

Following step S1203, processing proceeds to step S1204, in which it is determined if printer 10 is on-line. Once it is determined that printer 10 is on-line, processing proceeds to step S1205, in which the calculated printer parameters are registered in printer EEPROM 102.

Specifically, when printer 10 is determined to be on-line, the printer parameters stored in the EEPROM 102 are registered by printer driver 84 in step S1205. The parameters are used to control printer and print head operation. In step S1205, the parameters are sent by CPU 91 for storage in host processor 2 so that printer driver 84 can generate appropriate commands for printer operation. Such commands are indicated in the steps of the dashed box of FIG. 12 and take into account the current identification of printer 10, the print head configuration, print head alignment and cartridge ink status.

After registration of the printer parameter information in step S1205, the status of each of print head cartridges 43a and 43b (see FIG. 5) is checked in step S1206. This is done by ascertaining whether access door 12 has been opened and closed and detecting whether one or more of the ink cartridges or ink reservoirs has been changed. If a cartridge or reservoir has been changed, a cleaning operation is performed on the corresponding print head, in which the nozzles of the print head are cleaned.

Following the cartridge change processing performed in step S1206, processing proceeds to step S1207. In step S1207, it is determined whether an interrupt has been requested by printer 10 for operations such as print head heater control, automatic sheet feed (ASF) control, head cleaning control, and the like. In response to such an interrupt request, the requested printer operation is performed in step S1208. Thereafter, processing returns to step S1206.

If an interrupt has not been requested by the printer in step S1207, processing proceeds to step S1209. In step S1209, it is determined if printer driver 84 has requested a command sequence. In the system of FIG. 8, tasks of printer 10 are controlled by commands from printer driver 84 which have been generated in accordance with parameter and status information received from printer 10.

When a user interface sequence is selected, step S1213 is entered and user interface processing is performed. Upon completion of user selections by means of keyboard and pointer entry on the user interface display, control is returned to step S1209 and is directed to use print command sequence step S1210.

If a print sequence is selected in step S1209, processing proceeds to step S1210. In step S1210, printer driver 84 generates a sequence of commands based on print head configuration, print head alignment, media type and size and target image information stored therein. These commands are sent to printer control 110 (see FIG. 9) in printer 10. In the printer, printer control 110 receives the commands and the firmware from printer ROM 92 and causes execution of command tasks in print engine 101.

The print command sequence includes transferring print data from print driver 84 to print buffer 109 which is defined for each print job. The print data transfer is performed without a receiving buffer in printer 10. Print data for a next scan is sent to empty storage locations of the current scan in print buffer 109 during ramp-up of the print heads in the current scan.

The command sequence of step S1210 includes commands to set print resolution of print heads 100a and 100b. These commands are set by controlling the size of ink droplets based on digital data stored in a print buffer for a print head and the order in which the print data is read out of the print buffer for the print head. Preferably, resolution of the print heads can be controlled independently of each other. For ink jet type print heads which eject ink droplets based on digital data stored in a print buffer, resolution is controlled by controlling ink droplet size and by controlling readout order from the print buffer, with droplet size and readout order preferably being controlled independently for each print head.

Further in the print command sequence of step S1210, printer driver 84 selects the type of ink that is to be used in printing a target pixel based on an analysis multi-level image data of adjacent pixels. As an example, a dye-based ink may be selected for a black target pixel surrounded by color pixels in an image while a pigment-based ink may be selected for a black target pixel surrounded by black pixels.

Upon completion of printing one page, flow proceeds to step S1211 of FIG. 12, wherein the page is output from printer 10 responsive to a paper eject command.

Figure 13:
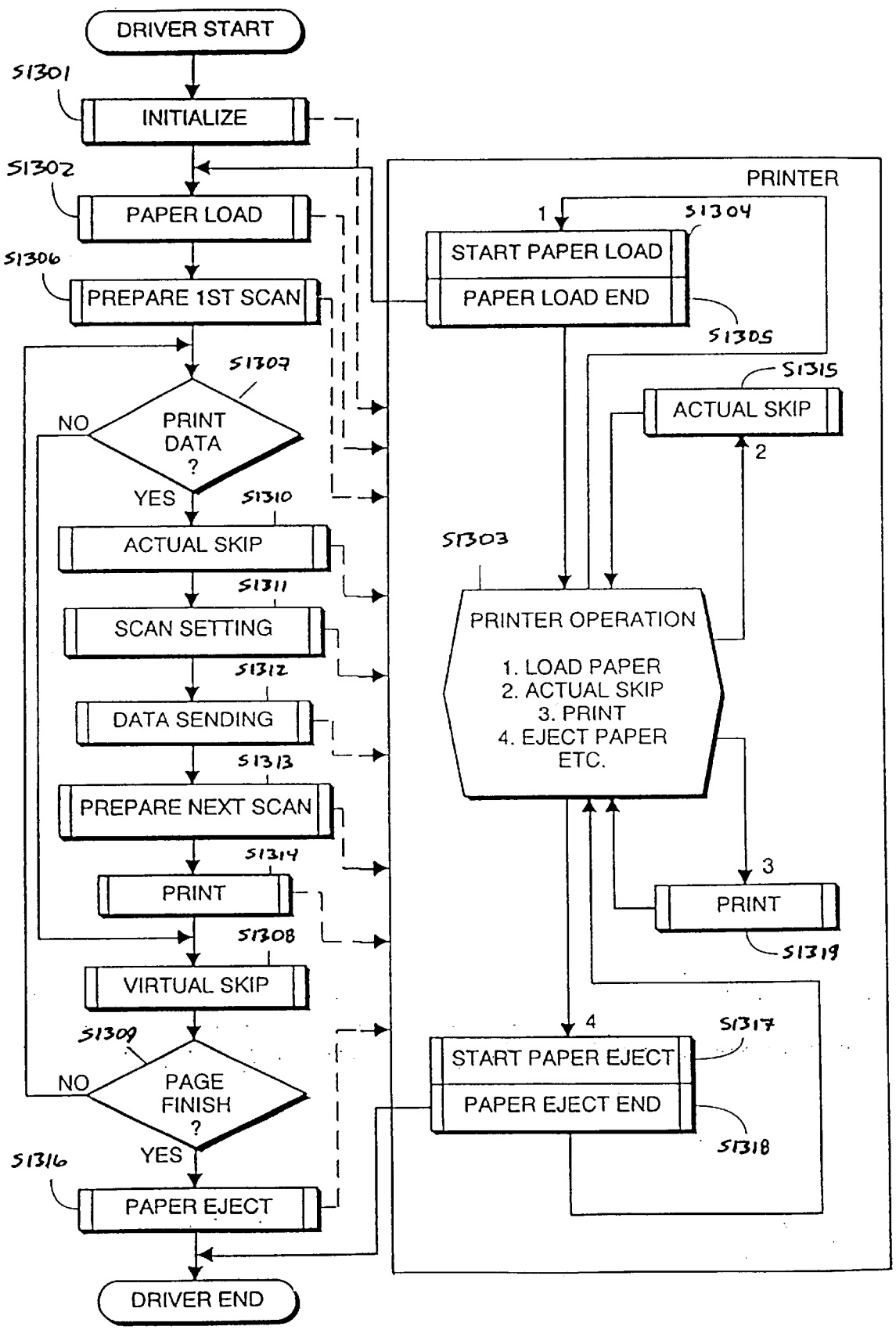
FIG. 13 is a flowchart showing print control flow in accordance with the present invention.

FIG. 13 is a flowchart that illustrates a command sequence generated by printer driver 84 for printing and operating printer 10. The command sequence in FIG. 13 is simplified to provide a general framework for describing operation of printer 10. A more detailed command sequence which includes, for example, automatic sheet feed control according to the invention is described in section 4.0 with respect to FIG. 20.

Returning to FIG. 13, the print command sequence is started by a printer initialization command in step S1301, which is sent to printer control 110 to reset printer operation. A paper load command (step S1302) is then provided to printer control 110, which selects a load paper operation in selection step S1303 and executes a start paper load (step S1304). When a paper load end is detected in printer control 110 in step S1305, a signal indicating end paper load is sent to printer driver 84, and the print data is prepared for a first scan of print heads 100a and 100b in step S1306. Printer control 110 is notified of this scan preparation. The preparation of print data in printer driver 84 is described more fully in U.S. patent application Ser. No. 08/901,719, entitled "Print Driver For A Color Printer", filed Jul. 28, 1997. If no print data for the scan is determined in decision step S1307, a virtual skip is performed in printer driver 84 in step S1308. Control is returned to step S1307 when a page finish is not detected in step S1309. Until the page finish is detected, steps S1310 through S1314 and S1308 are performed.

In step S1310, an actual skip command is provided by printer driver 84 to printer control 110 for printing correct print data. Printer control 110 selects the actual skip operation (step S1303) and executes the actual skip (step S1315). Scan setting is then performed (step S1311) in printer driver 84, and printer control 110 is notified. Next, print data generated in printer driver 84 and print buffer addresses for the print data are transferred to printer control 110 which stores this information in print buffer 109 (step S1312). The next scan is then prepared in printer driver 84, and printer control 110 is notified (step S1313). Then, a print command generated in printer driver 84 is sent to printer control 110. In response, printer control 110 selects a print operation in step S1319 and executes the print task in step S1314. A virtual skip is then performed by printer driver 84 in step S1308 to keep track of the lines of the page being printed. When a page finish is determined in decision step S1309, a page eject command is sent by printer driver 84 to printer control 110, which selects a page eject operation (step S1316) and starts page eject (step S1317). Upon completion of the page eject (step S1318), printer driver 84 is notified of the completion of the page eject and control is passed to step S1209 of FIG. 12.

An example of the command sequence from the host processor 2 to printer 10 to print a page in color mode with two color print heads is set forth in Table A shown in FIG. 14. Initially as indicated in Table A, the current time is set by a [UCT] command and printer 10 is reset by a [RESET] command. Data compression is selected to pack the print data by a [COMPRESS] command. The bottom margin size of the printable area is selected by a [BTM_MARGIN] command. Print buffers for print heads 100a and 100b are defined by [DEFINE_BUF] commands. The print color table is defined by a [DEFINE_COLOR] command. The heat pulse and buffer control tables are defined for the color mode of the print head configuration by [DEFINE_PULSE] and [DEFINE_CONTROL] commands.

After the printer tasks are executed for the foregoing initializing commands, a paper load command [LOAD] to load a page or other print medium and a raster skip command [SKIP] to skip to the print position of the first print head scan are sent to printer 10, and the print direction [DIRECTION] and edges [EDGE] for printing of print heads 100a and 100b are set for the first scan. A loop of commands is then sent to control printer tasks for printing the lines of the page. In the first portion of the loop for each line, the scanning parameters ([SPEED], [SIZE], [SELECT-PULSE] and [SELECT-CONTROL]) for the line are set. Following completion of the printer tasks for the select buffer control table commands [SELECT_CONTROL], the print data blocks are selected by the [BLOCK] command, and the print colors are selected and transmitted by repeated select color [COLOR] and data transmission [DATA] commands according to the determined print areas for print heads 100a and 100b.

The direction of the second scan and the left and right edges of the print areas for the second scan are then set by the [DIRECTION] and [EDGE] commands. The backward direction scan margin for the next scan is set by a [SCAN_MARGIN] command. The auto-trigger delay for the present scan is set by an [AT_DELAY] command. At this time, a [PRINT] command is transferred from host processor 2 to printer 10 to execute printing for the first scan, and a [SKIP] command is sent to skip to the print position of the second scan. When the last line has been printed, a paper eject command [EJECT] is given to printer 10 to execute paper ejection.

As can be seen from the command sequences for set scan operations and the example of the printing operations according to the invention, each aspect of printer operation, such as scan setting or printing, is controlled by printer driver 84 taking into account print head configuration and the print mode. The tasks to be performed by printer 10 are thereby defined in detail by printer driver 84 so that the printer architecture is substantially simplified to be less costly.

Returning to FIG. 12, when a printer status request is determined in step S1209, flow proceeds to step S1212. In step S1212, a printer status command sequence is performed. The status commands that provide requests for printer status information are described in detail in section 3.6. In general, each of the status commands is sent from host processor 2 to printer 10 to request the information on printer operation or information stored in printer 10. For example, a base status command [BASE-STATUS] requests the current status of the printer. In response, printer 10 returns one data byte indicating one of the following: printing status, whether print buffer 109 can or cannot receive data, whether printer 10 is busy performing start-up, cartridge replacement, print head cleaning, test printing, etc., and whether an error or alarm has been detected. A [HEAD] command requests return of print head configuration, and a [DATA_SEND] command requests return of EEPROM data to host processor 2. After return of the requested data in step S1212, control is returned to step S1206.

3.0 Architecture of Printer Software

Control over functionality of printer 10 is effected by individual programs executing on CPU 91. The individual programs include initialization routines such as routines executed on power-on, tasks to interpret commands received from host processor 2, interrupt handlers such as handlers to process real time hardware interrupts, and cyclic handlers that handle cyclic processes such as handlers for control over bi-directional communications with host processor 2.

Printer CPU 91 further executes an operating system so as to coordinate execution of each of the individual programs (i.e., the initialization routines, the tasks, the interrupt handlers, and the cyclic handlers). The operating system is responsible for inter-program communication through messaging and the like, and inter-program switching so as to switch execution from one program to another when appropriate. Details of the operating system follow.

3.1 Operating System

The operating system is a real-time operating system (or "kernel" or "monitor") created to modularize printer control programs and to facilitate maintenance, inheritance, and expansion. The real-time operating system is system software that provides for a preemptive multi-task software environment, in which a currently executing program can be suspended in favor of a switch to another program with a higher priority.

The operating system allows for four different types of programs, each of which is executed by the operating system in accordance with its specific type. The types are initialization routines, tasks, interrupt handlers, and cyclic handlers. Initialization routines are routines scheduled by the operating system immediately after printer 10 is reset but after the operating system initializes itself. Tasks are ordinary programs (sometimes called "execution units") of continuous processing that are executed sequentially. Thus, tasks are one or more sequences of instructions handled by the operating system as units of work executed by CPU 91 in a multiple-programming or multiple-processing environment. An illusion of concurrent processing is created by the operating system by scheduling processing in individual task units.

An interrupt handler is a (usually short) program unit that is activated by the operating system immediately upon receipt of a hardware interrupt. Cyclic handlers are similar to interrupt handlers, but rather than being activated by a hardware interrupt, cyclic handlers are activated by a timer interrupt of the operating system.

When printer 10 is reset, execution of the operating system is the first software executed by CPU 91. CPU registers are set according to predefined requirements, and then user-defined initialization routines are executed if any exist. Thereafter, control reverts to the operating system, which activates each of the tasks in the system. One such task is a start task. After the start task begins, the operating system is activated each time a system call is issued or an interrupt occurs. After executing the system call, or handling the interrupt, execution reverts back to the operating system, which schedules tasks so as to execute the executable task with the highest priority.

Scheduling of tasks involves a determination of which task is executed if there are several tasks currently eligible for execution. Tasks are scheduled according to an assigned priority in which a higher priority task is executed before all other lower priority tasks. Tasks eligible for execution but not currently being executed because of their lower priority level are placed in a ready queue based on their priorities.

As each task becomes newly eligible for execution, it is placed at the end of the ready queue. Scheduling is then performed when returning from a system call issued by a task or when returning from interrupt processing to a task, both of which can cause new tasks to be entered into a queue or can cause a change in priority of tasks already existing in the queue. Scheduling orders the tasks in the task queue based on each task's priority and makes the task with the highest priority the currently executable run task. If there are two or more tasks in the ready queue of the same priority, the decision as to which task should be selected is made based on which task first entered into the queue.

The operating system uses semaphores as one basic means of communication between tasks and for control or synchronization between tasks. Tasks can also communicate and transfer data therebetween using messages. Messages are sent to mailboxes by one task, and a task that needs to receive the message issues a receive request to the mailbox so as to obtain the message.

The operating system further uses event flags to synchronize tasks. Any task desiring to be released from a wait state based on a certain event can register an event flag pattern, upon the occurrence of which the operating system will release the task from the wait state.

Interrupt management by the operating system is provided by an interrupt handler and by interrupt permission level settings. Time management is provided by the operating system's actuation of an interrupt handler based on the system timer.

Cyclic handlers carry out processing at each of specified time intervals, based on cyclic handlers registered with the operating system. Typically, a cyclic handler is a short program that specifies a task that is performed at each of specified time intervals.

Initialization routines, tasks, interrupt handlers, and cyclic handlers that are preferred for printer 10 are described in the following sections.

3.2 Initialization

During power-up, initialization functions are performed to initialize printer 10, such as initializing control logic 94, checking ROM 92, checking RAM 99, and checking EEPROM 102.

Figure 15:
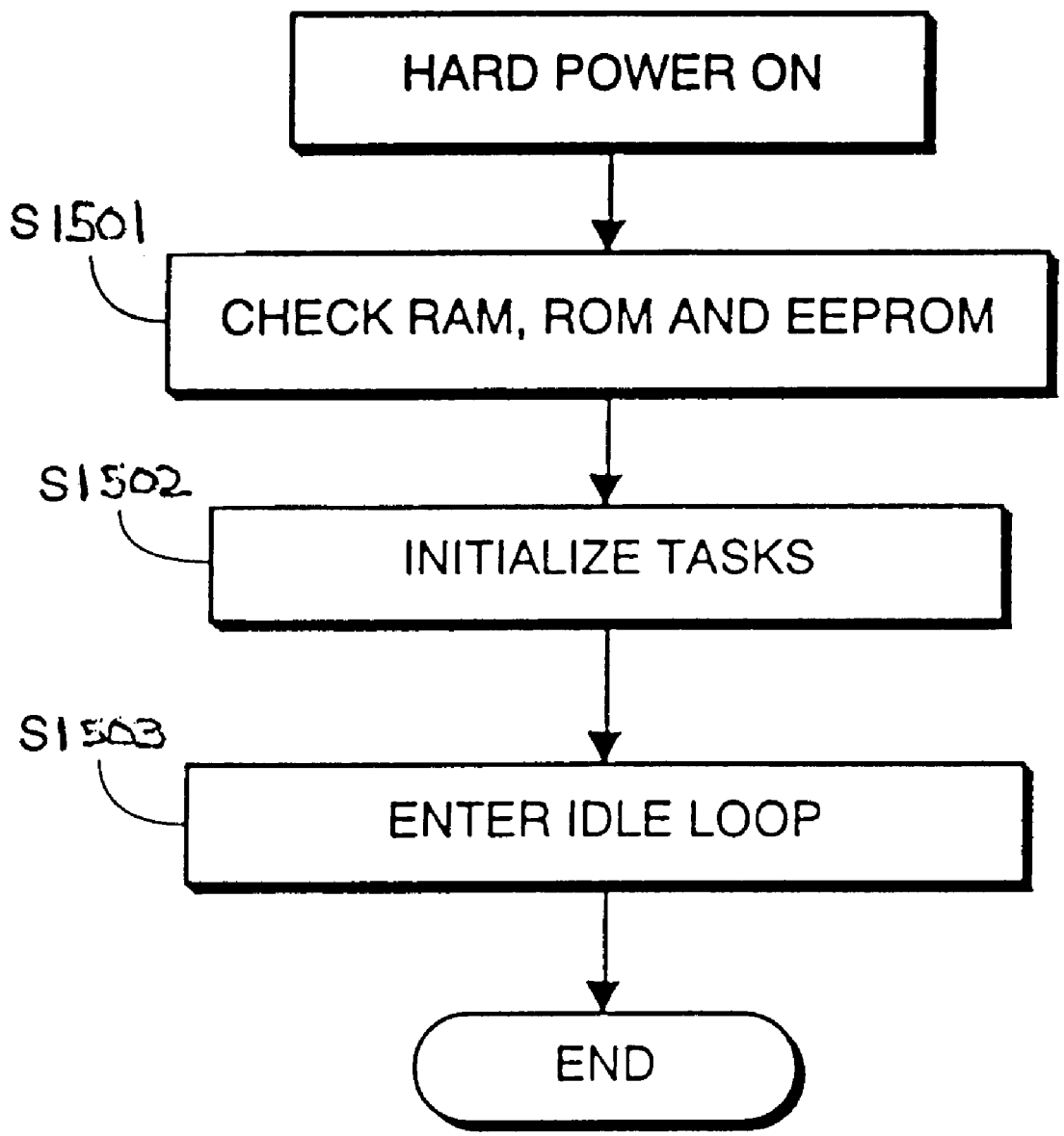
FIG. 15 is a flow diagram which depicts a hard power-on sequence for the printer of the present invention.
Figure 16:
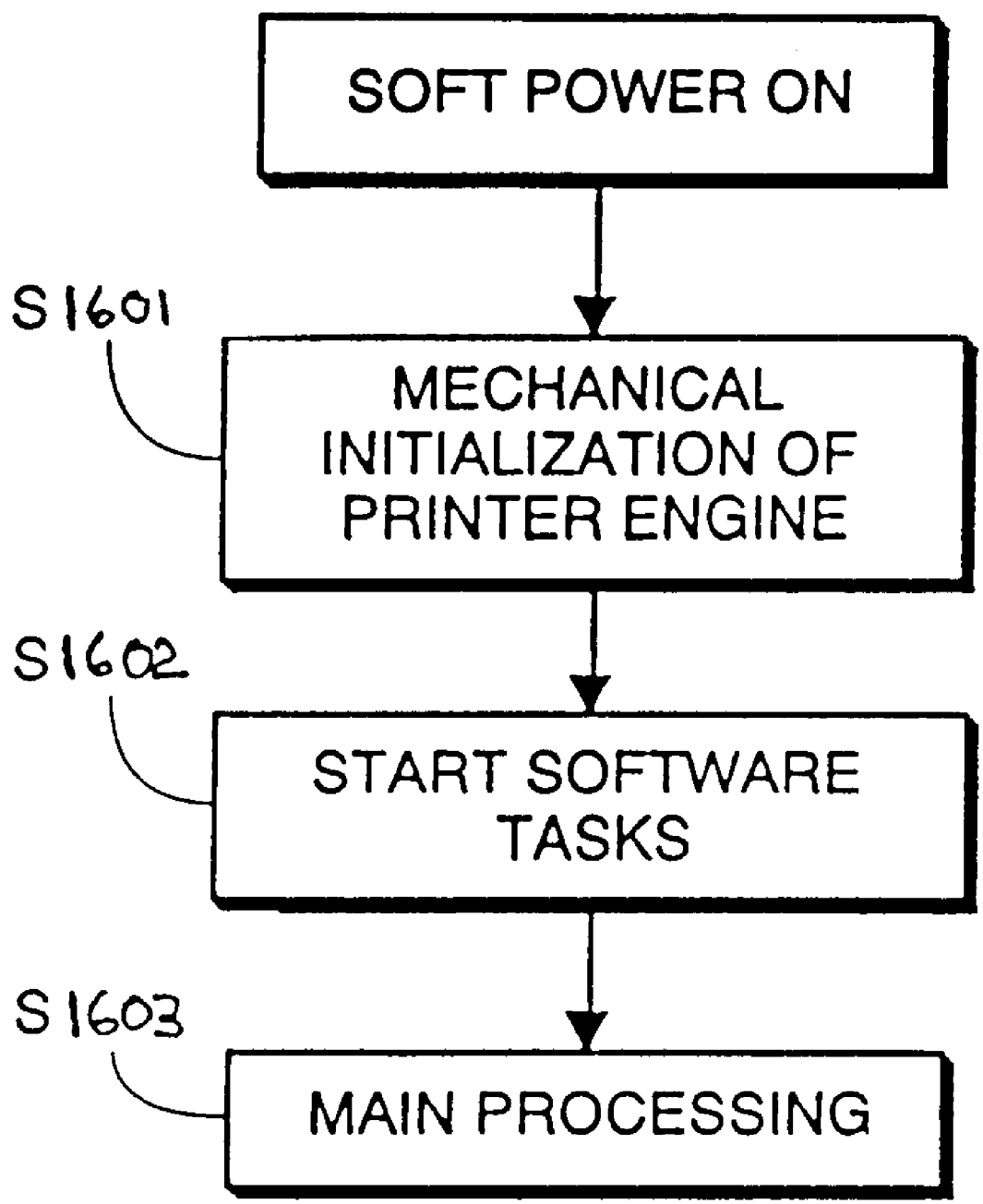
FIG. 16 is a flow diagram which depicts a soft power-on sequence for the printer of the present invention.

FIGS. 15 and 16 illustrate a hard power-on sequence and a soft power-on sequence, respectively. In this regard, it is noted that so long as power is supplied to printer 10, CPU 91 is executing software regardless of the status of power button 24. Thus, a "hard power-on" refers to initial application of power to printer 10. Thereafter, user activation of power button 24 simply causes a soft power-on or soft power-off. This arrangement is preferred, since it allows printer 10 to monitor ongoing events (such as elapsed time) even when printer 10 is "off".

Referring to FIG. 15, which shows a hard power-on sequence, upon initial application of power, step S1501 performs memory checks such as a ROM check, a RAM check, and an EEPROM check. Step S1502 initializes software tasks, and in step S1503, CPU 91 enters an idle loop, awaiting a soft power on.

FIG. 16 indicates the soft power-on sequence. Step S1601 performs mechanical initialization of printer engine 101, such as a reset to the home position, step S1602 starts the software control tasks including Centronics communication tasks, and step S1603 enters the main processing mode.

Figure 17:
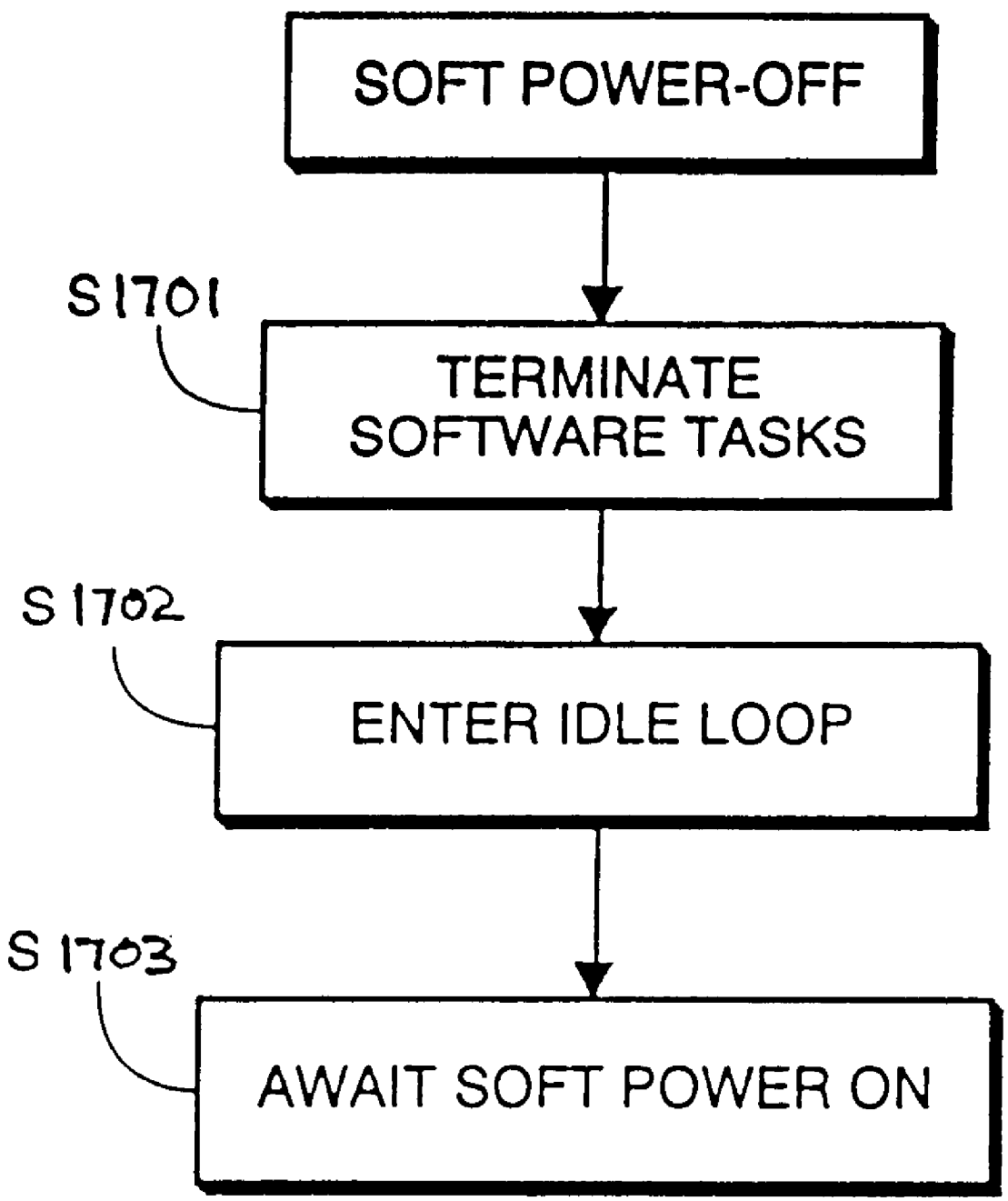
FIG. 17 is a flow diagram which depicts a soft power-off sequence for the printer of the present invention.

FIG. 17 details a soft power-off sequence. Step S1701 terminates all software tasks, and step S1702 enters an idle loop during which, in step S1703, printer 10 awaits the next soft power-on sequence.

3.3 Tasks

Figure 18:
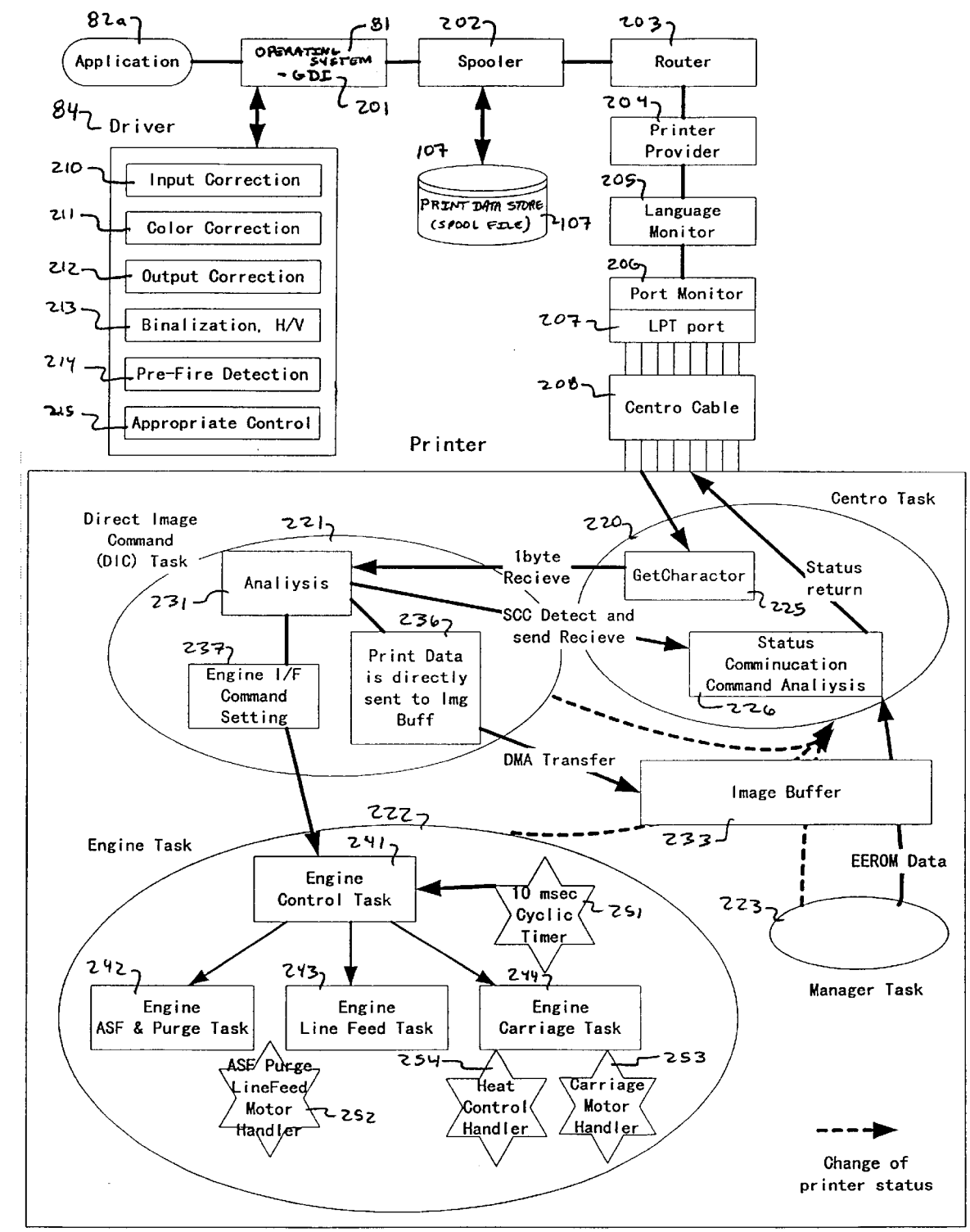
FIG. 18 illustrates communication according to the preferred embodiment of the invention between an application program and other operations running on a host processor and various tasks running on a printer according to the preferred embodiment of the invention.

FIG. 18 illustrates communication according to the preferred embodiment of the invention between application program 82a and other operations running on host processor 2 and various tasks running on printer 10. In should be noted that the operations and tasks illustrated in FIG. 18 are by no means inclusive. Rather, FIG. 18 provides an overview of the interaction between operations and tasks involved in printing.

On the host processor side of a print operation, application program 82a communicates with graphical device interface (GDI) 201 of operating system 81. GDI 201 in turn communicates with printer driver 84 and spooler 202, which communicates with printer provider 204 through router 203. Printer provider 204 communicates with printer 10 through language monitor 205, port monitor 206, printer (LPT) port 207 and Centronics cable 208. The function of each of these elements is now described briefly.

Application program 82a generates a print job in response to user commands, preferably either for an image created on host processor 2 or for an image input from an unshown image input device such as a scanner. This print job is sent to GDI 201, which preferably provides a device-independent interface to application program 82a for outputting graphic images. GDI 201 in turn converts the print job into printer-specific commands through use of printer driver 84.

Printer driver 84 performs various functions on the print data so as to facilitate printing. These functions preferably include input correction 210, color correction 211, output correction 212, binarization and hue/value processing 213, pre-fire detection 214, and status-based control 215.

Input correction 210 preferably includes correcting print data based on characteristics of an image input device, for example scanning characteristics of a scanner. Input correction 210 preferably also includes gamma correction and conversion from illuminative color values such as RGB color values to absorptive color values such as CMY or CMYK color values.

Color correction 211 preferably includes correction for a type of recording medium, human color perception and lighting under which a printed image is to be viewed. Output correction 212 preferably involves correction based on ink absorption limitations of a recording medium, for example by thinning print data.

Binarization and hue/value processing 213 preferably includes selection of different inks and determination of corresponding hue and color value data based on the inks, as explained in more detail below in section 10. Pre-fire detection 214 concerns detection of various factors that affect pre-firing of ink jet nozzles so as to improve print quality, as explained in more detail below in section 9. Status-based control 215 modifies printing parameters based on printer status, as explained in more detail below in section 7.

Print data typically is generated by application program 82a and GDI 201 faster than the data can be printed by printer 10. Spooler 202 stores print data from GDI 201 in print data store 107, depicted in FIG. 18 as a spool file, as that data is generated. As a result, application program 82a can finish sending a print job and can continue with other tasks before the print job is completely printed.

Router 203 routes print data from spooler 202 to printer provider 204, which provides a connection to printer 10 through language monitor 205, port monitor 206, LPT port 207, and a bi-directional communication line such as Centronics cable 208. Language monitor 205 monitors the language of the print data, for example to determine if the language is supported by the printer. Port monitor 206 controls access to LPT port 207.

Print data from host processor 2 is processed by various tasks running on printer 10. In the preferred embodiment of the invention, printer tasks are designed to isolate functionality so that each task is responsible for a single cohesive aspect of printer control. These tasks include Centronics task 220, direct image command task 221, engine task 222, and manager task 223.

Centronics task 220 controls communication with host processor 2. Characters received from host processor 2 are forwarded by GetCharacter operation 225 to direct image command task 221. Status, communication and command (SCC) information from direct image command task 221 is received by SCC analysis operation 226. From this SCC information, status information is returned to host processor 2.

Direct image command task 221 receives data from and sends SCC information to Centronics task 220. Data received from Centronics task 220 is analyzed by analysis operation 231. If the data is print data, that data is sent to image buffer 233 by print data operation 236. If the data is control data, engine interface command operation 237 interprets the control data and sends corresponding commands to engine task 222.

Engine task 222 controls actual printing by print heads 100a and 100b of print data read from image buffer 233, as well as operation of line feed motor driver 34a and carriage motor driver 39b to feed sheets of recording media and to purge the recording heads. To this end, engine task 222 includes various other tasks, such as engine control task 241, engine auto-sheet-feed (ASF) and purge task 242, engine line feed task 243, and engine carriage task 244.

Engine task 222 utilizes cyclic timer 251 for controlling cyclic operations, for example as described below with reference to FIG. 19. Engine ASF and purge task 242, engine line feed task 243, and engine carriage task 244 utilize ASF and purge line feed motor handler 252 and carriage motor handler 253 to control line feed motor driver 34a and carriage motor driver 39a, respectively, to feed sheets of recording media and to purge print heads 100a and 100b. The sheet feed and purging operations are described in more detail above with respect to FIGS. 5C and 5D.

Interface and other communications between tasks in printer 10 are controlled by manager task 223 and preferably are accomplished through use of unshown mailboxes into which messages and semaphores are placed so as to coordinate message communication.

3.4 Interrupt Handlers

Although the operating system can accommodate interrupt handlers such as handlers for periodic clock interrupts, such cyclic events can also be handled with cyclic handlers.

3.5 Cyclic Handlers

Cyclic handlers are provided for Centronics communications task 220 and for engine task 222, as shown and described above in connection with FIG. 18. In addition, a cyclic handler is provided for controller timer operations.

Figure 19:
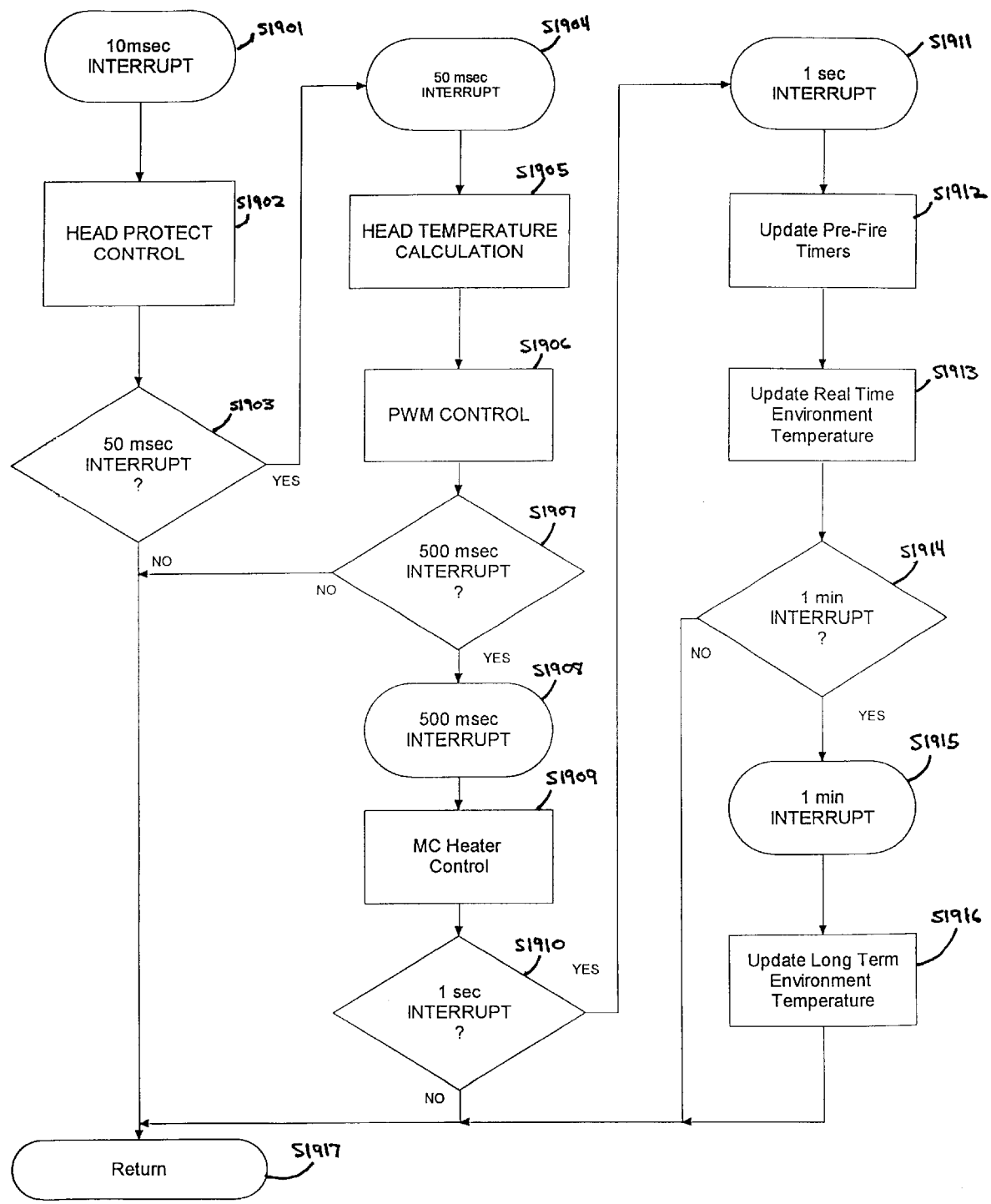
FIG. 19 is a flow diagram illustrating controller timer control according to a cyclic handler for controlling timer operations.

FIG. 19 is a flow diagram illustrating controller timer control according to this cyclic handler. As shown in FIG. 19, upon receipt of a 10 ms interrupt in step S1901, head protect control (step S1902) is effected in order to pause printing if print head temperatures exceed 75 degrees Centigrade, thereby preventing damage to the print heads.

Next, as further shown in FIG. 19, it is determined whether a 50 ms interrupt has been received (step S1903) and, if so, control is directed to the 50 ms interrupt logic flow (step S1904) in which a head temperature calculation (step S1905) is performed for each head based on the amount of head driving pulses applied at each head. Calculations are based on pre-stored tables in ROM 92 which provide constants for use in calculating temperature increase as well as temperature decrease based on head firings.

The 50 ms interrupt logic further executes pulse width modulation control (step S1906) in accordance with pre-stored tables in ROM 92 so as to set the setup time, the pre-heat pulse, the interval time, and the main-heat pulse for each print nozzle. The pulse parameters are then sent to control logic 94. Next, it is determined if a 500 ms interrupt has been received in step S1907. The 500 ms interrupt logic flow (step S1908) thereupon initiates meniscus heater control which is used under low environmental temperatures and before printing in order to maintain good print head temperature (step S1909). Next, it is determined if a one second interrupt has been received in step S1910. The one second interrupt logic flow (step S1911) then updates pre-fire timers (step S1912) and then updates real time environmental temperature (step S1913).

Next, it is determined if a one minute interrupt has been received in step S1914. The one minute interrupt logic flow (step S1915) initiates an update of the long term environmental temperature in step S1916 after which control is returned from this sequence in step S1917.

It should be noted that each of the 10 ms, 50 ms, 500 ms, 1 second and 1 minute durations depicted in FIG. 19 and discussed herein are merely illustrative and may be altered.

3.6 Commands To And From The Host Processor

The following summarizes the commands sent to and from host processor 2 over bi-directional printer interface 74. Generally speaking, each command will include one or more parameters, with some commands (such as the [DATA] image data transmission command) also including data.

The status request command [STATUS] is a generalized command that elicits a response over bi-directional interface 74 from printer 10. Through use of the status request command, host processor 2 can obtain detailed information concerning printer 10, such as the contents of EEPROM 102, alignment and density sensor results, and the like. The status request command is therefore discussed in considerable detail below.

In the sections below, a mnemonic for each command is shown enclosed by square brackets ("[ ]"). The mnemonics shown below are simply examples. The actual sequence and combinations of letters used to form the command mnemonics is immaterial, so long as usage is consistent in the printer side and the host processor side such that commands sent by one are understandable to the other.

3.6.1 Control Commands

Control commands serve to control print operations of printer 10. The following is a description of the various control commands.

[LOAD]—Paper Load

The LOAD command causes paper loading, but does not eject the recording medium currently loaded. This command must be sent to printer 10 even when a medium is already loaded manually. The LOAD command includes parameters to allow for specification of the recording media type and size, and for specification of the paper loading mode. The paper loading mode can be one of either: (1) Auto Sheet Feeder—Normal Feed; (2) Auto Sheet Feeder—High Feed; or (3) Manual Feed.

[EJECT]—Paper Eject

This command prints all data remaining in the print buffer, then ejects the medium currently loaded. This command can provide for various eject speeds.

[PRINT]—Print Execution

The Print Execution command causes the data in the print buffer to be printed on a currently-loaded recording medium. The printing area extends from the left edge to the right edge of each print buffer specified by the Left and Right parameters of the [EDGE] command described below.

[CARRIAGE]—Carriage Movement

The Carriage Movement command includes a Position parameter which specifies carriage position in units of column position. This command is used for forward and reverse seeking.

[SKIP]—Raster Skip

The Raster Skip command is used to advance the vertical print position by the number of raster lines specified by a Skip parameter. A SKIP command with an argument of zero is used to instruct printer 10 to perform a nozzle-number-change prefire operation.

[DATA]—Image Data Transmission

This command is used to transmit bit image data of yellow (Y), magenta (M), cyan (C) or black (Bk or K) to printer 10 individually in column image format. Multiple sequences of this command may be issued to make a single scan line. Bit image data is stored into the area specified by the block [BLOCK] and color [COLOR] commands described below. Printer 10 will actually start printing when the [PRINT] command is received.

3.6.2 Setting Commands

Setting commands specify settings for print operations performed by printer 10. Once these commands are set, they are valid until the settings are changed by another command. If no settings are provided for a page, the settings will be reset to default settings. Setting commands are described in more detail below:

[RESET]—Printer Reset

The Mode parameter defines the Printer Reset command and specifies the reset mode. Default settings are included for data compression flag, buffer size, droplet size, print speed, pulse control tables, buffer control tables, and the like.

[COMPRESS]—Select Data Compression

The Mode parameter of the Select Data Compression command specifies whether the image data is compressed or un-compressed, with un-compressed being the default setting.

[BTM_MARGIN]—Select Bottom Margin

The Select Bottom Margin command is used to specify the bottom margin of the printable area on the recordable medium. The margin parameter of this command provides for the selection of one of multiple bottom margin sizes.

[DEFINE_BUF]—Define Print Buffer

The Define Print Buffer command is used to define the memory size and configuration of print buffer 109, for each of heads A and B in common.

[DROP]—Select Droplet Size

This command is used to specify the ink droplet size (large or small) for each print head.

[SPEED]—Select Print Speed

This command is used to specify the printing speed.

[SPEED_RSKIP]—Select Speed for Raster Skip

The Select Speed for Raster Skip command is used to specify the raster skip speed of the line feed. This command allows for the specification of one of multiple allowable raster skip speeds.

[DIRECTION]—Set Print Direction

The Direction parameter of this command specifies whether printing will be in the forward direction (left to right) or the backward direction (right to left).

[EDGE]—Set Print Edge

The Set Print Edge command specifies the left edge and the right edge of print position in units of column position; the left edge must be smaller than the right edge.

[BLOCK]—Select Print Block

This command is used to specify the left edge and the right edge of a data block in units of column position from the top of each print buffer. The [BLOCK] command also specifies where bit images following a [DATA] command (described above) are stored.

[DEFINE_COLOR]—Define Print Color

The Define Print Color Command is used to define the color table which specifies the location in the printer head where the bit image data that follows the [DATA] command is stored. This command has parameters to specify the color table to be defined, the color start position, the color height, and the color offset.

[COLOR]—Select Print Color

This command is used to specify the color table which was defined by the DEFINE_COLOR command.

[DEFINE_PULSE]—Define Heat Pulse Table

The [DEFINE PULSE] command is used to define up to plural different heat pulse block tables. The pulse block table must be defined before printer 10 receives the [SELECT PULSE] command which will be defined below.

[SELECT_PULSE]—Select Heat Pulse Table

The Select Heat Pulse Table command is used to select one heat pulse block table, from among plural tables defined by the [DEFINE_PULSE] command above, that is in common with all heads.

[DEFINE_CONTROL]—Define Buffer Control Table

This command is used to define up to plural different print buffer control tables. The print buffer control table must be defined before the printer receives [SELECT_CONTROL] command (described below).

[SELECT_CONTROL]—Select Buffer Control Table

This command is used to select a print buffer control table for each print head 100a and 100b, from among the plural tables defined in the [DEFINE_CONTROL] command.

[SCAN_MARGIN]—Set Scan Margin

The Set Scan Margin command is used to set the scan margin. This command is to be received by printer 10 before a line is printed so that the printer can seek the carriage logically.

[AT_DELAY]—Set Auto-Trigger Delay

This command is used to set the auto-trigger delay by specifying the scan direction as either forward or backward, and by specifying an auto-trigger delay time in units of 10 $\mu$sec up to a maximum auto-trigger delay time of 2,550 $\mu$sec.

3.6.3 Maintenance Commands

Maintenance commands serve to maintain print operations of printer 10 and are described in more detail below.

[RECOVER]—Head Recover

Receiving this command causes printer 10 to go into head recovery mode, such as cleaning and ink suction operations.

[HEAD_EXC]—Head Exchange

The Head Exchange command places printer 10 in head exchange mode. Upon entering head exchange mode, the carriage moves to the exchange position. This parameters of this command specifies the head and/or ink tank to be exchanged.

[PCR]—Change Pulse Control Ratio

This command is used to change a ratio of the Pulse Control Table. Each ratio can be set from 1 through 200, which means 1% through 200%. Default setting is 100 which means 100%.

[UCT]—Universal Coordinated Time

This command is used to set the current time in printer 10, and must be sent to printer 10 at the onset of a print job start. Printer 10 uses the time to determine whether or not printer 10 should recover the print head. The time value is expressed as the number of seconds elapsed since midnight (00:00:00), Jan. 1, 1970, Universal Coordinated Time (UCT), according to the system clock of host processor 2.

[HEAD CHECK]—Head Check

The head check command is used to check the print head type currently installed in the printer 10.

[AUTO_POWER]—Auto Power Management

This command is used to specify whether the auto power management function within printer 10 is enabled or not.

[SCAN]—Scan Sensor

This command is used to read an auto-alignment sensor value and to send the result back to host processor 2. Scanning speed, direction, resolution and area are defined by the [SPEED], [DIRECTION], [DEFINE_BUF] and [EDGE] commands, respectively, as described above.

[NVRAM]—NV-RAM Control

This command is used to read data from EEPROM 102 and send the read data back to host processor 2.

[SMEAR]—Smear Control

The Smear Control command is used to prevent the print medium being used from being smeared with undried ink. This command allows a specified time to be set for delay of the printing time of the current page thereby preventing smearing.

[IF_CONTROL]—Interface Control

The Interface Control command is used to specify whether or not a specific interface mode on printer 10 is enabled.

[STATUS]—Status Request

This command is used as a prefix command to send status requests to printer 10. Requests can be made for basic settings, main status, and detailed status.

Basic Setting Commands are commands used by host processor 2 to set printer 10 and do not necessarily require a response from printer 10.

Main Status Request/Response commands are commands which are used to obtain status information in regular mode and include Base Status [BASE_STATUS], Echo Command [ECHO], print head configuration [HEAD], Alignment Sensor Results [SENSOR_RESULTS], EEPROM data sending to host [DATA_SEND], and Shift Buffer Size sending to host [BUFFER_SIZE]. For each Main Status Request/Response command issued, a response is automatically returned to host processor 2.

Detailed Status Request/Response commands are used to obtain detailed status information. These commands include Detailed Job Status [JOB_STATUS], Detailed Busy Status [BUSY_STATUS], Detailed Warning Status [WARNING_STATUS], Detailed Operator Call Status [OPERATOR_CALL], and Detailed Service Call Status [SERVICE_CALL]. Like Main Status Request/Response commands, for each Detailed Status Request/Response command issued, a response is automatically returned to host processor 2.

[PREFIRE_EX]—Prefire Execution

The Prefire Execution command is used to execute the prefire of ink. The parameters of this command allow for identification of the specific head to be prefired.

[PREFIRE_CYC]—Prefire Cycle Set

The Prefire Cycle Set command is used to set the auto prefire execution cycle. The parameters of this command allow for the identification of the target head to be prefired and the amount of auto prefire cycle time in increments of seconds up to a maximum of 255 seconds.

4.0 Automatic Sheet Feed Control

In brief, this section provides a description of the present invention in which an automatic sheet feed control process is provided for a printer whereby the printer is commanded to load a sheet of recording medium into the printer and to prepare said sheet for printing in an efficient and reliable manner. Specifically, a first aspect of the invention provides logic for selecting the speed at which the recording medium is loaded into the printer based upon the type of recording medium being loaded and upon print modes selected by the user and other printing-related conditions. In a related aspect, the line feed speed used to pass the recording medium through the printer during printing and the eject speed used during ejection of the recording medium from the printer after printing can also be selected in a similar manner. In a further aspect, the present invention also provides for an automatic sheet feed control whereby other pre-printing tasks can be carried out prior to completion of the automatic sheet feed sequence. Lastly, the present invention provides an automatic sheet feed sequence whereby a determination is made whether the sheet feed sequence will be successful prior to actual completion of the sheet feed sequence, thereby allowing a printer driver to send print data to the printer prior to completion of the automatic sheet feed sequence.

As described in more detail below, the foregoing arrangement provides for increased reliability during the loading of a recording medium into the printer and also reduces the amount of time required to load the recording medium and to complete other pre-printing tasks in preparation for printing on the recording medium.

4.1 ASF, Line Feed and Elect Speed Selection

Printer 10 includes an automatic feeder 14 for automatically feeding a recording medium into printer 10 prior to printing. A sheet of recording medium is automatically loaded from automatic feeder 14 into printer 10 by automatic feeder rollers 32 which are driven by line feed motor 34 through clutch device 140 as depicted in FIG. 5A. Movement of cartridge receptacles 37a and 37b are necessary in order to position clutch device 140 so as to engage automatic feeder rollers 32 with line feed motor 34 for loading the recording medium into printer 10. The sequence of events necessary to engage and operate automatic feeder rollers 32 via clutch device 140 is depicted in FIG. 5C, as discussed in more detail in Section 1.1, above.

The operation of automatic feeder 14 and automatic sheet rollers 32 is controlled by printer 10 in conjunction with printer driver 84 whereby printer driver 84 sends control commands to printer 10 via communication line 76. In the present aspect of the invention, printer driver 84 preferably sends a command to printer 10 to begin loading the recording medium prior to printing. Upon receipt of the load command from printer driver 84, printer 10 starts to load the recording medium pursuant to the parameters and conditions specified in the load command. As shown in FIG. 14, the load ([LOAD]) command is utilized during the command sequence from printer driver 84 to printer 10 to instruct printer 10 to load the recording medium. The load ([LOAD]) command provides parameters to printer 10 regarding the type and size of recording medium to be loaded, and informs printer 10 whether the recording medium is to be loaded using automatic feeder 14 or manual feeder 17. When automatic feeder 14 is to be used, the load ([LOAD]) command also indicates which one of a plurality of speeds, such as high speed or normal speed, is to be used by automatic feeder rollers 32 for loading the recording medium into printer 10. As discussed earlier in reference to FIG. 14, a skip ([SKIP]) command is used to direct printer 10 to advance the recording medium through printer 10 during printing and an eject ([EJECT]) command is used to eject the recording medium from printer 10 after printing has been completed.

Figure 20:
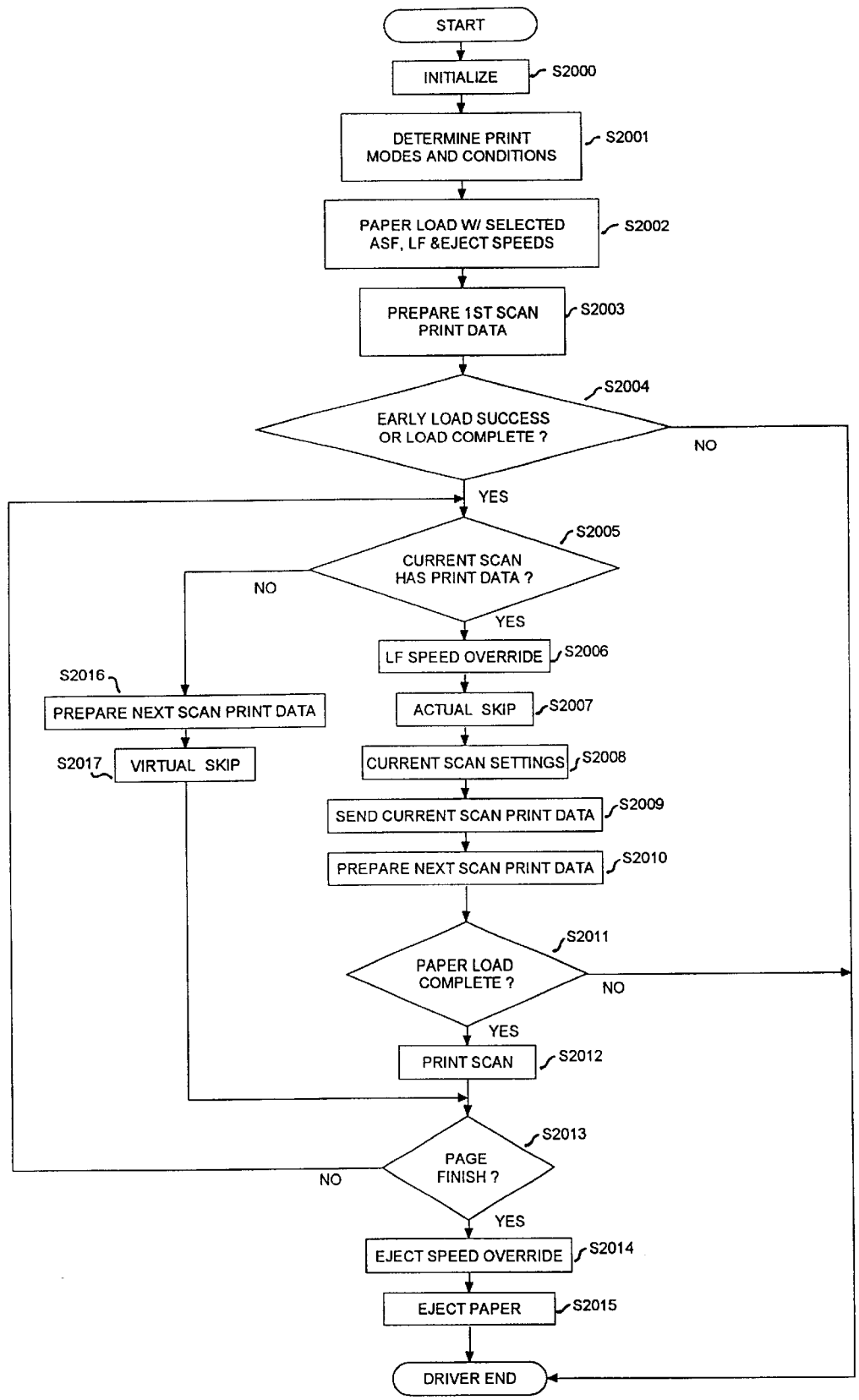
FIG. 20 is a flow diagram which depicts printer driver software process flow.

FIG. 20 is a flow chart that depicts a sequence of steps that are preferably executed within printer driver 84 for commanding printer 10 to load and print a page of recording medium according to the present invention. In FIG. 20, the sequence is started in step 2000 in which printer driver 84 sends a reset command ([RESET]) to printer 10 in order to initialize printer 10. Printer driver 84 then determines (step S2001) the print modes and conditions related to the type of recording medium to be loaded, the type of image to be printed on the recording medium and the modes to define the manner in which printer 10 shall print the image. Once the print modes and conditions have been determined, printer driver 84 determines an appropriate automatic sheet feed speed, line feed speed and eject speed for use during the loading, printing and ejection of the recording medium, and then sends a paper load command ([LOAD]), which includes the determined load speed, line feed speed and eject speed, to printer 10 to begin loading the recording medium (S2002). Printer driver 84 then prepares print data for a first scan of printing in step S2003 and notifies printer 10 of the print data preparation. The preparation of print data by print driver 84 is described more fully in U.S. patent application Ser. No. 08/901,719, entitled "PRINT DRIVER FOR A COLOR PRINTER", filed Jul. 28, 1997. In step S2004, a determination is then made whether printer driver 84 has received an indication of early success of loading the recording medium or an indication that the loading is complete. If either indication is received, then printer 10 is ready to proceed with printing and control passes to step S2005. If neither indication is received, control passes to the end of the sequence. If no print data is to be printed for this scan, (step S2005), control proceeds to step S2016 in which print data for the next scan is prepared. Printer driver 84 then performs a virtual skip in step S2017 in order to keep track of the total number of scan lines processed for this particular page of recording medium. If it is determined that printing for this page of recording medium has not yet been completed (step S2013), control is returned to step S2005. Until it is determined that printing for the current page is finished, steps S2005 through S2013 are repeatedly performed.

If there is print data to be printed for this scan (step S2005), printer driver 84 determines whether to override the previous selection for line feed speed of printer 10 based upon user input (step S2006). For example, the user may select No_Override, Low_Speed Override, or High_Speed Override which is sent to printer 10 (step S2006) via a line feed speed command ([SPEED_RSKIP]). A skip command ([SKIP]) is then sent to printer 10 (step S2007) to instruct line feed motor 34 to advance the recording medium by a specific number of raster lines in order to position the recording medium for printing the current scan of print data. Printer driver 84 then sets scan settings and sends them to printer 10 (step S2008) to prepare it for printing the current scan of print data ([DIRECTION], [EDGE], [SPEED], [SIZE], [SELECT_PULSE], [SELECT_CONTROL]). After sending the scan setting parameters to printer 10, printer driver 84 sends the print data for the current scan to printer 10 via an image data transmission command ([DATA]) in step S2009. Printer driver 84 then prepares the next scan of print data in step S2010. It is then determined whether the loading of recording medium has been completed successfully (step S2011). If the page of recording medium has not been successfully loaded, control is directed to the end of the printer driver, process.

If the loading of the recording medium has been successfully completed, printer driver 84 begins printing of the current scan of print data by sending a print command ([PRINT]) to printer 10 (step S2012). If printing for the page is finished (step S2013), printer driver 84 sets the selected eject speed override in step S2014 to either No_Override, Low_Speed Override, or High_Speed Override, and then sends the override selection to printer 10 as part of a paper eject command ([EJECT]) to instruct printer 10 to eject the current page of recording medium (step S2015). If printing for the current page is not finished, control returns to step S2005. In this manner, printer driver 84 provides detailed commands and data to printer 10 based upon the type of recording medium being used, the print modes and conditions requested by the user, and other relevant print related conditions.

Figure 24:
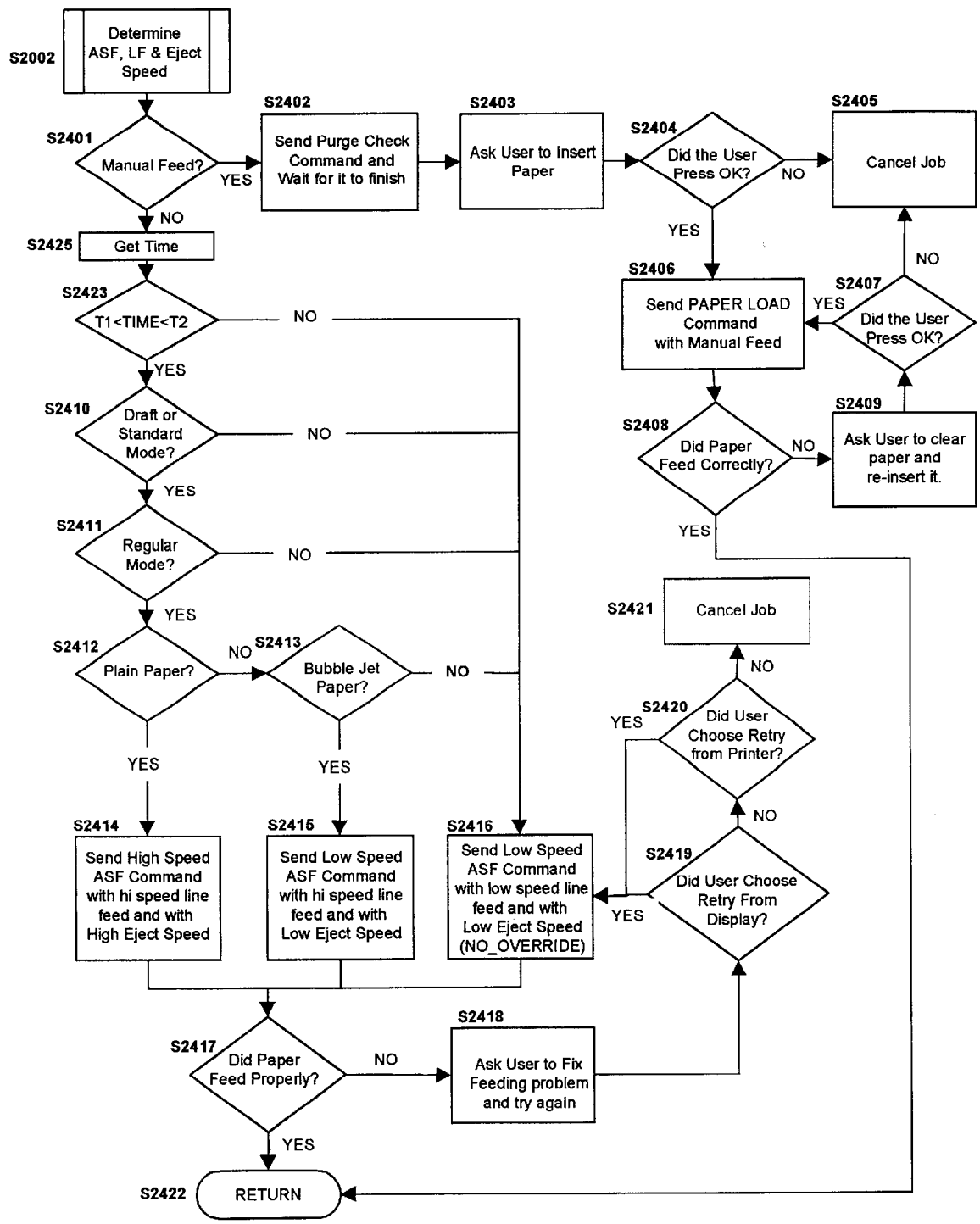
FIG. 24 is a flow diagram which depicts printer driver logic for the selection of line feed, paper load and eject speeds.

FIG. 24 is a flow chart providing a detailed view of the process steps performed by printer driver 84 during step S2002 of FIG. 20 in which automatic sheet feed speed, line feed speed and eject speed are determined. First, it is determined whether the user has selected manual feed for the current print job (step S2401) whereby the user manually feeds a sheet of recording medium into manual feeder 17 of printer 10. If manual feed is selected, printer driver 84 sends a purge check command to printer 10 and waits for the purge check to finish, thereby preventing the user from manually feeding the recording medium during operation of the purge pump (not shown) contained within ink cleaning mechanism 45. Once it is determined that the purge pump is not currently in operation, a dialog box is displayed on display 4 prompting the user to insert a sheet of recording medium into the manual feeder (step S2403). A determination is then made whether the user acknowledged the dialog box prompt to manually insert paper (step S2404) and, if so, control proceeds to step S2406 in which a paper load command ([LOAD]) is sent to printer 10 specifying a manual load. If the user did not acknowledge the dialog box prompt displayed on display 4, the print job is cancelled in step S2405.

Returning to step S2406, after the manual feed load command is sent to printer 10, a determination is made whether the recording medium was loaded correctly (step S2408). If it was not, the user is asked to remove the recording medium from the printer and re-insert it for another attempt at manual feed (step S2409). If the user acknowledges the request to re-insert the recording medium for another attempt at manual feed (step S2407), then control is directed back to step S2406 to send another load command specifying manual feed. If the user does not acknowledge the request to re-insert the recording medium for another attempt at manual feed (step S2407), then the print job is cancelled (step S2405). Returning to step S2408, if the recording medium is properly fed into printer 10 after receipt of the manual feed load command, then control is directed to return from the sequence (step S2422).

Returning to step S2401, if the user does not select manual feed, the current time is obtained in step S2425. If printer 10 is being used within a specified time period as defined by predetermined thresholds T1 and T2 (step S2423), which preferably define daytime business hours, control proceeds to step S2410. If printer 10 is not being used within the specified time period (step S2423), then printer driver 84 selects a low speed automatic sheet feed command, a low speed line feed command and a low speed eject speed command and sends them to printer 10 (step S2416), thereby reducing the noise generated by printer 10 during printing. These settings correspond to default settings when a No_Override mode is selected by the user. If printer 10 is being used within the specified time period (step S2423), but the user has not selected draft or standard mode, then printer driver 84 selects a low load speed setting, a low line speed setting and a low eject speed setting and sends the settings to printer 10 via a paper load ([LOAD]) command (step S2416). If, however, the user has selected a draft or standard mode, a determination is made whether the current print job is to be printed using a regular mode (step S2411). If regular mode is not selected, then a high resolution color mode is in use for the current print job and therefore the printer driver 84 selects low speed settings for the load speed, line feed speed and eject speed and sends them to printer 10 via paper load ([LOAD]) command (step S2416).

If, however, regular mode is being used for the current print job (step S2411), then a determination is made in printer driver 84 regarding what type of recording medium is being used for the current print job (step S2412). If plain paper is being used (step S2412), then a high speed is selected for the load speed, line speed and eject speed and these selections are sent to printer 10 via a paper load ([LOAD]) command (step S2414). However, if instead bubble jet paper is being used for the current print job (step S2413), then a low speed setting is selected for the load speed, a high speed setting is selected for the line feed speed, and a low speed setting is selected for the eject speed, and these selections are sent to printer 10 via a paper load ([LOAD]) command (step S2415). If neither plain paper nor bubble jet paper is being used for the current print job, then printer driver 84 selects a low speed setting for the load speed, a low speed setting for the line feed speed and a low speed setting for the eject speed and these selections are sent to printer 10 via a paper load ([LOAD]) command (step S2416). After a paper load command is sent to printer 10 from one of steps S2414, S2415 or S2416, a determination is made whether the recording medium was properly fed into printer 10 (step S2417). If the recording medium was not properly fed, a dialog box is displayed on display 4 asking the user to correct the problem and retry the paper load (step S2418). If the user then chooses to retry the paper load from display 4 (step S2419), control is directed to step S2416 in which low speed settings are set for the load speed, line feed speed and eject speed and another paper load ([LOAD]) command is sent to printer 10 (step S2416). If the user did not select a retry from display 4, then a determination is made whether the user selected retry from resume button 26 on printer 10 (step S2420), and if so, control is directed to step S2416. If the user did not select retry from display 4 or from printer 10, then the printing job is cancelled (step S2421). Returning to step S2417, if the recording medium was loaded properly into printer 10, flow is directed to step S2422 which returns control from the entire sequence.

In this manner, the present invention provides logic within printer driver 84 to select from one of multiple speeds for loading recording medium from automatic sheet feeder 14 and for similar selection of line feed speed and eject speed based upon the conditions and requirements of a given print job such as the type and size of recording medium, print modes, previous unsuccessful load attempts, and other modes and conditions. As a result, the fastest speeds that are appropriate for a given print job are utilized during loading of the recording medium, and during printing and ejection of the recording medium, thereby reducing the overall time required for a particular print job while still providing reliable performance.

Figure 25:
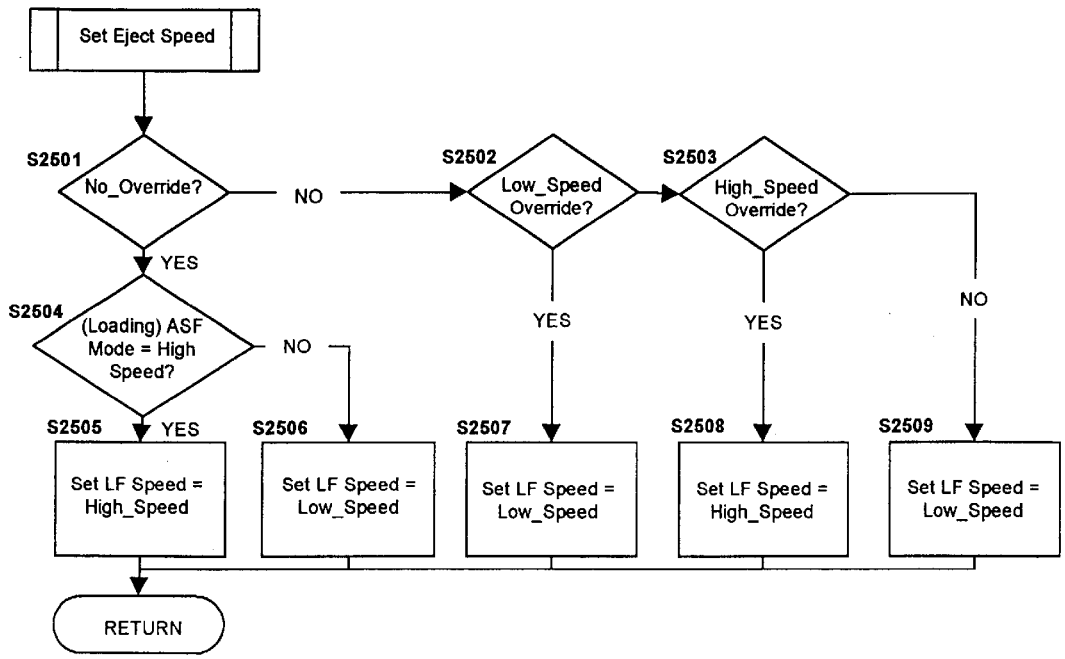
FIG. 25 is a flow diagram which depicts eject speed override logic of the present invention.

FIG. 25 is a flow chart depicting logic used within CPU 91 of printer 10 for setting eject speed based on an override command provided from printer driver 84. Control begins in step S2501 in which a determination is made whether a No_Override command was received from printer driver 84. If the No_Override setting was selected, a determination is made whether the load speed is currently set to a high speed setting (step S2504). If the load speed is currently set to a high speed, then the line feed speed to be used during eject is also set to a high speed selection (step S2505). If the load speed is not set to a high speed, then the line feed speed to be utilized during eject is set to a low speed (step S2506). Returning to step S2501, if a No_Override was not sent by driver 84, then it is determined whether a Low_Speed Override was sent (step S2502). If a Low_Speed Override command was sent, then the line feed speed to be used for ejection is set to a low speed (step S2507). On the other hand, if a Low_Speed Override was not sent, then a determination is made whether a High_Speed Override command was sent (step S2503), and if so, a high speed line feed speed is selected for ejection (step S2508). If neither a No_Override, a Low_Speed Override or a High_Speed Override has been sent, then a default value, preferably low speed, for line feed speed is set for ejection (step S2509). In this manner, printer driver 84 can select an ejection speed override to change a previously set ejection speed command from printer driver 84.

Figure 26:
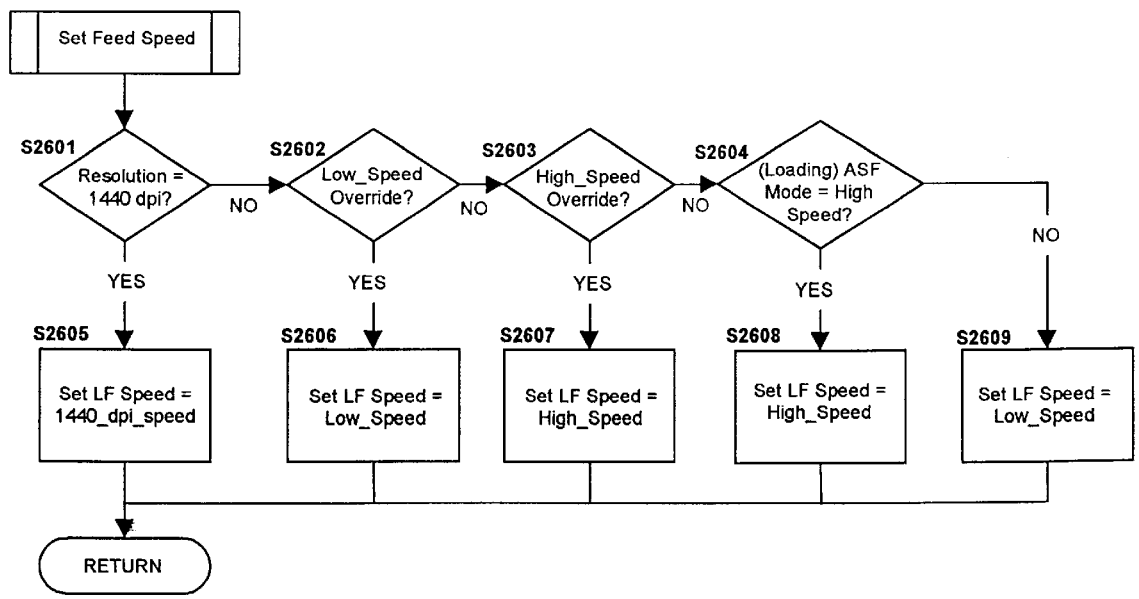
FIG. 26 is a flow diagram which depicts line feed speed override logic of the present invention.

In a similar manner, FIG. 26 provides a flow chart for operation of logic in CPU 91 of printer 10 whereby a prior setting for line feed speed can be overridden at a subsequent time by printer driver 84. Control begins in step S2601 in which it is determined whether the resolution for printing has been set to 1440 dpi. If the resolution of 1440 dpi has been selected by printer driver 84, then a 1440 dpi speed is selected for the line feed speed (step S2605). If, however, a resolution of 1440 dpi has not been selected, then a determination is made whether printer driver 84 has sent a Low_Speed Override (step S2602) and if so, a low speed is selected for the line feed speed (step S2606). If a Low_Speed Override has not been selected, a determination is made whether a High_Speed Override has been selected (step S2603), and if so, a high speed is selected for the line feed speed (step S2607). If a High_Speed Override has not been received, then a determination is made whether the load speed is currently set to a high speed (step S2604) and, if so, a high speed is set for the line feed speed (step S2608). If a high speed has not been set for the load speed, then a default speed of a low speed is selected for the line feed speed (step S2609). In this manner, printer driver 84 can select an override setting for line feed speed after a previous line feed speed setting has been provided by printer driver 84.

4.2 Early Determination of Paper Load Success

In a preferred embodiment of the present invention, a determination is made within CPU 91 of printer 10, prior to completion of the loading of the recording medium, whether the loading will probably be successful. If the loading will probably be successful, printer 10 notifies printer driver 84 of the early success indication so that printer driver 84 can begin sending print data to printer 10 as soon as possible. In this manner, the printer can begin printing more quickly after a successful completion of the loading of the recording medium.

Figure 21A:
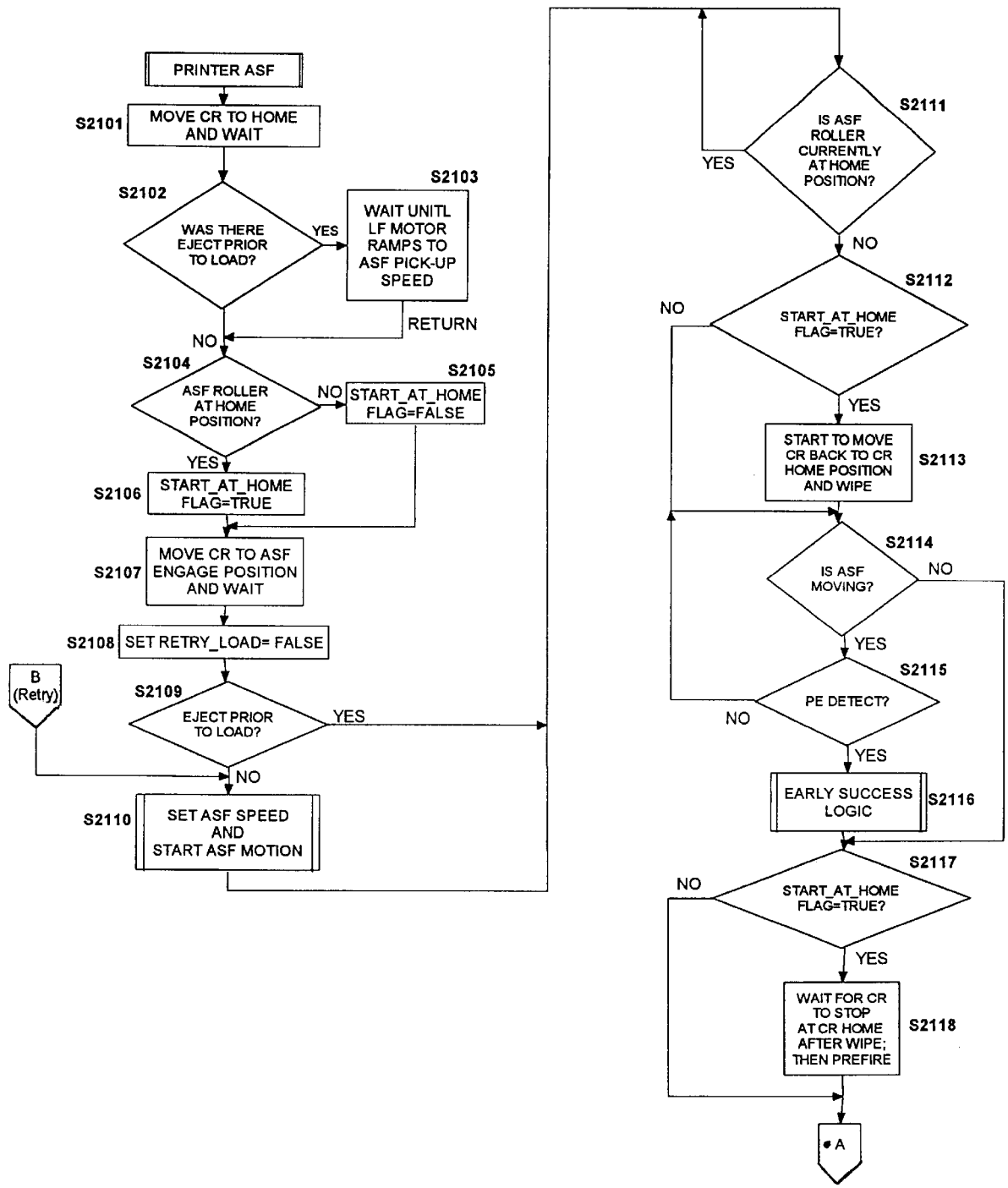
FIG. 21A is a flow diagram which depicts automatic sheet feed sequence of the present invention.

FIG. 21A is a flow chart which illustrates the steps performed in CPU 91 of printer 10 during the loading of a page of recording medium by automatic feeder 14 in printer 10, including steps necessary to obtain an early success indication regarding the loading of the recording medium. Control begins in step S2101 in which cartridge receptacles 37a and 37b are commanded to move to home location 46 and then to wait once they arrive there. The cartridge receptacles are driven by carriage motor driver 39a. Next, it is determined whether a previous recording medium was ejected immediately prior to this loading sequence (step S2102). If there was an ejection, then a process wait is entered into (step S2103) until line feed motor 34 has ramped from the ejection line feed speed to the automatic sheet feed pickup speed at which speed automatic feeder rollers 32 can be engaged. This wait is performed so that adjustment of clutch unit 140 for engaging automatic feeder rollers 32 is not attempted until line feed motor 34 is at an appropriate speed. Once the line feed motor is at the appropriate speed, a determination is made whether automatic feeder rollers 32 are currently at their initial home position (step S2104). If so, a flag is set to indicate that automatic feeder rollers 32 were in their home position at the beginning of the automatic sheet feed sequence (step S2106).

If the automatic feeder rollers were not initially in the home position, then the flag is set to false (step S2105). Next, cartridge receptacles 37a and 37b are commanded to move to clutch unit 140 for engaging automatic feeder rollers 32 (step S2107). A Retry_Load Flag is set to false in step S2108 to indicate that a retry has not yet been attempted for loading of the recording medium. Next, a determination is again made whether there was an ejection of a previous recording medium prior to the beginning of this load sequence (step S2109). If there was an ejection, then control is directed to step S2111 and, if there was not an ejection, the load speed is selected based upon various conditions as described in further detail in FIG. 21D, after which the start of automatic feeder rollers 32 is commanded (step S2110). Control flow then proceeds to step S2111 in which it is determined whether automatic feeder rollers 32 are currently at their home position. If they are currently at their home position, control is again returned to step S2111 to keep checking their position until they are no longer at the home position. If automatic feeder rollers 32 are not currently at the home position and it is also determined that automatic feeder rollers 32 did, in fact, start in the home position (step S2112), then clutch unit 140 is properly engaged for driving automatic feeder rollers 32 and, therefore, cartridge receptacles 37a and 37b are no longer required to be positioned near clutch unit 140. Cartridge receptacles 37a and 37b are then commanded to move back to home location 46 for the cleaning of print heads 100a and 100b (step S2113).

Returning to step S2112, if automatic feeder rollers 32 were not initially in the home position, then cartridge receptacles 37a and 37b should remain positioned against clutch unit 140 so as to engage automatic feeder rollers 32 to provide enough time for them to complete their motion. In this case, cartridge receptacles 37a and 37b are not commanded to move back to the home position but, instead, control is directed to step S2114 in which it is determined whether automatic feeder rollers 32 are currently moving. If they are moving, then a determination is made whether the leading edge of the recording medium has been detected within printer 10 (step S2115). If the leading edge has not yet been detected, control is returned to step S2114 to again determine if automatic feeder rollers 32 are moving. If it is determined in step S2114 that automatic feeder rollers 32 are not moving, such as upon completion of their required motion for loading the recording medium, then control is directed to step S2117. Returning to step S2115, if the leading edge of the recording medium is detected, then early success logic is performed (step S2116) to determine whether the loading process will probably be successful even though it has not yet been completed. A more detailed description of the early success logic is discussed further in reference to FIG. 21C. After execution of the early success logic (step S2116), a determination is made in step S2117 whether automatic feeder rollers 32 began in their initial home position and, if so, a process wait is entered into (step S2118) to wait for carriage receptacles 37a and 37b to stop at home location 46. Print heads 100a and 100b are then commanded to perform a pre-fire in order to maintain them in at least a good printing condition step S2118).

The wait in step S2118 also allows for cartridge receptacles 37a and 37b to move past wipers 44a and 44b for wiping on the way to home location 46. Step S2118 is circumvented if automatic feeder rollers 32 were not initially in their home position (step S2117) at the beginning of the automatic sheet feed sequence. Control is continued at step 2119 in FIG. 21B wherein a determination is made whether automatic feeder rollers 32 are currently moving. If rollers 32 are moving, control is returned to step S2119 until it is determined that rollers 32 are no longer moving. Once rollers 32 have stopped moving, control is directed to step S2120 to determine whether rollers 32 were initially in their home position at the beginning of the automatic sheet feed sequence. If rollers 32 were not initially at their home position, then cartridge receptacles 37a and 37b are commanded to their home location 46 (step S2121). Control then proceeds to a determination of whether rollers 32 are currently stopped at their home position (step S2122). If rollers 32 are not returned to their home position after they have stopped moving (step 2122) then there has been a fatal error and appropriate action is taken to restart all tasks and log the error (step S2123). If rollers 32 did return to their home position, a determination is made (step S2124) whether the leading edge of the recording medium was detected by the paper edge sensor (not shown).

If the leading edge of the recording medium was detected, a determination is made (step S2125) whether the detection of the edge was made within the specified number of motor steps, e.g. whether the recording medium took too long to load because it was slipping on automatic feeder rollers 32. If the leading edge was detected within the expected time, it is then determined whether the leading edge of the recording medium was loaded past the paper edge sensor by a sufficient amount (step S2126). If the recording medium was loaded by a sufficient amount, then the recording medium was loaded successfully and a Return Load Status flag is set to SUCCESS (step S2128). Control is then returned from the automatic sheet feed sequence.

If, however, the recording medium took too long to be detected (step S2125) or was not loaded past the paper edge sensor by a sufficient amount (step S2126) the attempt to load the recording medium was unsuccessful and control is then directed to step S2127 in which a determination is made whether the recording medium allows for the use of a recovery sequence to place the recording medium in the proper position. The recovery sequence is preferably not allowed for recording media that are less than six inches or that are glossy paper, glossy photo card, or high gloss film. If the type of recording medium does not allow for the use of a recovery sequence, the Return Load Status is set to ERROR and control is returned from the entire automatic sheet feed sequence (step S2131). If the type of recording medium allows for utilization of a recovery sequence, then control is directed to the recovery sequence in step S2129. The recovery sequence is discussed in greater detail below in reference to FIG. 21E. Upon recovery, the Return Load Status is set to SUCCESS and control is returned from the entire automatic sheet feed sequence (step S2128).

Returning to step 2124, if the leading edge of the recording medium has not been detected by the paper edge sensor, the type of recording medium is checked to determine whether it supports the use of a recovery sequence (step S2132). If the type of recording medium does not allow for the use of a recovery sequence, the Return Load Status is set to ERROR (step S2131) and control is then returned from the entire automatic sheet feed sequence. If the type of recording medium supports the use of a recovery sequence, a the Retry_Load flag is tested (step S2133) to determine whether this is the second attempt to retry loading of the recording medium. If this is the second retry attempt, the Return Load Status is set to ERROR and control is returned from the entire automatic sheet feed sequence (step S2131).

If this is the first retry attempt, the Retry_Load flag is set (step S2134) and rollers 32 are checked to determine if they are currently at their home position (step S2135). The Start_At_Home flag is set accordingly in step S2136 or step S2137 in accordance with the current position of rollers 32. The process then waits for cartridge receptacles 37a and 37b to stop moving, and then commands cartridge receptacles 37a and 37b to move to clutch unit 140 to engage automatic feeder rollers 32 with line feed motor 34 (step S2138). Control then returns to step S2110 in FIG. 21A to repeat the automatic sheet feed sequence steps previously described.

Figure 21B:
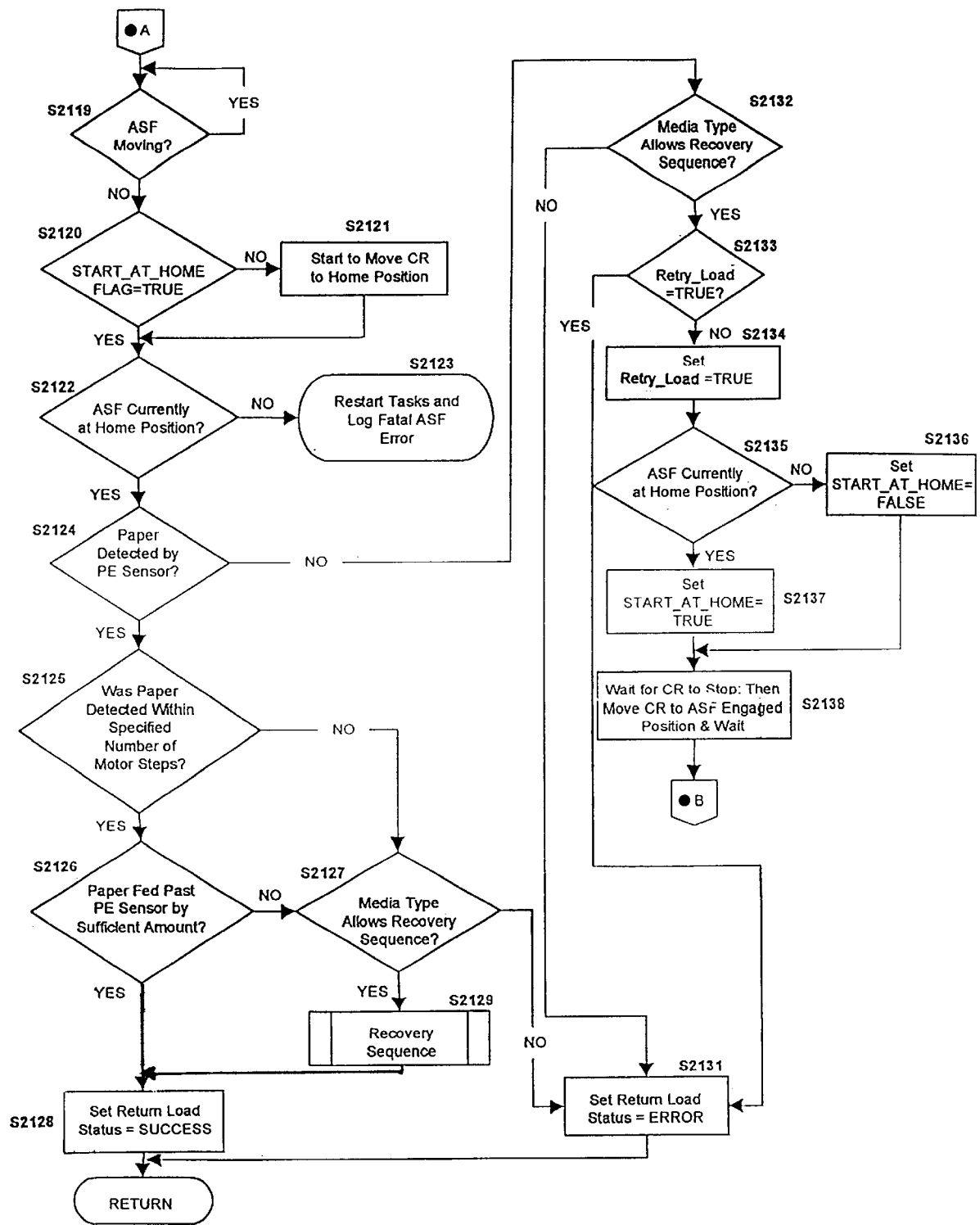
FIG. 21B is a continuation of the automatic sheet feed sequence shown in the automatic sheet feed sequence of FIG. 21A.
Figure 21C:
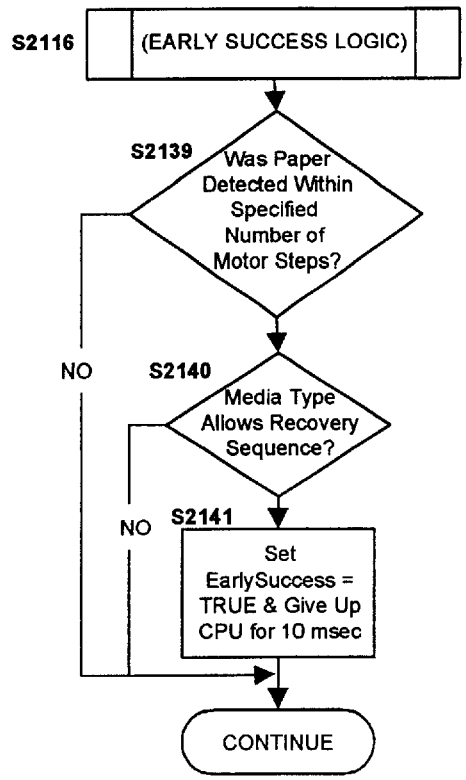
FIG. 21C is a flow diagram which depicts the early success logic shown in the automatic sheet feed sequence of FIG. 21A.

The early success logic referenced earlier in step 2116 of FIG. 21B allows an Early Success flag to be sent to printer driver 84 so that printer driver 84 can begin sending print data to printer 10 prior to completion of the loading of the recording medium. FIG. 21C provides a detailed flow diagram of the steps comprising the early success logic. In step S2139, a determination is made whether the leading edge of the recording medium was detected within the specified number of motor steps, e.g. whether the recording medium took too long to load because it was slipping on automatic feeder rollers 32. If the leading edge of the recording medium was not detected within the specified number of motor steps, then control is returned because there is a probability that the load will not be successful.

If the leading edge of the recording medium was detected within the specified number of motor steps, then the type of recording medium is checked to determine whether it supports the use of a recovery sequence as discussed above (step S2140). If the type of recording medium does not allow for the use of a recovery sequence, control is returned because there is a probability that the load will not be successful. Alternatively, if the type of recording medium allows for the use of a recovery sequence, an Early Success flag is set and the process gives up control of CPU 91 for 10 milliseconds (step S2141) to allow another process to send a SUCCESS indication in the Return Load Status to printer driver 84. In this manner, the automatic sheet feed sequence performed in CPU 91 of printer 10 controls the automatic loading of a recording medium from automatic feeder 14 in an efficient manner while also providing reliable performance by allowing printer driver 84 to begin sending print data prior to completion of the loading process based upon an early success indication. This arrangement therefore reduces the time required between the completion of loading the recording medium and the beginning of printing image data on the recording medium.

Figure 21D:
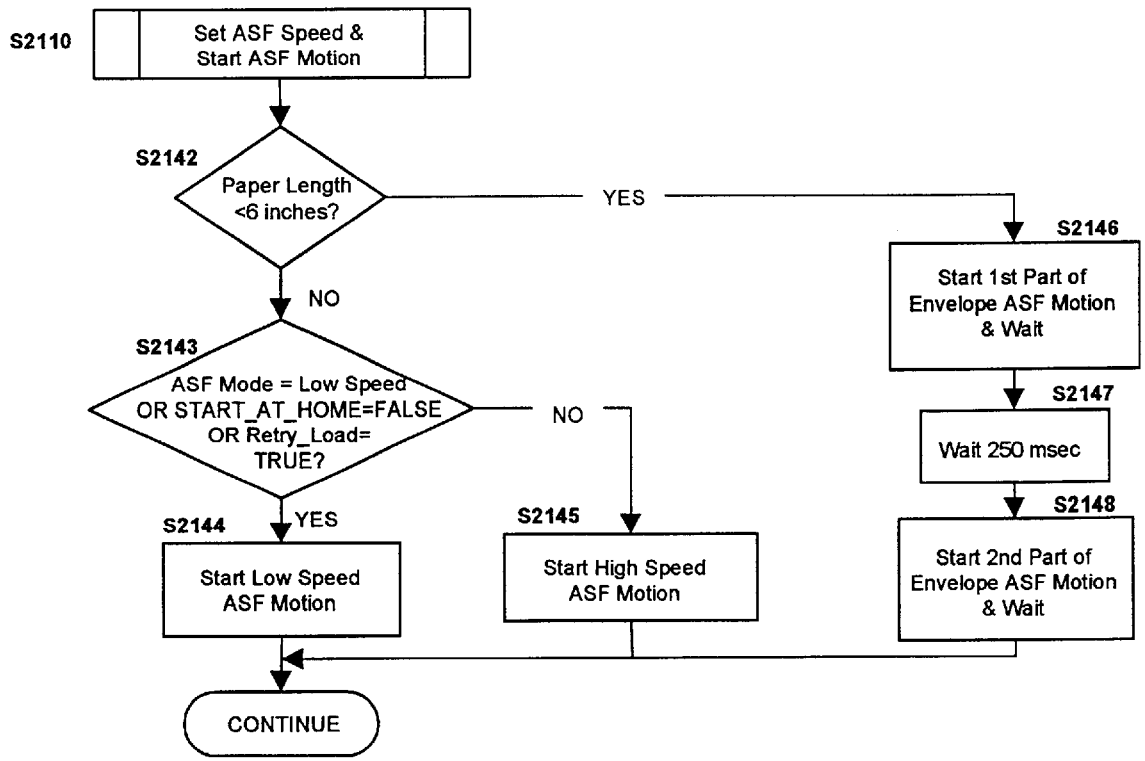
FIG. 21D is a flow diagram which depicts the load speed select for the automatic sheet feed sequence shown in FIG. 21A.

FIG. 21F is a flow diagram that illustrates the process steps referenced in the reference in FIG. 21D to step S2110 in which CPU 91 of printer 10 sets the load speed based upon the automatic sheet feed speed provided by printer driver 84 and by current conditions and parameters related to the automatic sheet feed sequence. In step S2142, the length of the recording medium is checked to determine if it is less than six inches. If it is, the recording medium is treated similar to an envelope and a two-part load sequence is initiated whereby the first part of the motion for automatic feeder rollers 32 is started (step S2146). After a 250 millisecond wait (step S2147), the second part of the motion for automatic feeder rollers 32 is started (step S2148). Control is then returned from this process. This two-part motion provides reliability when attempting to load smaller size recording medium, such as bulky, heavier envelopes.

If the recording medium is not less than six inches, the currently set load speed is checked to determine if it is set to low speed, the Start at Home flag is checked to determine if automatic feeder rollers 32 were not initially at their home position, and the Retry_Load flag is checked to determine if a prior attempt to load the recording medium was unsuccessful (step S2143). If any of the aforementioned checks are answered in the affirmative, line feed motor 34 is commanded to drive automatic feeder rollers 32 at low speed (step S2144). If none of the aforementioned checks are answered in the affirmative, line feed motor 34 is commanded to drive automatic feeder rollers 32 at high speed (step S2145). Control is then returned from this process.

Figure 21E:
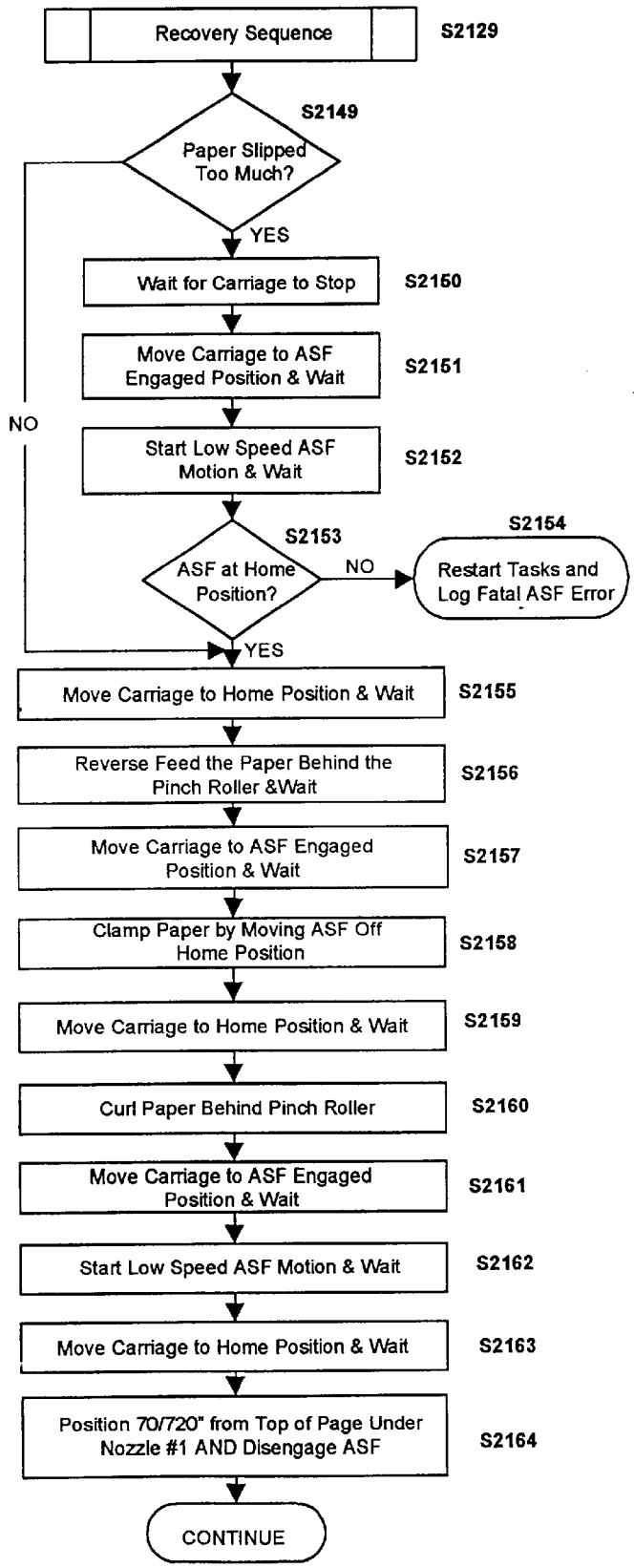
FIG. 21E is a flow diagram which depicts the recovery sequence as shown in the automatic sheet feed sequence of FIG. 21A.

FIG. 21E is a flow diagram that provides a detailed view of the process steps comprising the recovery sequence represented by step S2129 in FIG. 21B. The recovery sequence begins in FIG. 21E by first determining if the recording medium slipped too much while being loaded by automatic feeder rollers 32 (step S2149). If so, the recovery sequence waits for cartridge receptacles 37a and 37b to stop moving (step S2150) and then commands cartridge receptacles 37a and 37b to move to clutch unit 140 to engage automatic feeder rollers 32 with line feed motor 34 (step S2151). If the paper has not slipped too much, control is directed to step S2155 which is discussed in more detail below. Automatic feeder rollers 32 are then started at a low speed (step S2152) and the recovery sequence then waits until automatic feeder rollers 32 complete the loading motion. Next, it is determined whether automatic feeder rollers 32 have stopped at their home position (step S2153). If they have stopped at their home position, then the recovery sequence continues to step S2155. If they have not stopped at their home position, then all tasks are restarted and a fatal error is logged (step S2154).

The recovery sequence continues at step S2155 wherein cartridge receptacles 37a and 37b are commanded to move to home location 46 thereby disengaging automatic feeder rollers 32 from line feed motor 34 via clutch unit 140. Line feed motor 34 is then commanded to rotate line feed roller 165 in the reverse direction (step S2156) to feed the recording medium behind a pinch roller (not shown). Cartridge receptacles 37a and 37b are then commanded to move to clutch unit 140 to engage automatic feeder rollers 32 with line feed motor 34 (step S2157) via clutch unit 140. The recording medium is then clamped by moving automatic feeder rollers 32 from their home position (step S2158).

Cartridge receptacles 37a and 37b are then commanded to move to home location 46 thereby disengaging automatic feeder rollers 32 from line feed motor 34 (step S2159). The recording medium is then curled behind the pinch roller (not shown) by driving line feed motor 34 (step S2160). Cartridge receptacles 37a and 37b are then commanded to move to clutch unit 140 to engage automatic feeder rollers 32 with line feed motor 34 (step S2161). Automatic feeder rollers 32 are started at a low speed in step S2162 and the recovery sequence then waits until automatic feeder rollers 32 complete the loading motion. Cartridge receptacles 37a and 37b are then commanded to move to home location 46 thereby disengaging automatic feeder rollers 32 from line feed motor 34 (step S2163). The recording medium is then positioned such that the leading edge of the recording medium is loaded 70/720th of an inch past the location of the first nozzle of print heads 100*a* and 100*b* (step S2164). At this point, the recording medium is positioned for printing and control is returned from this recovery process.

4.3 Print Head Maintenance During Paper Load

As discussed above and depicted in FIGS. 5A, 5B and 5C, the movement of cartridge receptacles 37*a* and 37*b* is necessary in order to adjust clutch unit 140 so as to engage automatic feeder rollers 32 with line feed motor 34 thereby driving automatic feeder rollers 32 to load recording medium into printer 10. Conventional printers typically wait until loading of the recording medium is successfully completed before performing other pre-printing tasks such as cleaning the print heads. In such an arrangement, cartridge receptacles 37*a* and 37*b* are kept near clutch unit 140 during loading of the recording medium in the event that there is a loading problem that requires the use of cartridge receptacles 37*a* and 37*b* to engage or disengage automatic feeder rollers 32 from line feed motor 34.

In the preferred embodiment of the present invention, it is determined whether automatic feeder rollers 32 began an automatic sheet feed sequence in the proper position and whether the automatic sheet feed sequence is progressing properly. Therefore, in the event that the automatic loading of a recording medium is proceeding properly, cartridge receptacles 37*a* and 37*b* can be utilized for other pre-printing tasks such as print head cleaning and maintenance prior to the completion of the automatic sheet feed sequence.

The specific steps performed by printer 10 to achieve this function are shown in steps S2111 through S2118 of the automatic sheet feed sequence depicted in FIG. 21A and have been thoroughly discussed above. Specifically, when it is determined that the automatic sheet feed sequence is proceeding properly, cartridge receptacles 37*a* and 37*b* are sent to home location 46 in step S2113 of FIG. 21A. The process waits for cartridge receptacles 37*a* and 37*b* to stop at home location 46, thereby providing time for wiping print heads 100*a* and 100*b* on the way to home location 46, after which print heads 100*a* and 100*b* are commanded to perform a pre-fire of ink to maintain them in a good printing condition (step S2118 of FIG. 21A).

Figure 22:
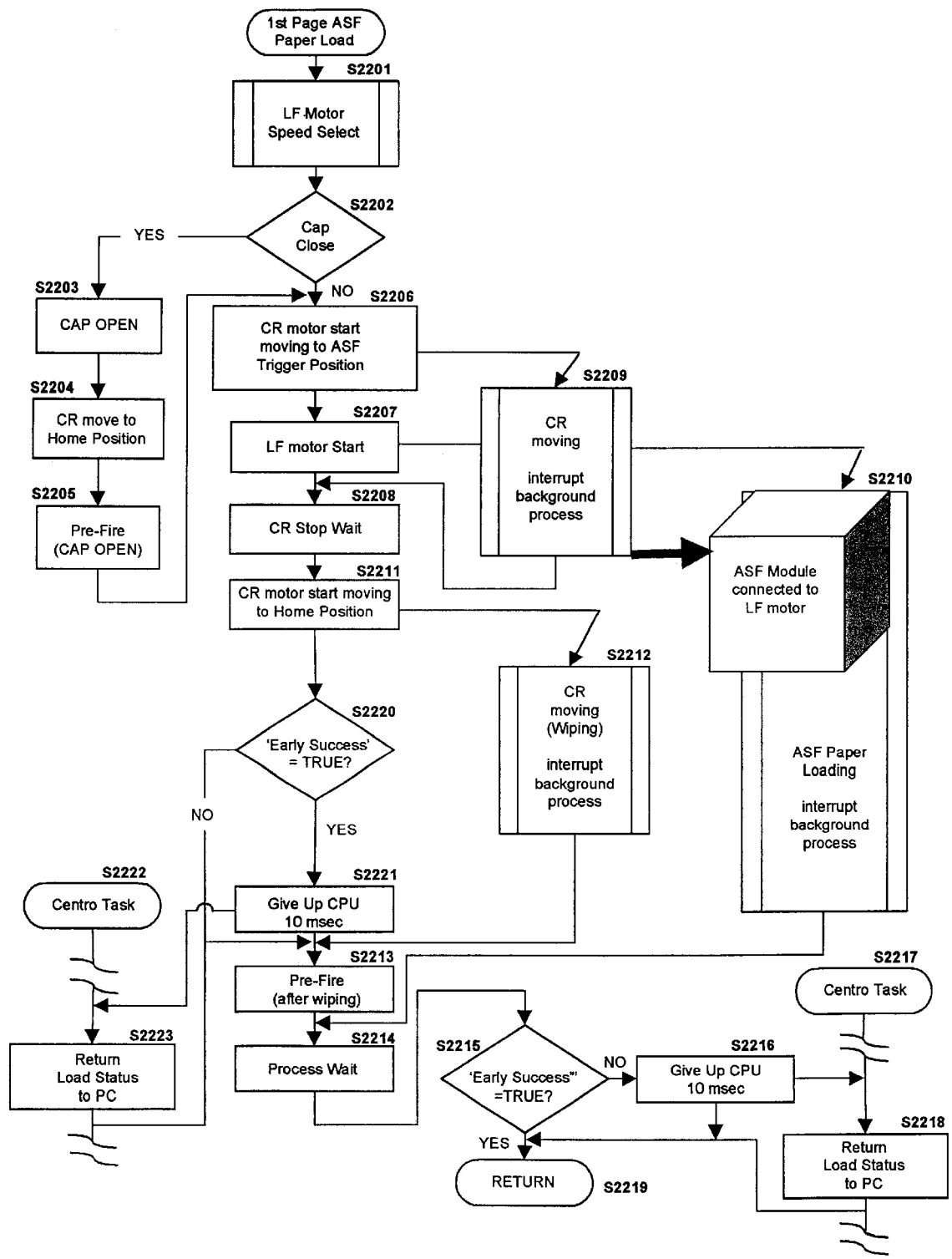
FIG. 22 is a flow diagram which depicts an automatic sheet feed sequence for a first page within a printer.

FIG. 22 is a flow diagram that functionally depicts the relationships among automatic feeder rollers 32, cartridge receptacles 37*a* and 37*b*, print heads 100*a* and 100*b* and printer driver 84 during execution of an automatic sheet feed sequence in printer 10 for loading a first page of recording medium during a print job. Starting with step S2201, the line feed motor speed is selected as described earlier in reference to FIG. 21D. Then, the status of print head connection caps 47*a* and 47*b* are checked to determine if they are closed (step S2202). If caps 47*a* and 47*b* are closed, they are commanded to open (step S2203), after which cartridge receptacles 37*a* and 37*b* are commanded to home location 46 (step S2204), and print heads 100*a* and 100*b* are commanded to pre-fire (step S2205). Control is then returned to step 2206 in which carriage motor 39 is commanded to move cartridge receptacles 37*a* and 37*b* to clutch unit 140 to engage automatic feeder rollers 32 with line feed motor 34. The motion of cartridge receptacles 37*a* and 37*b* thereupon continues under the supervision of an interrupt background process as shown in step S2209.

Control continues to step S2207 in which line feed motor 34 is started to begin the loading of the recording medium via automatic feeder rollers 32. The paper loading thereupon continues under the supervision of an interrupt background process as shown in step S2210. In step S2208, a process wait is entered until the interrupt background process of step S2209 returns an interrupt indicating that cartridge receptacles 37*a* and 37*b* have moved to clutch unit 140. Then, control proceeds to step S2211 whereupon carriage motor 39 is commanded to move cartridge receptacles 37*a* and 37*b* to home location 46, thereby initiating an interrupt background process to supervise the wiping of print heads 100*a* and 100*b* as shown in step S2212. A determination is then made whether an Early Success flag has been set for the automatic sheet feed sequence (step S2220). If the Early Success flag is set to FALSE, control is directed to step S2213. However, if the Early Success flag is set to TRUE, control of CPU 91 is given up in order to transmit the Return Load Status to printer driver 84 as depicted in steps S2221 through S2223. Control is then directed to proceed immediately prior to step S2213.

The interrupt background process that moves cartridge receptacles 37*a* and 37*b* to home location 46 (step S2212), during which the wiping of print heads 100*a* and 100*b* is performed, returns an interrupt prior to step S2213 indicating that cartridge receptacles 37*a* and 37*b* have arrived at home location 46. Pre-fire of print heads 100*a* and 100*b* is then performed in step S2213. A process wait is entered in step S2214 until the interrupt background process that monitors the loading of the recording medium (step S2210) returns an interrupt indicating that the loading of the recording medium is complete.

Upon receipt of an indication that the loading of the recording medium is complete (step S2214), a determination is made whether Early Success was previously detected for the automatic sheet feed sequence (step 2215). If there was an Early Success detection, control is returned from this sequence (step S2219). If there was not an Early Success detection, control is given up to CPU 91 of printer 10 (step S2216) in order to transmit the Return Load Status to printer driver 84 as depicted in steps S2217 and S2218. Control is then returned from this sequence in step S2219. In this manner, cartridge receptacles 37*a* and 37*b* are allowed to perform other pre-printing tasks, such as wiping and pre-firing of print heads 100*a* and 100*b*, concurrently with the loading of the recording medium if the loading process is proceeding properly. Thus, the overall time required between completion of loading the recording medium and the start of printing is reduced without adversely affecting reliability and performance of the automatic recording medium load sequence.

Figure 23:
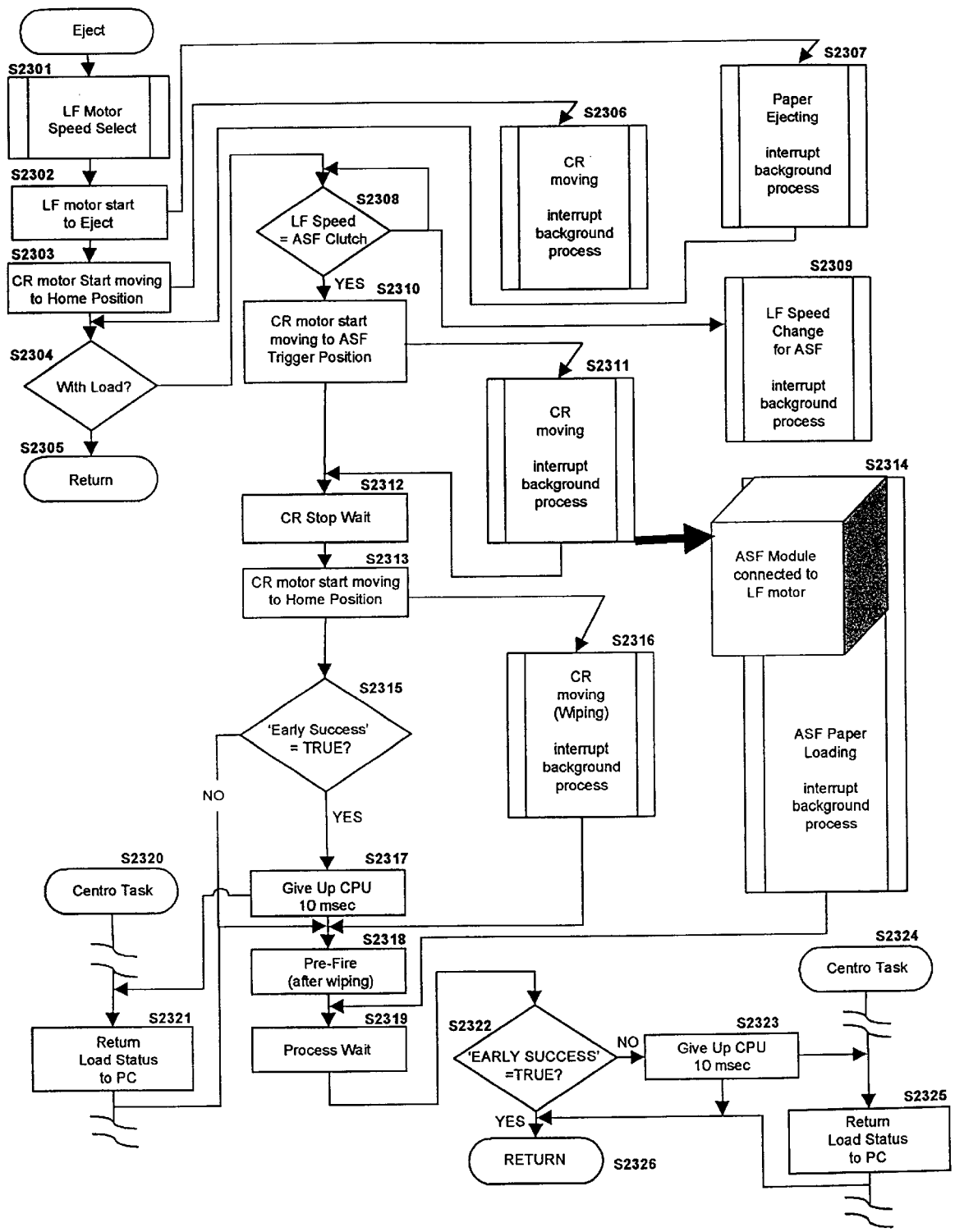
FIG. 23 is a flow diagram which depicts an automatic sheet feed sequence after an eject sequence in a printer.

FIG. 23 is a flow diagram that functionally depicts execution of an automatic sheet feed sequence in printer 10 for ejection of a page of recording medium followed by loading of a new page of recording medium First, the speed of line feed motor 34 is selected for ejection of the previous page of recording medium (step S2301). Then, line feed motor 34 is commanded to begin the ejection of the previous page of recording medium (step S2302). This initiates an interrupt background process to monitor the ejection of the previous page of recording medium as shown in step S2307. Next, carriage motor 39 is commanded to move cartridge receptacles 37*a* and 37*b* to home location 46 (step S2203), thereby initiating an interrupt background process to monitor the movement of cartridge receptacles 37*a* and 37*b* (step S2306). Control then waits until an interrupt is returned from the interrupt background process monitoring the ejection of the previous page of recording medium (step S2307) indicating that the ejection is complete, whereupon control proceeds to step S2304. A determination is made whether the ejection is to be followed by the loading of a new page of recording medium (step S2304), and if not, then control is returned from the process in step S2305.

If the ejection is to be followed by the loading of a new page of recording medium, then a determination is made whether the current line feed speed is equal to the speed required for engaging clutch unit 140 for driving automatic feeder rollers 32 (step 2308). If the line feed speed is not the same, then an interrupt background process is initiated to monitor the ramping of the current line feed speed to the speed required to engage clutch unit 140 for driving automatic feeder rollers 32 (step S2309). Control then continues at step S2308 until the required speed is obtained, after which control is directed to step S2310.

Carriage motor 39 is then commanded to move cartridge receptacles 37a and 37b to clutch unit 140 in step S2310 in order to engage automatic feeder rollers 32 with line feed motor 34. The motion of cartridge receptacles 37a and 37b thereupon continues under the control of an interrupt background process as shown in step S2311. Upon the return of an interrupt from the background process of step S2311, the loading of the recording medium then proceeds under the monitoring of an interrupt background process as shown in step S2314. In step S2312, a process wait is entered until the interrupt background process of step S2311 returns an interrupt indicating that cartridge receptacles 37a and 37b have moved to clutch unit 140 and thereby engaged automatic feeder rollers 32 to line feed motor 34. Then, control proceeds to step S2313 whereupon carriage motor 39 is commanded to move is cartridge receptacles 37a and 37b to home location 46, thereby initiating an interrupt background process (step S2316) to monitor cartridge receptacles 37a and 37b as they move to home location 46, during which wiping of print heads 100a and 100b is performed. A determination is then made whether an Early Success flag has been set for the automatic sheet feed sequence (step S2315). If the Early Success flag is FALSE, control is directed to step S2318, but if the Early Success flag is TRUE, control is given up from CPU 91 of printer 10 in order to transmit the load status to printer driver 84 as depicted in steps S2317, 2320 and S2321. Control is then directed to step S2318.

The interrupt background process of step S2316 returns an interrupt prior to step S2318 indicating that cartridge receptacles 37a and 37b have arrived at home location 46. Pre-fire of print heads 100a and 100b is then performed in step S2318. A process wait is entered in step S2319 until the interrupt background process that monitors the loading of the recording medium (step S2314) returns an interrupt indicating that the loading of the recording medium is complete. Upon receipt of an indication that the loading of the recording medium is complete (step S2319), a determination is made whether Early Success was previously detected for the automatic sheet feed sequence (step 2322). If there was an Early Success detection, control is returned from this sequence (step S2326). If there was not an Early Success detection, control is given up to CPU 91 of printer 10 (step 2323) in order to transmit the Return Load Status to printer driver 84 as depicted in steps S2324 and S2325. Control is then returned from this sequence in step S2326.

Thus, similar to the loading of a first page of recording medium depicted in FIG. 22 as described above, the overall time required after the completion of loading the recording medium to perform other pre-printing tasks, such as wiping and pre-firing, is reduced without adversely affecting reliability and performance.

5.0 Carriage Control

This Section describes carriage motor control according to the invention so as to accommodate a faster carriage motor.

5.1 Margin And Direction Control

Carriage motor 39 of printer 10 preferably is a high-speed motor so as to increase overall printing speed by scanning print heads 100a and 100b more rapidly across a recording medium than in a conventional printer. However, high-speed motors tend to exhibit non-uniform speeds when they start. These speed non-uniformities can result in rippled or otherwise degraded image formation. The ripples tend to be most apparent in continuous images, for example non-color graphics such as charts or tables, and color images. The impact of the non-uniformities can be alleviated, however, by appropriate carriage motor control.

Briefly, the invention addresses speed non-uniformity by determining content of print data, and then printing the print data either with a first lateral scan process using a critical zone at edges in a lateral scan of the print head for printing, or with a second lateral scan process that does not use the critical zone for printing. The first or second lateral scan process is selected based on the print data. The critical zone is an unstable zone for moving the print head in a lateral scan.

Preferably, the critical zone is sized in correspondence with ramp up non-uniformities of a print carriage on which the print head is mounted, so as to accommodate a distance between a point where print degradation due to speed non-uniformities are noticeable to a point where print degradation due to speed non-uniformities are no longer noticeable.

Preferably, it is determined whether or not print data for a current scan and print data for a previous scan, in at least the critical zone, are continuous print data. The current scan is printed in a direction opposite to that of the previous scan by the first lateral scan process in a case that the print data for the current scan and the print data for the previous scan are not continuous print data. The current scan is printed in a same direction as that of the previous scan by the second lateral scan process in a case that the print data for the current scan and the print data for the previous scan are continuous print data.

Figure 27A:
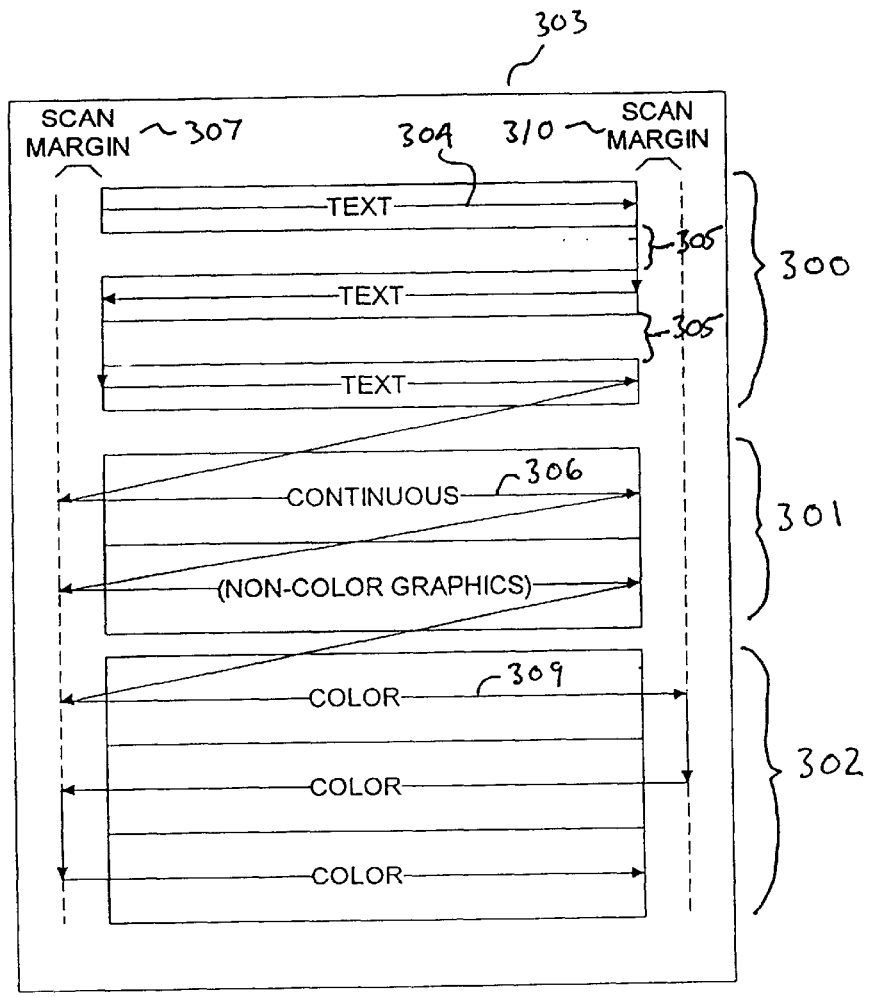
FIG. 27A is a representative view of for describing carriage control for printing text, continuous images, and color images.

In more detail, FIG. 27A is a representative view for describing carriage control for standard mode (i.e., not draft or best mode) printing of isolated scan lines 300, continuous images 301, and color images 302 on plain-paper recording medium 303. Isolated scan lines 300 are separated by whitespaces 305 and typically comprise text having a height less than a printable height of print head 100a or 100b. According to the invention, isolated scan lines 300 are printed using bi-directional printing 304 without additional scan margins. Because these scan lines typically are text, ripples and other distortions caused by speed non-uniformity of carriage motor 39 tend not to be noticed. Accordingly, the faster bi-directional printing without scan margins produces satisfactory image quality at high speed.

Continuous images 301 are non-color images that require multiple scan lines to print, without any whitespaces between scan lines. Examples of continuous images 301 are large-font text that has a height greater than a print height of print head 100a or 100b, and black-and-white or grey-scale graphics including tables and charts.

If continuous images 301 are printed using bi-directional printing without margins, speed non-uniformity occurs on opposite sides of recording medium 303 from scan line to scan line. As a result, distortions caused by speed non-uniformity at a start of each scan line become more noticeable by proximity to vertically-adjacent non-distorted ends of previous and subsequent scan lines. In order to address this problem, printer 10 according to the invention prints continuous images using unidirectional printing 306. Furthermore, scan margin 307 is inserted before each scan line so as to allow motor non-uniformities to dissipate before ink is ejected onto recording medium 303. Because unidirectional printing is preformed, only left scan margin 307 needs to be inserted on a left side of the scan lines.

By virtue of the foregoing, bi-directional printing that includes printing in the critical zone is used for isolated (e.g., text) scan lines, where distortion from speed non-uniformity is less noticeable, thereby improving printing speed. Unidirectional printing that does not include printing in the critical zone is used for scan lines of continuous images, thereby alleviating image distortion from speed non-uniformity where such distortion is most noticeable.

With respect to color images 302, each scan line recorded by a color print head such as print head 62 in FIG. 7 is 23 pixels high, as opposed to 127 pixels for a black print head or 63 pixels for black nozzles of a color print head. As a result, more scans of print heads 100a and 100b are required to print a given sized color image with a color print head as compared to printing isolated or continuous images. Unidirectional printing might unacceptably slow such a printing operation, unless extremely high quality output is desired. Accordingly, bi-directional printing 309 is used to print color images 302. Because bi-directional printing is used, left scan margin 307 is inserted before forward (left-to-right) scans of print heads 100a and 100b, and right scan margin 308 is inserted before reverse (right-to-left) scans of print heads 100a and 100b.

As noted above, the foregoing combinations of scan margins and scan directions illustrated in FIG. 27A are applicable to standard mode printing on plain-paper recording medium 303. Other printing directions can result from different combinations of print mode, recording media type, print head configuration, and error diffusion mode. These different combinations and the resulting printing directions are explained in more detail below with reference to FIGS. 27C to 27G. If continuous or color images are recorded using these different combinations, scan margin 307 preferably is inserted before each scan line for unidirectional printing, and scan margins 307 and 310 preferably are inserted before scan lines for bi-directional printing (margin 307 is inserted before forward scan lines, and margin 310 is inserted before reverse scan lines).

Figure 27B:
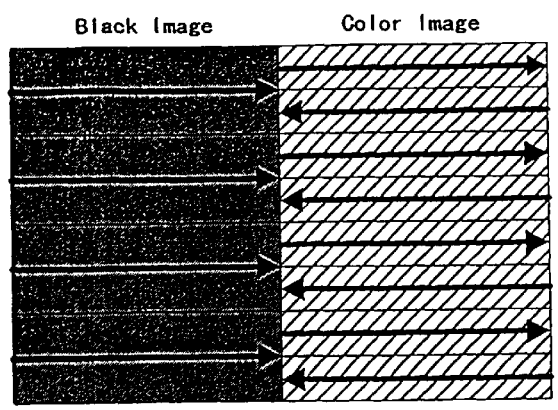
FIG. 27B is a representative view for describing carriage direction control for scan lines which include both non-color continuous and color images.

FIG. 27B is a representative view for describing carriage direction control for scan lines which include both non-color continuous and color image portions. As shown in FIG. 27B, non-color continuous portions preferably are printed unidirectionally, and color portions preferably are printed bi-directionally. By printing the continuous portions unidirectionally, noticeable image distortion caused by carriage motor speed non-uniformities is reduced.

If a print head such as print head 62 shown in FIG. 7 is used, then 23 color nozzles are used for each pass of the print head for color portions, while 46 black nozzles are used for each pass of the print head for non-color portions. As a result, less passes are needed for the non-color portions, thereby compensating for the loss in speed that results from printing the non-color portions unidirectionally.

FIGS. 27C to 27G provide a series of print mode tables containing printing schemes for printing an image using different combinations of print mode, recording media type, print head configuration, and error diffusion mode. More specifically, FIG. 27C shows a Print Mode With High Speed Error Diffusion table, which contains multiple printing schemes for use by printer 10 when printing an image with print heads 100a and 100b. FIG. 27C contains six Factors for each particular printing scheme provided; they are: (1) Raster Resolution of the image to be printed; (2) Print Resolution of the image to be printed; (3) number of Passes and Direction for print heads 100a and 100b to scan over each scan line; (4) automatic sheet feed ("ASF") speed; (5) line feed ("LF") speed; and (6) cartridge receptacle ("CR") speed.

These six Factors vary from one printing scheme to the next depending on the print mode for image resolution, which can be Draft mode, Standard mode or High mode. The six Factors also very depending on the mode of image quality which can be Regular mode or a Photo quality mode, and depending on the type of recording medium being used which can be Plain, Special 1 or Special 2. The Speed Identifications table shown in FIG. 27D defines the speed in pulses per second for each particular mode of automatic sheet feed ("ASF") speed, line feed ("LF") speed, and cartridge receptacle ("CR") speed. The Recording Media Types table shown in FIG. 27E provides the types of recording media that fall into the categories of Plain, Special 1 and Special 2. For example, the Plain category includes plain paper, bubble jet paper, brochure paper, and greeting cards. The Special 1 category includes high resolution paper ("HR-101"), and Special 2 category includes all other recording media types.

Returning to the Print Mode With High Speed Error Diffusion table shown in FIG. 27C, the various combinations of print modes and recording media types result in eighteen separate printing schemes for printing with alignment. For example, when a print job with alignment is requested that requires use of the Standard print mode and the Regular image quality mode and the use of high resolution paper in the Special 1 category, a printing scheme is defined for the six Factors as follows: (1) Raster Resolution is 360 by 360 dpi; (2) Print Resolution is 720 by 720 dpi; (3) two Passes are required for print heads 100a and 100b to scan over each scan line and scanning is to take place in both directions; (4) ASF speed is set to normal; (5) LF speed is set to normal; and (6) cartridge receptacle CR speed is set to slow. Some of the printing schemes in FIG. 27C are not applicable by definition, such as an attempt to print a Photo quality image in Draft mode, or use of Special recording media in Draft mode.

Certain printing schemes require the use of a sub-printing scheme ("1pass_U/B*1") shown in FIG. 27F, in which only one scan pass is utilized for printing each scan and in which the scan direction and nozzle pattern to be utilized is determined by the type of print heads 100a and 100b installed in printer 10 and by the type of image to be printed on the current scan line. As discussed earlier, the type of print heads 100a and 100b installed in printer 10 can include any two print heads of from a selection of color ink print heads ("BC-21e") and/or black ink print heads ("BC-23"). The type of image to be printed on a scan line can be either Isolated Black which is used during printing of lines of text, Continuous Black which is used during a continuous section of black image such as a graphic, and In Color which is used during color printing.

For example, the printing scheme for a print request in Standard resolution mode and Regular image quality mode using Plain paper refers to the 1pass_U/B*1 sub-printing scheme. If printer 10 contains one color ink print head and one black print head for print heads 100a and 100b, and if the image to be printed on the current scan line is a continuous black graphic, then only one scan is required by print heads 100a and 100b to print the scan line. In addition, the color nozzles of the color ink print head are not utilized at all, 63 nozzles of black ink from the color ink print head are utilized for printing in only one direction, and 127 nozzles of the black ink print head are utilized for printing in only the forward direction (unidirectional scanning can occur in the forward or backward direction). Thus, the number of scan passes, printing direction, and nozzle selection is selected as part of the printing scheme in order to provide reliable printing of a quality image based upon the types of print heads 100a and 100b installed in printer 10, the type of image being printed on the current scan line, and upon the print modes and recording media type requested for the current print job.

The present invention is particularly reflected in the table shown in FIG. 27F. Specifically, Isolated Black is printed bi-directionally, Continuous Black is printed unidirectionally (with a BC-21e and BC-23 print head combination), and Color is printed bi-directionally.

Print Mode With Normal Error Diffusion table is shown in FIG. 27G. This table also provides six Factors for each particular printing scheme; they are: (1) Raster Resolution of the image to be printed; (2) Print Resolution of the image to be printed; (3) number of Passes and Direction for one of print heads 100a and 100b to scan over each scan line; (4) automatic sheet feed ("ASF") speed; (5) line feed ("LF") speed; and (6) cartridge receptacle ("CR") speed.

These six Factors vary from one printing scheme to the next depending on the print mode for image resolution, which can be Draft mode, Standard mode or High mode. The six Factors also very depending on the mode of image quality which can be Regular mode or a Photo quality mode, and depending on the type of recording medium being used which can be Plain, Special 1 or Special 2. The printing schemes for printing without alignment are therefore determined by the various combinations of print modes and recording media types.

Figure 28:
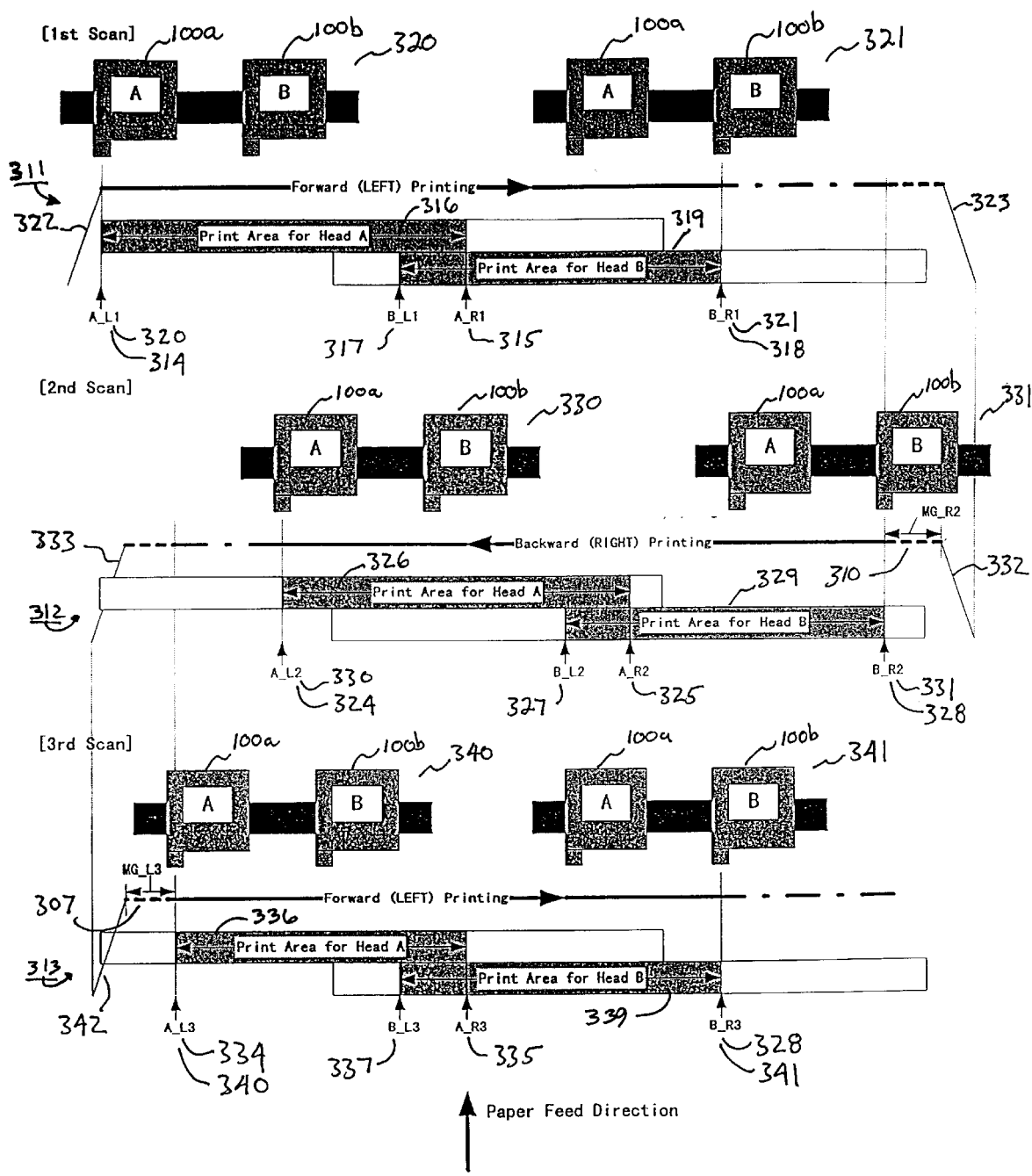
FIG. 28 is a representative view for explaining movement of print heads according to the invention.

FIG. 28 is a representative view for explaining movement of print heads according to the invention for a print operation. Shown in FIG. 28 are carriage positions and scan margins for three scan lines 311, 312 and 313. For explanation purposes hereinbelow, scan line 311 is defined as a previous scan line, scan line 312 is defined as a current scan line, and scan line 313 is defined as a next scan line.

Shown for previous scan line 311 are LeftPos[A] (A_L1) 314 and RightPos[A] (A_R1) 315 for print area 316 of print head 100a, LeftPos[B] (B_L1) 317 and RightPos[B] (B_R1) 318 for print area 319 of print head 100b, RangeLeft 320 and RangeRight 321 for the combined print area, RampUp 322, and RampDown 323. Shown for current scan line 312 are LeftPos[A] (A_L2) 324 and RightPos[A] (A_R2) 325 for print area 326 of print head 100a, LeftPos[B] (B_L2) 327 and RightPos[B] (B_R2) 328 for print area 329 of print head 100b, RangeLeft 330 and RangeRight 331 for the combined print area, RampUp 332, and RampDown 333. Shown for next scan line 313 are LeftPos[A] (A_L3) 334 and RightPos[A] (A_R3) 335 for print area 336 of print head 100a, LeftPos[B] (B_L3) 337 and RightPos[B] (B_R3) 338 for print area 339 of print head 100b, RangeLeft 340 and RangeRight 341 for the combined print area, and RampUp 342.

The position values shown in FIG. 28 run from left to right. Thus, a lower-valued position is to the left of a higher-valued position.

The ramp ups and ramp downs are distances travelled by print heads 100a and 100b while carriage motor 39 accelerates to or decelerates from scanning speed. These distances preferably are represented by a constant value such as 25 steps of carriage motor 39, or 16 millimeters.

The print operation illustrated in FIG. 28 is representative of bi-directional printing with scan margins. In more detail, after print heads 100a and 100b complete printing previous scan line 311, the print heads are at RangeRight 321. The print heads are then moved from RangeRight 321 to a right of RangeRight 331 for current scan line 312 by a distance equal to scan margin 310 plus RampUp 332, so as to be ready to begin printing current scan line 312. After printing current scan line 312, the print heads are at RangeLeft 330. The print heads are then moved from RangeLeft 330 to a left of RangeLeft 340 for next scan line 313 by a distance equal to scan margin 307 plus RampUp 342, so as to be ready to begin printing next scan line 313.

If printing in FIG. 28 were unidirectional, print heads 100a and 100b would move from RangeRight 321 at the end of printing previous scan line 311 to the left of RangeLeft 330 for current scan line 312 by scan margin 307 plus RampUp 332 (which would be on the left of the Figure).

The operation of printer driver 84 and printer control 110 (i.e., printer firmware) in moving print heads 100a and 100b is described next.

5.1.1 Printer Driver Initiated Operation

Figure 29:
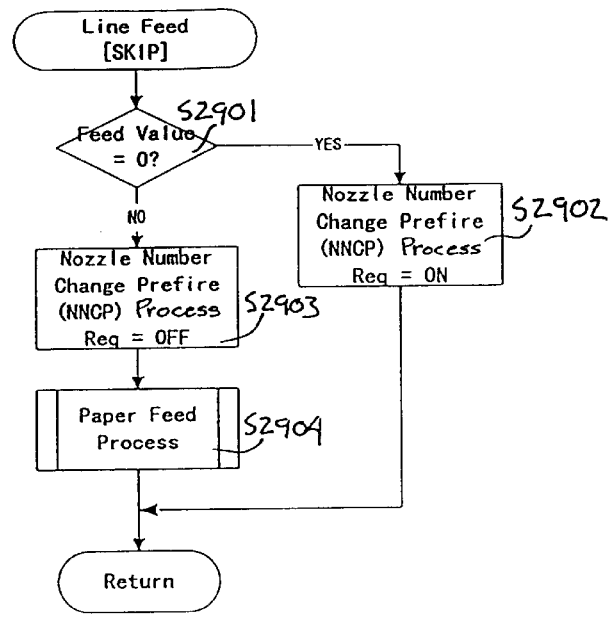
FIG. 29 is a flowchart for describing a SKIP command issued by a printer driver according to the invention.

FIG. 29 is a flowchart for describing a SKIP command issued by a printer driver according to the invention. This function is called from step S2008 in FIG. 20 and is used to feed a recording medium so as to advance a vertical print position by a number of raster lines specified by a Skip parameter. A SKIP command with an argument of zero is used to instruct printer 10 to perform a nozzle-number-change prefire operation, as described below in Section 8.0. In order to advance from one isolated scan line to another isolated scan line, for example across whitespaces 305 in FIG. 27A, the Skip argument corresponds to a distance greater than a height of print heads 100a or 100b.

In more detail, step S2901 determines if the Skip argument indicates a feed of zero lines. If the Skip argument is zero, flow proceeds to step S2902, where a nozzle-number-change-prefire request is sent to printer control 110, as described in more detail below in Section 9.0. Otherwise, any pending nozzle-number-prefire request is resent in step S2903, and the recording medium is feed by Skip raster lines in step S2904.

Figure 30:
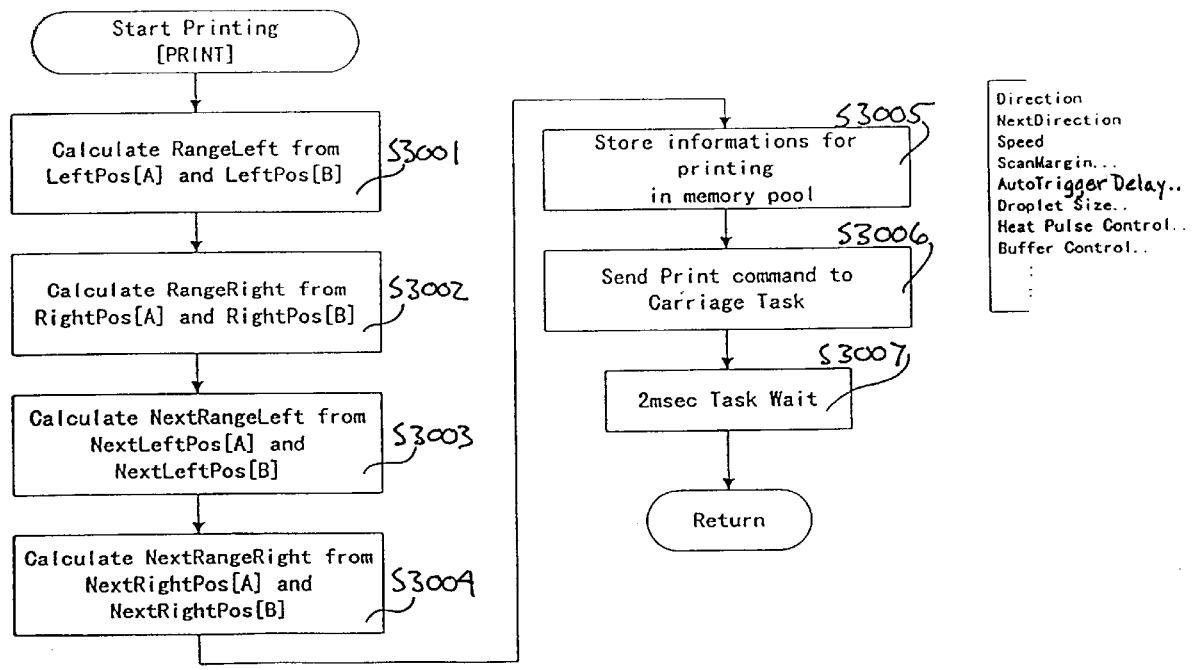
FIG. 30 is a flowchart for describing a PRINT command issued by a printer driver according to the invention.

After an appropriate SKIP operation, a PRINT command is issued by printer driver 84 (See FIG. 20). FIG. 30 is a flowchart for describing the PRINT command according to the invention.

In step S3001, RangeLeft 330 for current scan line 312 is determined from LeftPos[A] 324 and LeftPos[B] 327, by setting RangeLeft 330 equal to the lesser of LeftPos[A] 324 and LeftPos[B] 327. Likewise, in step S3002, RangeRight 331 for current scan line 312 is determined from RightPos[A] 325 and RightPos[B] 328, by setting RangeRight 331 equal to the greater of RightPos[A] 325 and RightPos[B] 328.

In step S3003, RangeLeft 340 for next scan line 313 is determined from LeftPos[A] 334 and LeftPos[B] 337, by setting RangeLeft 340 equal to the lesser of LeftPos[A] 334 and LeftPos[B] 337. Likewise, in step S3004, RangeRight 341 for next scan line 313 is determined from RightPos[A] 335 and the RightPos[B] 338, by setting RangeRight 341 equal to the greater of RightPos[A] 335 and RightPos[B] 338.

The LeftPos and RightPos values used in steps S3001 through S3004 are defined through the EDGE command, explained in more detail below with reference to FIG. 32.

In step S3005, print information such as print direction, speed, scan margin, automatic trigger delay, and the like are stored for performance of a print operation. Setting of print direction is described below with reference to FIG. 31, of scan margin with reference to FIGS. 33 and 34, and of automatic trigger delay with reference to FIG. 35.

Figure 36:
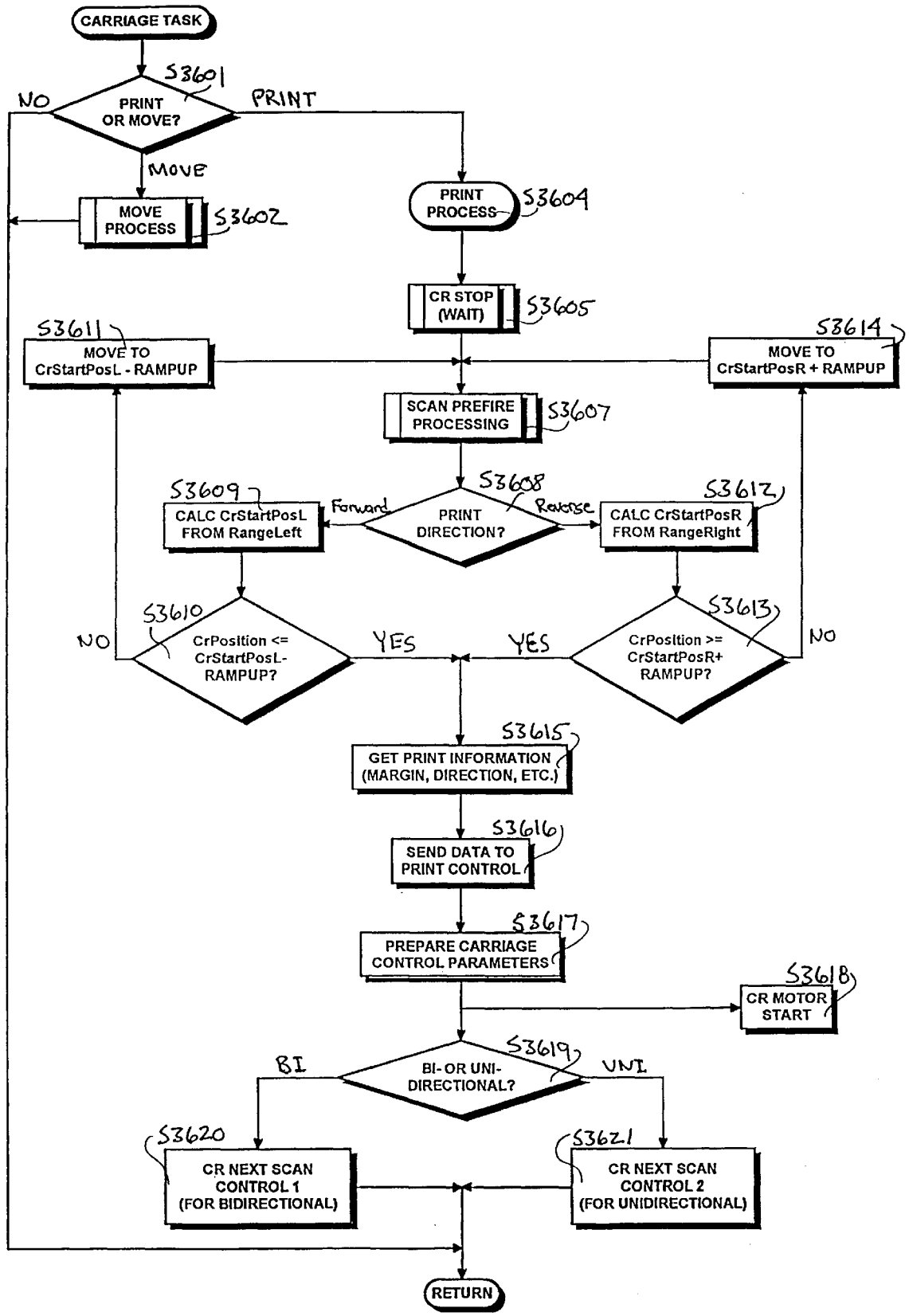
FIG. 36 is a flowchart for describing a carriage task performed by a printer control according to the invention.
Figure 37:
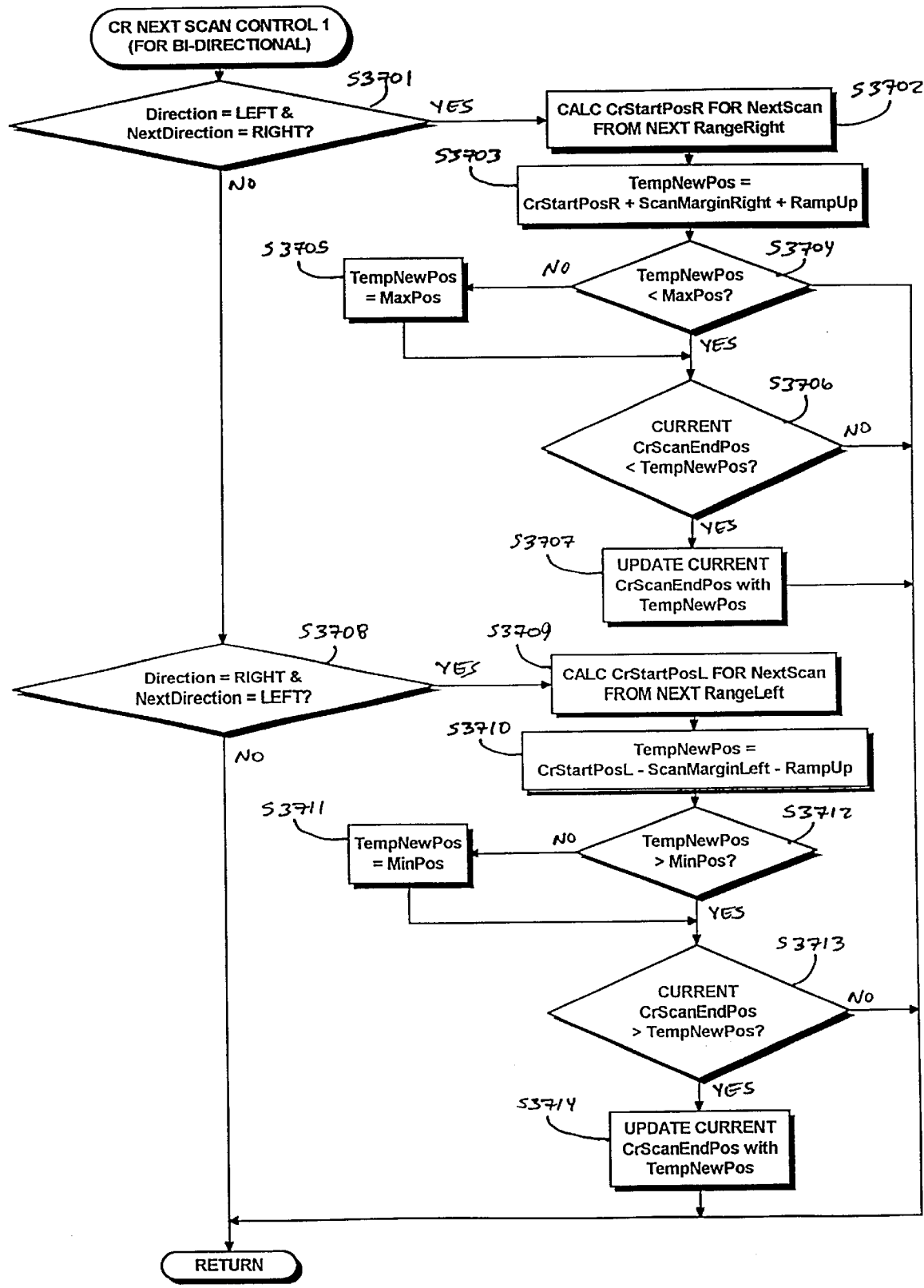
FIG. 37 is a flowchart for describing a first carriage scan control called by the carriage task of FIG. 36.
Figure 38:
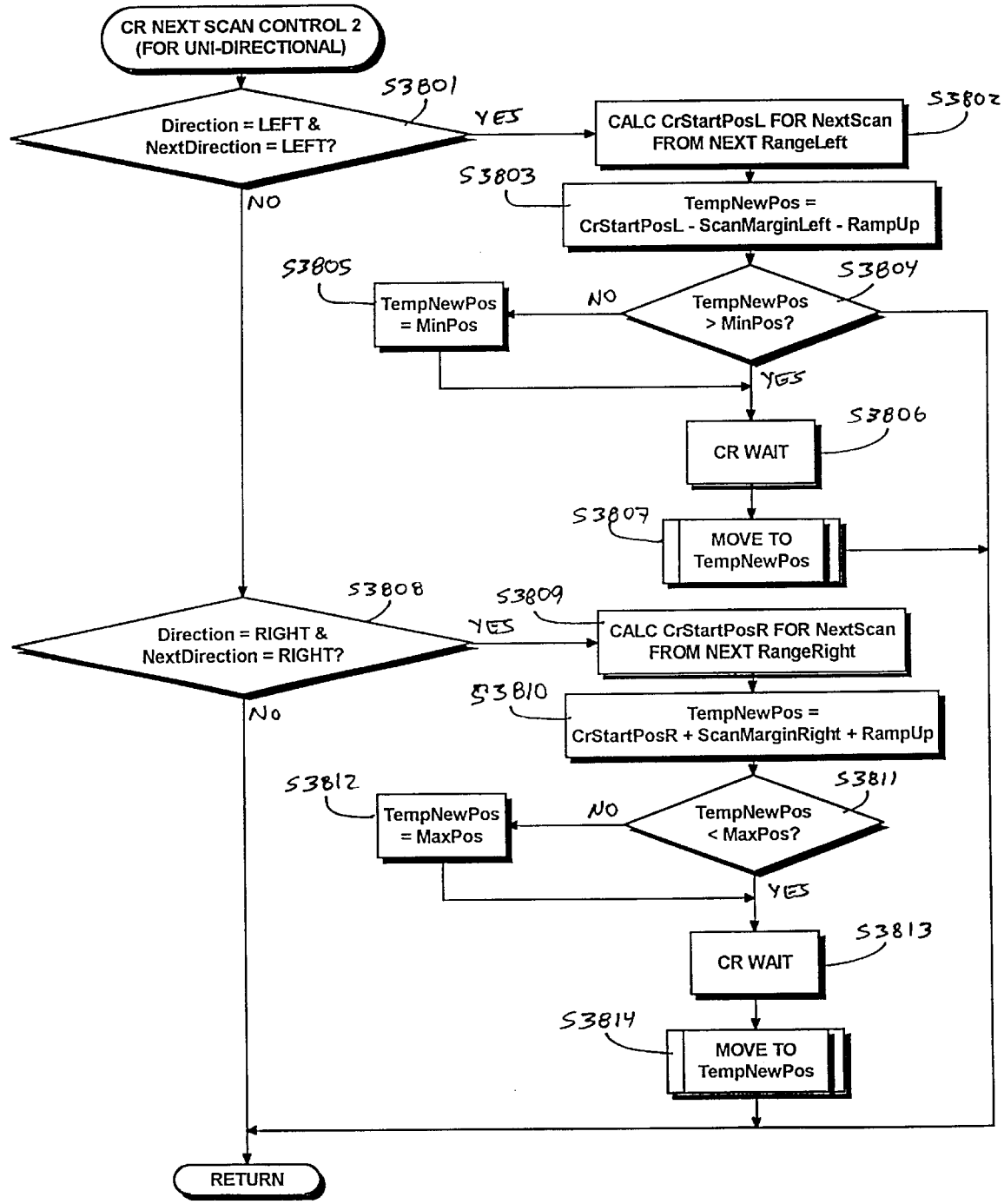
FIG. 38 is a flowchart for describing a second carriage scan control called by the carriage task of FIG. 36.

In step S3006, printer driver 84 instructs printer control 110 to initiate the carriage task, which is shown in more detail in FIGS. 36 to 38. The carriage task is responsible for positioning and scanning the print heads across a recording medium, during which time ink is ejected from the print heads. After the carriage task is initiated, step S3007 provides a two millisecond wait to allow printer control 110 to perform any necessary processing and communication with printer driver 84.

Then, flow returns to FIG. 20.

Figure 31:
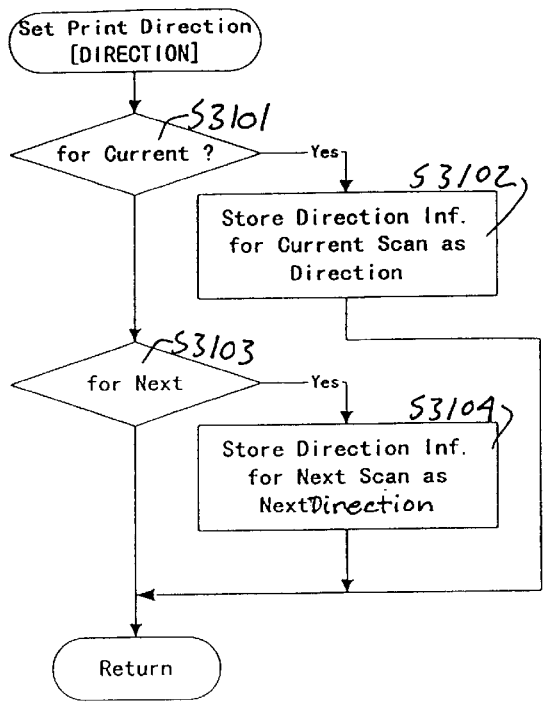
FIG. 31 is a flowchart for describing a DIRECTION command issued by a printer driver according to the invention.

FIG. 31 is a flowchart for describing a DIRECTION command issued by a printer driver according to the invention. In steps S3101, it is determined if the DIRECTION command is being called for current scan 312, in which case direction information for the current scan is set as Direction. Otherwise, in step S3103, it is determined if the DIRECTION command is being called for next scan 313, in which case direction information for the next scan is set as Next-Direction.

Direction and NextDirection can store values for forward and reverse scanning. In order to determine values for Direction and NextDirection, printer driver 84 first determines if unidirectional or bi-directional printing is being performed. Unidirectional or bi-directional printing is determined based on print mode, recording media type, image type, print head configuration, and alignment status for the print heads, as discussed in section 6.0. Briefly, for standard-quality print mode with plain paper, unidirectional printing is used for continuous image types, and bi-directional printing is used for text and color image types, as explained above with reference to FIG. 27A.

If unidirectional printing is under way, Direction and NextDirection are set to forward printing. If bi-directional printing is under way, Direction and NextDirection are set opposite to their values for previous scan 311.

Figure 32:
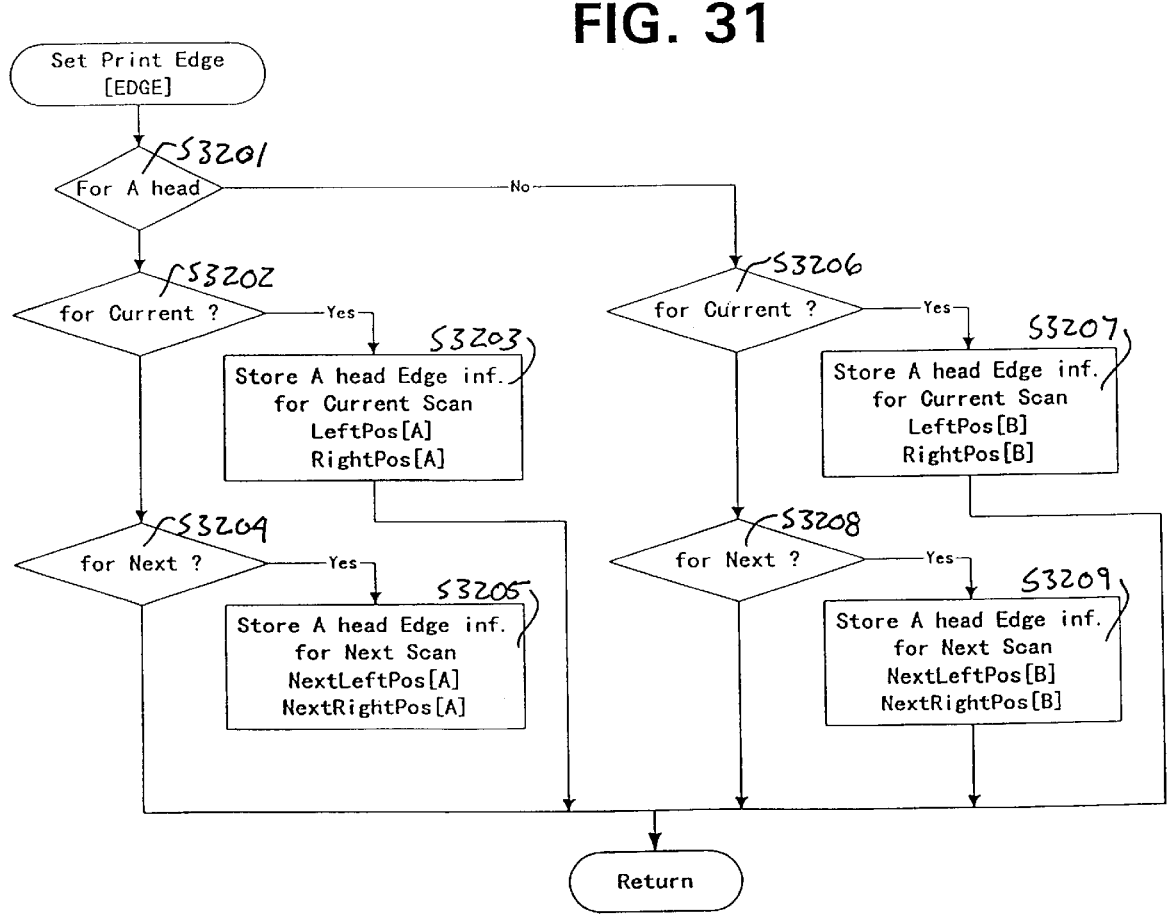
FIG. 32 is a flowchart for describing an EDGE command issued by a printer driver according to the invention.

FIG. 32 is a flowchart for describing an EDGE command issued by a printer driver according to the invention. The Edge command specifies the left edge and the right edge of print position in units of column position, for both the current and the next scan line. Printer driver 84 preferably calculates these values based on input print data.

In step S3201, it is determined if EDGE is being called for print head 100a (print head A) or print head 100b (print head B). If EDGE is called for print head A, flow proceeds to step S3202, where it is determined if EDGE is being called for current scan line 312, in which case step S3203 sets LeftPos [A] 324 and RightPos[A] 325 for current scan line 312. Otherwise, it is determined in step S3204 that EDGE is being called for next scan line 313.

In that case, step S3205 sets LeftPos[A] 334 and RightPos [A] 335 for next scan line 313.

If EDGE is called for print head B, similar processing in steps S3206 through S3209 sets LeftPos[B] 327 and RightPos[B] 328 for current scan line 312 and sets LeftPos [B] 337 and RightPos[B] 338 for next scan line 313. The LeftPos and RightPos values are used by printer control 110 to control movement of print heads 100a and 100b, as described in more detail below in Section 5.1.2.

Figure 33:
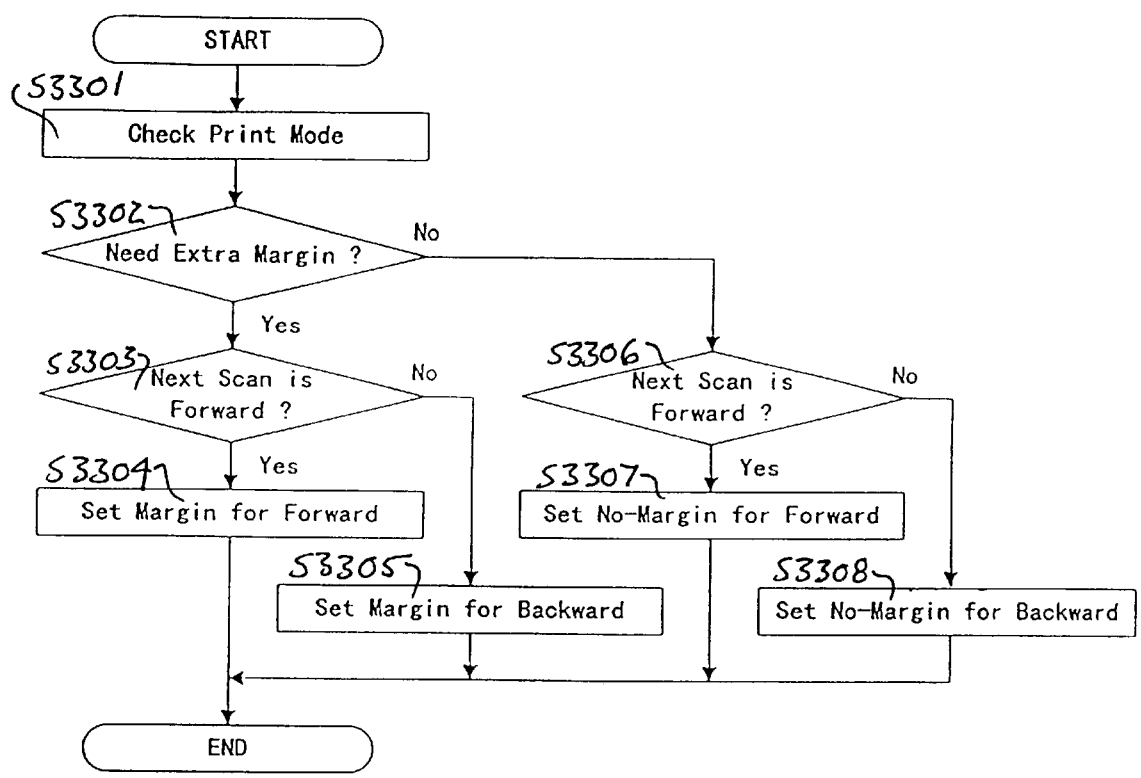
FIG. 33 is a flowchart for describing determination of a scan margin by a printer driver according to the invention.

FIG. 33 is a flowchart for describing determination of a scan margin by a printer driver according to the invention. In step S3301, a print mode is checked. In step S3302, it is determined that a scan margin is needed if the print mode is continuous or color. If Direction from FIG. 31 for current scan 312 is forward, step S3303 directs flow to step S3304, where scan margin 307 for a forward scan is set. If Direction is reverse, step S3303 directs flow to step S3305, where scan margin 310 for a reverse scan is set.

If it is determined in step S3302 that no scan margin is needed, which occurs for isolated scan line printing, flow proceeds from step S3302 to step S3306. If Direction from FIG. 31 for current scan 312 is forward, step S3306 directs flow to step S3307, where a scan margin of zero (no-margin) is set for the forward scan. If Direction is reverse, step S3306 directs flow to step S3308, where a scan margin of zero (no-margin) is set for the reverse scan.

Figure 34:
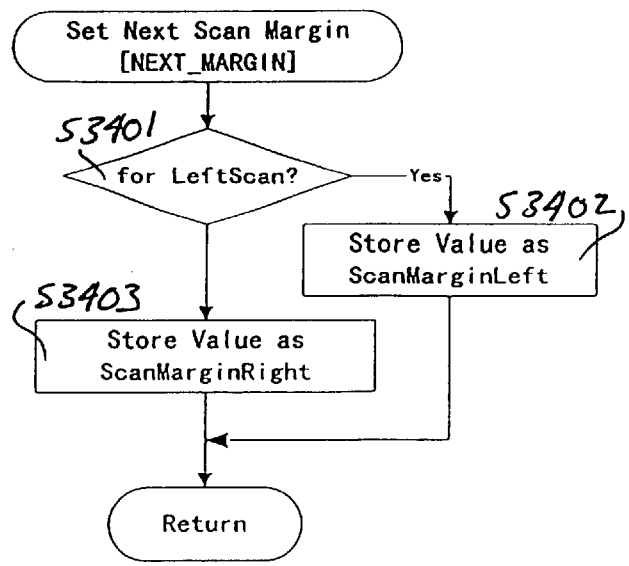
FIG. 34 is a flowchart for describing a NEXT_MARGIN command issued by a printer driver according to the invention.

FIG. 34 is a flowchart for describing a NEXT_MARGIN command issued by a printer driver according to the invention. The NEXT_MARGIN command stores a value for a next scan margin in an appropriate one of ScanMarginLeft or ScanMarginRight. ScanMarginLeft is used if the next scan margin inserted into a scan line is a left scan margin for a forward scan, and ScanMarginRight is used if the next scan margin is a right scan margin for a reverse scan. Step S3401 determines if next scan line 313 is forward or reverse, and steps S3402 and S3403 store a margin value in ScanMarginLeft or ScanMarginRight, accordingly.

Figure 35:
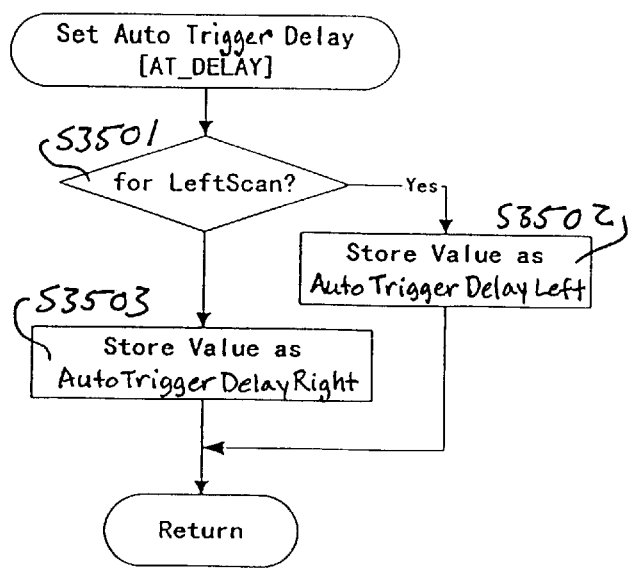
FIG. 35 is a flowchart for describing an AT_DELAY (automatic delay) command issued by a printer driver according to the invention.

FIG. 35 is a flowchart for describing an AT_DELAY (automatic delay) command issued by a printer driver according to the invention. The automatic delay is used to alleviate satelliting that can occur when printing in a reverse direction, as explained below with respect to FIGS. 39a, 39b, and 40 to 42. This command sets the auto-trigger delay by specifying the scan direction as either forward or backward, and by specifying an auto-trigger delay time in units of 10 $\mu$sec up to a maximum auto-trigger delay time of 2,550 $\mu$sec. Step S3501 determines if a next scan margin is for a forward or a reverse scan, and the value for the automatic delay is stored in AutoTriggerDelayLeft or AutoTriggerDelayRight, respectively, in steps S3502 and S3503.

5.1.2 Print Control Operation

FIG. 36 is a flowchart for describing carriage task 244 performed by a printer control according to the invention. Communication between carriage task 244 and other tasks in printer 10 is explained above with reference to FIG. 18. In printer 10, carriage task 244 controls scanning of print heads 100a and 100b across carriage 41 as printing occurs in printer 10.

In step S3601, carriage task 244 determines if printer driver 84 has sent a move or a print command to printer 10. If no move or print command has been sent, flow returns to engine control task 241 in FIG. 18. If a move command is received, carriage task 244 in step S3602 executes a move process according to the arguments of the move command, and control again returns to engine control task 241 in FIG. 18. If a print command is received, flow proceeds to step S3604 for a print process, which starts with step S3605.

In step S3605, carriage task 244 waits until movement of print heads 100a and 100b ceases at then end of a scan line. Flow then proceeds to step S3607 for scan prefire processing, as explained in detail below in Section 9.0

After scan prefire processing, flow proceeds to step S3608, where a scan direction for current scan 312 is determined by examining Direction set by print driver 84 through the DIRECTION command shown in FIG. 31. If the scan direction is forward, flow proceeds to step S3609; if the scan direction is reverse, flow proceeds to step S3612.

If the scan direction is forward, CrStartPosL is calculated in step S3609 from RangeLeft 330 for current scan 312.

CrStartPosL is a start position for the print heads for a next forward scan across a recording medium. In step S3610, carriage task 244 determines if the current position of the print heads, CrPosition, is less than or equal to CrStartPosL minus Rampup, a ramp up distance for carriage motor 39. If CrPosition is not less than or equal to CrStartPosL minus RampUp, then the print heads are to the right of CrStartPosL minus RampUp. Accordingly, carriage task 244 in step S3611 moves the print heads left to CrStartPosL minus RampUp. Furthermore, because the print heads are moving to a start of the scan line, flow returns to step S3607 so as to perform any needed prefire processing before the scan line is started. Steps S3607 through S3611 are repeated until CrPosition is less than or equal to CrStartPosL minus RampUp, at which point the print heads are at the start of the forward scan line. Flow then proceeds to step S3615.

If the print direction is reverse, CrStartPosR is calculated in step S3612 from RangeRight 331 for current scan 312. CrStartPosR is a start position for the print heads for a next reverse scan across a recording medium. In step S3613, carriage task 244 determines if the current position of the print heads, CrPosition, is greater than or equal to CrStartPosR plus RampUp, a ramp up distance for carriage motor 39. If CrPosition is not greater than or equal to CrStartPosR plus RampUp, then the print heads are to the left of CrStartPosR plus RampUp. Accordingly, carriage task 244 in step S3614 moves the print heads right to CrStartPosR plus RampUp. Furthermore, because the print heads are moving to a start of a scan line, flow returns to step S3607 so as to perform any needed prefire processing before the scan line is started. Steps S3607, S3608 and S3612 through S3614 are repeated until CrPosition is greater than or equal to CrStartPosR plus RampUp, at which point the print heads are at the start of the reverse scan line. Flow then proceeds to step S3615.

In step S3615, print information is retrieved. This print information was stored by printer control 110 in response to a PRINT command from printer driver 84, as shown in FIG. 30. Relevant parts of the print information, such as automatic trigger delay, droplet size, heat pulse control and buffer control, are sent in step S3616 to other tasks running on printer control 110, such as heat control handler 254.

In step S3617, carriage control parameters are prepared. This control parameters are used to control carriage motor driver 39a, which in turn controls carriage motor 39. Examples of the control parameters include control method (half/full/quarter), RampUp Table, RampDown Table, RampUpSteps, ConstantSteps, RampDownSteps, CrHeatStartPosition, CrHeatEndCount, CrScanEndPosition, CrStopPosition, etc.

The carriage motor is started in step S3618, and an automatic triggering mechanism controlled by printer control 110 causes print heads 100a and 100b to eject ink as the print heads are scanned across a recording medium by carriage motor 29. This triggering mechanism is explained in more detail below with respect to FIGS. 40 through 42.

After the carriage motor is started, step S3619 determines if bidirectional or unidirectional printing is being used. For standard mode printing, the type of printing is determined based on print mode (e.g., isolated, continuous, or color). As discussed above with respect to FIGS. 27C to 27G, the type of printing also can depend on recording media type, print head configuration, error diffusion mode, and the like. If bi-directional printing is being used, flow proceeds to step S3620 for carriage scan control 1 illustrated in FIG. 37. If unidirectional printing is being used, flow proceeds to step S3621 for carriage scan control 2 illustrated in FIG. 38.

FIG. 37 is a flowchart for describing a first carriage scan control called by carriage task 244 of FIG. 36 for bi-directional printing.

Carriage task 244 in step S3701 determines if Direction for the current scan is forward (left) and NextDirection for the next scan is reverse (right), in which case steps S3702 through S3707 are performed. Otherwise, carriage task 244 in step S3708 determines if Direction for the current scan is reverse (right) and NextDirection for the next scan is forward (left), in which case steps S3709 through S3714 are performed.

For a forward current scan line, CrStartPosR for next scan 313 is calculated in step S3702 from RangeRight 341 for next scan 313. Then, in step S3703, TempNewPos is calculated from CrStartPosR plus ScanMarginRight plus RampUp. ScanMarginRight preferably is part of the information calculated by printer control 110 in response to a NEXT_MARGIN command (see FIG. 34). If a margin is to be inserted before the reverse next scan, ScanMarginRight contains the size of the margin. If a margin is not to be inserted, ScanMarginRight contains no-margin (zero).

Carriage task 244 in step S3704 determines if TempNewPos is less than MaxPos, the right-most position possible for print heads 100a and 100b. If TempNewPos is not less than MaxPos, then TempNewPos is an invalid position to the right of MaxPos. Accordingly, TempNewPos is set equal to MaxPos in step S3705. After steps S3704 and S3705, TempNewPos is equal to the start of the next (reverse) scan line, accounting for scan margin and motor ramp up.

It is determined in step S3706 if CrScanEndPos is less than TempNewPos. CrScanEndPos is the position for print heads 100a and 100b after printing the current (forward) scan line. Thus, if CrScanEndPos is less than TempNewPos, the current forward scan line ends before the next reverse scan line begins. In that case, step S3707 updates CrScanEndPos with TempNewPos, thereby extending the current scan line to the start of the next scan line.

For a reverse current scan line, CrStartPosL for next scan 313 is calculated in step S3709 from RangeLeft 340 for next scan 313. Then, in step S3710, TempNewPos is calculated from CrStartPosL minus ScanMarginLeft minus RampUp. ScanMarginLeft preferably is part of the information calculated by printer control 110 in response to a NEXT_MARGIN command (see FIG. 34). If a margin is to be inserted before the forward next scan, ScanMarginLeft contains the size of the margin. If a margin is not to be inserted, ScanMarginLeft contains no-margin (zero).

Carriage task 244 in step S3711 determines if TempNewPos is greater than MinPos, the left-most position possible for print heads 100a and 100b. If TempNewPos is not greater than MinPos, then TempNewPos an invalid position to the left of MinPos. Accordingly, TempNewPos is set equal to MinPos in step S3712. After steps S3711 and S3712, TempNewPos is equal to the start of the next (forward) scan line, accounting for scan margin and motor ramp up.

It is determined in step S3713 if CrScanEndPos is greater than TempNewPos. CrScanEndPos is the position for print heads 100a and 100b after printing the current (reverse) scan line. Thus, if CrScanEndPos is greater than TempNewPos, the current reverse scan line ends before the next forward scan line begins. In that case, step S3714 updates CrScanEndPos with TempNewPos, thereby extending the current scan line to the start of the next scan line.

FIG. 38 is a flowchart for describing a second carriage scan control called by the carriage task of FIG. 36 for unidirectional printing.

Carriage task 244 in step S3801 determines if Direction for the current scan is forward (left) and NextDirection for the next scan is forward (left), in which case steps S3802 through S3807 are performed. Otherwise, carriage task 244 in step S3808 determines if Direction for the current scan is reverse (right) and NextDirection for the next scan is reverse (right), in which case steps S3809 through S3814 are performed.

For forward scanning, CrStartPosL for next scan 313 is calculated in step S3802 from RangeLeft 340 for next scan 313. Then, in step S3803, TempNewPos is calculated from CrStartPosL minus ScanMarginLeft minus RampUp. ScanMarginLeft preferably is calculated by printer control 110 in response to a NEXT_MARGIN command (see FIG. 34). If a margin is to be inserted before the next scan, ScanMarginLeft contains the size of the margin. If a margin is not to be inserted, ScanMarginLeft contains no-margin (zero).

Carriage task 244 in step S3804 determines if TempNewPos is greater then MinPos, the left-most position possible for print heads 100a and 100b. If TempNewPos is not greater than MinPos, then TempNewPos is an invalid position to the left of MinPos. Accordingly, TempNewPos is set equal to MinPos in step S3805. After steps S3804 and S3805, TempNewPos is equal to the start of the next (forward) scan line, accounting for scan margin and motor ramp up.

In step S3806, the carriage control waits until the current scan line is finished. Then, in step S3807, the carriage control moves print heads 100a and 100b to TempNewPos for the start of a next forward scan line. Control is then returned to FIG. 36.

For reverse scanning, CrStartPosR for next scan 313 is calculated in step S3809 from RangeRight 341 for next scan 313. Then, in step S3810, TempNewPos is calculated from CrStartPosR plus ScanMarginRight plus RampUp. ScanMarginRight preferably is calculated by printer control 110 in response to a NEXT_MARGIN command (see FIG. 34). If a margin is to be inserted before the forward next scan, ScanMarginRight contains the size of the margin. If a margin is not to be inserted, ScanMarginRight contains no-margin (zero).

Carriage task 244 in step S3811 determines if TempNewPos is less than MaxPos, the right-most position possible for print heads 100a and 100b. If TempNewPos is not less than MaxPos, then TempNewPos an invalid position to the right of MaxPos. Accordingly, TempNewPos is set equal to MaxPos in step S3812. After steps S3811 and S3812, TempNewPos is equal to the start of the next (reverse) scan line, accounting for scan margin and motor ramp up.

In step S3813, the carriage control waits until the current scan line is finished. Then, in step S3814, the carriage control moves print heads 100a and 100b to TempNewPos for the start of a next reverse scan line. Control is then returned to FIG. 36.

5.2 Automatic Ink Ejection and Satelliting Control

Figure 39A:
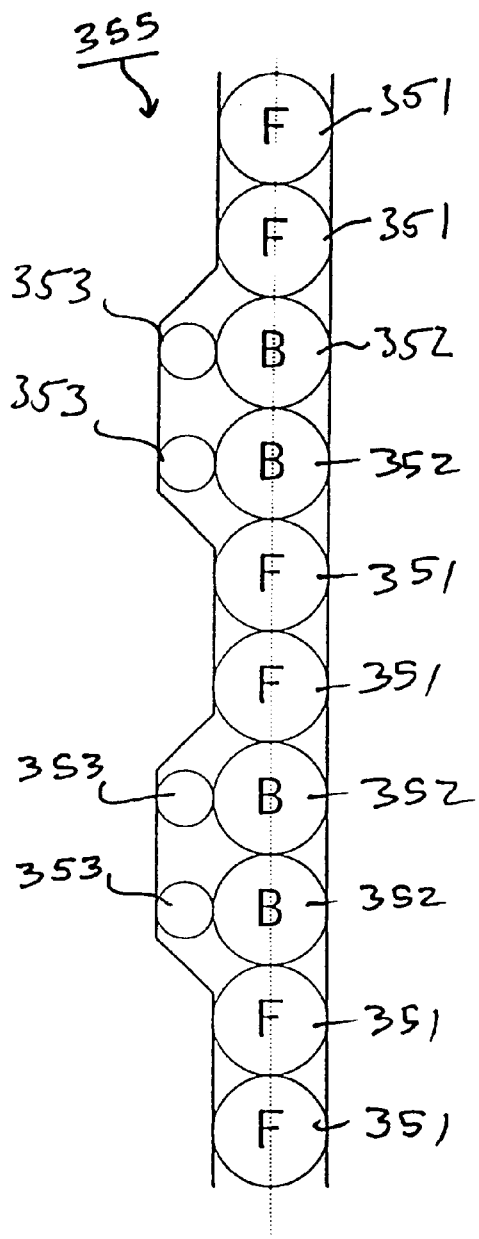
FIGS. 39a and 39b are representative views for describing satellite control according to the invention.
Figure 39B:
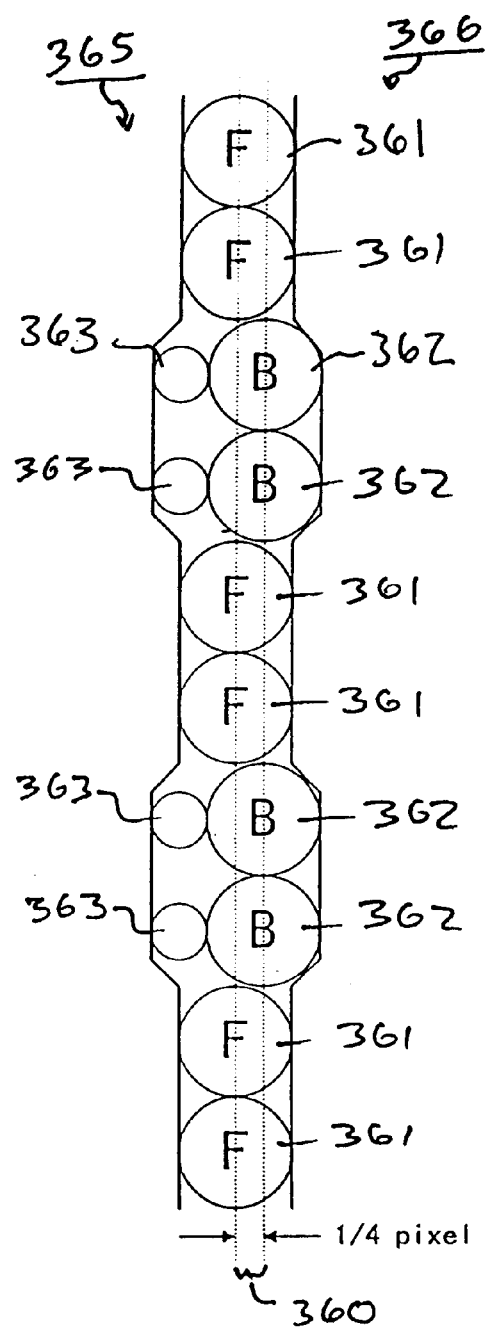

FIGS. 39a and 39b are representative views for describing satelliting control according to the invention. FIG. 39a illustrates image degradation that can occur due to satelliting, particularly with high-speed scanning of print heads across a recording medium as ink is ejected from those print heads. When a main droplet of ink is ejected from an ink jet print head so as to record a pixel, a small satellite droplet often is also ejected. Ink jet print heads typically are angled slightly with respect to a recording medium so that the satellite droplet overlaps the main droplet when the print head is scanned across a recording medium in a forward direction. However, in the reverse direction, this angling tends to cause the satellite droplet to land near an edge of or even outside of the main droplet, resulting in a small satellite being recorded next to each recorded pixel during a reverse scan.

Accordingly, FIG. 39a shows pixels 351 printed by ejecting ink during forward scans and pixels 352 printed by ejecting ink during reverse scans. Pixels 352 are accompanied by satellites 353, forming jagged side 355 for the column of pixels. Jagged left side 355 can noticeably degrade image quality, particularly in a case of continuous images (i.e., non-color graphics).

FIG. 39b shows pixels printed according to the invention so as to reduce image degradation due to satelliting.

Briefly, image degradation due to satelliting can be addressed for forward and reverse printing on a recording medium by reciprocal forward and reverse scans of a print head in accordance with print data. According to this invention, print data is printed in one direction of the reciprocal forward and reverse scans of the print head, and print data is printed in another direction of the reciprocal forward and reverse scans so that the printed data in the other direction is laterally shifted a predetermined distance as compared to printing where each pixel printed in the other direction vertically matches each pixel printed in the one direction. Preferably, the predetermined distance is a distance corresponding one fourth of a printed pixel. This lateral shift tends to mask satelliting effects, particularly in the case of printing continuous image data.

In FIG. 39b, pixels 362 printed during reverse scans have been offset by AT_DELAY 360, shown as a one fourth pixel delay, from pixels 361 printed during forward scans. As a result, any unevenness in the printed column of pixels is split between left side 365 and right side 366. The offset tends to mask the satellites, rendering them far less noticeable.

As mentioned above, satelliting is more noticeable in continuous image data. Accordingly, in the preferred embodiment of the invention, the foregoing pixel shifts are applied only to reverse scans for recording continuous images. The pixel shifts preferably are not applied to isolated (e.g., text) or color images.

Figure 40:
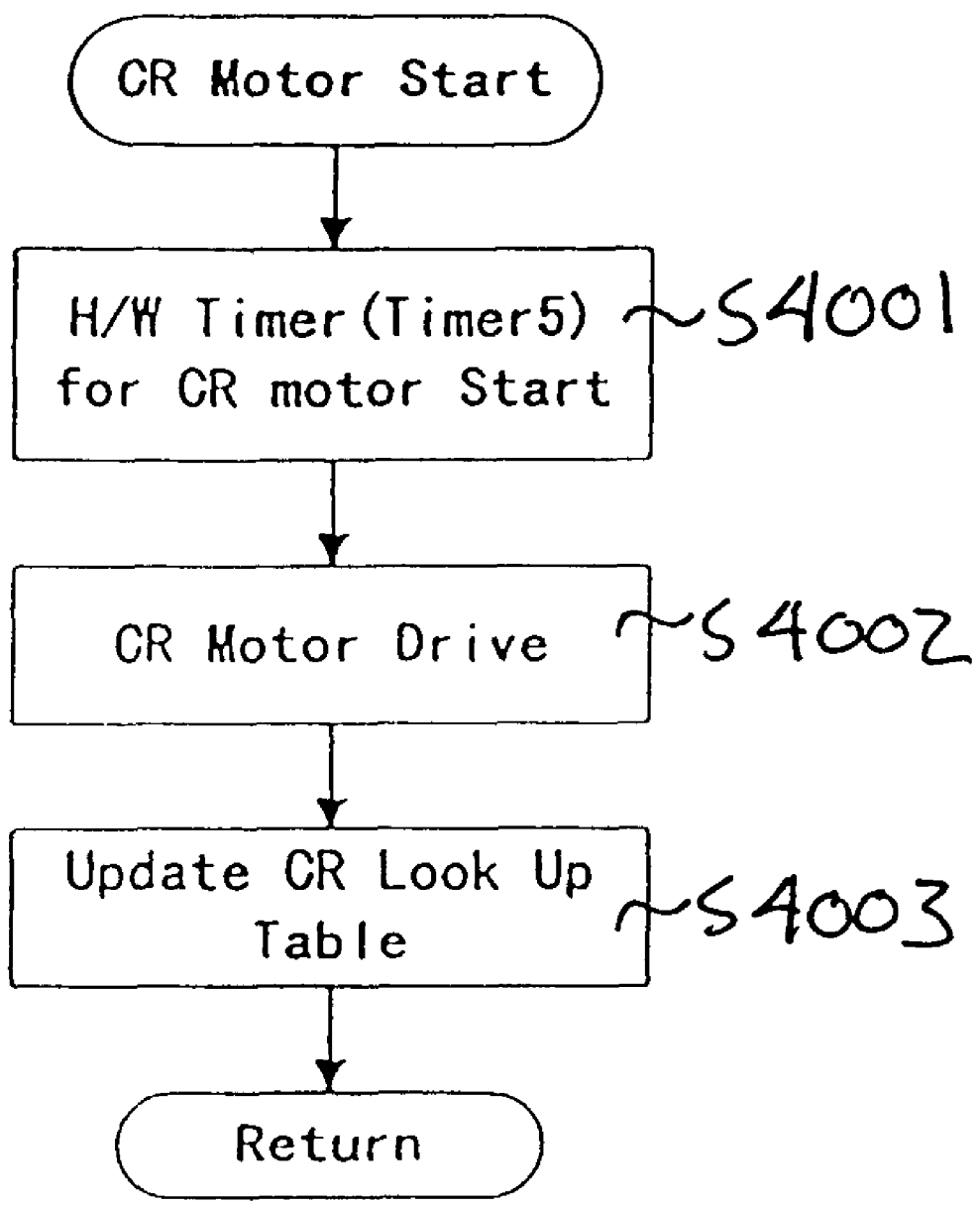
FIG. 40 is a flowchart for describing carriage motor start performed by a printer control according to the invention.
Figure 41:
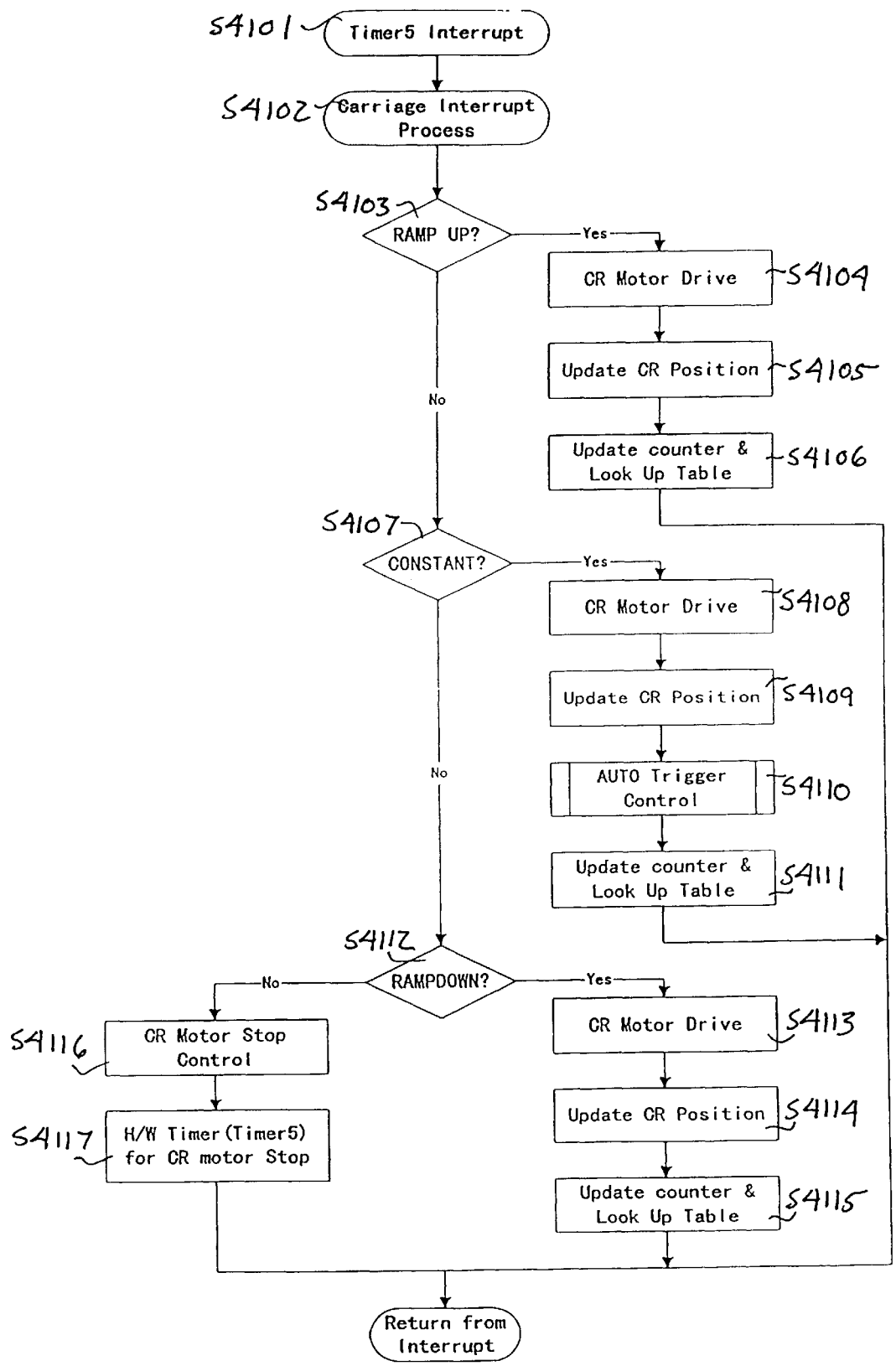
FIG. 41 is a flowchart for describing a carriage interrupt process performed by a printer control according to the invention.
Figure 42:
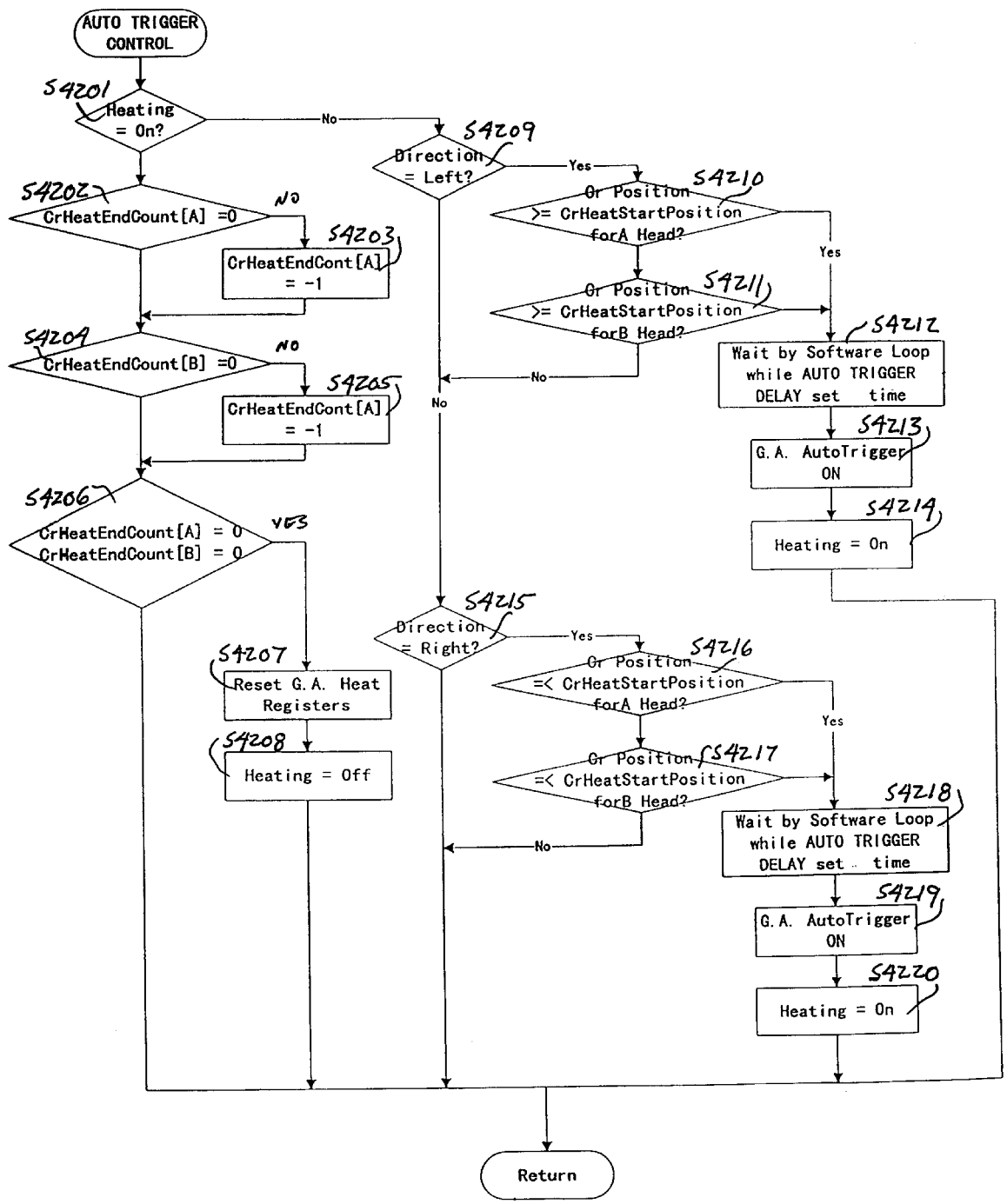
FIG. 42 is a flowchart for describing automatic trigger delay performed by a printer control so as to alleviate satelliting according to the invention.

FIGS. 40 through 42 explain automatic ink ejection while a print head is scanned across a recording medium, wherein the automatic ink ejection adds a delay to pixels printed in a reverse direction. Briefly, an AT_DELAY command from printer driver 84 sets an automatic trigger delay corresponding to one fourth of a pixel for reverse scan lines, and an automatic trigger delay of zero for forward scan lines.

FIG. 40 is a flowchart for describing carriage motor start performed by printer control according to the invention. CR MOTOR START is received from step S3618 of the carriage task operation illustrated in FIG. 36. In response, a hardware timer for the carriage motor interrupts is initiated in step S4001. This hardware timer is used to perform carriage motor control, as explained with reference to FIGS. 41 and 42 below. Carriage motor driver 39a is initiated in step S4002, and a look-up table is updated in step S4003. The look up table is used during carriage motor control, such as to define times and to set phase current mode for driving the carriage motor. Control then returns to FIG. 36.

FIG. 41 a flowchart for describing a carriage interrupt process performed by a printer control according to the invention. This process is initiated by step S4001 in FIG. 40. In step S4101, an interrupt occurs, activating carriage interrupt process S4102.

The interrupt process of FIG. 41 determines in step S4103 if motor 39 is ramping up. If motor 39 is ramping up, the motor is driven so as to reach its target speed in step S4104. CrPosition, the current position of print heads 100a and 100b, is updated in step S4105, and a counter and look up table for carriage motor control are updated in step S4106.

If motor 39 is not ramping up, step S4107 determines if the motor is operating in a constant-speed (i.e., printing)

region. If the motor is operating in a constant-speed region, steps S4108 and S4109 drive the motor and update CrPosition. Step S4110 then initiates automatic trigger control, as explained in more detail below with respect to FIG. 42, so as to eject ink from the print heads as the motor scans the print heads across a recording medium. Then, a counter and look up table for carriage motor control are updated in step S4111.

In step S4112, it is determined if motor 39 is ramping down, in which case flow proceeds to step S4113. The motor is driven is step S4113, CrPosition for the motor is updated in step S4114, and a counter and look up table for carriage motor control are updated in step S4115.

If motor 39 is not ramping down at step S4112, then motor 39 has stopped. Accordingly, motor control is stopped in S4116, and the hardware timer for motor interrupts is stopped.

FIG. 42 is a flowchart for describing automatic triggering of nozzles of print heads, including use of automatic trigger delay by printer control so as to mask satelliting according to the invention. The automatic triggering preferably is performed by printer control 110, and the automatic trigger delay preferably is supplied to printer control 110 from printer driver 84 through the AT_DELAY command described above with reference to FIG. 35. According to the invention, printer driver 84 sets the automatic trigger delay for forward scans to zero, and printer driver 84 sets the automatic trigger delay for reverse scans to a time for print heads 100a and 100b to traverse one fourth of a pixel.

Turning to FIG. 42, in step S4201, printer control 110 determines if heating for nozzles of a print head is on. If heating is on, printer control 110 automatically drives print head nozzles to eject ink while the print heads are scanned across a recording medium. Flow proceeds to step S4202, where it is determined if CrHeatEndCount[A] equals zero. If CrHeatEndCount[A] is not equal to zero, it is decremented in step S4203. Likewise, it is determined if CrHeadEndCount[B] equals zero in step S4204, and if CrHeatEndCount[B] is not equal to zero, it is decremented in step S4205.

In step S4206, it is determined if both CrHeatEndCount[A] and CrHeatEndCount[B] are equal to zero, in which case heat control registers in printer control 110 are reset and heating is turned off. When heating is off, ink is not ejected from the print heads.

Returning to step S4201, if heating is off when automatic trigger control is called from the carriage interrupt process, flow proceeds to step S4209. In step S4209, printer control 110 determines if the current scan line direction is forward (left), based on a DIRECTION command from printer driver 84. If the direction is forward, steps S4210 and S4211 determine if CrPosition, the current print head position, is greater than or equal to CrHeatStartPos for print head A or B, in which case flow proceeds to step S4212 through S4214.

In step S4212, a software loop introduces an automatic trigger delay into the automatic trigger control. The duration of the delay is set by printer driver 84 through the AT_DELAY command. However, because S4212 is reached only if the current scan direction is forward, the delay set by AT_DELAY according to the invention preferably is zero (no-margin). Therefore, flow proceeds immediately to steps S4213 and S4214, were AutoTrigger and heating are turned on so as to allow for automatic ejection of ink for print heads scanned across a recording medium.

Returning to step S4209, if the current scan direction is not forward, flow proceeds to step S4215, where it is determined if the current scan line direction is reverse (right). If the direction is reverse, steps S4216 and S4217 determine if CrPosition, the current print head position, is less than or equal to CrHeatStartPos for print head A or B, in which case flow proceeds to step S4218 through S4219.

In step S4218, a software loop introduces an automatic trigger delay into the automatic trigger control. The duration of the delay is set by printer driver 84 through the AT_DELAY command. In order to offset pixels printed in the reverse direction, printer driver 84 preferably sets the delay equal to a time require for print heads 100a and 100b to traverse one fourth of a pixel. After the delay, flow proceeds immediately to steps S4219 and S4220, where AutoTrigger and heating are turned on so as to allow for automatic ejection of ink for print heads scanned across a recording medium.

By virtue of the foregoing, a shift is introduced into pixels printed in the reverse direction, thereby tending to mask satellites that accompany those pixels.

6.0 Printer Control Based On Head Alignment

In brief, this section is a description of the present invention whereby a printing system is provided for a multiple print head printer in which it is determined whether the print heads are effectively aligned and in which one of multiple different printing schemes for controlling the printing of print data is then selected based upon the aforementioned alignment determination. Specifically, the present invention relates to a printer driver 84 that notifies the user if print heads 100a and 100b need to be aligned once a print job is requested by the user. If the user chooses to continue the print request without performing the alignment process, printer driver 84 directs printer 10 to print the requested image by using only one of print heads 100a and 100b, thereby reducing the adverse effects caused by misalignment of print heads 100a and 100b.

In a related aspect, when the user has chosen not to perform the alignment process after being prompted to do so by printer driver 84, printer driver 84 also directs printer 10 to print the requested image by laterally scanning print heads 100a and 100b in one direction only. In this manner, the image quality is improved when printing in a no-alignment mode because unidirectional, rather than bidirectional, scanning of print heads 100a and 100b results in a higher quality printed image when print heads 100a and 100b are not aligned.

As described above, printer 10 includes cartridge receptacles 37a and 37b which hold ink cartridges 43a and 43b having print heads 100a and 100b. Printer 10 prints an image on a recording medium by laterally scanning print heads 100a and 100b across the recording medium while directing print heads 100a and 100b to print image data. The manner in which printer driver 84 directs print heads 100a and 100b to scan the recording medium for printing the image depends upon several factors including the type of image being printed, the desired resolution, and the type of recording medium being used. For example, printer driver 84 may command printer 10 to print an image according to a printing scheme whereby print heads 100a and 100b are scanned across the same scan line of the recording medium several times in succession in order to improve the image quality. The same printing scheme may also direct printer 10 to print the current scan line first in one direction and then in the other direction; e.g. bi-directional printing. The printing scheme may also direct a speed for carriage motor 39 to control print head speed during printing and may direct the use of a particular pattern of print head nozzles on print heads 100*a* and 100*b* to achieve the printed image desired by the user. Various printing schemes can be utilized based upon combinations of the aforementioned factors. Printer driver 84 selects a particular printing scheme to achieve the desired image quality according to the type of recording media, print modes and other print-related conditions being utilized for a given job print request.

An alignment process (not shown) is provided by printer driver 84 for directing printer 10 to align print heads 100*a* and 100*b* when printer driver 84 detects that print heads 100*a* and 100*b* are not known to be aligned. Print heads 100*a* and 100*b* may be misaligned either because they are not aligned with respect to each other, or because their individual positions within printer 10 are not in their proper aligned positions, respectively. If printer driver 84 determines that print heads 100*a* and 100*b* may be in a misaligned state, printer driver 84 prompts the user to initiate the alignment process when the user initiates a print job request. If the user chooses to initiate the alignment process, printer driver 84 performs the alignment process after which print heads 100*a* and 100*b* are presumed to be sufficiently aligned by printer driver 84. If the user chooses not to perform the alignment process, printer driver selects only one of print heads 100*a* and 100*b* for printing the image, and also selects a particular printing scheme to control the selected print head during printing such that the selected print head is directed to print the image while scanning the recording medium in only one direction. As a result of the present invention, the user is allowed to proceed with a print request when print heads 100*a* and 100*b* are in a misaligned state by utilizing a predetermined printing scheme for directing printer 10 to print the requested image using only one of print heads 100*a* and 100*b*, thereby improving the quality of the printed image when print heads 100*a* and 100*b* are in a misaligned state.

In a preferred embodiment of the present invention, a print request is denied by the printer driver if it is determined that print heads 100*a* and 100*b* may be misaligned and if the user's print request requires the use of a particular print mode that cannot be supported by using only one print head in a no-alignment situation.

Figure 43:
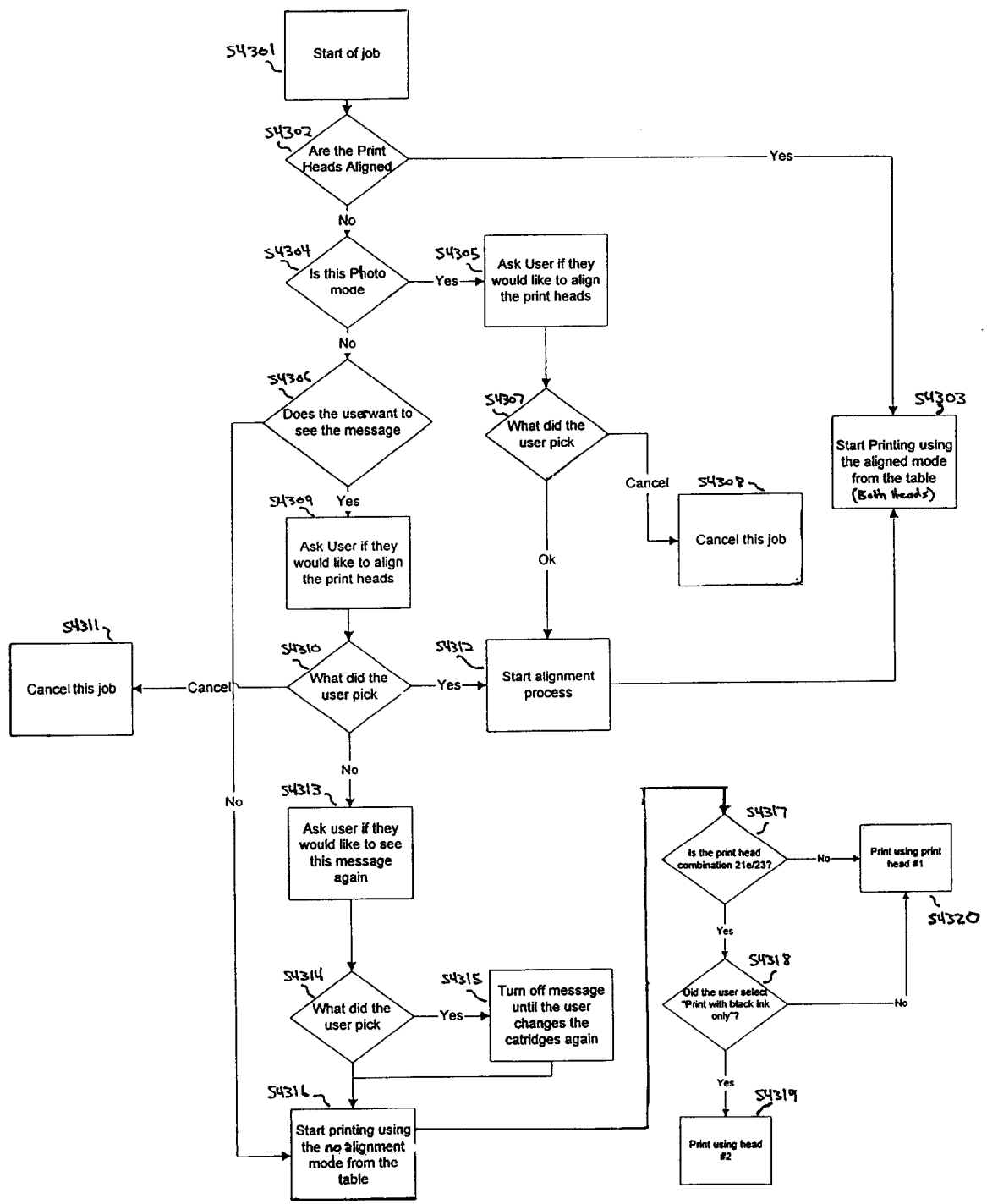
FIG. 43 is a flow diagram which depicts a printer driver software alignment process of the present invention.

FIG. 43 is a flow diagram which depicts a software alignment process for execution within printer driver 84 of the present invention. The process begins in step S4301 in which printer driver 84 receives a print request job from the user via an application software module 82. Printer driver 84 first determines whether print heads 100*a* and 100*b* are aligned in step S4302. Printer driver 84 determines whether print heads 100*a* and 100*b* may be misaligned based upon the status of the printer and other conditions, such as: (1) an indication from printer 10 that the user has changed one or both of ink cartridges 43*a* and 43*b* in the printer; (2) an indication that a specified amount of time or a specified number of print jobs has elapsed since the last time the alignment process was performed, or (3) an indication from printer 10 that print heads 100*a* and 100*b* are misaligned.

If it is determined that print heads 100*a* and 100*b* are sufficiently aligned in step S4302, printer 10 is directed by print driver 84 to print the requested print job pursuant to commands and data provided to printer 10 by print driver 84 (step S4303). Therefore, in the case when print heads 100*a* and 100*b* do not need further alignment, a particular printing scheme is selected by printer driver 84 to provide for reliable printing of a quality image in accordance with the print modes and print-related conditions of the current print job request (step S4303). The selection of a particular printing scheme by printer driver 84 for printing with alignment is discussed in more detail below in reference to FIG. 44.

If printer driver 84 determines that print heads 100*a* and 100*b* are not sufficiently aligned in step S4302, a determination is then made whether the user has requested the use of a photo-quality mode to print the current print job (step 4304). If a photo-quality mode is selected for the current print job, a dialog box is then displayed on display 4 (step S4305) asking if the user would like to initiate the alignment process to align print heads 100*a* and 100*b*. If the user indicates via keyboard 5 or pointing device 6 to not perform the alignment is process (step S4307), the print job is cancelled (step S4308) because the image cannot be printed in a photo-quality mode without using two aligned print heads 100*a* and 100*b*.

If the user decides to perform the alignment process (step S4307), control passes to step S4312 in which printer driver 84 initiates the alignment process. After the alignment process is complete, printer driver 84 directs printer 10 to print the requested print job pursuant to the commands and data provided to printer 10 by print driver 84 in accordance with a particular printing scheme for printing with alignment (step S4303).

If a photo-quality mode is not selected for this print job (step 4304), printer driver 84 next asks the user, via a dialog box on display 4, if the user would like to see a message regarding misalignment of print heads 100*a* and 100*b* (step S4306). If the user does not want to see the misalignment message, control is directed to step S4316 in which printer driver 84 directs printer 10 to print the requested print job pursuant to the commands and data provided by printer driver 84 in accordance with a particular printing scheme for printing without alignment (step S4316). The selection of a particular printing scheme by printer driver 84 for printing without alignment is depicted in more detail below in reference to FIG. 44.

If the user wants to see the misalignment message, control is directed to step S4309 in which printer driver 84 displays a dialog box on display 4 (step S4309) asking if the user would like to initiate the alignment process to align print heads 100*a* and 100*b*. If the user decides to cancel the print request after reading the dialog box, (step S4310), the print job is cancelled (step S4311). If the user decides after reading the dialog box to initiate the alignment process, (step S4310), control passes to step S4312 in which printer driver 84 initiates the alignment process. After the alignment process is complete, printer driver 84 directs printer 10 to print the requested print job pursuant to the commands and data provided to printer 10 by print driver 84 in accordance with a particular printing scheme for printing with alignment (step S4303). If the user decides after reading the dialog box not to initiate the alignment process, (step S4310), the user is asked via a dialog box on display 4 whether the user would like to be notified in the future of the misalignment of print heads 100*a* and 100*b* whenever another print job is requested (step S4313). If the user decides to not see the misalignment message in the future (step S4314), the message is turned off and prevented from being displayed in the future until the user changes one or both of ink cartridges 43*a* and 43*b* (step S4315). Control is then directed to step S4316 to print the requested print job as dicussed in further detail below. If the user decides to continue seeing the misalignment message in the future (step S4314), control is directed to step S4316 in which printer driver 84 directs printer 10 to print the print job pursuant to commands and data provided by printer driver 84 according to a printing scheme for printing without alignment (step S4316).

Upon starting the printing without alignment in step S4316, control is directed to step S4317 in which printer driver 84 determines whether print heads 100*a* and 100*b* comprise a particular combination wherein one print head is capable of printing color ink, including black ink, and the other print head is capable of printing black ink only (step S4317). In the preferred mode, if printer 10 contains a print head that is capable of printing both color ink and black ink, that print head is print head 100*a* and must be positioned in carriage receptacle 37*a* and the other print head is print head 100*b* and must be positioned in carriage receptacle 37*b* regardless of the type of the other print head. If printer 10 contains a color ink print head and a black ink print head (step 4317), printer driver 84 next determines whether the print job requires the image to be printed in black ink only (step S4318). If the print job is to be printed using black ink only (step S4318), printer driver 84 directs printer 10 to print the print job using only the black ink print head, which is print head 100*b* in the preferred embodiment (step 4319). If, in the alternative, the print job requires the use of color ink, (step S4318), printer driver 84 directs printer 10 to print the print job using only the color ink print head, which is print head 100*a* in the preferred embodiment (step 4320).

For all other possible combinations of print heads 100*a* and 100*b* in step S4317, such as two black ink print heads or two color ink print heads, printer driver 84 directs printer 10 to print the print job using only the color ink print head, which is print head 100*a* in the preferred embodiment (step 4320). The above arrangement therefore allows the user to proceed with a print job request whenever possible, even if print heads 100*a* and 100*b* are not sufficiently aligned and the user does not wish to initiate the alignment process. Moreover, in such a situation, printer driver 84 selects only one print head to use in conjunction with a particular printing scheme so as to provide reliable printing of a quality image when print heads 100*a* and 100*b* are not sufficiently aligned.

FIG. 44 provides a series of print mode tables containing printing schemes for printing an image with alignment, e.g. when the alignment process has been performed, and for printing an image without alignment pursuant to the printer driver software alignment process of FIG. 43. More specifically, Print Mode With Alignment table 385 contains multiple printing schemes for use by printer 10 when printing an image with aligned print heads 100*a* and 100*b* as referenced in step S4303 of FIG. 43. Table 385 generally contains two attributes for each particular printing scheme provided; they are: (1) Print Resolution; and (2) (3) the number of scan Passes and print Direction during which print heads 100*a* and 100*b* are to print the image.

These attributes vary from one printing scheme to the next depending on the print mode for image resolution, which can be Draft mode, Standard mode or High mode. The attributes also vary depending on the mode of image quality which can be either Regular mode or a Photo quality mode, and depending on the type of recording medium being used which can be Plain Paper, High Resolution or Glossy. Returning to Print Mode With Alignment table 385, the various combinations of print modes and recording media types result in twelve separate printing schemes for printing with alignment. For example, when printing with alignment requires use of the Standard print mode, the Regular image quality mode and High Resolution paper, a printing scheme is defined by the attributes in table 385 as follows: (1) Print Resolution is 720 by 720 dpi; and (2) two Passes are required for print heads 100*a* and 100*b* to scan over each printed scan line and printing is to be performed in both directions (bidirectional). Some of the printing schemes in table 385 are not applicable by definition, such as an attempt to print a Photo quality image in Draft mode, or the use of Glossy recording medium in Draft mode.

Certain printing schemes depicted in table 385 require the use of a sub-printing scheme, "1pass_U/B*1, as shown in table 386 of FIG. 44. The "1pass_U/B*1" sub-printing scheme provides printing schemes in which only one scan pass is utilized for printing each scan and in which the scan direction and nozzle pattern to be utilized are determined by the type of print heads 100*a* and 100*b* that are installed in printer 10 and by the type of image to be printed on the current scan line. As discussed earlier, the type of print heads 100*a* and 100*b* installed in printer 10 can include any two print heads from a selection of color ink print heads ("BC-21e") and black ink print heads ("BC-23"). The type of image to be printed on a scan line can be Isolated Black, which refers to successive lines of text, Continuous Black, which is a continuous section of black or grey-scale image such as a graphic, or In Color, which is color text and/or image.

Pursuant to the Print Mode with Alignment table 385, it is seen that the printing scheme corresponding to a print request in Standard resolution mode and Regular image quality mode using Plain paper refers to the 1pass_U/B*1 sub-printing scheme. Turning to table 386, if the image to be printed on the current scan line is a continuous black graphic, then only one scan pass is required for print heads 100*a* and 100*b* to print the scan line. In addition, the color nozzles of the color ink print head are not utilized at all, 63 nozzles of black ink from the color ink print head are utilized for printing in only one direction (unidirectional), and 127 nozzles of the black ink print head are utilized for printing in only the forward direction (unidirectional scanning can occur in the forward or backward direction). Thus, the number of scan passes, printing direction, and nozzle selection are selected as part of the printing scheme in order to provide reliable printing of a quality image based upon the types of print heads 100*a* and 100*b* installed in printer 10, the type of image being printed on the current scan line, and upon the print modes and recording medium type requested for the current print job.

Print Mode Without Alignment table 387 contains multiple printing schemes for use by printer 10 when printing an image without aligned print heads 100*a* and 100*b* as referenced in step S4316 of FIG. 43. Table 387 generally contains two attributes for each particular printing scheme provided; they are: (1) Print Resolution; and (2) (3) the number of scan Passes and print Direction during which print heads 100*a* and 100*b* are to print the image.

These attributes vary from one printing scheme to the next depending on the print mode for image resolution, which can be Draft mode, Standard mode or High mode. The attributes also vary depending on the mode of image quality which can be either Regular mode or a Photo quality mode, and depending on the type of recording medium being used which can be Plain Paper, High Resolution or Glossy. Returning to Print Mode Without Alignment table 387, the various combinations of print modes and recording media types result in twelve separate printing schemes for printing with alignment. For example, when printing with alignment requires use of the Standard print mode, the Regular image quality mode and High Resolution paper, a printing scheme is defined by the attributes in table 387 as follows: (1) Print Resolution is 720 by 720 dpi; and (2) two Passes are required for print heads 100*a* and 100*b* to scan over each printed scan line and printing is to be performed in only one direction (unidirectional). Some of the printing schemes in table 387 are not applicable by definition, such as an attempt to print a Photo quality image in Draft mode, or the use of Glossy recording medium in Draft mode.

Certain printing schemes depicted in table 387 require the use of a sub-printing scheme, "1pass_U/B*2", as shown in table 388 of FIG. 44. The "1pass_U/B*2" sub-printing scheme provides printing schemes in which only one scan pass is utilized for printing each scan and in which the scan direction and nozzle pattern to be utilized are determined by the type of print heads 100*a* and 100*b* that are installed in printer 10 and by the type of image to be printed on the current scan line. As discussed earlier, the type of print heads 100*a* and 100*b* installed in printer 10 can include any two print heads from a selection of color ink print heads ("BC-21e") and black ink print heads ("BC-23"). As discussed above in reference to FIG. 43, only one of print heads 100*a* and 100*b* is selected for use during printing without alignment. The type of image to be printed on a scan line can be Isolated Black, which refers to successive lines of text, Continuous Black, which is a continuous section of black or grey-scale image such as a graphic, or In Color, which is color text and/or image.

Pursuant to the Print Mode without Alignment table 387, it is seen that the printing scheme corresponding to a print request in Standard resolution mode and Regular image quality mode using Plain paper refers to the 1pass_U/B*2 sub-printing scheme. Turning to table 388, if the image to be printed on the current scan line is a continuous black graphic, then only one scan pass is required for print heads 100*a* and 100*b* to print the scan line. In addition, if the color ink print head is selected for use during printing without alignment, the color nozzles of the color ink print head are not utilized at all, but 63 nozzles of black ink from the color ink print head are utilized for printing in only one direction (unidirectional). If, however, the black ink print head is selected for use during printing without alignment, then 127 nozzles of the black ink print head are utilized for printing in only the forward direction (unidirectional scanning can occur in the forward or backward direction). Thus, the number of scan passes, printing direction, and nozzle selection are selected as part of the printing scheme in order to provide reliable printing of a quality image based upon the types of print heads 100*a* and 100*b* installed in printer 10, the type of image being printed on the current scan line, and upon the print modes and recording medium type requested for the current print job.

7.0 Dual Head Multicolor Printing

Figure 45:
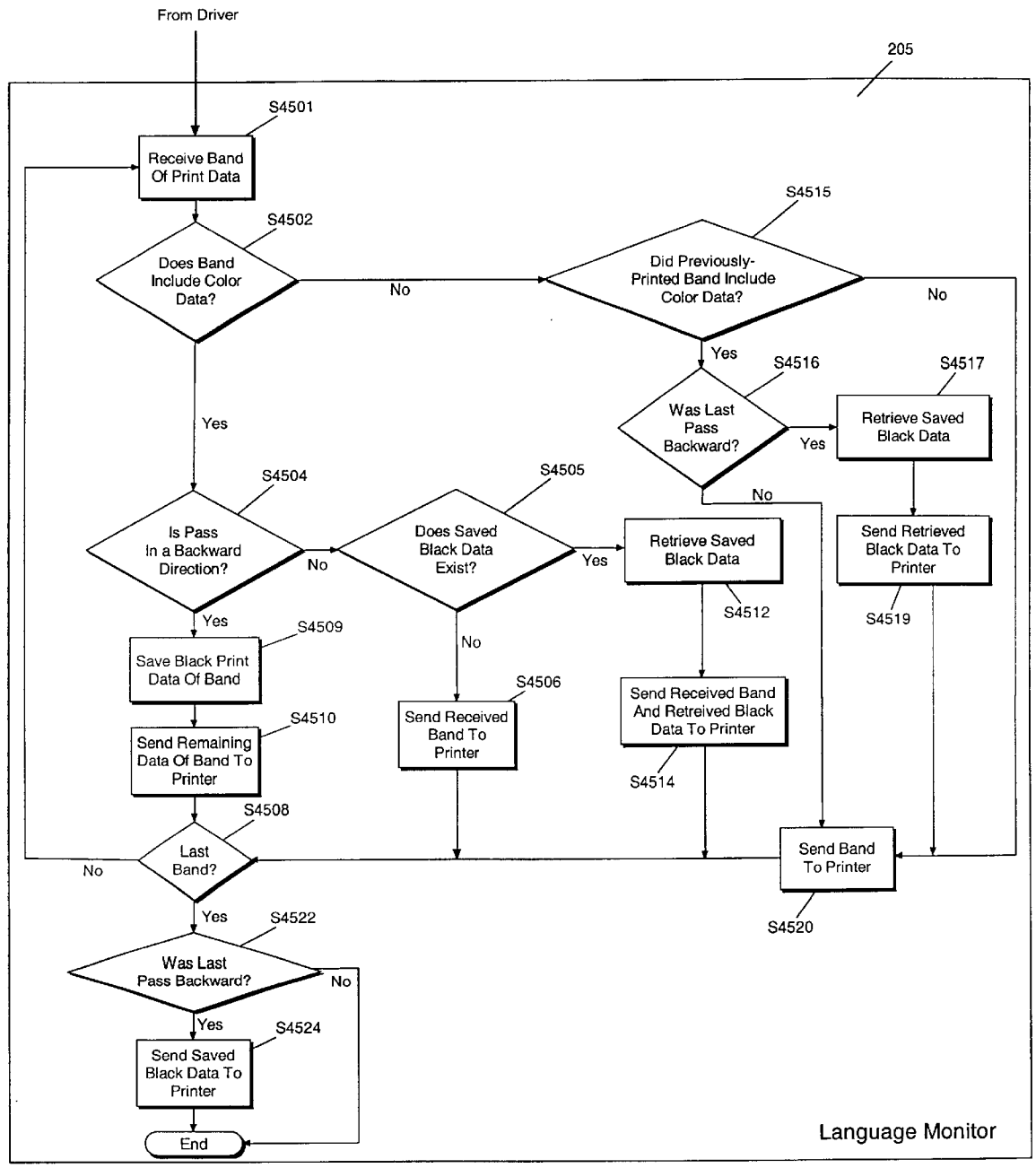
FIG. 45 is a flow diagram of processor-executable process steps to print color data.

FIG. 45 is a flow diagram illustrating computer-executable process steps used to print color data onto a recording medium. As shown, these steps are preferably included in language monitor 205 and executed by CPU 70 of host processor 2. It should be noted that these steps may also be executed by CPU 91 of printer 10.

Briefly, the FIG. 45 process steps include steps to print print data other than black print data included in the bands of print data using bidirectional printing and a step to print black print data included in the bands of print data using unidirectional printing.

More specifically, flow begins at step S4501, in which a band of print data is received from driver 84. Using the configuration illustrated in FIG. 18, the band is actually received printer provider 204. The received print data preferably includes binarized data indicating whether or not droplets of yellow, magenta, cyan or black ink are to be placed on particular pixel locations of the recording medium. The particular pixel locations are those which can be printed upon during a single scan of receptacles 37*a* and 37*b* using ink cartridges 43*a* and 43*b*. In the foregoing example, cartridge 43*a* utilizes print head 62 of FIG. 7, and ink jet cartridge 43*b* utilizes print head 64 of FIG. 7. In addition, ink cartridge 43*a* preferably stores yellow, magenta, cyan and black high-penetration inks, while ink cartridge 43*b* stores low penetration black ink.

Figure 46:
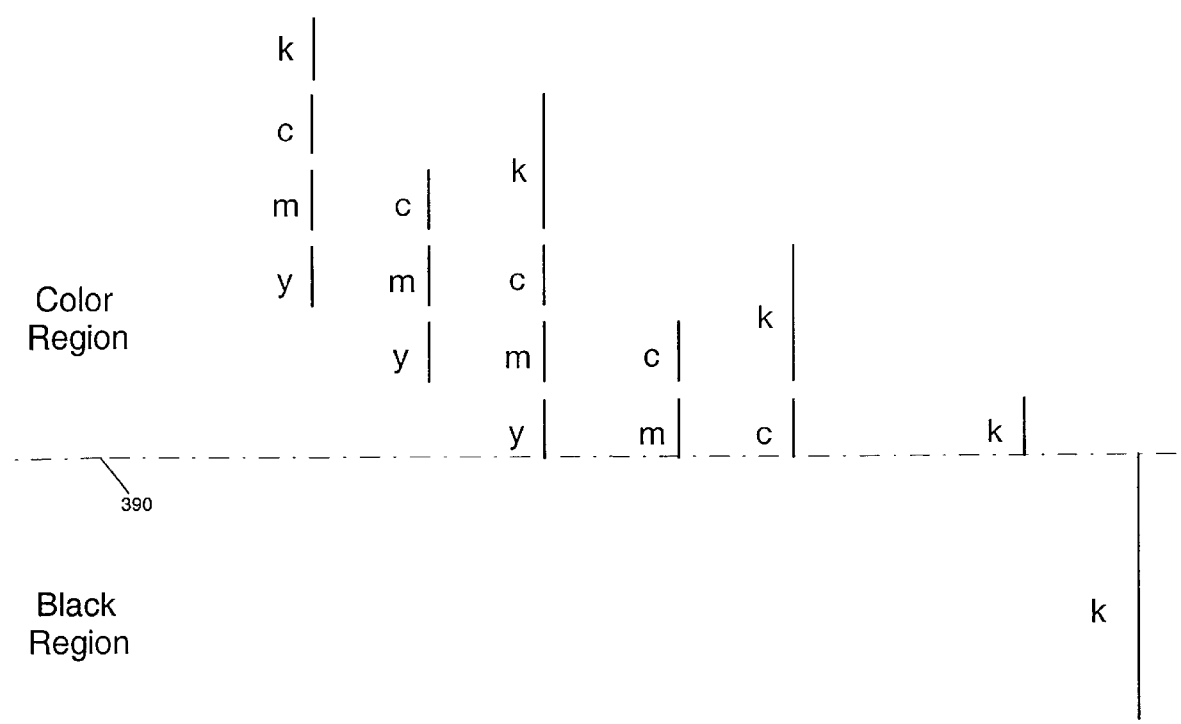
FIG. 46 illustrates printing of color data and black data using two different ink jet print heads.

Turning to FIG. 46, FIG. 46 illustrates a sequence of printing according to the FIG. 45 process steps. As shown, a color region exists above dashed line 390 and a black region exists below dashed line 390. Also shown in FIG. 46 are relative positions of ink nozzles of print head 62 during several passes of print head 62 over the recording medium during printing. Nozzles illustrated in each pass are those nozzles which perform printing during the pass according to the present example. Moreover, gaps shown between nozzle groupings are to illustrate the different groupings; these gaps are not to scale.

Returning to the FIG. 45 flow, a band of print data corresponding to pass 1 of FIG. 46 is received in step S4501. In step S4502, it is determined whether the received band includes color data. In this regard, a band is determined to include color data if any pixel location in the band is to be, or has previously been, printed upon using either a yellow, magenta, or cyan ink droplet. Accordingly, the received band of print data is determined to include color data in step S4502. Flow therefore proceeds to step S4504, where it is determined whether the current pass is in a backward direction.

In the present example, this first pass will be in a forward direction, therefore flow proceeds from step S4504 to step S4505. In step S4505, it is determined whether unprinted black data exists. Such unprinted black data will be described below with reference to FIG. 45. In the present instance, no such unprinted data exists and flow continues to step S4506, wherein the received band is sent to printer 10 for printing.

Pass 1 of FIG. 46 shows nozzles used during printing of the received band in step S4506. Preferably, 23 nozzles are used to print each of the inks during a single scan of print head 62. It should be noted that, after step S4506 of the present example, ink cartridge 43*a* is at an end of printer 10 opposite from the end at which the first pass began.

Flow continues from step S4506 to step S4508, wherein it is determined whether the previously-received band is a last band of print data. Since more bands of data exist in the present example, flow returns to step S4501. A band of print data for a second pass is received in step S4501 and, since, as shown in FIG. 46, the band includes color data, flow proceeds from step S4502 to step S4504. Since pass 1 was in a forward direction, pass 2 will be in a backward direction. Accordingly, flow continues to step S4509, wherein black print data of the received band is saved, preferably in print buffer 109. The remaining data of the band is then sent to printer 10 in step S4510. FIG. 46 shows that, in pass 2, only yellow, magenta and cyan droplets are printed.

It should be noted that, after pass 1 was completed, the recording medium was advanced a distance corresponding to 23 nozzles, and therefore pixels printed using magenta and yellow nozzles in pass 1 may be printed using cyan and magenta nozzles, respectively, in pass 2.

Flow continues from step S4508 to step S4501, wherein a next band of print data is received. Accordingly, flow proceeds from step S4502 to step S4504, wherein, since pass 3 is in a forward direction, flow continues to step S4505.

Since the black print data of pass 2 was saved in step S4509 as described above, flow continues from S4505 to step S4512, wherein the saved data is retrieved from print buffer 109. Next, in step S4514, both the band of print data received in step S4501 and the retrieved saved black data are sent to printer 10 for printing. As shown in FIG. 46, the lower-most black nozzles of print head 62 are used, along with the cyan, magenta and yellow nozzles, to print black print data of the received band of data while the upper-most black nozzles are used to print the saved black data of the band printed in pass 2. Advantageously, the black data is printed only in a forward direction. Accordingly, image degradation caused by backward printing of black ink is avoided.

Flow continues as described above with regard to pass 2 and pass 3 for each of passes 4 and 5, respectively, as illustrated in FIG. 46. However, as shown in FIG. 46, yellow nozzles of print head 62 are not used during pass 4 nor are magenta or yellow nozzles of print head 62 used during pass 5 because no data for those nozzles is present in the bands printed during either pass.

With regard to pass 6, a band of print data corresponding to pass 6 is received in step S4501. Although the received band does not contain any data corresponding to yellow, magenta or cyan ink, pixel locations of the band have previously been printed upon, in passes 3, 4 and 5, using yellow, magenta and cyan ink, respectively. Accordingly, flow proceeds to step S4504. Since pass 6 would be in a backward direction, flow continues to step S4509, wherein black print data of the received band is saved in buffer 109. In step S4510, data other than black data of pass 6 is sent to printer 10 for printing. In this case, the received band of print data includes only black print data, therefore head 62 merely scans across the recording medium in a backward direction without printing during step S4510 of pass 6. Flow then continues from step S4508 to step S4501, wherein a next band of print data is received.

In the present example, the received band corresponds to the black region shown in FIG. 46, therefore flow proceeds from step S4502 to step S4515. In step S4515, it is determined whether a previously printed band included color data. Since the band of print data analyzed with respect to pass 6 was determined to include color data, flow continues to step S4516, wherein it is determined whether a last pass was in a backward direction. Again, since pass 6 was in a backward direction, flow continues to step S4517. In step S4517, saved black data is retrieved from print buffer 109. In this regard, since step S4517 can be reached only if a previously-printed band included color data and a last pass was backward, it is assumed that black data of the previously-printed band was saved and not printed. Accordingly, next, in step S4519, the retrieved black data is sent to printer 10.

It should be noted that, after pass 5, the recording medium was advanced 23 nozzles and after pass 6, the recording was again advanced 23 nozzles. Accordingly, the retrieved black data is printed during pass 7 using nozzles 24 to 46 of print head 62. Flow then proceeds to step S4520, wherein the retrieved band of black data is sent to printer 10 for printing during pass 8 using print head 64 and ink jet cartridge 43b which, as described above, includes low-penetration black ink. It should be noted that pass 8 is performed in a forward direction to avoid image degradation caused by printing black ink in a reverse direction.

Flow proceeds from steps S4520 to S4508 and then, if another band is to be printed, to step S4501. If the next band includes no color data, flow proceeds from step S4515 directly to step S4520 as described above.

Flow continues as described above until, in step S4508, it is determined that a last band has been printed. In this case, flow then proceeds to step S4522, wherein it is determined whether the last pass was in a backward direction. If not, flow terminates. If so, saved black data yet to be printed is sent to printer 10 to be printed, in a forward direction, in step S4524. Flow then terminates.

By virtue of the foregoing process, printing of certain data in a backward direction can be avoided if it is determined that it is not desirable to print the data in the backward direction. In this regard, it should be noted that the foregoing process steps are not limited to forward-direction printing of black print data only, but can be applied to print other types of print data exclusively in a backward direction.

8.0 Prefiring and Pulse Width Modulation

This Section describes prefiring and pulse width modulation control according to the invention.

8.1 Prefire Control

Prefiring is performed in an ink jet printer so as to clear drying or coagulating ink from print head nozzles. Prefire timing according to the invention is described in Section 8.1.1. An embodiment of a system for control of prefire timing according to the invention is described in Section 8.1.2.

8.1.1 Prefire Timing

Figure 47:
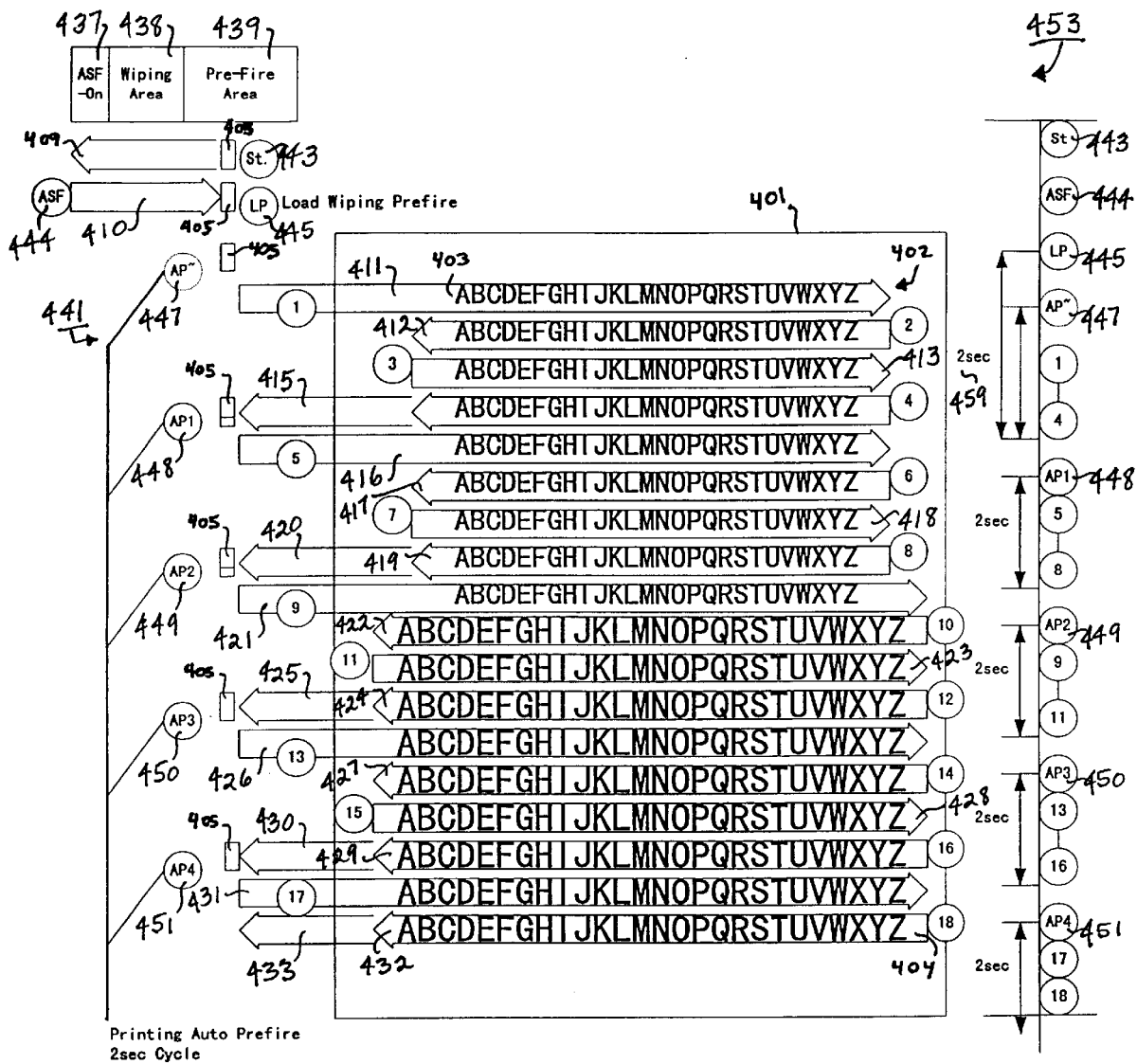
FIG. 47 is a diagram for describing prefire control in which a prefiring operation is performed at a predetermined interval.

FIG. 47 is a diagram for describing prefire control in which a prefire operation is performed at a predetermined interval. Shown in FIG. 47 is recording medium 401 with image 402 printed thereon. In FIG. 47, image 402 includes smaller-font text 403 and larger-font text 404.

Also shown in FIG. 47 is cartridge receptacle 405 at various times during printing of image 402. Cartridge receptacle 405 is one of cartridge receptacles 37a and 37b of printer 10 described above with reference to FIG. 5 in Section 1.0. Cartridge receptacle 405 preferably carries an ink jet cartridge such as ink jet cartridge 43a shown in FIG. 6 above. The ink jet cartridge preferably has a print head such as print head 61 or print head 62 shown in FIG. 7 above.

Arrows 409 to 433 indicate movement of cartridge receptacle 405, and therefore of a print head carried by cartridge receptacle 405, across recording medium 401 before, during and after multiple scans for printing image 402. Circled numbers are located next to starts of those of arrows 409 to 433 that represent scans during which parts of image 402 are printed. The circled numbers are in order of the scans used to print image 402. Thus, in FIG. 47, a first scan occurs at the top of image 402, and a last scan occurs at the bottom of image 402.

FIG. 47 also shows ASF position 437, wiping area 438, and prefire area 439 for cartridge receptacle 405. Cartridge receptacle 405 moves to ASF position 437 so as to initiate an automatic sheet feed operation, as discussed in more detail above in Sections 1.0 and 4.0.

In the preferred embodiment, wiping area 438 and prefire area 439 are located at home position 46 shown in FIG. 5. wiping area 438 includes wipers 44a and 44b. At wiping area 438, a print head held by cartridge receptacle 405 is wiped by a wiping mechanism so as to wipe excess ink, dust, paper particles and other debris from the print head.

Prefire area 439 is also located and at home position 46 and includes prefire receptacles 42a and 42b. A print head ejects ink from its nozzles into one of these receptacles so as to clear drying or coagulating ink from the nozzles.

Positioning of cartridge receptacle 405 at one of ASF position 437, wiping area 438, or prefire area 439 is indicated in FIG. 47 by showing cartridge receptacle 405 or an arrow representing movement of cartridge receptacle 405 below the position or area.

Event list 441 is shown to the left of recording medium 401. Circled symbols in event list 441 represent events that occur as image 402 is printed. In FIG. 47, start of printing 443 is represented by circled symbol St. Automatic sheet feed 444 is represented by circled symbol ASF, and initial load wipe/prefire 445 is represented by circled symbol LP. Automatic prefire events 447 to 451, which are represented by circled symbols AP", AP1, AP2, AP3 and AP4, respectively, also are shown in event list 441.

Timeline 453 is shown to the right of recording medium 401. The timeline runs from top to bottom in FIG. 47 and illustrates the timing relationship between scans of cartridge receptacle 405 for printing image 402 and events shown in event list 441. Accordingly, starts of each scan of cartridge receptacle 405 for printing image 402 are represented in timeline 453 by circled numbers corresponding to the circled numbers shown at the starts of the ones of arrows 409 to 433 that represent scan movement of cartridge receptacle 405. Likewise, events shown in event list 441 are represented in timeline 453 by symbols identical to those used in event list 441, and common reference numerals are used in both event list 441 and timeline 453 for identical symbols corresponding to a single event. For example, circled symbol St in event list 441 and circled symbol St in timeline 453 both represent start of printing 443.

In the prefire control illustrated by FIG. 47, an automatic prefire operation is preformed based on a two second interval. In more detail, event list 441 and timeline 453 show start of printing 443 followed by automatic sheet feed 444 and initial load wipe/prefire 445. Accordingly, arrow 409 shows cartridge receptacle 405 moving from circled symbol St at start of printing 443 to circled symbol ASF for automatic sheet feed 444 of recording medium 401. Arrow 410 shows cartridge receptacle 405 then moving past wiping area 438 for initial wiping to prefire area 439 for initial prefire, completing initial load wipe/prefire 445.

Following load wipe/prefire 445, a first automatic prefire 447 represented by circled symbol AP" optionally is performed. In particular, if a sufficient delay (e.g., two seconds) occurs between load wipe/prefire 445 and a start of printing, automatic prefire 447 is performed to maintain clear ink nozzles. Such a delay can occur, for example, while data is processed by a host processor or sent to the printer. In addition, the delay can occur while a user manually feeds a recording medium to the printer.

In order to perform automatic prefire 447, cartridge receptacle 405 is positioned at prefire area 439, as illustrated by the position of cartridge receptacle 405 next to circled symbol AP" below prefire area 439. Then, the print head nozzles are prefired to clear them of drying or coagulating ink.

Three scans of cartridge receptacle 405 are performed and a fourth scan is started before two second interval 459 elapses. This interval is measured from initial load wipe/prefire 445 (or automatic prefire 447, if applicable). The movement of cartridge receptacle 405 for these four scans is represented by arrows 411 to 414, and the starts of the four scans are represented by circled numbers 1 to 4.

Once two second interval 459 elapses, cartridge receptacle 405 completes a current scan and then moves to prefire area 439 for an automatic prefire operation. Accordingly, after the fourth scan, cartridge receptacle 405 moves to prefire area 439 for automatic prefire 448, as illustrated by arrow 415. After automatic prefire 448, cartridge receptacle 405 resumes scanning across recording medium 401.

The foregoing process continues until image 402 is printed onto recording medium 401. In particular, an automatic prefire operation occurs whenever a two second interval from a previous prefire elapses during a given scan. Whenever the interval elapses, the current scan preferably is completed, and then cartridge receptacle 405 is moved to prefire area 439 for a prefire operation. If the scan during which the interval elapses is a scan in which cartridge receptacle 405 is moving away from prefire area 439, then after the current scan is completed, a next scan is completed as cartridge receptacle 405 moves to prefire area 439.

Thus, in FIG. 47, cartridge receptacle 405 performs fifth through eighth scans corresponding to arrows 416 to 419; moves to prefire area 439 for automatic prefire 449 as illustrated by arrow 420; performs ninth through eleventh scans corresponding to arrows 421 to 423; performs a twelfth scan and then moves to prefire area 439 for automatic prefire 450 as illustrated by arrows 424 and 425 (the twelfth scan is performed because the eleventh scan is moving away from prefire area 439); performs thirteenth through sixteenth scans corresponding to arrows 426 to 429; moves to prefire area 439 for automatic prefire 451 as illustrated by arrow 430; and performs seventeenth and eighteenth scans corresponding to arrows 431 and 432 to complete printing image 402.

After image 402 is printed, cartridge receptacle 405 moves off of recording medium 401 for ejection of the recording medium, as shown by arrow 433. The ejection process is described in more detail above with respect to Section 3.0.

The foregoing prefire control results in frequent prefire operations to ensure proper ink ejection from nozzles of the ink jet head, thereby tending to ensure image quality. However, some of the prefire operations are unnecessary. In particular, when text of a single font size is printed during successive scans, one block of nozzles of a print head tends to be re-used for each scan. As long as the same block of nozzles is used from scan to scan, the act of printing the text ensures that the nozzles in the block remain free of drying or coagulating ink.

Thus, for example, automatic prefire 448 (corresponding to circled symbol AP1) between scans for printing smaller-font text 403 is at least partly unnecessary for maintaining image formation quality for the fifth through eighth scans in FIG. 47 (corresponding to arrows 416 to 419). The previous scans have already kept the block of nozzles used for those scans free of drying or coagulating ink. Likewise, automatic prefire 451 (corresponding to circled symbol AP4) between scans for printing larger-font text 404 is at least partly unnecessary. These unnecessary prefire operations unacceptably slow the image formation process, particularly in a case where high speed image formation is desired.

One technique for increasing image formation speed is to increase the time interval between automatic prefire operations. However, increasing the time interval between all prefire operations can unacceptably degrade image quality.

FIGS. 48 and 49A to 49C are diagrams for describing image degradation that can result from use of overly-long intervals between prefire operations. Shown in FIG. 48 is recording medium 461 with image 462 printed thereon. In FIG. 48, image 462 includes smaller-font text 463 and larger-font text 464.

Also shown in FIG. 48 is cartridge receptacle 405 at various times during printing of image 462. Examples of cartridge receptacle 405 are cartridge receptacles 37a and 37b described above with reference to FIG. 5 in Section 1.0. Cartridge receptacle 405 preferably carries an ink jet cartridge such as ink jet cartridge 43a shown in FIG. 6 above. The ink jet cartridge preferably has a print head such as print head 61 or print head 62 shown in FIG. 7 above.

Arrows 469 to 491 indicate movement of cartridge receptacle 405, and therefore of a print head carried by cartridge receptacle 405, across recording medium 461 before, during and after multiple scans for printing image 462. Circled numbers are located next to starts of those of arrows 469 to 491 that represent scans during which parts of image 462 are printed. The circled numbers are in order of the scans used to print image 462. Thus, in FIG. 48, a first scan occurs at the top of image 462, and a last scan occurs at the bottom of image 462.

FIG. 48 also shows ASF position 437, wiping area 438, and prefire area 439 for cartridge receptacle 405. Cartridge receptacle 405 moves to ASF position 437 so as to initiate an automatic sheet feed operation, as discussed in more detail above in Sections 1.0 and 4.0.

Wiping area 438 and prefire area 439 preferably are located at home position 46 shown in FIG. 5. At wiping area 438, a print head held by cartridge receptacle 405 is wiped by a wiping mechanism so as to wipe excess ink, dust, paper particles and other debris from the print head. The print head ejects ink from its nozzles into prefire area 439 so as to clear drying or coagulating ink from the nozzles. The position of cartridge receptacle 405 at one of ASF position 437, wiping area 438, or prefire area 439 is indicated in FIG. 48 by showing cartridge receptacle 405 or an arrow representing movement of cartridge receptacle 405 below the position or area.

Event list 501 is shown to the left of recording medium 461. Circled symbols in event list 501 represent events that occur as image 462 is printed. In FIG. 48, start of printing 503 is represented by circled symbol St. Automatic sheet feed 504 is represented by circled symbol ASF, and initial load wipe/prefire 505 is represented by circled symbol LP. Automatic prefire events 507, 508 and 510, which are represented by circled symbols AP", AP1, and AP2, respectively, also are shown in event list 501, along with data wait 509 represented by circled symbol DW. The data wait event represents a pause in printing as host processor 2 spools print data to printer 10.

Timeline 513 is shown to the right of recording medium 461. The timeline runs from top to bottom in FIG. 48 and illustrates the timing relationship between scans of cartridge receptacle 505 for printing image 462 and events shown in event list 501. Accordingly, starts of each scan of cartridge receptacle 405 for printing image 462 are represented in timeline 513 by circled numbers corresponding to the circled numbers shown at the starts of the ones of arrows 469 to 491 that represent scan movement of cartridge receptacle 405. Likewise, events shown in event list 501 are represented in timeline 513 by symbols identical to those used in event list 501, and common reference numerals are used in both event list 501 and timeline 513 for identical symbols corresponding to a single event. For example, circled symbol St in event list 501 and circled symbol St in timeline 513 both represent start of printing 503.

In the prefire control illustrated by FIG. 48, an automatic prefire operation is preformed based on a six second interval. In more detail, event list 501 and timeline 513 show start of printing 503 followed by automatic sheet feed 504 and initial load wipe/prefire 505. Accordingly, arrow 469 shows cartridge receptacle 405 moving from circled symbol St at start of printing 503 to circled symbol ASF for automatic sheet feed 504 of recording medium 461. Arrow 470 shows cartridge receptacle 405 then moving past wiping area 438 for initial wiping to prefire area 439 for initial prefire, completing initial load wipe/prefire 505.

Following load wipe/prefire 505, a first automatic prefire 507 represented by circled symbol AP" optionally is performed. In particular, automatic prefire 507 is performed if six second delay 514 elapses before actual printing begins. Such a delay can occur, for example, while data is processed by a host processor or sent to the printer. In addition, the delay can occur while a user manually feeds a recording medium to the printer.

Such a delay also can occur while data is processed or loaded into the printer, particularly if data is being processed by a low-end host processor connected to the printer. In addition, such a delay can occur if the printing operation must await user intervention, for example to load recording medium 461 or to initiate actual printing of image 462. If six second delay 514 elapses, cartridge receptacle 405 is positioned at prefire area 439 so that automatic prefire 507 can be performed, as illustrated by the position of cartridge receptacle 405 next to circled symbol AP" below prefire area 439. Then, the print head nozzles are prefired to clear them of drying or coagulating ink.

In a case that the delay is insufficient to trigger automatic prefire 507, the delay still can be sufficient to adversely affect image quality. In particular, a delay of just under six seconds easily can lead to image degradation such as that illustrated in FIG. 49A. This image degradation can appear as jagged or offset pixels for a left side of printed text for the first scan line. The pixels are offset or distorted by partially dried or coagulated ink in the print head nozzles.

In any event, after printing starts in FIG. 48, eleven scans of cartridge receptacle 405 are performed and a twelfth scan is started before six second interval 515 elapses. This interval is measured from automatic prefire 507 (or initial load wipe/prefire 505, if applicable). The movement of cartridge receptacle 405 for these twelve scans is represented by arrows 471 to 482, and the starts of the twelve scans are represented by circled numbers 1 to 12.

Image degradation can occur during the first twelve scans due to the long interval for prefiring. In particular, a block of print head nozzles are unused while smaller-font text 463 is printed. During this time, ink in nozzles in this block can begin to dry or to coagulate. Then, when a line of larger-font text 464 is started at the tenth scan, these nozzles can misfire for several pixels. One example of image degradation that can result from this misfiring is illustrated in FIG. 49B.

Returning to FIG. 48, once six second interval 515 elapses, cartridge receptacle 405 moves to prefire area 439 for automatic prefire at the end of the current scan. Accordingly, after the twelfth scan, cartridge receptacle 405 moves to prefire area 439 for automatic prefire 508, as illustrated by arrow 483. After automatic prefire 508, cartridge receptacle 405 resumes scanning across recording medium 461.

The foregoing process continues until image 462 is printed onto recording medium 461. In particular, an automatic prefire operation occurs whenever a six second interval from a previous prefire elapses during a given scan. Whenever the interval elapses, the current scan preferably is completed, and then cartridge receptacle 405 is moved to prefire area 439 for a prefire operation. If the scan during which the interval elapses is a scan in which cartridge receptacle 405 is moving away from prefire area 439, then after the current scan is completed, a next scan is completed as moving cartridge receptacle 405 moves to prefire area 439.

Thus, in FIG. 48, cartridge receptacle 405 performs thirteenth through sixteenth scans corresponding to arrows 484 to 487. Then, data wait event 509 occurs. If this data wait event is sufficiently slow that six second interval 516 elapses before the seventeenth scan, then automatic prefire 510 occurs. In that case, cartridge receptacle 405 moves to prefire area 439, as illustrated by arrow 488, so that the prefire operation can be performed. Otherwise, the seventeenth scan is performed without a prefire operation.

In the case that the seventeenth scan is performed without a prefire operation, image degradation such as that shown in FIG. 49C can occur. Because all print head nozzles were idle during data wait event 509, ink in the nozzles can begin to dry or to coagulate, adversely affecting the first few pixels of the seventeenth scan. An example of the resulting image degradation that can occur is shown in FIG. 49C in the form of a jagged or offset left edge for the first letter of the printed text.

Returning to FIG. 48, once again, cartridge receptacle 405 next performs seventeenth and eighteenth scans corresponding to arrows 489 and 490 to complete printing image 462.

After image 462 is printed, cartridge receptacle 405 moves off of recording medium 461 for ejection of the recording medium, as shown by arrow 491. The ejection process is described in more detail above with respect to Section 3.0.

In the printing operation discussed above, the longer interval between prefiring operations can result in image degradation such as that shown in FIGS. 49A to 49C. Significantly, the image degradation illustrated in FIGS. 49A and 49C can occur if a delay in printing caused by a data wait event is long enough for ink to start drying or coagulating, but not long enough to trigger automatic prefire.

Data wait events for low-end host processors tend to be long enough to trigger automatic prefire. Thus, a user printing images from a slow low-end host processor would be less likely to experience the problems illustrated in FIGS. 49A and 49C, although these problems still could occur. Users printing from more expensive and faster high-end host processors would be more likely to experience these problems. Therefore, in order for a printer to be suitable for use with high-end host processors, the problems with prefiring detailed above should be addressed.

While the foregoing has illustrated image degradation for printing an image composed of text having different font sizes, such degradation also can occur when printing color or non-color graphics. For example, image degradation can occur when long intervals between automatic prefire operations are used while printing graphics with a color print head such as print head 62 shown in FIG. 7. When a part of an image is printed in color using such a print head, the recording medium is advanced between each scan by a distance corresponding to the number of nozzles for a single color. For print head 62, the recording medium is advanced each scan by a distance corresponding to 24 nozzles. As explained above in Section 5.0, only 48 of the available 64 black nozzles are used for each scan; a block of 16 nozzles are unused. Then, if printing transitions to all black printing, all 64 black nozzles are used, including the previously unused block of 16 black nozzles. These previously unused nozzles can misfire due to dried or coagulated ink in the nozzles, resulting in image degradation along the lines shown in FIG. 49B. Therefore, the foregoing problems of image degradation also should be addressed in the context of a color printing apparatus.

Figure 50:
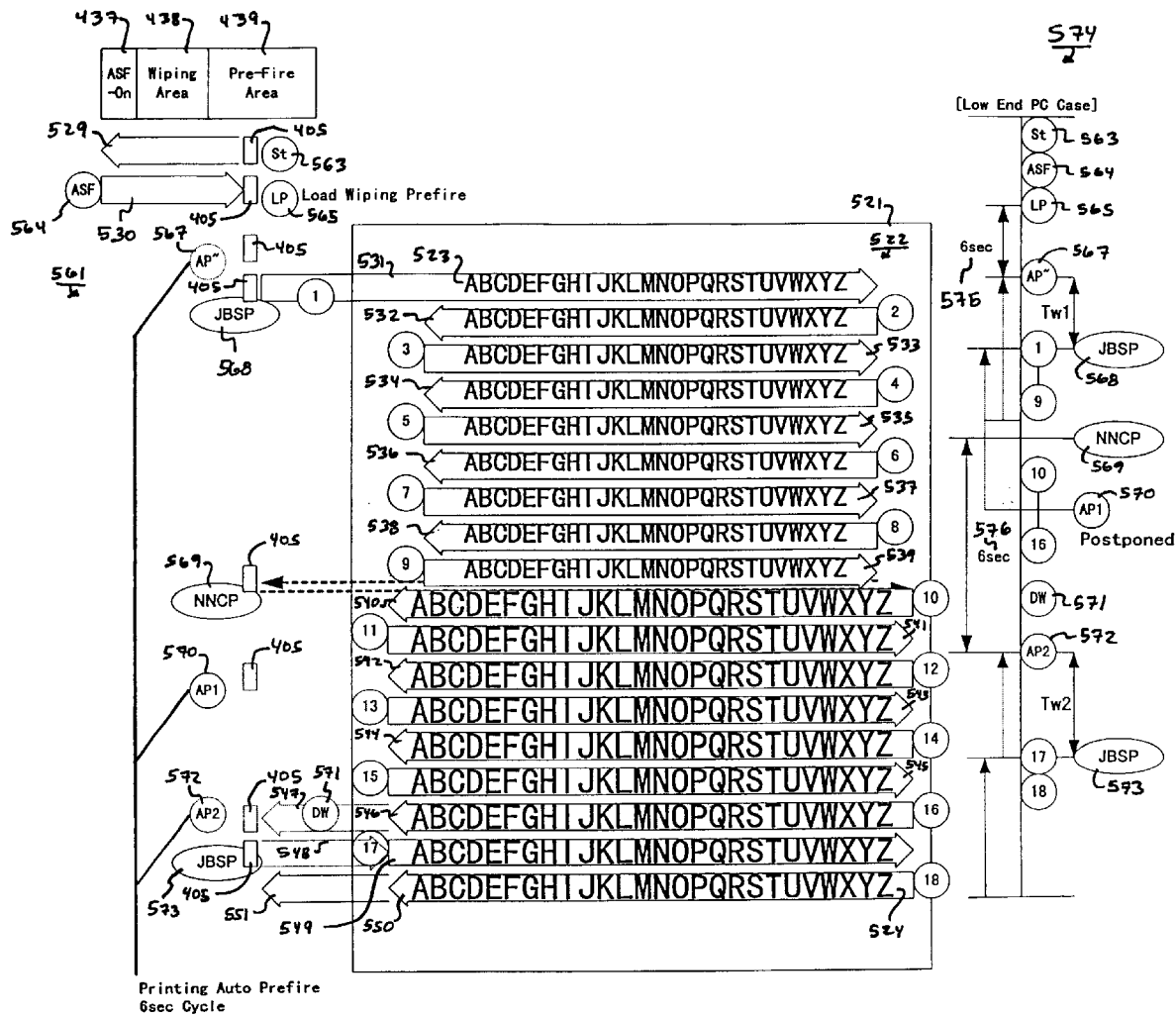
FIG. 50 is a diagram for describing prefire control according to the invention.

FIG. 50 is a diagram for describing prefire control according to the invention which addresses the problems discussed above with respect to use of fixed time intervals for automatic prefire operations.

Briefly, in an ink jet printing apparatus which performs printing by using a print head with at least a predetermined number of nozzles to eject ink, a prefiring operation is performed to eject ink from nozzles of the print head for maintaining printing quality after a first time interval during a printing operation. Nozzles of the print head are driven based on data to be printed and the prefiring operation is performed in a case where a number of the nozzles to be driven is changed. Preferably, the prefiring operation can be delayed to a second time interval longer than the first time interval. After the second time interval, the prefiring operation is performed.

In more detail, FIG. 50 shows recording medium 521 with image 522 printed thereon. In FIG. 50, image 522 includes smaller-font text 523 and larger-font text 524. Also shown in FIG. 50 is cartridge receptacle 405 at various times during printing of image 402. Examples of cartridge receptacle 405 are cartridge receptacles 37a and 37b of printer 10 described above with reference to FIG. 5 in Section 1.0. Cartridge receptacle 405 preferably carries an ink jet cartridge such as ink jet cartridge 43a shown in FIG. 6 above. The ink jet cartridge preferably has a print head such as print head 61 or print head 62 shown in FIG. 7 above.

Arrows 529 to 551 indicate movement of cartridge receptacle 405, and therefore of a print head carried by cartridge receptacle 405, across recording medium 521 before, during and after multiple scans for printing image 522. Circled numbers are located next to starts of those of arrows 529 to 552 that represent scans during which parts of image 522 are printed. The circled numbers are in order of the scans used to print image 122. Thus, in FIG. 50, a first scan occurs at the top of image 522, and a last scan occurs at the bottom of image 522.

FIG. 50 also shows ASF position 437, wiping area 438, and prefire area 439 for cartridge receptacle 405. Cartridge receptacle 405 moves to ASF position 437 so as to initiate an automatic sheet feed operation, as discussed in more detail above in Sections 1.0 and 4.0.

Wiping area 438 and prefire area 439 preferably are located at home position 46 shown in FIG. 5. At wiping area 438, a print head held by cartridge receptacle 405 is wiped by a wiping mechanism so as to wipe excess ink, dust, paper particles and other debris from the print head. The print head ejects ink from its nozzles into prefire area 439 so as to clear drying or coagulating ink from the nozzles. The position of cartridge receptacle 405 at one of ASF position 437, wiping area 438, or prefire area 439 is indicated in FIG. 50 by showing cartridge receptacle 405 or an arrow representing movement of cartridge receptacle 405 below the position or area.

Event list 561 is shown to the left of recording medium 521. Circled symbols in event list 561 represent events that occur as image 522 is printed. In FIG. 50, start of printing 563 is represented by circled symbol St. Automatic sheet feed 564 is represented by circled symbol ASF, and initial load wipe/prefire 565 is represented by circled symbol LP. Automatic prefire events 567, 570 and 572, which are represented by circled symbols AP", AP1 and AP2, respectively, also are shown in event list 561. In addition, just-before-scan prefire (JBSP) events 568 and 573 are represented in FIG. 50 by circled symbols JBSP, nozzle-number-change prefire (NNCP) event 569 is represented by circled symbol NNCP, and data wait (DW) event 571 is represented by circled symbol DW. These events are explained ink more detail hereinbelow.

Briefly, according to the invention, nozzle-number-change prefire occurs when data to be printed requires driving nozzles that have not been driven for a first time interval since a previous prefiring operation. Just-before-scan prefire occurs when none of the nozzles of a print head have be driven for a second time interval. Automatic prefire occurs when a third time interval has elapsed since a previous prefiring operation. The third time interval is longer than the first and second time intervals. As a result, prefire operations are delayed until the longer third time interval unless a prefire operation is triggered by a nozzle number change or a pause before scanning a line, which can result from a data wait event.

Returning to FIG. 50, timeline 574 is shown to the right of recording medium 521. The timeline runs from top to bottom in FIG. 50 and illustrates the timing relationship between scans of cartridge receptacle 405 for printing image 5122 and events shown in event list 561. Accordingly, starts of each scan of cartridge receptacle 405 for printing image 522 are represented in timeline 574 by circled numbers corresponding to the circled numbers shown at the starts of the ones of arrows 529 to 552 that represent scan movement of cartridge receptacle 405. Likewise, events shown in event list 561 are represented in timeline 574 by symbols identical to those used in event list 561, and common reference numerals are used in both event list 561 and timeline 574 for identical symbols corresponding to a single event. For example, circled symbol St in event list 561 and circled symbol St in timeline 574 both represent start of printing 563.

In the prefire control illustrated by FIG. 50, an automatic prefire operation is preformed based on a six second interval. However, certain events can trigger an earlier prefire operation, including a change in a number of nozzles used in a scan across recording medium 521 or a pause in use of all nozzles.

In more detail, event list 561 and timeline 574 show start of printing 563 followed by automatic sheet feed 564 and initial load wipe/prefire 565. Accordingly, arrow 529 shows cartridge receptacle 405 moving from circled symbol St at start of printing 563 to circled symbol ASF for automatic sheet feed 564 of recording medium 521. Arrow 530 shows cartridge receptacle 405 then moving past wiping area 438 for initial wiping to prefire area 439 for initial prefire, completing initial load wipe/prefire 565.

Following load wipe/prefire 565, a first automatic prefire 567 represented by circled symbol AP" optionally is performed. In particular, automatic prefire 567 is performed if a predetermined interval elapses between load wipe/prefire 165 and a start of printing. The predetermined interval can elapse, for example, while data is processed by a host processor or sent to the printer. In addition, the interval can elapse while a user manually feeds a recording medium to the printer.

In FIG. 50, the predetermined interval is six second interval 575. After the six second interval has elapsed, the nozzles are in a "danger region" of operation in which ink ejection errors are more likely to occur. Thus, a prefiring operation should be performed before printing occurs. In order to perform automatic prefire 567, cartridge receptacle 405 is positioned at prefire area 439, as illustrated by the position of cartridge receptacle 405 next to circled symbol AP" below prefire area 439. Then, the print head nozzles are prefired to clear them of drying or coagulating ink.

If a further delay occurs before printing starts, then nozzles of the print head might remain idle long enough for ink to begin drying or coagulating. Accordingly, the invention determines if no printing (including prefiring) has occurred for a predetermined interval, which in FIG. 50 is three seconds. If no printing has occurred for this interval, just-before-scan prefire 568 is performed, thereby tending to ensure that the nozzles remain clear of drying or coagulating ink. This operation tends to prevent image degradation along the lines discussed above with respect to FIG. 49A.

Once printing starts, elapsed time is measured from a previous prefire operation. In the example illustrated in FIG. 50, the previous prefire operation is just-before-scan prefire 568, and the interval for performing an automatic prefire is six seconds. However, before this interval elapses, nine scans of cartridge receptacle 405 are performed, as shown by arrows 531 to 539. These nine scans print all of smaller-font text 523. In order to print larger-font text 524 for the tenth scan represented by arrow 540, previously unused nozzles must be driven to eject ink. According to the invention, this change in a number of used nozzles is detected, as explained in more detail below with reference to FIG. 54.

In FIG. 50, the nozzle number change occurs after a first time interval of three seconds has elapsed since a last prefiring operation. Thus, the nozzles are operating in a "sensitive region" in which a change in the number of driven nozzles can lead to image degradation such as that illustrated in FIG. 49B discussed above. Accordingly, nozzle-number-change prefire 569 is performed. However, if the change had occurred before the first three second time interval had elapsed, the nozzles would have been operating in a "safe region" in which image degradation is less likely. In that case, no prefiring would have been performed.

Preferably, it is determined if a scan will have a nozzle number change before that scan is performed. Carriage receptacle 405 is moved to prefire area 439 before the scan is performed so that unused print head nozzles can be cleared before further printing occurs. Then, after the nozzle-number-change prefire is performed, printing continues. This situation is illustrated in FIG. 50, where cartridge receptacle 405 is shown moving to prefire area 439 after the ninth scan, and prefiring occurs before cartridge receptacle 405 begins the tenth scan at circled number 10 for larger-font text 524. This operation is in contrast to the prefire control discussed above with respect to FIGS. 47 and 48, in which cartridge receptacle 405 completes a current scan and possibly performs a next scan in order to move to prefire area 439.

Returning to FIG. 50, six seconds elapse from just-before-scan prefire 568 to after a start of the twelfth scan represented by arrow 542. However, automatic prefire 570 is not performed because nozzle-number-change prefire 569 occurs during the elapsed time. Instead, the prefire is postponed until automatic prefire 572, which occurs after the thirteenth through sixteenth scans represented by arrows 543 through 546. Automatic prefire 572 is triggered by the elapse during the sixteenth scan of six second interval 576 from nozzle-number-change prefire 569.

In order to perform the automatic prefire operation, cartridge receptacle 505 moves to prefire area 439, as shown by arrow 147. If the sixteenth scan had moved cartridge receptacle 405 away from prefire area 439 (i.e., arrow 546 had been pointed away from prefire area 439), a next scan line preferably would have been printed while moving cartridge receptacle 405 to prefire area 439. This operation is in contrast to the operation of a nozzle-number-change prefire operation discussed above, in which a next scan line preferably would not be printed.

Also illustrated in FIG. 50 is a case where data wait 571 is sufficiently long so that no nozzles are driven for a predetermined interval (e.g., three seconds) after automatic prefire 572. As a result, just-before-scan prefire 573 is performed before the seventeenth scan begins, thereby tending to avoid image degradation of the type shown in FIG. 49C.

After just-before-scan prefire 573, the seventeenth and eighteenth scans are performed so as to complete printing image 522. After image 522 is printed, cartridge receptacle 405 moves off of recording medium 521 for ejection of the recording medium, as shown by arrow 551. The ejection process is described in more detail above with respect to Section 3.0.

Figure 51:
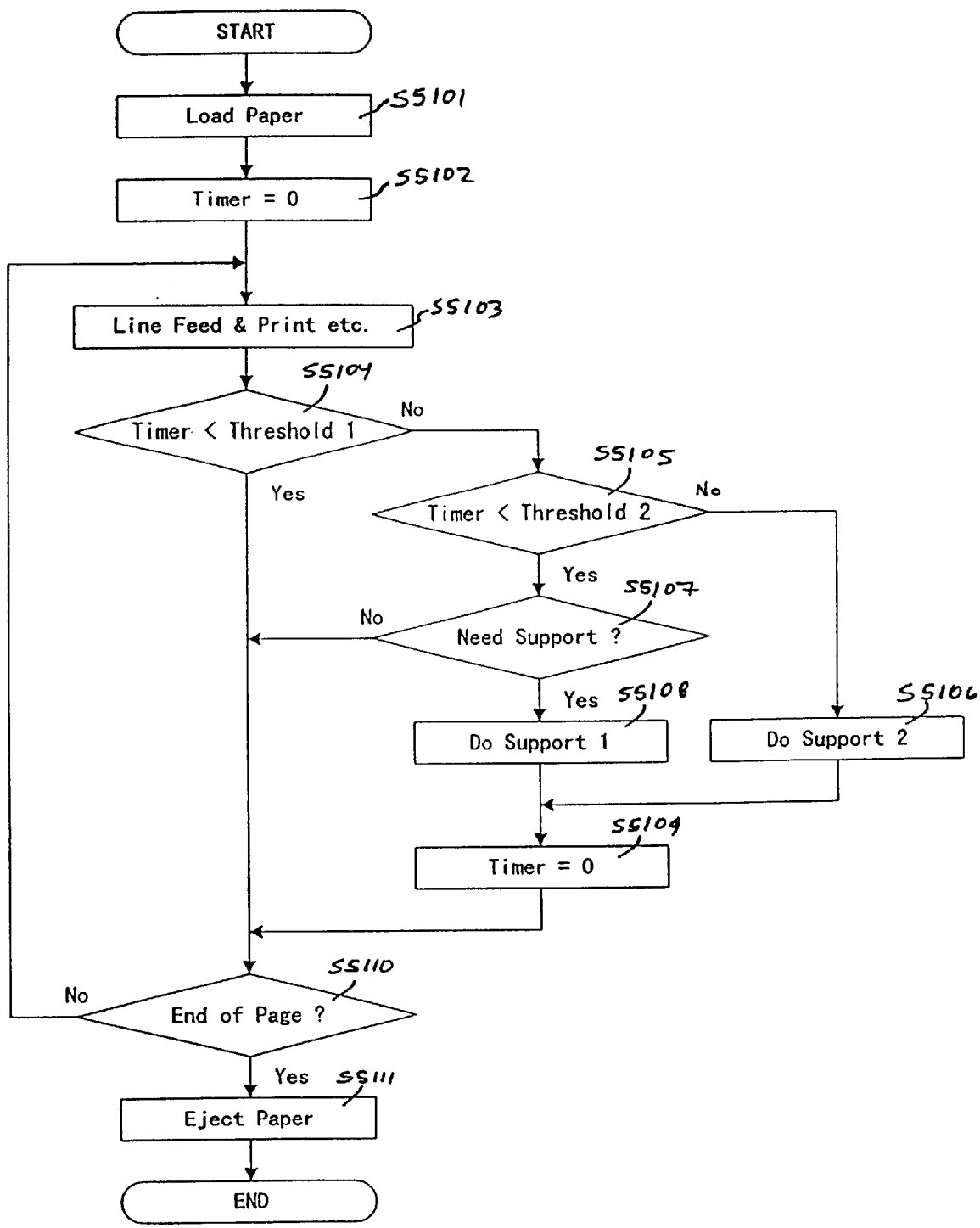
FIG. 51 is a flowchart for describing prefire control timing according to the invention.

FIG. 51 is a flowchart for describing prefire control timing according to the invention.

In step S5101, printer 10 loads a recording medium. A timer is then set equal to zero seconds in step S5102.

Line feed and printing operations occur in step S5103. In step S5104, it is determined if the timer is less than Threshold 1. Threshold 1 represents a safe time interval during which prefire operations are generally unnecessary. However, if the timer is not less than Threshold 1, flow proceeds to step S5105.

In step S5105, it is determined if printer 10 is operating in a "sensitive region" or a "danger region". In particular, step S5105 determines if the timer is less than Threshold 2. If the timer is not less than Threshold 2, then printer 10 is operating in a "danger region", and flow proceeds to step S5106 for performance of a support operation such as a prefire operation.

On the other hand, if the timer is less than Threshold 2, printer 10 is operating in a "sensitive region". In that case, flow proceeds to step S5107, where it is determined if support is needed. For example, support would be needed if a number of nozzles that were driven to print on the recording medium were changed. If support is needed, flow proceeds to step S5108 for performance of the support operation. After either step S5106 or step S5108, the timer is reset to zero in step S5109.

In step S5110, it is determined if printer 10 has reached an end of a page. If printer 10 has reached the end of a page, step S5111 ejects the recording medium. Otherwise, flow returns to step S5103 for continued printing.

8.1.2 Embodiment

FIGS. 52 through 56 are flowcharts for describing a preferred embodiment for implementing the timing of prefire control described above with respect to FIGS. 50 and 51. In this embodiment, certain functions preferably are executed by printer control 110 discussed above with reference to FIG. 8, for example in printer firmware. Other functions preferably are executed by printer driver 84 running on host processor 2.

Figure 52:
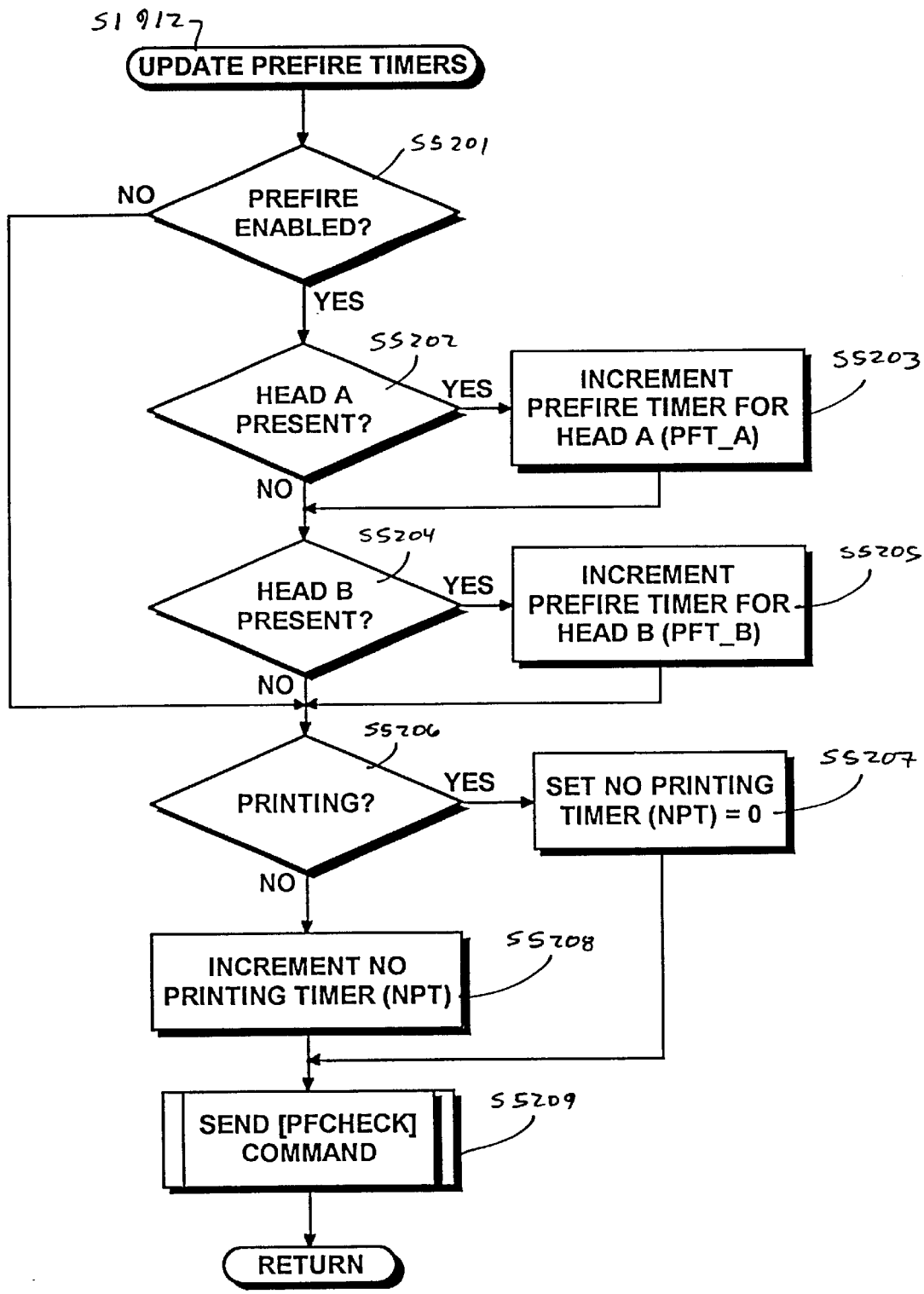
FIG. 52 is a flowchart for describing an update of prefire timers by a printer controller according to the invention.

FIG. 52 is a flowchart for describing a prefire-timer-update function that preferably is executed by printer control 110. This function is called every second from step S1912 shown in FIG. 19, which also preferably is executed by printer control 110. Accordingly, the prefire timers are updated every second by printer control 110.

In more detail, when the prefire-timer-update function is called, in step S5201 it is first determined if automatic prefire is enabled. Automatic prefire preferably can be enabled or disabled by a user, for example through printer driver 84. In addition, in a high-speed printing mode, automatic prefire can be disabled so as to improve print speed. Likewise, in a high-quality printing mode, automatic prefire can be enabled so as to improve print quality. Certain print heads such as the Canon BC-21(e) also are less sensitive to long intervals between prefiring operations, and automatic prefiring can be disabled for those print heads.

If automatic prefire is enabled, flow proceeds to step S5202. If automatic prefire is disabled, flow skips steps to step S5206.

In step S5202, it is determined if print head A (reference numeral 100a above) is present. For example, it is determined if a cartridge with a usable print head is properly installed in cartridge receptacle 37a. If print head A is present, prefire timer PFT_A for print head A is incremented in step S5203. Likewise, in step S5204, it is determined if print head B )reference numeral 100b above) is present, in which case step S5205 increments prefire time PFT_B for print head B. PFT_A and PFT_B are used according to the invention to control automatic prefire operations such as automatic prefire operation 567, 570 and 572 explained above.

In step S5206, it is determined if printing or prefiring has occurred since a last invocation of the prefire-timer-update function. If printing or prefiring has occurred, flow proceeds to step S5207, and no-printing timer NPT is set to zero. Otherwise, flow proceeds to step S5208, and no-printing timer NPT is incremented. Thus, no-printing timer NPT stores a time since a last printing or prefiring operation.

No-printing timer NPT is used according to the invention to control just-before-scan prefire operations such as just-before-scan prefire operations 568 and 573 described above. It should be noted that no-printing timer NPT is updated regardless of whether automatic prefiring is enabled.

In step S5209, a PFCHECK command is executed. This command preferably invokes a prefire check function executed by printer control 110. The prefire check function is described below with reference to FIG. 53. After step S5209, flow returns to the flowchart of FIG. 19.

Figure 53:
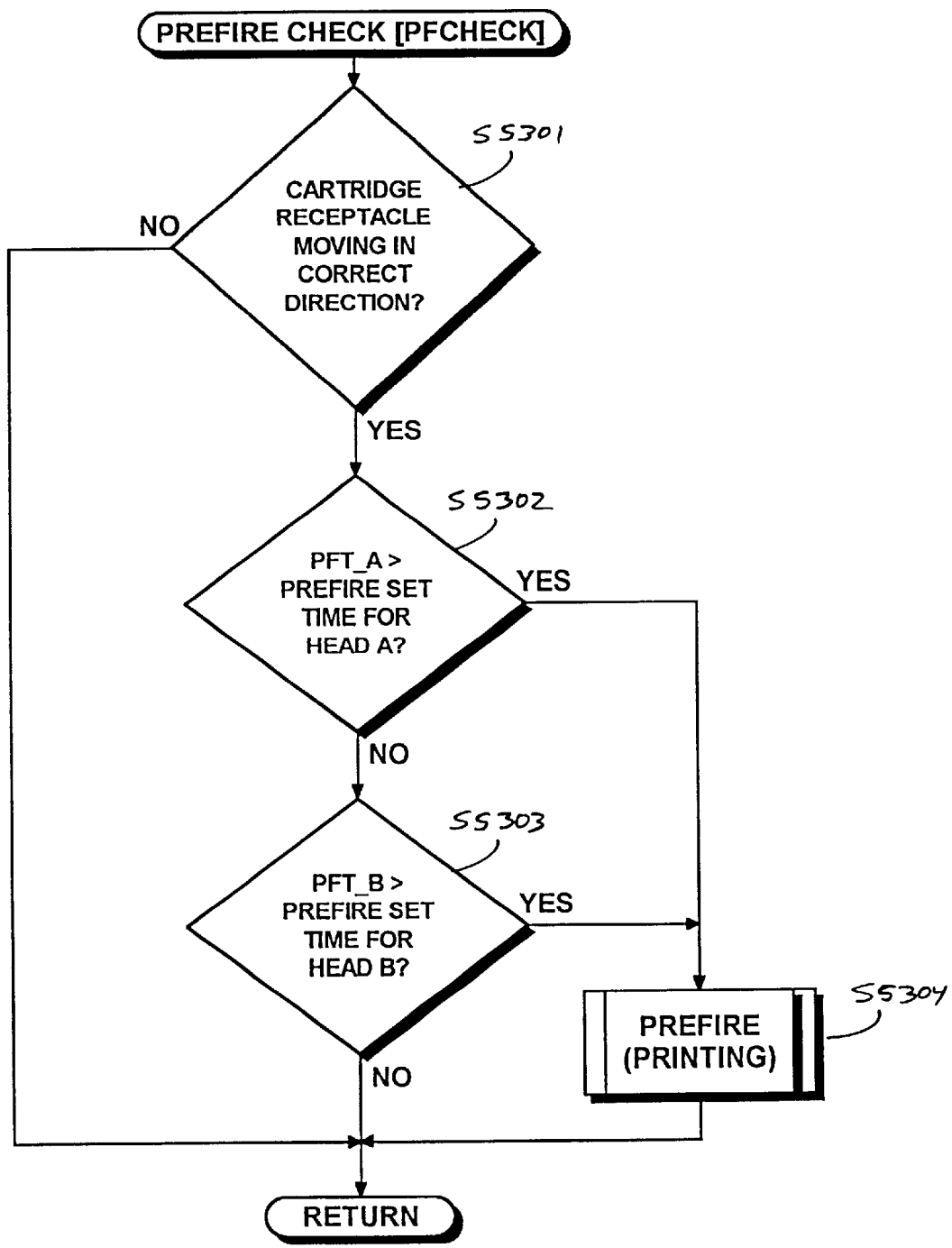
FIG. 53 is a flowchart for describing a prefire check operation performed by a printer controller according to the invention.

FIG. 53 is a flowchart for describing a prefire check operation preferably executed by printer control 110 according to the invention. In step S5301, it is determined if cartridge receptacle 405 is moving in the correct direction, which is toward prefire area 439. If cartridge receptacle 405 is not moving in the correct direction, flow skips to the end of the function and returns to FIG. 52, where flow then returns to FIG. 19. When step S1912 of FIG. 19 is called at succeeding one second interrupts, this process is repeated until the cartridge receptacle is moving in the correct direction. Once the cartridge receptacle is moving in the correct direction, flow proceeds to step S5302.

The foregoing operation of step S5301 ensures that in a case where an interval for an automatic prefire operation elapses during a scan that moves cartridge receptacle 405 away from prefire area 439, printing is performed for a next scan while returning cartridge receptacle 405 to prefire area 439.

In step S5302, it is determined if PFT_A is greater than a prefire set time for print head A. Likewise, in step S5303, it is determined if PFT_B is greater than a prefire set time for print head B. In the example described above with respect to FIG. 50, these set times are both six seconds. It should be noted, however, that these set times do not need to be equal, but rather can be different so as to accommodate use of different print heads for print head A and print head B.

If either prefire timer PFT_A or prefire timer PFT_B is greater than its respective set time, the corresponding print head is operating in the "danger region" discussed above with reference to FIG. 50, and a prefire operation should be performed. Accordingly, flow proceeds to step S5304 where a prefire (print) function is called, thereby performing an automatic prefire operation. The prefire (print) function is described in more detail below with reference to FIG. 56.

Figure 54:
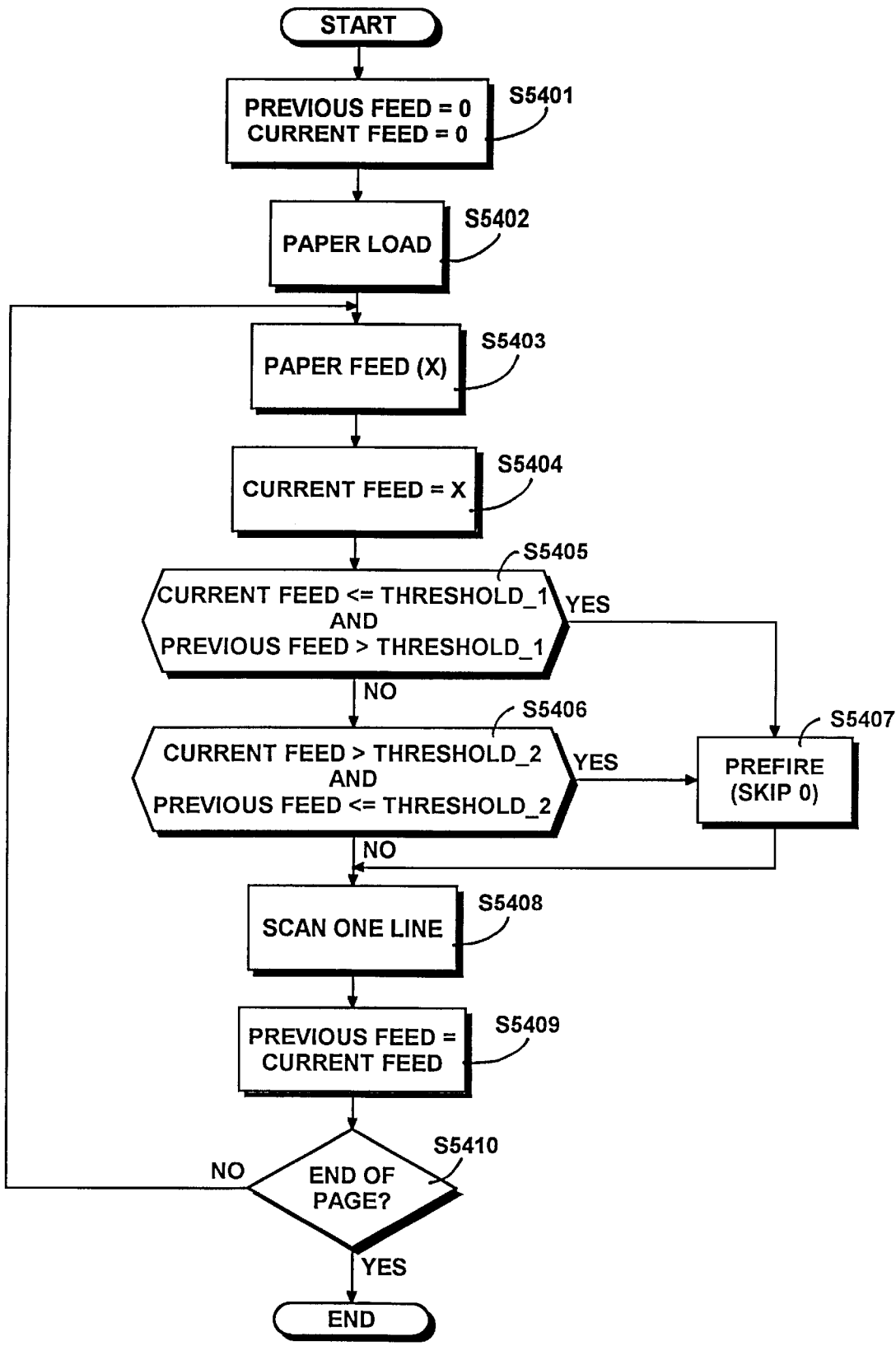
FIG. 54 is a flowchart for describing generation of a nozzle-number-change prefire request by a printer driver according to the invention.

FIG. 54 is a flowchart for describing generation of a nozzle-number-change prefire request by printer driver 84 according to the invention.

In step S5401, printer driver 84 sets PREVIOUS FEED and CURRENT FEED to zero at a start of a page for a print job. In step S5402, printer driver 84 sends a LOAD command to printer 10 so as to cause printer 10 to load a recording medium, as described above in Section 3.6.1.

Printer driver 84 determines scan height X in raster lines for a next scan line to be printed. In step S5403, printer driver 84 instructs printer 10 to advance the recording medium by X scan lines using the SKIP command. In step S5404, CURRENT FEED is set equal to X.

Step S5405 determines that a nozzle-number-change has occurred if CURRENT FEED is less than or equal to THRESHOLD_1 and PREVIOUS FEED (the CURRENT FEED for a previous scan) is greater than THRESHOLD_1. In the preferred embodiment, THRESHOLD_1 is one less than a height of a print head that is being used for printing in raster lines. For example, for print head 61 shown in FIG. 7, THRESHOLD_1 preferably is 127 raster lines.

In more detail, if PREVIOUS FEED is greater than THRESHOLD_1, printer 10 fed the recording medium for the previous scan by more than the height of the print head. As a result, a whitespace exists between the previous scan and the current scan, indicating that the data being printed for the previous scan was so-called isolated data in which scan lines are separated from other scan lines by horizontal whitespaces. Typically, less than all of the nozzles of a print head are used to print isolated data. In particular, at least some of the top or bottom nozzles of the print head typically are unused.

If CURRENT_FEED is less than or equal to THRESHOLD_1, no whitespace separates the current scan line from the previous scan line. Accordingly, the current scan data is continuous scan data such as data for a table or chart, in which all nozzles of the print head typically are used. Thus, testing if CURRENT FEED is less than or equal to THRESHOLD_1 and PREVIOUS FEED is greater than THRESHOLD_1 detects a nozzle number change that occurs when transitioning from printing isolated data to printing continuous data.

Step S5406 determines that a nozzle number change has occurred if CURRENT FEED is greater than THRESHOLD_2 and PREVIOUS FEED is less than or equal to THRESHOLD_2. In the preferred embodiment, THRESHOLD_2 is equal to a number of color nozzles used to eject ink of one color (e.g., cyan, magenta or yellow), which preferably is one less than a number of nozzles of a part of a color print head for ejecting ink of one color. For example, for print head 62 shown in FIG. 7, THRESHOLD_2 preferably is 23.

In more detail, if CURRENT FEED is greater than THRESHOLD_2, then the data for the current scan most likely is not color data, because the number of raster lines printed for the current scan is greater than the number of raster lines of color ink that can be recorded using the color print head. If PREVIOUS FEED is less than or equal to THRESHOLD_2, then the previous scan most likely was color data. Thus, this test determines that printing has transitioned from printing color data to printing non-color data.

During color printing, a number of black nozzles used for one scan typically equals the number of color nozzles for a single color. For example, as explained in Section 8.0, only 46 black nozzles of print head 62 typically are used for each scan during color printing, leaving 18 nozzles unused. However, during non-color printing, all of the black nozzles typically are used. Therefore, after a transition from color printing to non-color printing, a nozzle number change typically occurs for the black nozzles being used.

If either step S5405 or S5406 determines that a nozzle number change has occurred, a nozzle-number-change prefire request is sent to printer 10 in step S5407. In the case that the command set available to printer driver 10 does not include a nozzle-number-change prefire request, the instruction can be sent by sending an existing command with an out-of-range argument. Then, firmware in the printer can be modified to recognize the command with the out-of-range argument as a nozzle-number-change prefire request. For example, in the preferred embodiment, a raster SKIP command with an argument of zero lines is used as a nozzle-number-change prefire request.

In any event, the scan line is printed in step S5408 using the PRINT command. In step S5409, PREVIOUS FEED is set equal to CURRENT FEED. If the end of the page has not been reached, step S5410 returns flow to step S5403 for processing the next scan line. Otherwise, processing for the page ends.

Figure 55:
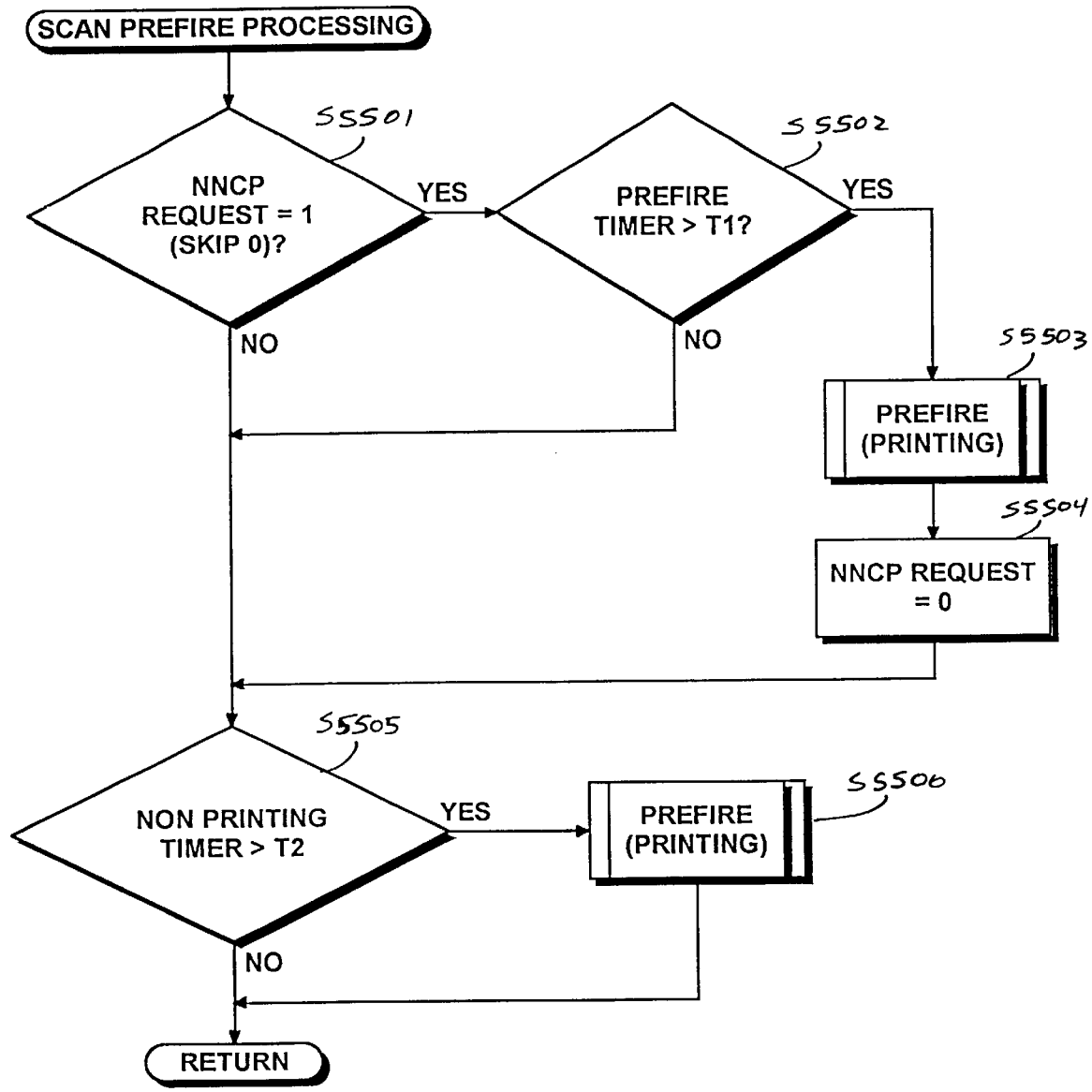
FIG. 55 is a flowchart for describing scan prefire processing by a printer controller according to the invention.

FIG. 55 is a flowchart for describing scan prefire processing preferably executed by printer control 110 according to the invention. This processing occurs every time printer 10 receives a PRINT command to print a scan line.

In step S5501, it is determined if a nozzle-number-change prefire request has been received. As discussed above with respect to step S5407 of FIG. 54, in the preferred embodiment this request takes the form of a SKIP command with an argument of zero lines. If such a request has been received, flow proceeds to step S5502. Otherwise, flow skips to step S5505.

In step S5502, it is determined if a prefire timer, namely PFT_A or PFT_B discussed above with respect to FIG. 52, is greater than a threshold T1. If the prefire timer is less than this threshold, the print head is operating in a "safe region" as explained above with reference to FIG. 50. Accordingly, a prefire operation is not necessary and would only serve to delay printing, and flow skips to step S5505.

If the prefire timer is greater than this threshold, the print head is operating in a "sensitive region" (or a "danger region"), and a prefire operation should be performed. Accordingly, flow proceeds to step S5503 where a prefire (print) function is called, thereby performing a nozzle-number-change prefire (NNCP) operation. This prefire (print) function is discussed in more detail below with reference to FIG. 56. In step S5504, the nozzle-number-change prefire request is reset.

In step S5505, it is determined if no-printing timer NPT has exceeded a no-printing threshold T2. If no-printing timer NPT has exceeded this threshold, flow proceeds to step S5506 where the prefire (print) function is called, thereby performing a just-before-scan prefire (JBSP) operation.

Figure 56:
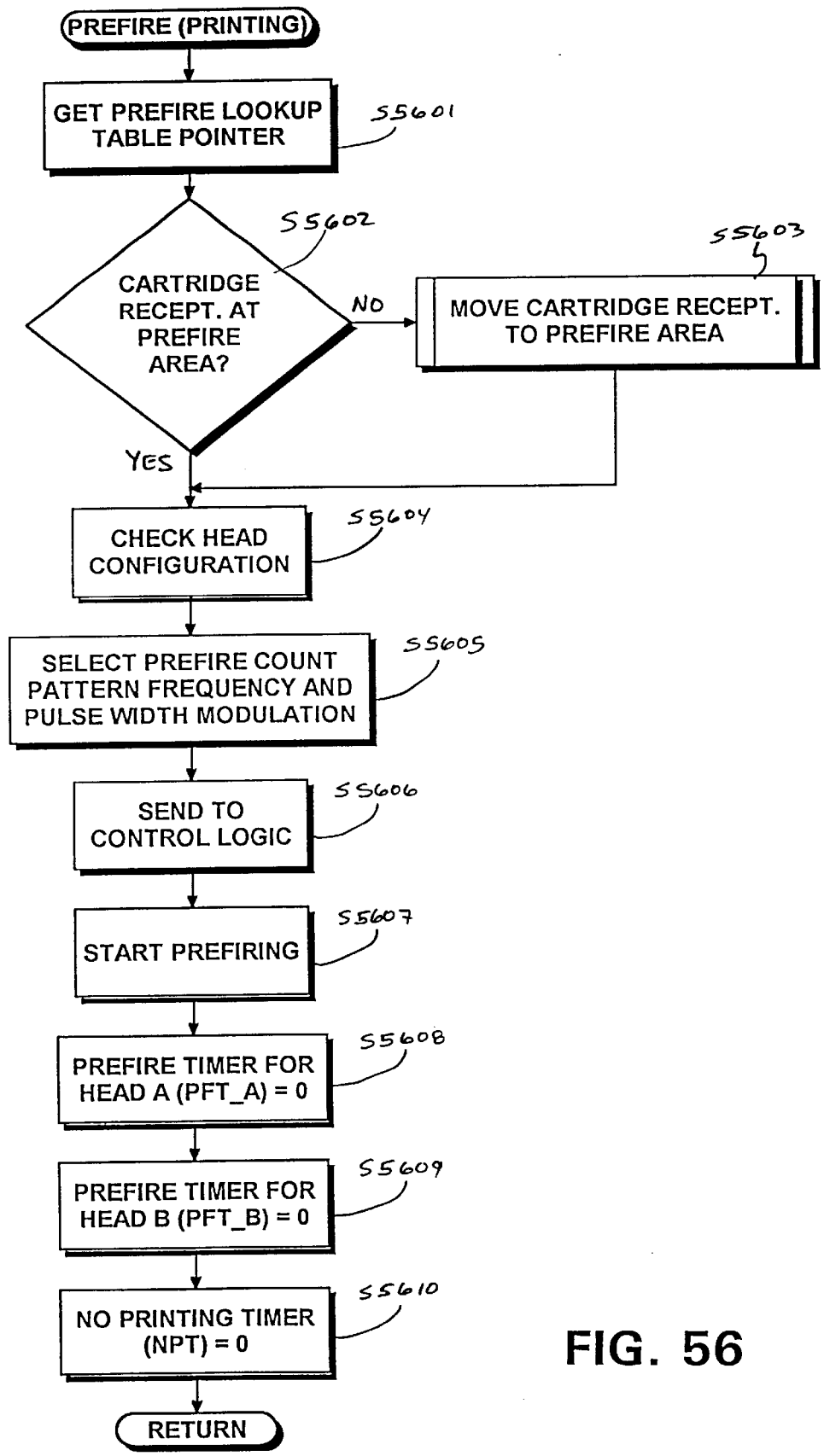
FIG. 56 is a flowchart for describing a prefire (print) function according to the invention.

FIG. 56 is a flowchart for describing a prefire (print) function according to the invention. This function preferably is executed by printer control 110.

A prefire lookup table pointer is retrieved in step S5601. In step S5602, it is determined if cartridge receptacle 405 is at prefire area 439. If cartridge receptacle 405 is not at prefire area 439, the cartridge receptacle is moved to prefire area 439 in step S5603.

As explained above with reference to FIG. 53, in a case that the prefire (printing) function is called from step S5304 for an automatic prefire operation, cartridge receptacle 405 is on the same side of printer 10 as prefire area 439. Likewise, in a case that the prefire (printing) operation is called from step S5506 in FIG. 55 for a just-before-scan prefire operation, no printing has occurred for at least time interval T2. Accordingly, cartridge receptacle 405 again is on the same side of printer 10 as prefire area 439. Preferably, only in the case of a nozzle-number-change prefire is cartridge receptacle 405 moved across a recording medium in step S5603 without printing. As a result, delay due to prefire operations tends to be further reduced, thereby increasing overall printing speed. In either of these cases, only a short time is needed for step S5603 to move cartridge receptacle 405 to prefire area 439.

Print head configuration is checked in step S5604. Based on the print head configuration, prefire count pattern frequency and pulse width modulation are determined in step S5605 as explained below in Section 8.2. The determined frequency and modulation are sent to control logic 94 in step S5606, which initiates prefiring in step S5607.

In steps S5608, S5609 and S5610, the prefire timers are all reset. In particular, PFT_A, PFT_B and NPT are all reset to zero. Then, flow returns from the prefire (printing) operation.

8.2 Pulse Width Modulation Control

Figure 57:
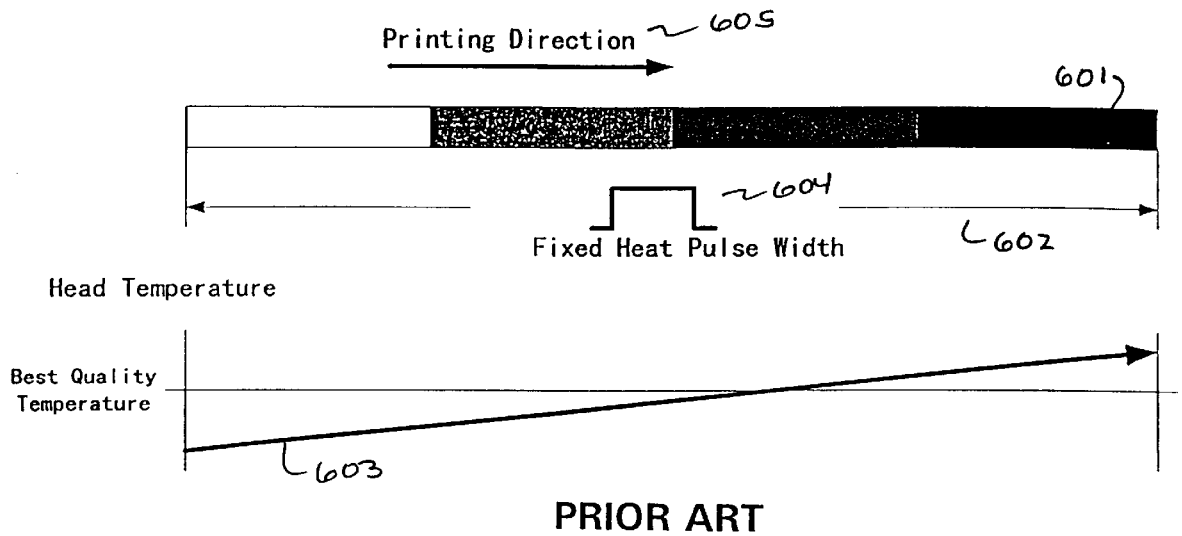
FIG. 57 is a diagram for describing a relationship between ink jet nozzle heat pulse width and output images.

FIG. 57 is a diagram for describing a relationship between ink jet nozzle heat pulse width and output density. Shown in FIG. 57 is printing density 601 across scan line 602 for printing by ejection of ink from nozzles of an ink jet print head using fixed-width heat pulse 604.

As the print head is scanned across scan line 602, print head temperature 603 increases due to repeated firing of ink jet nozzles. As the print head heats up, more ink is ejected from the nozzles for a given heat pulse width. As a result, printing density can disadvantageously increase along printing direction 605 independent of print data.

Figure 58:
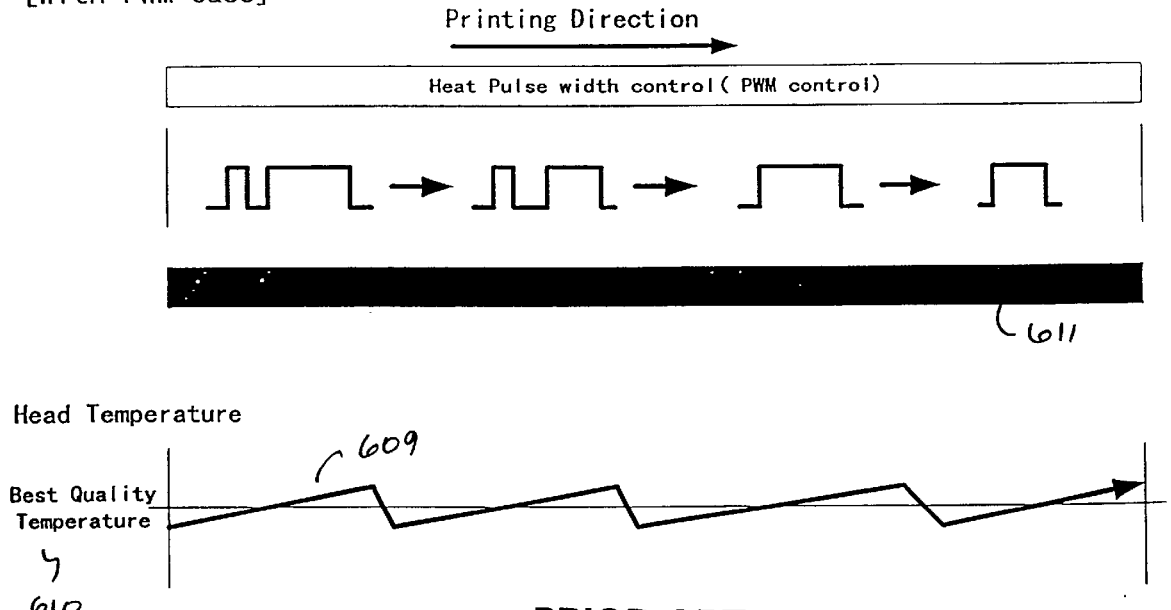
FIG. 58 is a diagram for describing a heat pulse width modulation.

FIG. 58 is a diagram for describing heat pulse width modulation. As shown in FIG. 58, different heat pulse widths are used as a print head moves across a scan line. The heat pulses are modulated so as to stabilize print head temperature 609 around best quality temperature 610, thereby stabilizing printing density 611.

Figure 59:
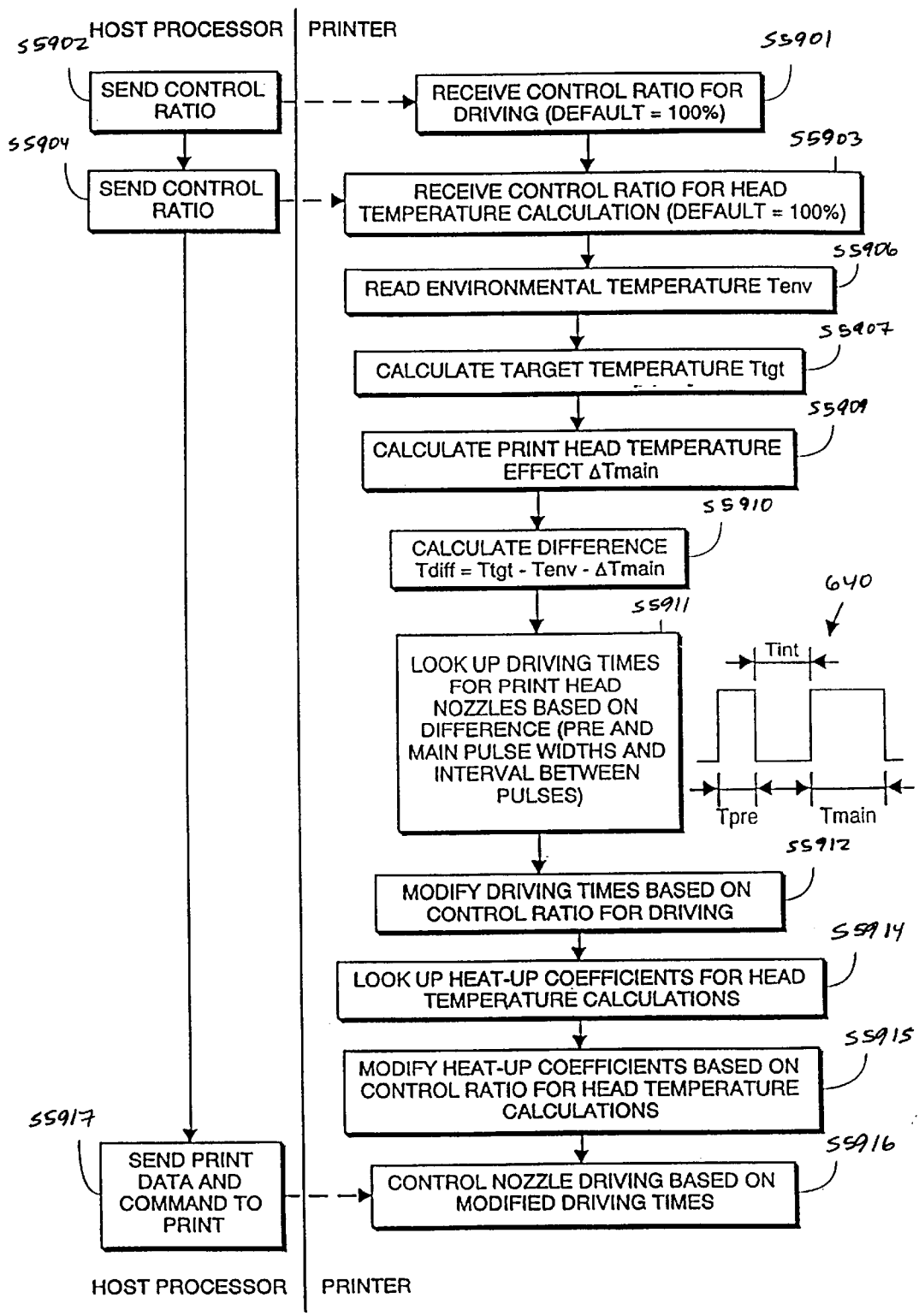
FIG. 59 is a flowchart for explaining control of nozzle heat pulse driving times.

FIG. 59 is a flowchart for explaining control of nozzle heat pulse driving times. In step S5901, printer 10 receives a command to set a control ratio for driving a print head pulse width sequence. The command is sent by host processor 2 (step S5902), and in the absence of receiving any such command, printer 10 maintains a default value of 100%. The control ratio for driving that is received in step S5901 is a factor applied to look-up values from a pre-stored table in ROM 92, as described more fully below in step S5912.

In step S5903, printer 10 receives a command for a control ratio for head temperature calculations. The command is received from host processor 2 (step S5904), and in the absence of receipt of such a command, printer 10 maintains a default value of 100%. The control ratio for head temperature calculations is applied as a multiplication factor against pre-stored values of heat-up coefficients used for calculating head temperature, as described more fully below in connection with step S5915.

Preferably, steps S5901 through S5904 are effected through use of the change pulse ratio command ([PCR]) defined above in Section 3.6. As described above, the [PCR] command is used to change a ratio of pulse control tables such as a ratio of heat-up coefficients used for calculating head temperature, and such as changing a ratio of pulse widths for a pulse width driving sequence for each individual nozzle of print heads 100a and 100b when ejecting an ink droplet from the nozzle.

Flow continues in printer 10 with steps S5906 through S5915 which are executed repeatedly at cyclic intervals of, for example, 50 msec so as to maintain in real time the most current values for print head driving parameters. More specifically, as described above in connection with FIG. 19, steps S5906 through S5915 are executed at 50 msec cyclic intervals, for example, so as to calculate head temperature and to derive pulse width timings for a pulse width sequence applied to eject an ink droplet from a nozzle, together with other tasks also executed at 50 msec intervals.

Referring again to FIG. 59, step S5906 reads current environmental temperature ($T_{env}$) from temperature sensor 103a in printer 10, preferably in real time as explained in FIG. 61 below. The current environmental temperature may be the most current value read from the thermistor, or more preferably the actual value read from the thermistor is subjected to low pass filtering so as to smooth any irregularities, discount bad readings of the thermistor, remove noise such as analog-to-digital sampling noise, and the like.

Based on the environmental temperature $T_{env}$ read in step S5906, a target temperature ($T_{tgt}$) is calculated in step S5907. The target temperature is the preferred operational temperature for printer 10 based on the current environmental temperature. Generally speaking, printer 10 is controlled through unshown heaters in print heads 100a and 100b so as to reach the target temperature, as explained above in connection with FIG. 19 at the 500 msec interrupt level. The target temperature is the most preferred temperature for print head operation based on the current environmental temperature. The relationship between target temperature and environmental temperature is inverse, meaning that low environmental temperatures result in relatively higher target temperatures, whereas high environmental temperatures result in relatively lower target temperatures. For example, at extremely low environmental temperatures such as $T_{env}=5°$ C., a preferred target temperature might be $T_{tgt}=35°$ C., whereas at extremely high environmental temperatures such as $T_{env}=35°$ C., a preferred target temperature might be $T_{tgt}=15°$ C.

Step S5909 calculates the effect on print head temperature caused by actual ink droplet ejection from print heads 100a and 100b. More particularly, the environmental temperature read in step S5906 is based on an environmental temperature read by a thermistor mounted exteriorly of print heads 100a and 100b. Proper control over print head driving parameters, on the other hand, is more directly affected by the internal temperature of ink adjacent the print head nozzles. It is not generally considered practicable to mount a thermistor within such a small area. At the same time, it is known that active ink droplet ejection will cause a rise in ink temperature and that in the absence of any ink ejection, ink temperature will generally fall. It is the purpose of step S5909 to calculate the effect of print head temperature caused by ink droplet ejection to make this calculation.

The calculation of print head temperature in step S5909 is made based in part on the number of ink droplets actually ejected over a previous time interval such as 50 msec. Each ejection of an ink droplet within the predetermined time interval is assigned a heat coefficient weight. Based on the number of ink droplet ejections within the predetermined time period, it is possible to calculate the effect of ink droplet ejection on print head temperature.

At the same time, it is known that such heat-up coefficients vary in dependence on the particular type of print head used, the ink characteristics used in the read, the resolution of printout by the head, and the like. Each different combination of head/ink/resolution changes heat-up coefficient values corresponding to the number of dots printed. Accordingly, ROM 92 is pre-stored with tables for heat-up coefficients. This situation is illustrated in FIG. 60.

Figure 60:
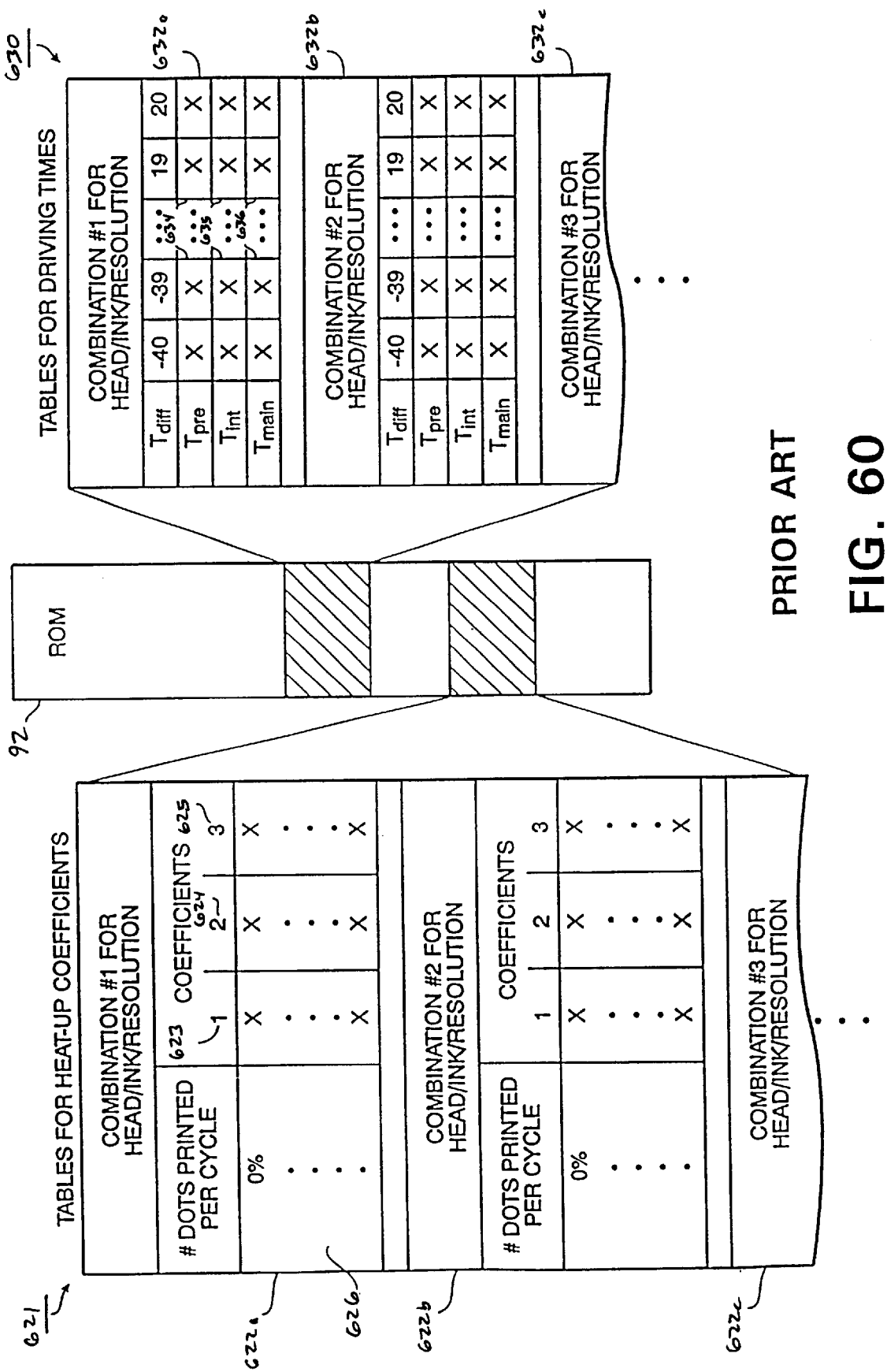
FIG. 60 is a diagram showing exploded views of tables for heat-up coefficients and tables for driving times stored in a printer.

As shown in FIG. 60, one portion of ROM 92 includes pre-stored tables 621 for heat-up coefficients. The tables include plural tables 622a, 622b, etc., one table for each different combination of printer head, ink characteristics, and resolution. Each of the plural tables includes tabularly accessed coefficients such as the coefficients labelled 1, 2 and 3 (reference numerals 623, 624 and 625), which are accessed through look-up operations based on the number of ink drops ejected in any one particular interval, for example, 50 msec. Printer 10 selects one heat-up table from the tables stored at 621, based on a default selection or based on a commanded selection, and then selects heat-up coefficients from the selected table based on the number of droplets ejected in a 50 msec period.

The coefficients obtained through look-up operation in tables 621 are used to calculate the effect on print head temperature by ink droplet election. One suitable calculation is as follows:

$$\Delta T_{main} = (\text{coeff1}\ (\#\ \text{black droplets ejected})) + (\text{coeff2}\ (\#\ \text{color droplets ejected})) + (\text{coeff3}\ (\text{heater duty cycle})) - \text{coeff4}$$

where coeff1 is a heat-up coefficient based on the number of black ink droplets ejected, coeff2 is a heat-up coefficient based on the number of color droplets ejected, coeff3 is a heat-up coefficient based on the current duty cycle of the heater, and coeff4 is a heat-up coefficient which actually shows cool down of the print head based on inactivity. Of course, the actual coefficients and calculations used depend on the head/ink/resolution combination. For example, the calculation given above is suitable for a four-color print head whereas an all-black print head would use a different calculation that excludes, for example, dependence on the number of color droplets ejected.

Armed with the environmental temperature $T_{env}$, the target temperature $T_{tgt}$ and the print head temperature effect $\Delta T_{main}$, step S5910 calculates the difference $\Delta T_{diff}$, as follows:

$$T_{diff} = T_{tgt} - T_{env} - \Delta T_{main}$$

Step S5911 accesses a look-up table in ROM 92 that stores pulse width times for a pulse width driving sequence, based on the temperature difference $T_{diff}$. Suitable tables are illustrated diagrammatically in FIG. 60 as described below.

Specifically, as shown in FIG. 60, ROM 92 includes look-up table 630 for storing driving times. The driving times are pulse widths for a pulse sequence used to drive nozzle heaters to eject an ink droplet. A typical pulse sequence is shown at 640 in FIG. 59, and includes a pre-heat pulse of width $T_{pre}$, a quiescent period of width $T_{int}$, and a main heating pulse of width $T_{main}$. Such a pulse sequence is applied to nozzle heaters in each nozzle of print heads 100a and 100b so as to eject a droplet of ink for printing. It is the purpose of table 630 to calculate each of $T_{rep}$, $T_{int}$ and $T_{main}$ based in part on the temperature difference calculated in step S5910.

At the same time, it is recognized that the pulse widths of the pulse driving sequence differ based on particular combinations of print head, ink characteristics, resolution, and the like. Accordingly, as shown in FIG. 60, tables 630 include individual tables such as 632a, 632b, etc. Each table 632a, 632b, etc. is tailored for a particular combination of print head, ink type and resolution. As shown at 630, each table includes entries 634 for the width of the pre-heat pulse $T_{pre}$, entries 635 for the width of the quiescent interval $T_{int}$, and entries 636 for the width of the main heating pulse $T_{main}$. Any one particular entry is accessed through look-up operation based on the temperature difference $T_{diff}$ calculated at step S5910.

Printer 10 selects one table of driving time from the tables stored at 630, based on a default selection or based on a commanded selection. Printer 10 thereafter accesses the entries in the selected table, and looks up appropriate times for the pre-heat pulse, the quiescent interval, and the main heat pulse, all based on the temperature difference calculated in step S5910, and in a particular combination of print head/ink/resolution.

Reverting to FIG. 59, step S5912 modifies the driving times obtained by look-up operation from table 630, based on the control ratio for driving that was received in step S5901. The purpose of this step is to allow for modification of pre-stored values from look-up tables 630, taking into consideration any difference between an actual print head mounted in printer 10, and the print head combination stored in table 630. In more detail, and as explained previously, although ROM 92 of printer 10 is pre-stored with plural tables for driving times, with each table tailored to a particular combination of print head/ink and resolution, it is not possible to anticipate each and every combination of print head/ink and resolution. Modification in step S5912, therefore, allows for use of previously unknown, or otherwise unstored, combinations of print head/ink and resolution.

Modification in step S5912 is preferably through multiplication of the driving times obtained through look-up operation in step S5911 by the control ratio received in step S5901. For this reason, the default control ratio is 100%. The control ratio that is commandable through the change pulse control ratio command [PCR] is constrained to lie between 1% to 200%, thereby allowing modification of pulse times from effectively negligible pulse times up to twice the values stored in tables 630.

Flow then advances to step S5914, in which printer 10 looks up heat-up coefficients for head temperature calculations. As described previously in connection with tables 621 of FIG. 60, heat-up coefficients are obtained based on a particular combination of print head, ink and resolution, and are looked up from one of tables 622a, etc. based on the number of dots printed per cycle, each having a duration of approximately 50 msec.

Step S5915 modifies the heat-up coefficients based on the control ratio received in step S5903. Again, the purpose of such modification is to permit usage of a particular combination of print head, ink and resolution not already stored in one of tables 621.

Preferably, modification of the heat-up coefficients in step S5915 is through multiplication of the coefficients obtained through look-up operation in step S5914 by the control ratio received in step S5903. For this reason, the default control ratio is 100%. The control ratio that is commandable through the change pulse control ratio command [PCR] is constrained to lie between 1% to 200%, thereby allowing modification of heat-up coefficient from effectively negligible values up to twice the values stored in tables 221.

In step S5916, printer 10 controls nozzle driving based on the modified driving times obtained in step S5912, all in response to a command from host processor 2 that sends print data to printer 10, and a command for printer 10 to print such data (step S5917). Flow repeats as before, with steps S5906 through S5915 being executed at 50 msec cyclic intervals, for example, and with control over nozzle driving based on modified driving times, as set out in step S5916, being executed as commanded by host processor 2. In addition, it should be recognized that control ratios for driving, as well as control ratios for head temperature calculations, may be sent from host processor 2 at any time, and are responded to by printer 10 as set out in steps S5901 and S5903 described above.

Figure 61:
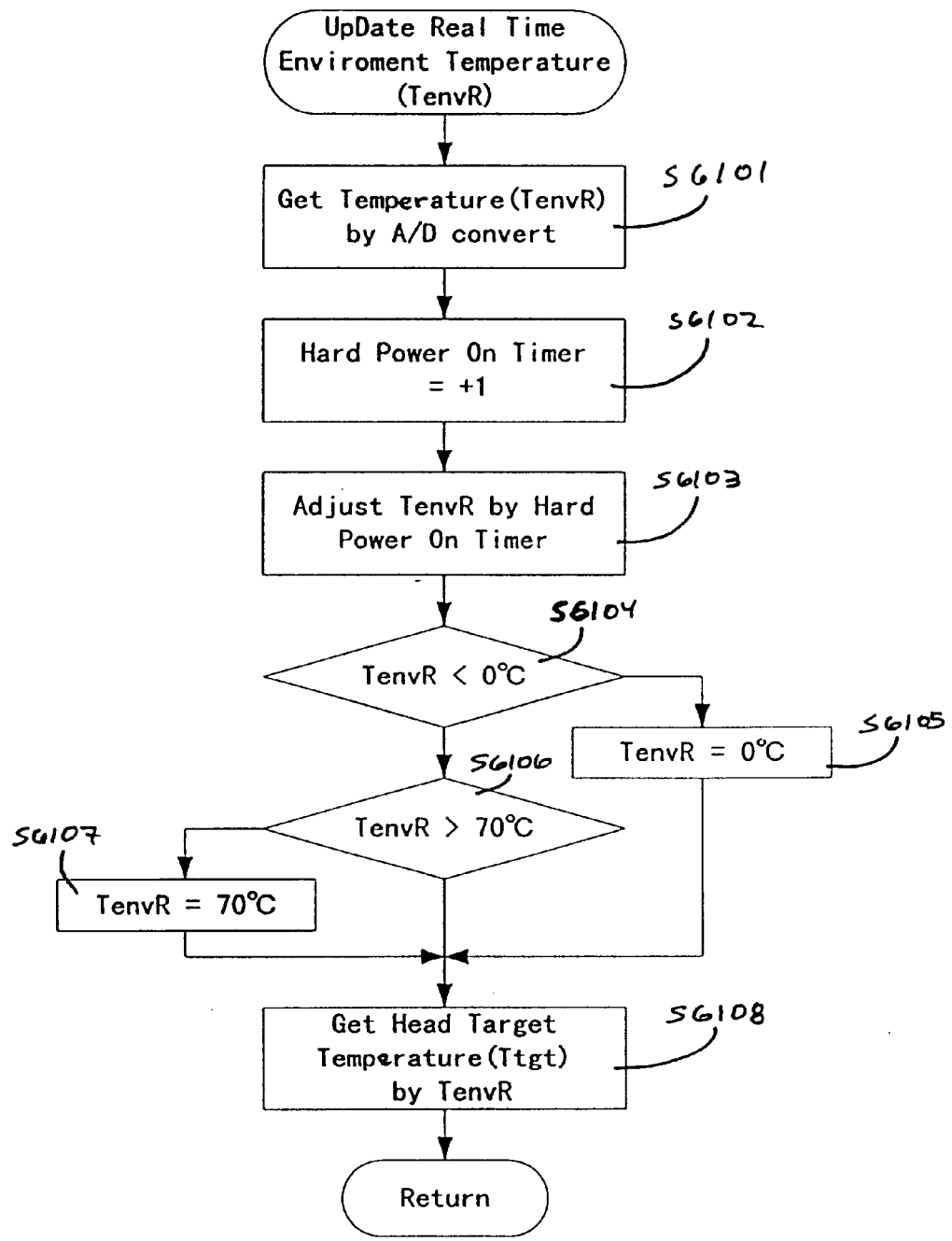
FIG. 61 is a flowchart for describing use of a real-time environmental temperature for determination of driving times.

FIG. 61 is a flowchart for describing use of a real-time environmental temperature for determination of driving times. In the preferred embodiment of the invention, environmental temperature $T_{env}$ used for determination of driving times for nozzles of a print head is real-time environmental temperature $T_{envR}$.

Accordingly, in step S6101, real-time temperature $T_{envR}$ is measured using temperature sensor 103a shown in FIG. 9 and is retrieved through an A/D converter and I/O ports 96. In step S6102, a hard-power-on timer is incremented. Then, in step S6103, real-time temperature $T_{envR}$ is updated using the hard-power-on timer so as to account for effects of continued operation of printer 10 on environmental temperature.

In step S6104, it is determined if $T_{envR}$ is less than zero degrees Celsius, in which $T_{envR}$ is set equal to zero degrees Celsius in step S6105. Likewise, in step S6106, it is determined if $T_{envR}$ is greater than seventy degrees Celsius, in which case $T_{envR}$ is set equal to seventy degrees Celsius.

In step S6108, a head target temperature is retrieved as explained above with reference to FIGS. 39 and 40, using $T_{envR}$ as $T_{env}$.

Figure 62:
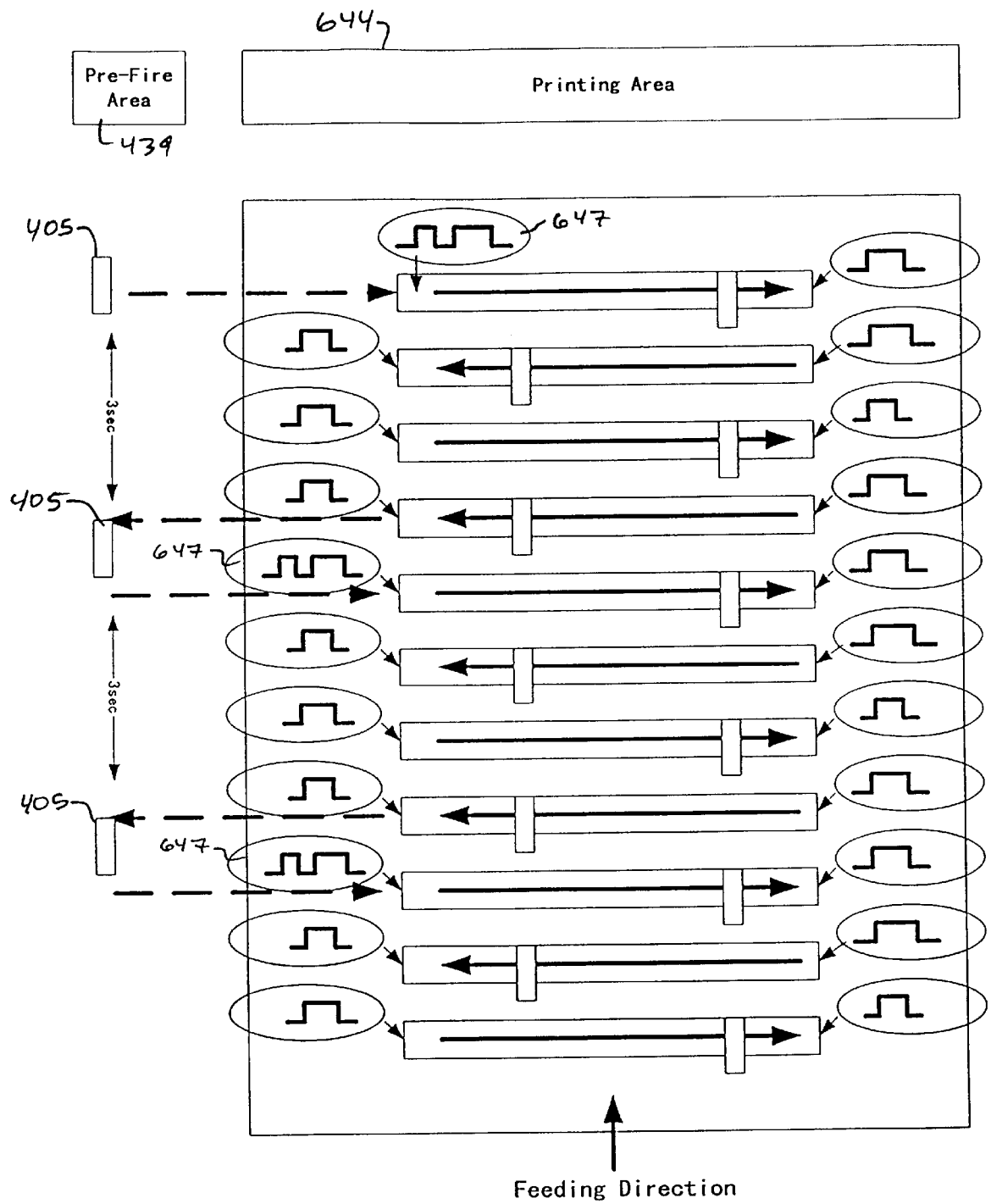
FIG. 62 is a diagram for describing heat pulse width modulation during printing of plural scan lines.

FIG. 62 is a diagram for describing control of heat pulse width modulation after automatic prefire operations performed based on a fixed time interval.

As shown in FIG. 62, pulse width modulation varies across each scan line so as to maintain stable printing density. Prefire operations occur after scan lines during which a three second time interval from a previous prefire operation expires.

After each prefire operation, cartridge receptacle 405 must move from prefire area 439 to printing area 644 before printing can resume. A print head carried by cartridge receptacle 405 cools during this motion. As a result, after a prefire operation, maximum pulse width 647 is employed when printing resumes, as shown in FIG. 62. It should be noted that the pulse widths actually comprise a pre-heat pulse, a quiescent interval, and then a main pulse as illustrated for maximum pulse width 647.

The control of heat pulse modulation illustrated in FIG. 62 may be sufficient to maintain printing quality in a case that prefiring occurs based on a single short fixed time interval. However, the heat pulse modulation can be modified to accommodate better the prefire operations according to the invention, in which prefire operations can be separated by varying time intervals as discussed above in Section 8.1.1.

Figure 63:
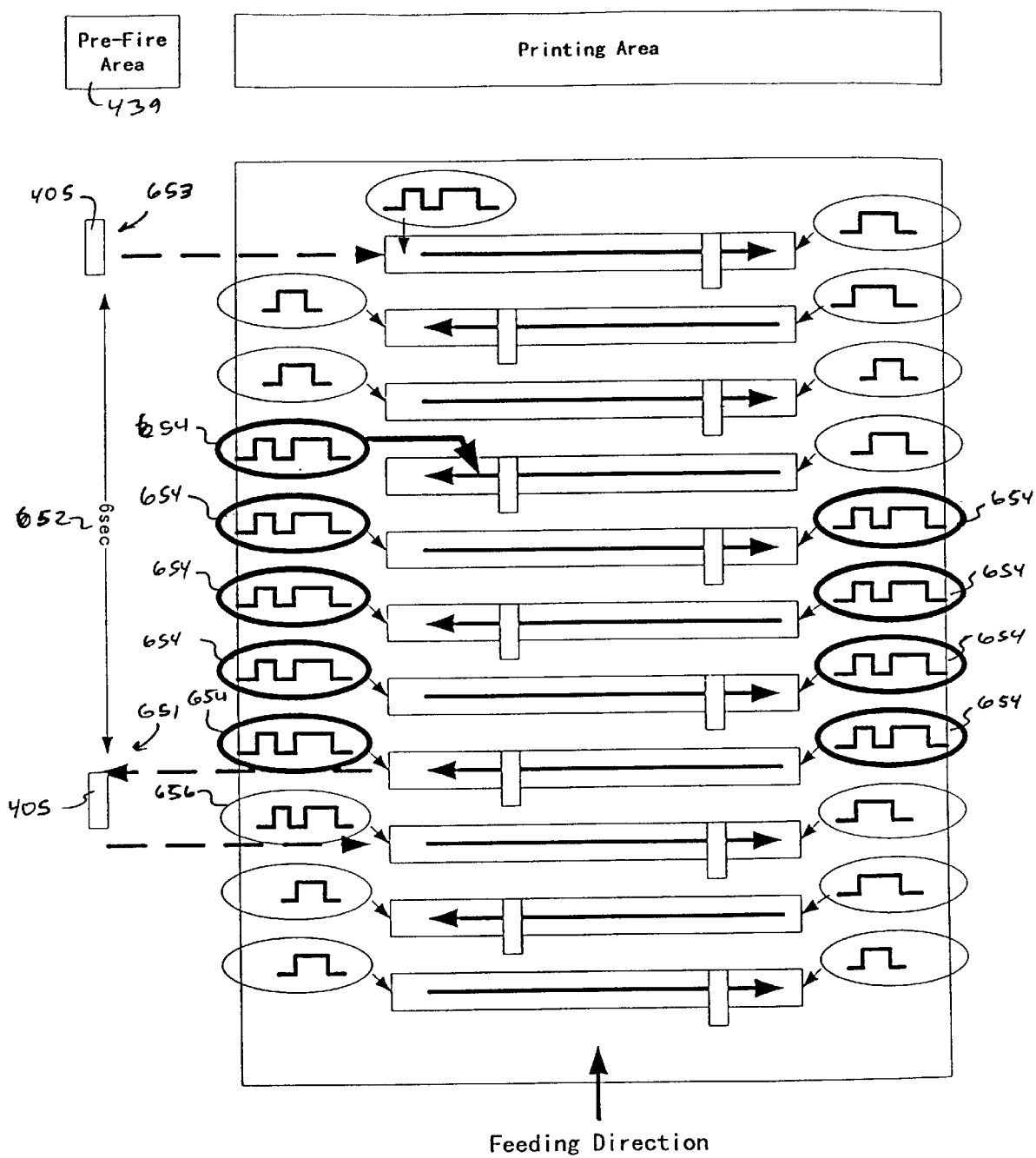
FIG. 63 is a diagram for describing heat pulse width modulation according to the invention in which a heat pulse width is maximized after a first time interval since a previous prefire operation.

FIG. 63 is a diagram for describing heat pulse width modulation for a print head according to the invention in which a heat pulse width is maximized after a first time interval since a previous prefire operation.

In FIG. 63, prefire operation 651 occurs after six-second interval 652 since previous prefire operation 653. Six second interval 652 is an example of a long interval during which a nozzle-number-change is not detected. Such long intervals are described above with reference to FIGS. 50 and 51.

During the first part of the long interval, the nozzles of a print head carried by cartridge receptacle 405 are operating in a "safe region". This safe region is defined by a threshold before which prefire operations are not performed even if a change in a number of driven nozzles occurs, also as described above with reference to FIGS. 50 and 51. During the safe region of operation, the nozzles tend to remain free of drying or coagulating ink. Accordingly, pulse width modulation along the lines discussed above with respect to FIGS. 59 to 62 results in acceptable image quality.

After the safe region, the nozzles of a print head carried by cartridge receptacle 405 are operating in a "sensitive region", again as described above with reference to FIGS. 50 and 51. During this sensitive region of operation, ink can begin to dry or coagulate in the nozzles of the print head. Therefore, according to the invention, maximum pulse width 654 is used to drive the nozzles when operating in the sensitive region. Likewise, if prefire is delayed until the "danger region" of operation discussed above with reference to FIGS. 50 and 51, a maximum pulse width continues to be used to drive the nozzles.

After a prefire operation, maximum pulse width 656 is used to drive the nozzles to account for cooling of the print head while cartridge receptacle 405 moves from prefire area 439 to the printing area. Then, pulse width modulation along the lines described above with respect to FIGS. 59 to 62 resumes, until the nozzles again are operating in a sensitive or danger region.

Figure 64:
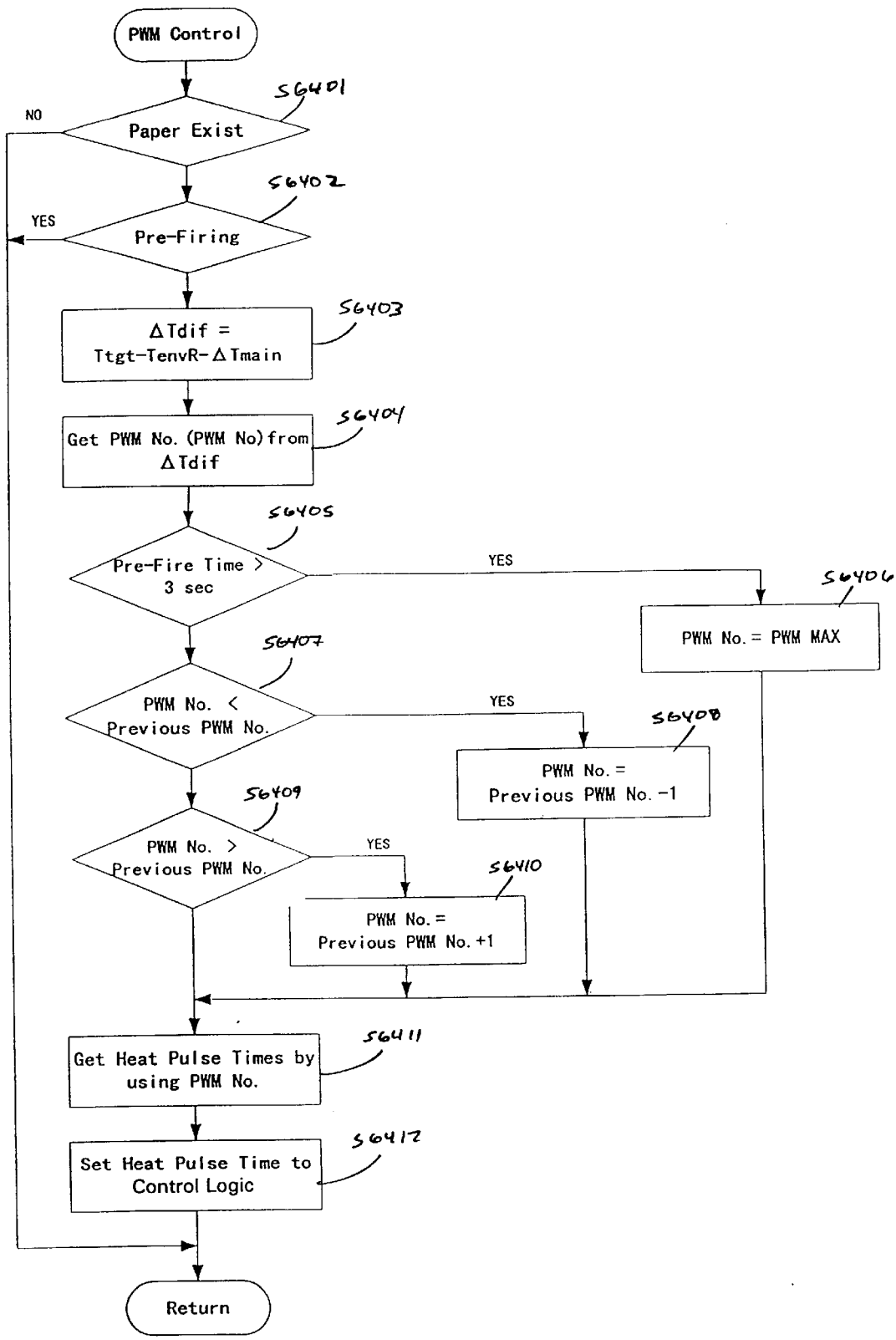
FIG. 64 is a flowchart for describing heat pulse width modulation according to the invention in which a heat pulse width is maximized after a first time interval since a previous prefire operation.

FIG. 64 is a flowchart for describing heat pulse width modulation according to the invention in which a heat pulse width is maximized after a first time interval since a previous prefire operation. This pulse width modulation control represents a modification of the pulse width modulation control described above with reference to FIGS. 59 to 62.

The pulse width modulation control of FIG. 64 preferably is executed repeatedly by print control 110 at cyclic intervals of, for example, 50 msec so as to update pulse width modulation in real time. More specifically, the pulse width modulation control of FIG. 64 is executed every 50 msec, for example, from step S1906 of FIG. 19.

In step S6401, it is determined if a recording medium is loaded into printer 10. If no recording medium is loaded, printing does not occur, and flow returns to FIG. 19. Otherwise, flow proceeds to step S6402, where it is determined if a prefire operation is underway. If a prefire operation is underway, pulse width modulation is controlled according to print head configuration as described above with reference to FIG. 56, so flow returns to FIG. 19. Otherwise, flow proceeds to steps S6403 and S6404.

In steps S6403 and S6404, pulse width modulation parameters are determined as described above with reference to FIGS. 59 to 62. In this embodiment of the invention, the pulse width parameters are returned in the form of a pulse number. A higher pulse number represents a heat pulse that causes a nozzle to eject more ink, and a lower pulse number represents a heat pulse that causes a nozzle to eject less ink.

It is determined in step S6405 if a prefire timer (PFT__A or PFT__B) is greater than a threshold (e.g., three seconds) defining a "sensitive region" for print head nozzle operation. If a prefire timer exceeds the threshold, flow proceeds to step S6406, and a maximum pulse width is used for pulse width modulation. By virtue of this step, a maximum pulse width is used during those times when nozzles are more likely to experience drying or coagulating of ink. The use of a maximum pulse width decreases the likelihood of nozzles becoming clogged, which would degrade image quality. Flow then proceeds to step S6411.

If a prefire timer does not exceed the threshold, step S6407 determines if the pulse number from step S6404 is less than the previously determined pulse width number. If the determined pulse number is less than the previous pulse width number, then in step S6408 the current pulse number is set equal to the previous pulse number minus one.

Likewise, step S6409 determines if the pulse number from step S6404 is greater than the previously determined pulse width number. If the determined pulse width number is greater than the previous pulse width number, then in step S6410 the current pulse number is set equal to the previous pulse number plus one.

By virtue of the operation of steps S6407 through S6410, a rate of change in current pulse width numbers is limited to one per time that the pulse width modulation function is called. As a result, changes in pulse width modulation tend to be smoother than in conventional systems, evening out resulting print density across a scan line.

In step S6411, the current pulse width number is converted into heat pulse times, which are sent to control logic 94 in step S6412. Then, flow returns to FIG. 19.

9.0 Color Printing Using Multiple Inks

Figure 65:
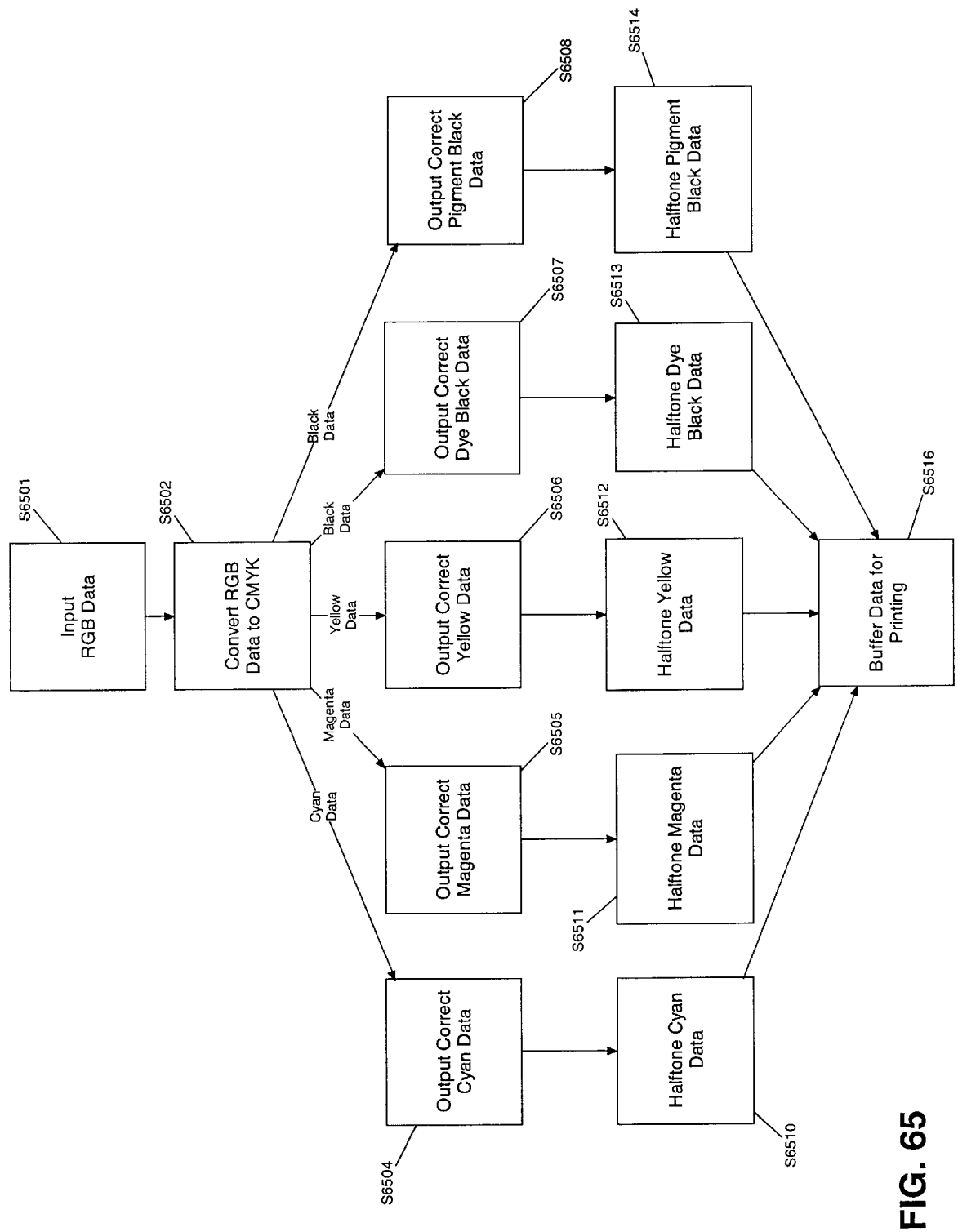
FIG. 65 is a flow diagram of computer-executable process steps to produce binarized data for five different inks based on RGB data of a pixel.

As described above, printer driver 84 performs various functions to convert input multilevel RGB data to binary CMYK data for use in printing. FIG. 65 is a flow diagram of computer-executable process steps to convert RGB data of a single pixel into corresponding binary data for each of yellow ink, magenta ink, cyan ink, black high-penetration ink and black low-penetration ink. The process steps are preferably included in printer driver 84 and executed out of RAM 86 by CPU 70.

Briefly, the FIG. 65 process steps include a first determining step to determine a first amount of low-penetration black ink corresponding to the multi-level value, a second determining step to determine a second amount of high-penetration black ink corresponding to the multi-level value and a printing step to print the pixel using the first amount of low-penetration black ink corresponding to the multi-level value and the second amount of high-penetration black ink corresponding to the multi-level value.

Specifically, flow begins at step S6501, in which RGB data for an input pixel is received. The input RGB data is preferably multi-value RGB data consisting of 8-bit red, green and blue values. The RGB data is converted to corresponding CMYK multi-bit values in step S6502. Next, in step S6504, a cyan data value resulting from step S6502 is subjected to output correction. In this regard, a magenta data value from step S6502 is subjected to output correction in step S6505 and output correction is performed on a yellow data value and a black data value produced in step S6502 in steps S6506 and S6507, respectively. Output correction is also performed, in step S6508, on the black data value produced in step S6502. It should be noted that output correction performed in S6508 is performed on the same black data upon which output correction is performed in step S6507, however, output correction in step S6507 produces an output-corrected value corresponding to black high-penetration ink and output correction performed in step S6508 results in a value corresponding to low-penetration black ink.

Figure 66:
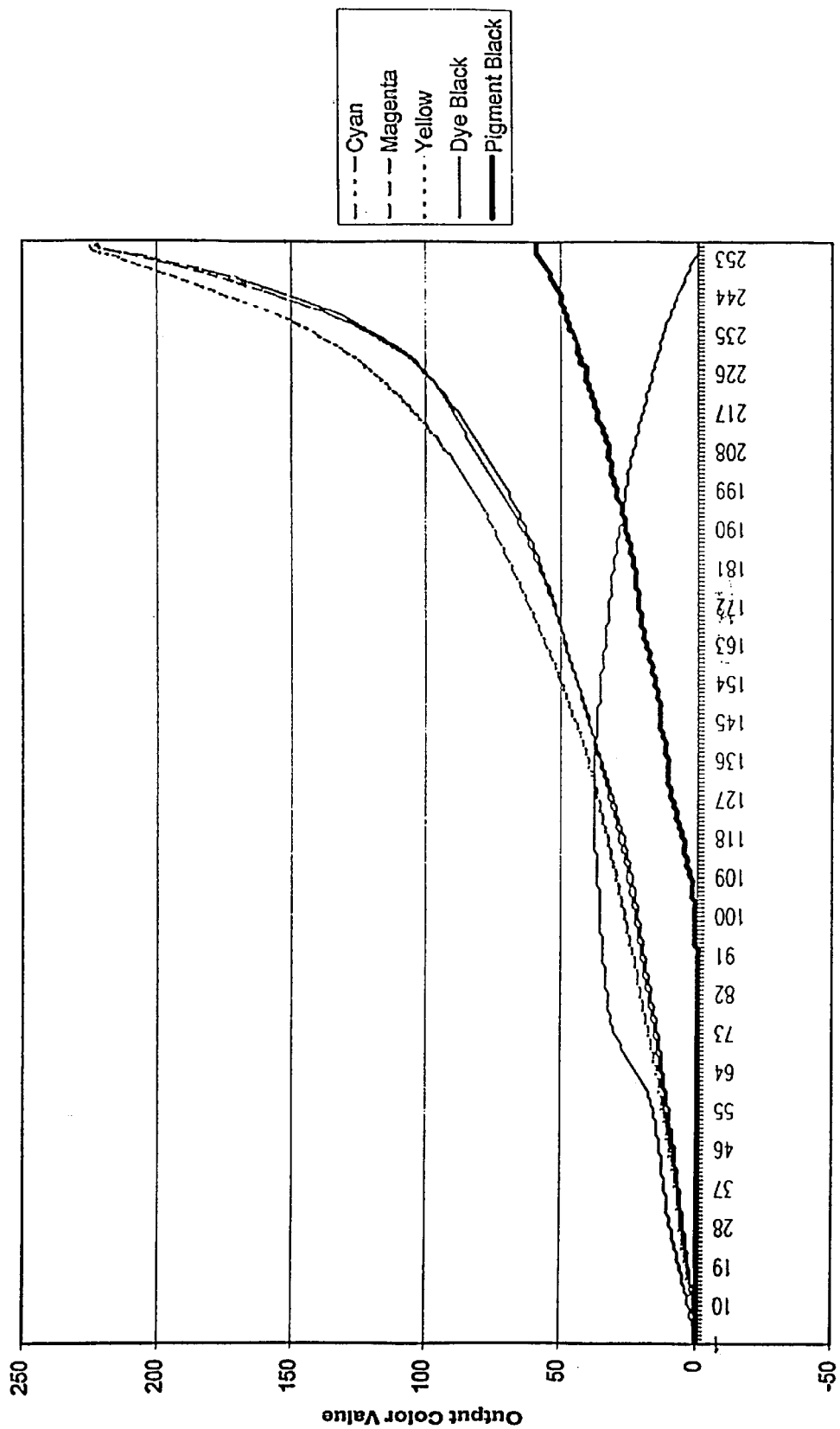
FIG. 66 illustrates a graph of input values versus output values for performing output correction on input values corresponding to five different types of ink.

FIG. 66 shows a graph which may be used for performing steps S6504 to S6508. In this regard, each graphed line in FIG. 66 represents corresponding input and output values used to perform output correction for a particular type of ink. For example, to perform output correction corresponding to dye black ink, an input black color value, produced in step S6502, is located on the horizontal axis, an imaginary vertical line is drawn to intercept the graphed line representing dye black ink, and an imaginary horizontal line is drawn from the interception point to the numbered vertical axis. The output-corrected value corresponding to the input color value is determined according to the point at which the imaginary horizontal line intersects the numbered vertical axis.

After output correction is performed as described above in steps S6504 to S6508, each output-corrected value is subjected to halftoning. Specifically, output-corrected cyan data is subjected to halftoning in step S6510, output-corrected magenta data is subject to halftoning in step S6511, output-corrected yellow data is subjected to halftoning in step S6512, output-corrected dye black data is subjected to halftoning in step S6513 and output-corrected pigment black data is subjected to halftoning in step S6514. It should be understood that the halftoning processes used in step S6510 to step S6514 will result in either a "0" or "1" value. As a result, when printing the pixel corresponding to the data input in step S6501, the pixel may be printed using no ink droplets, all ink droplets of each type of ink discussed above, or some combination thereof. Notably, and in contrast to conventional systems, both dye black ink and pigment black ink may be used to print the pixel. In step S6516, the halftoned data produced in each of steps S6510 to S6514 is placed in print buffer 109 for subsequent printing as described above.

In addition, the binarized data resulting from the process steps of FIG. 65 is preferably used to print yellow, magenta, cyan and high-penetration black ink droplets having a small droplet size and low-penetration black ink droplets having a larger droplet size. Such a configuration has been shown to produce high-quality text and black regions, while maintaining good quality within color regions.

10.0 Status-Based Control Over Printer

FIGS. 67 through 82 are used for explaining how the print driver obtains status of the printer and uses such status to control printer operations. In particular, these figures explain how the print driver uses status of the printer, and/or status of the printer coupled with the current environment of the computing equipment, so as to modify operational control parameters for the printer from their default values, and/or so as to modify the manner in which print data is derived by the print driver for printout by the printer, so that the print data is derived in a manner different from default methods taking into consideration the current status of the printer.

Many advantages result from status-based control over the printer. Specifically, operation of the printer is often fixed at design time with large operational margins, so as to accommodate all possible variations in status of the printer. While such large margins ensure operability across a large variety of possible status conditions, the large margins often result in inefficient usage at particular status conditions. Temperature, for example, is one example of printer status that causes large design margins in the printer, so as to accommodate good printer operation across a large variation in temperature. With large design margins, good printout can be obtained across a wide variety of temperatures. However, the cost of such printout is often decreased efficiency at one temperature (such as normal room temperature) so as to ensure good printout at another temperature (such a very cold or very warm temperatures). Representative embodiments of the invention, therefore, obtain printer status in the form of temperature, and modify how the printer is controlled based on the status, and/or modify how print data is derived based on such status.

10.1 Obtaining Status

Figure 67:
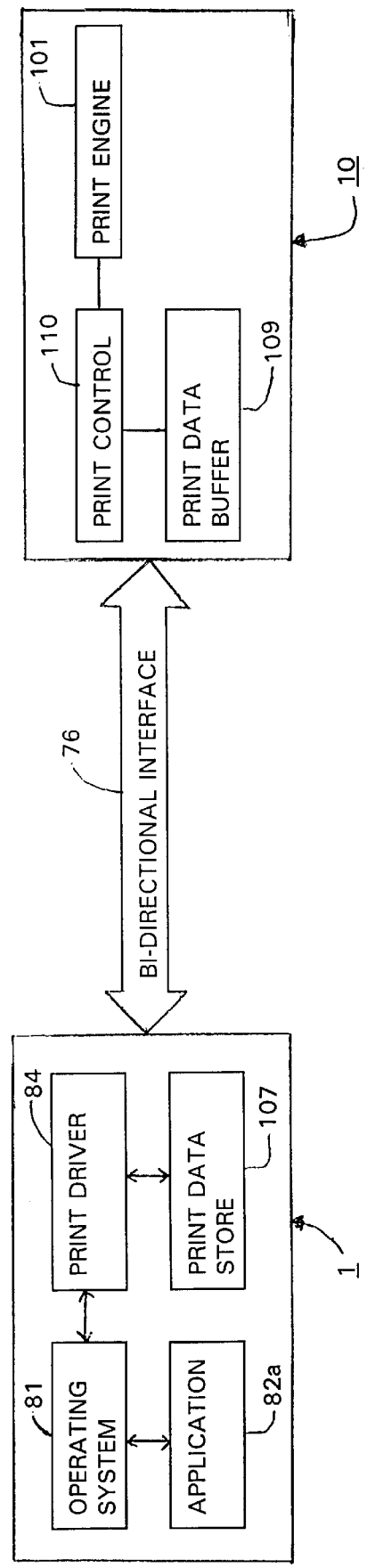
FIG. 67 is a functional block diagram showing computing equipment communicating with the printer.
Figure 68:
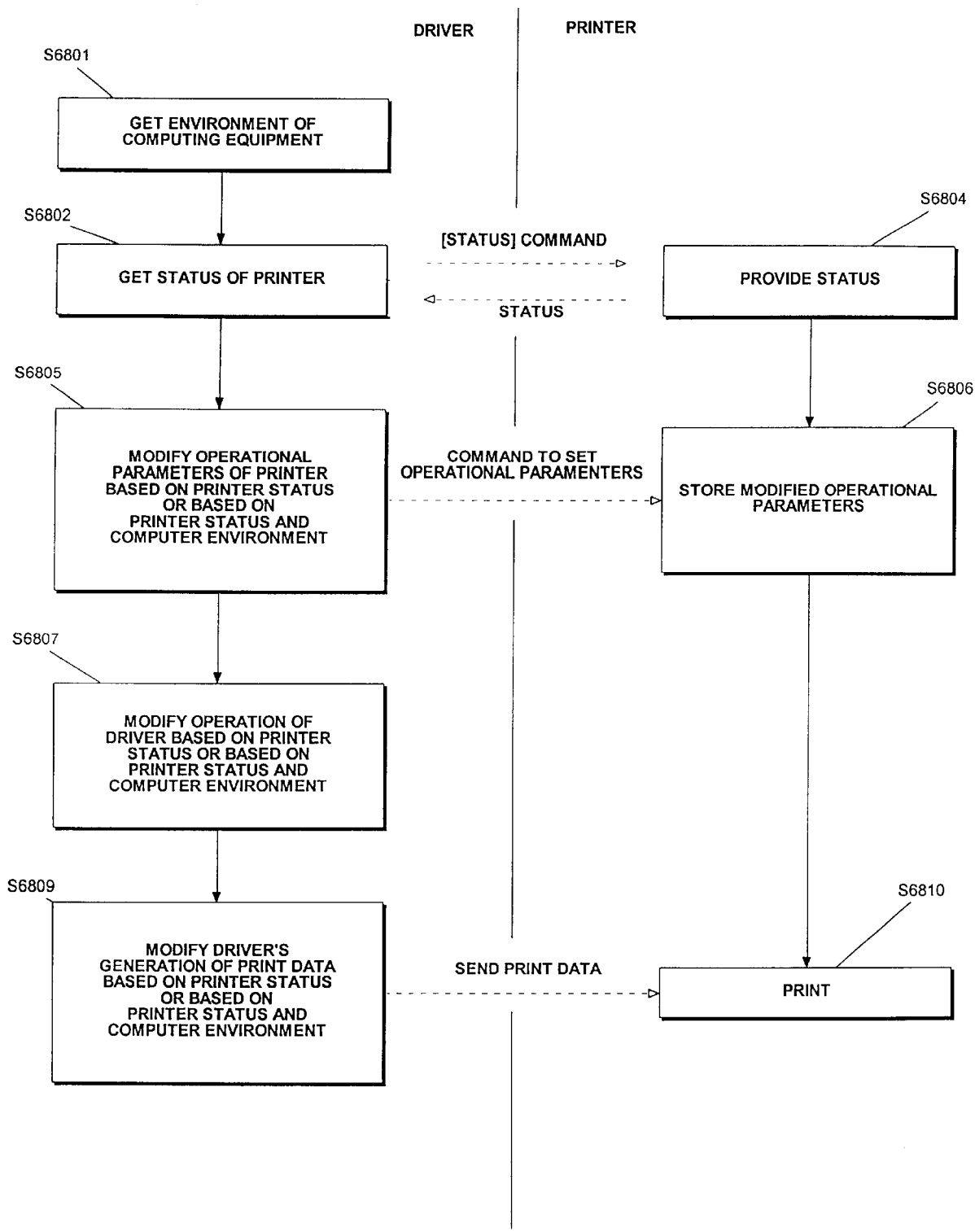
FIG. 68 is a flow diagram illustrating how print driver obtains status from printer and modifies processing of print data generation.
Figure 69:
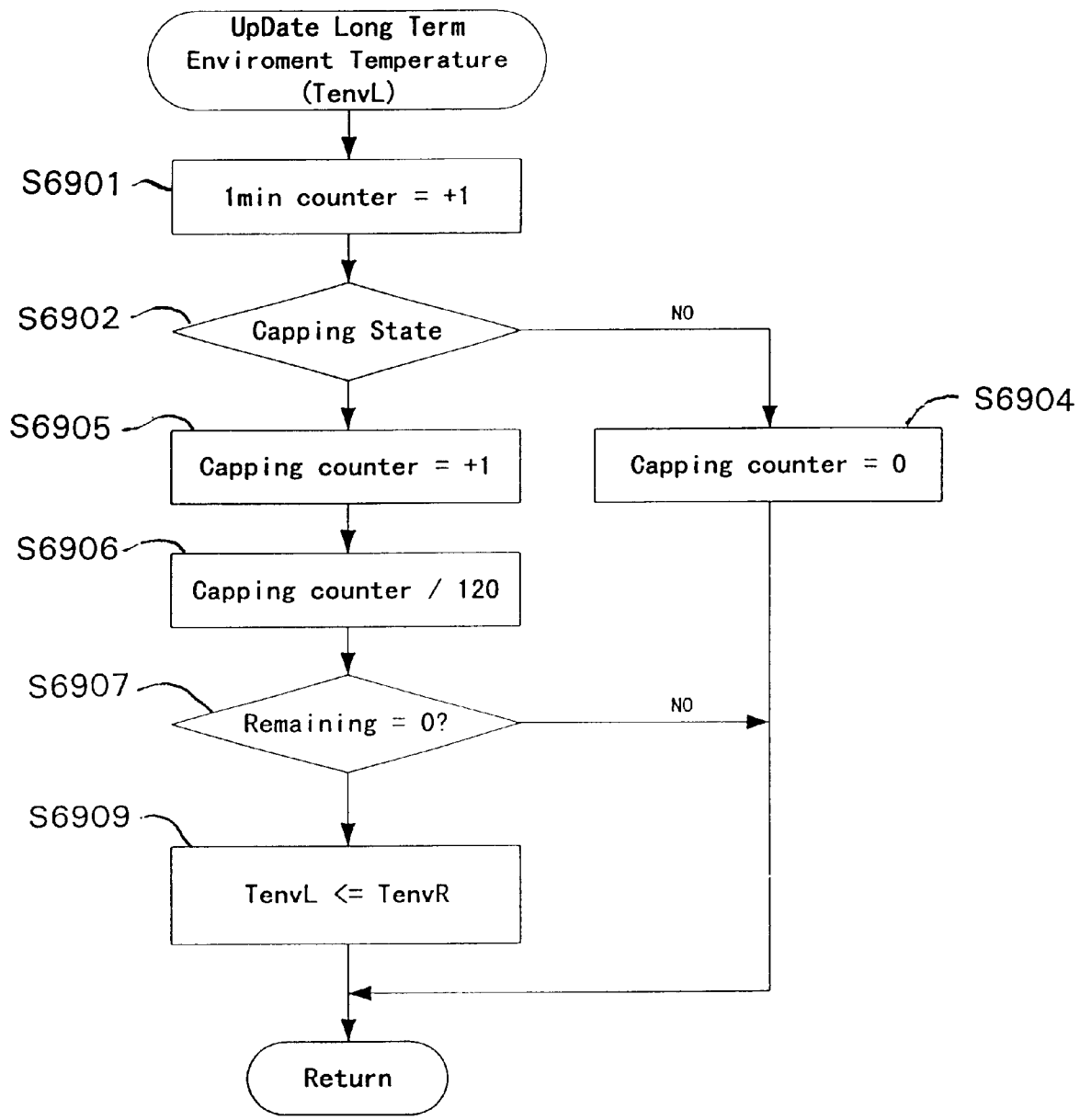
FIG. 69 illustrates a flow sequence executed by print controller.

FIGS. 67 through 69 illustrate generally how the print driver obtains status and uses the status to modify operational parameters of the printer and/or how the print driver derives print data, with such modifications departing from otherwise default processing.

FIG. 67 is a functional block diagram similar to those shown in FIGS. 9 and 18, showing computing equipment 1 communicating with printer 10. As shown in FIG. 67, computing equipment 1 includes operating system 81, an application program 82a which effects a print request, print driver 84, and print data store 107. Computing equipment 1 communicates to printer 10 over a bi-directional interface 76, such as a Centronix or a network interface. Printer 10 includes printer control software 110 which stores print data from print driver 84 in a print data buffer 109, and causes such print data to be printed by print engine 101.

FIG. 68 is a flow diagram illustrating how print driver 84 obtains status from printer 10 and modifies otherwise default processing of print data generation, and/or modifies otherwise default operational parameters for the printer, all based on the status so-obtained. In FIG. 68, processing shown on the left-hand side is processing performed by print driver 84 in computing equipment 1, whereas processing shown on the right-hand side is processing performed by print controller 110 in printer 10. All such operations are performed in response to a request from application program 82a to print a particular print job.

In step S6801, print driver 84 obtains the current environment of the computing equipment. Current environment includes, for example, time, date and location information, and other like environmental information available from the computer and its operating system 81. As shown below, such environmental information may be used by driver 84 to make even further refinements to the modifications made based on printer status. For example, certain operations may be performed more or less frequently, or not at all, at certain times of day.

In step S6802, print driver 84 obtains printer status. Print driver 84 obtains printer status by sending a [STATUS] command over bi-directional interface 76 to printer 10. Printer controller 110 responds in step S6804 by providing its current status to the print driver over bi-directional interface 76. Examples of status requested by print driver 84 and provided from printer 10 include printer temperature, firmware version for the printer as well as its capabilities and current configurations, current and on-going operations of the printer (such as cleaning, aligning, purging, sheet feeding), processor speed and power, and any of the variety of information available in the printer's EEPROM.

Flow in print driver 84 next advances to step S6805 in which the print driver modifies operational parameters of the printer based on the printer status so obtained, and/or based on the environment of computing equipment 10. Examples of operational parameters that may be changed in this step S6805 include adjustment of times between printhead prefires, adjustment of smear time, adjustment of automatic-sheet-feeder (ASF), speed for sheet feeding, adjustment of printhead purge speed, and the like. Print driver 84 modifies these operational parameters from their default values by transmission of appropriate commands over the bi-directional interface to printer 10, as described more fully below in connection with representative embodiments of the invention. Printer 10 responds to such commands in step S6806 by storing the modified operational parameters in place of their default values.

Flow in print driver 84 next advances to step S6807 in which print driver modifies its own operation, such a modification of its user interface, based on the printer status and/or based on the computer's environment. Examples of such operational modifications from otherwise default operations include the display of special messages to the user, such as a display of a message to delay insertion of a manually-fed sheet until after on-going printer operations have terminated.

Flow next advances to step S6809 in which the print driver modifies the manner in which it derives print data from otherwise default data processing, all based on the status of the printer and/or based on the status of the printer and the current environment of computing equipment 10. Examples of such print data processing modifications include modifications to printer correction tables so as to reduce effects of ink bleed and/or ink smear, modifications to data compression processing so as to change data compression algorithms to more efficient algorithms, or to turn off compression altogether in situations where the printer 10 can accommodate uncompressed data more quickly than compressed data, and the like. The print data so generated is sent over bi-directional interface 74 to printer 10 using the [DATA] command, in response to which printer 10 prints out such data in step S6810.

One important status variable obtained from printer 10 is current temperature of the printer. Here, temperature of the printer refers not to internal temperature of any of the printer components (such as the printer head or the printer circuit board), but rather to ambient temperature of the printer. Ambient temperature of the printer defines in large part the environment in which the printer is printing, and largely controls a variety of physical phenomena such as ink drying time, ink viscosity, recording media "slipperiness" (i.e., the ability of printer 10 to feed and to advance a recording medium from the sheet feed tray to the eject tray), and the like.

FIG. 69 illustrates a flow sequence executed by print controller 110 so as to obtain temperature. The flow steps illustrated in FIG. 69 are a more detailed explanation of step S1916 of FIG. 19, and obtain the status temperature of the printer based on the real time environmental temperature TenvR derived according to the steps illustrated in FIG. 61.

The overall effect of the process steps shown in FIG. 69 is to set the printer status temperature to the real time environmental temperature TenvR after the printer has remained inoperative in the capped state for at least two hours. The process steps shown in FIG. 69 are executed at the one minute interrupt level (see FIG. 19), and cause an increment in a running minute counter (step S6901). In step S6902, the capping state of the printer is investigated. If the printer is not currently in the capped state, flow branches to step S6904 in which a capping counter is reset to zero, whereafter flow terminates until the next one minute interrupt. On the other hand, if step S6902 determines that the printer is currently capped, then step S6905 increments a capping counter. Steps S6906 and S6907 determine whether the capping counter has reached 120, corresponding to 120 minutes in the capped state. If the capping counter has not reached a count of 120, then flow terminates until the next one minute increment. On the other hand, if the capping counter has reached 120, then the printer status temperature TenvL is set to the current value of the real time temperature TenvR. Flow thereafter terminates until the next one minute increment.

10.2 Bleed Reduction

Figure 70:
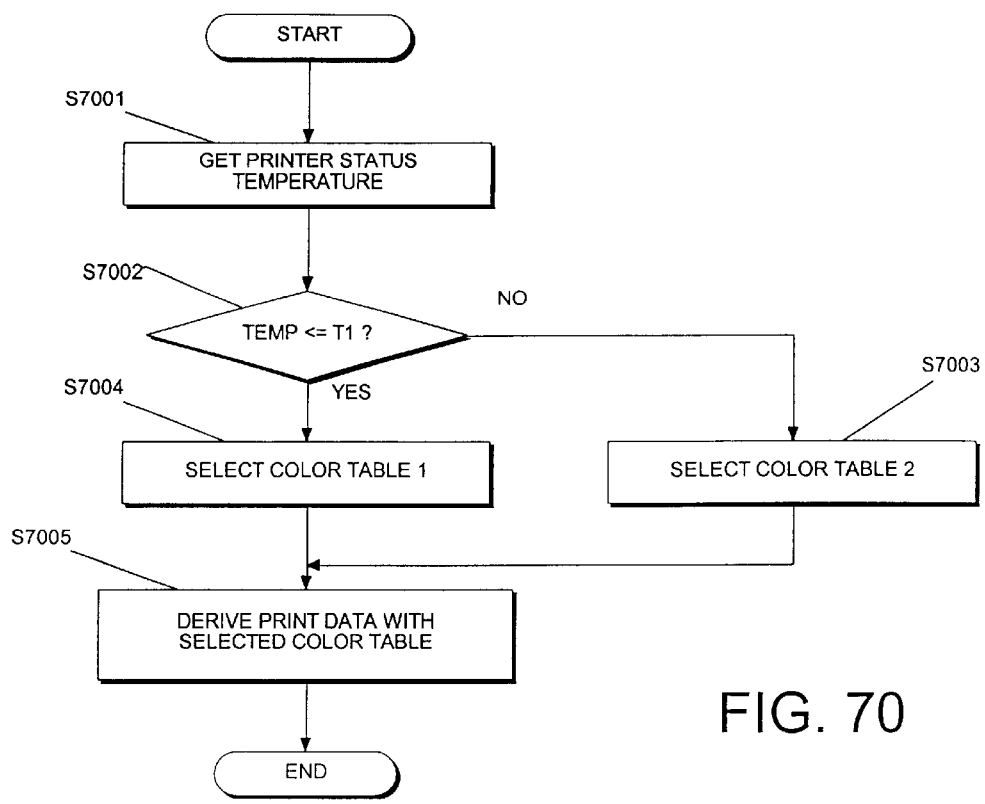
FIG. 70 illustrates process steps for bleed reduction.
Figure 72:
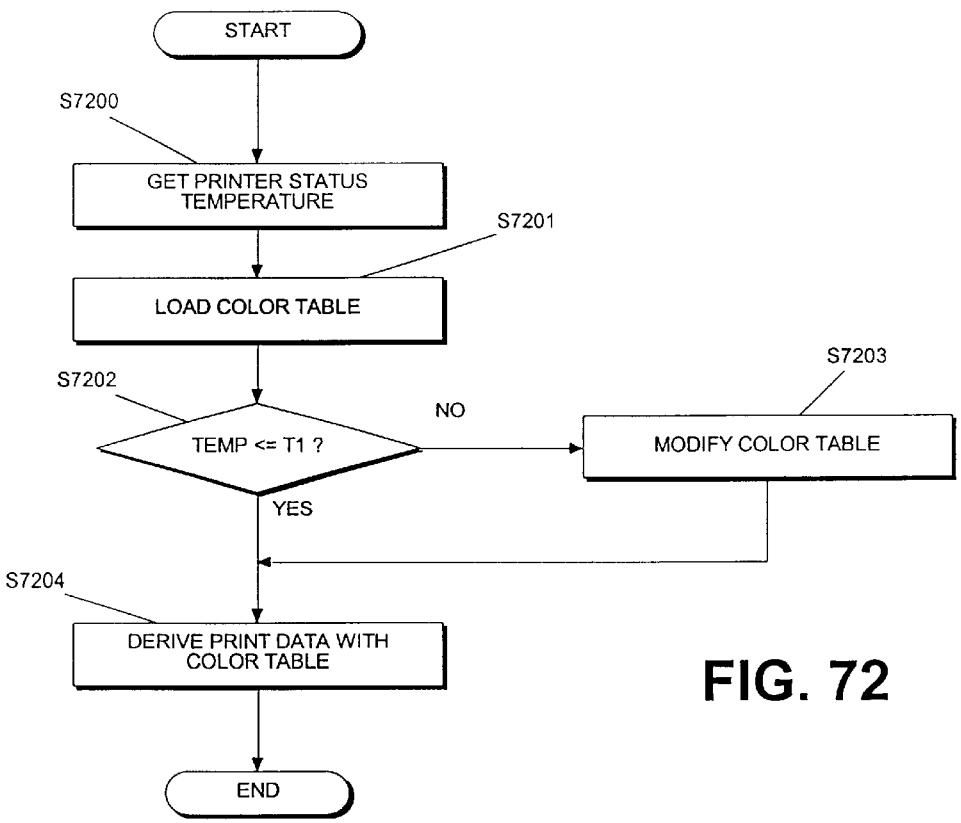
FIG. 72 illustrates values stored in Color Table 1 as opposed to values stored in Color Table 2.
Figure 71:
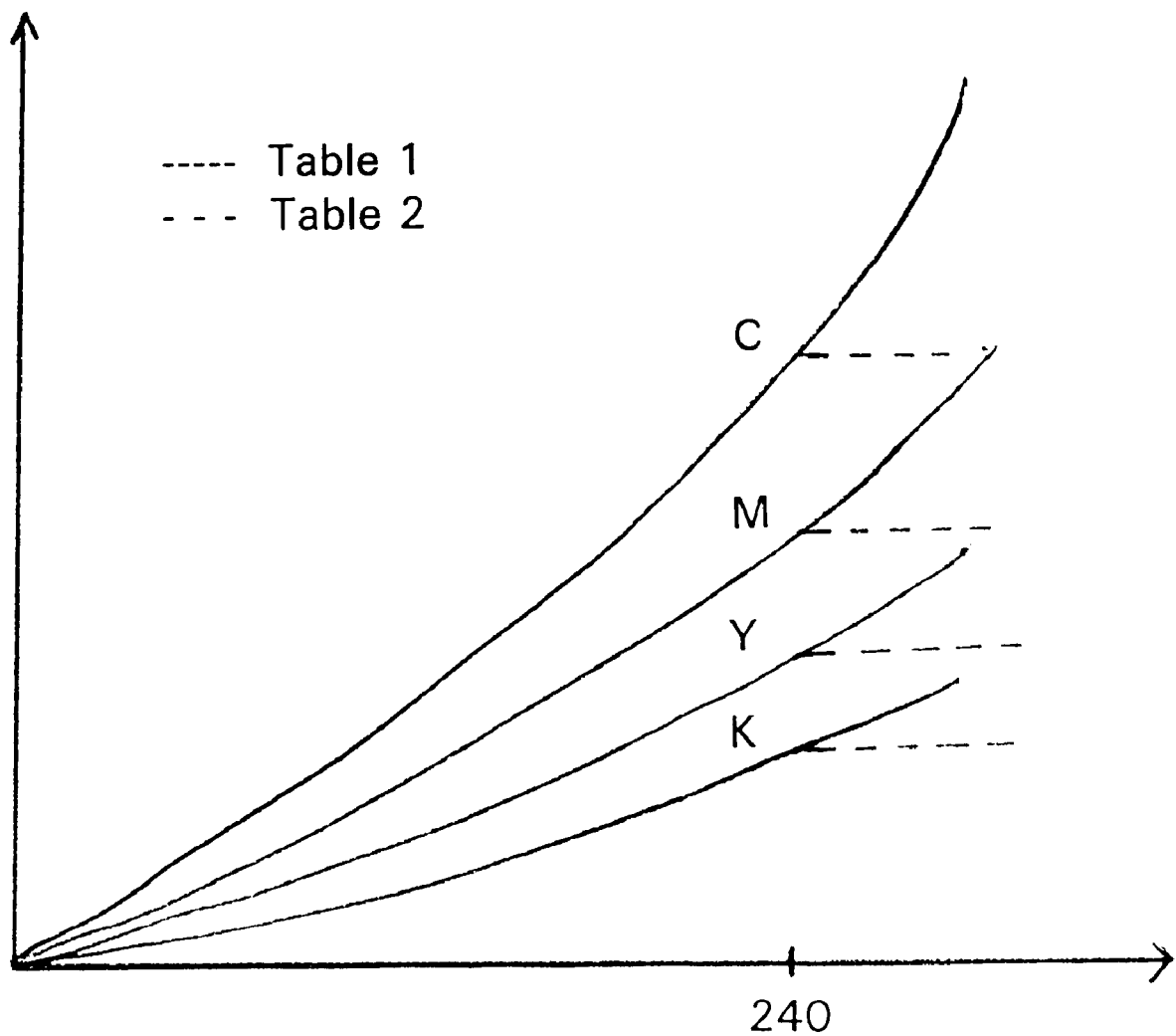
FIG. 71 is a graph of color values.

FIGS. 70 through 72 illustrate how driver 84 modifies its processing of print data from otherwise default processing, so as to reduce bleed, based on printer status. In the embodiments illustrated in FIGS. 70 through 72, modifications are based on printer status temperature TenvL, and the modifications act so as to reduce the overall amount of ink ejected by the printheads in high temperature situations where there is more possibility for ink bleeding.

FIG. 70 illustrates process steps for bleed reduction in which print driver 84 makes a selection of color tables based on the printer status. Thus, in step S7001, print driver 85 obtains printer status temperature TenvL. Step S7002 tests the printer status temperature against a fixed predetermined amount, preferably 32° C. If the printer status temperature TenvL is not less than or equal to the fixed predetermined temperature, then flow branches to step S7003 in which a color correction table is selected based on the higher possibility for ink bleed. Specifically, step 7003 selects color Table 2 which limits the amount of ink ejected by printer 10 for high temperatures. In this regard, it is inferred that high temperatures also involve high humidities, which increase overall ink drying time.

On the other hand, if step S7002 determines that the printer status temperature TenvL is less than or equal to the predetermined threshold, then flow advances to step S7004 to select a color correction table that does not limit the amount of ink ejected by printer 10 as much as color Table 2. Specifically, since printer temperature TenvL is relatively cooler, there is less possibility for ink bleed, and color table 1 is selected that allows for default processing.

FIG. 71 illustrates values stored in color table 1 as opposed to values stored in Color Table 2. FIG. 71 is a graph of such values, for each of cyan, magenta, yellow and black inks. The graphs give an output multilevel value obtained from the color table as a function of an input multilevel value. Values for table 1 are shown with solid lines. As seen in FIG. 71, output values for table 1, for each of cyan, magenta, yellow and black inks, increase gradually for increasing input values.

Values for table 2 are shown in dotted line, and for input values of zero through 240 are identical to values in table 1. However, beyond input value 240, values for table 2 are maintained at a constant level, thereby limiting the amount of ink ejected at higher temperatures and reducing the possibility of ink bleed.

In the embodiment shown in FIG. 70, different color tables were selected by print driver 84 based on the printer status temperature TenvL. It is also possible for print driver 84 to modify values in a look-up table, rather than to select between different look-up tables. FIG. 72 illustrates this alternative embodiment.

Thus, in step S7200, print driver 84 obtains printer status temperature TenvL. Next, in step 7201, a standard printer color correction table is loaded into memory. Step S7202 tests the printer status temperature against a fixed predetermined threshold such as 32° C. If the printer status temperature is less than or equal to the fixed threshold, then no modifications are made to the loaded printer color correction table. On the other hand, if the printer status temperature exceeds the fixed predetermined threshold, then flow branches to step S7203 where print driver 84 modifies the values in the color correction look-up table so as to reduce the possibility of ink bleed. Suitable modifications are modifications to values so as to obtain the values shown in FIG. 71.

By virtue of the foregoing, where the print driver modifies data processing from otherwise default data processing based on printer status, it is possible to reduce ink bleed.

10.3 Smear Reduction

"Smear" is a phenomenon by which ink on a recording medium currently in the ejection tray has not sufficiently dried, which allows the leading edge of a second recording medium currently being ejected from (or printed on by) the printer to smear the undried ink.

Figure 73A:
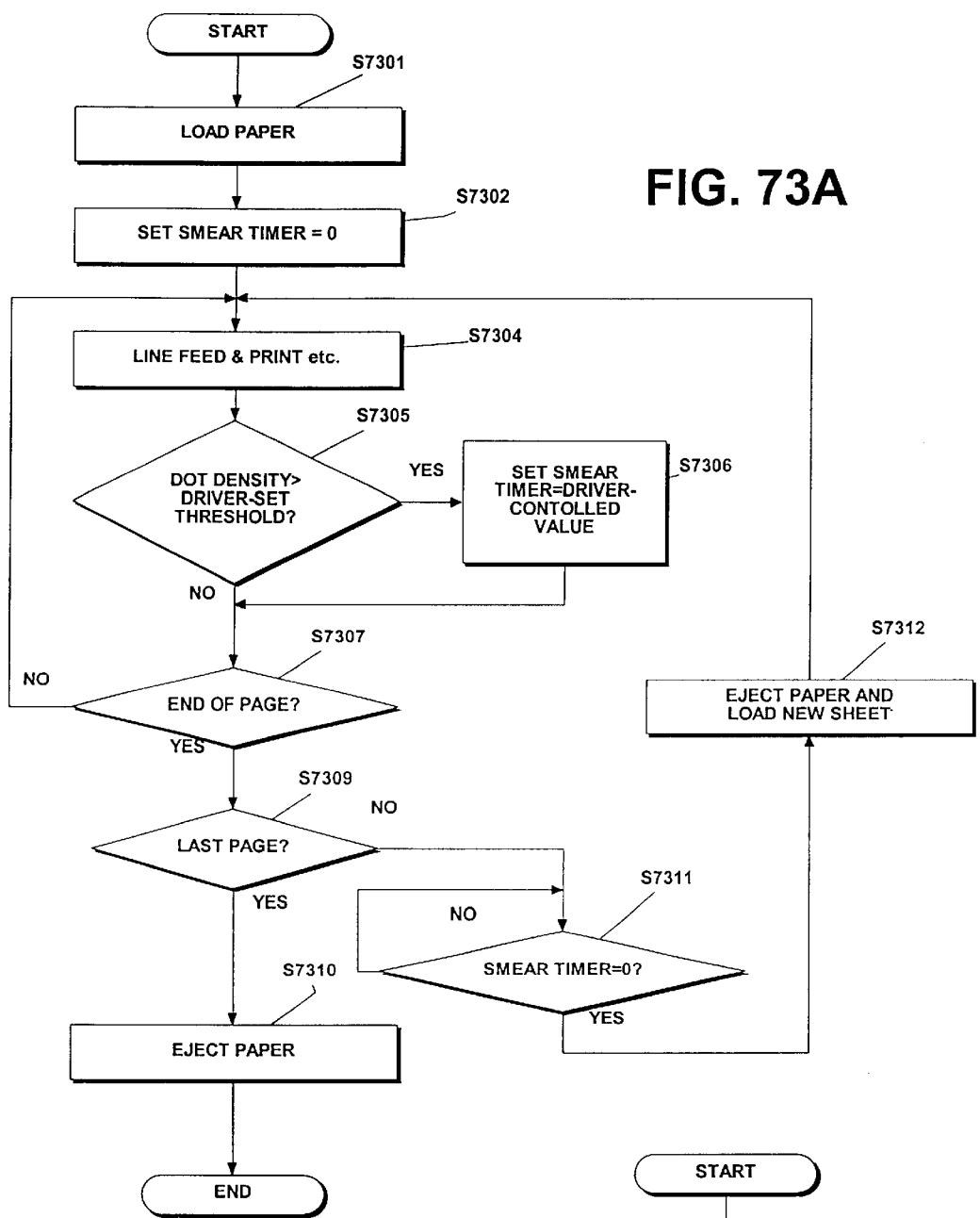
FIGS. 73A and 73B are flow diagrams for implementing smear control processing.
Figure 73B:
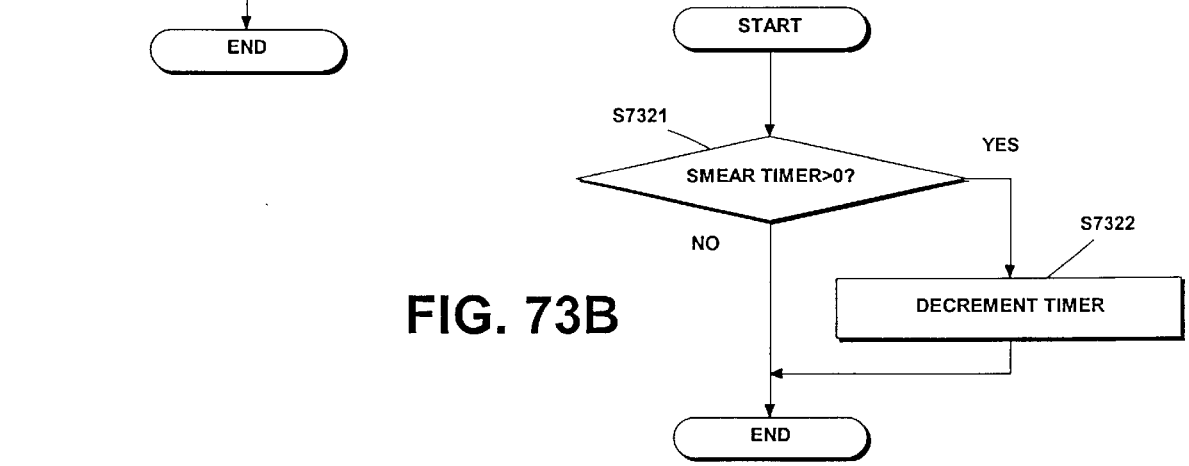

To control smear, print controller 110 implements smear control processing shown in FIGS. 73A and 73B. The processing in FIG. 73B is simple, and merely decrements a non-zero smear timer at the one second interrupt level (see step S1911 in FIG. 19). FIG. 73A shows how the smear timer is used in connection with currently printed dot density so as to reduce the possibility of undried ink being smeared by the leading edge of a subsequent recording medium.

Thus, in step S7301, printer 10 loads a recording medium from a print tray, and in step S7302 the print controller 110 sets the smear timer to zero. Step S7304 represents normal printout by the printer, during each scan of which the print controller 110 determines whether dot density for any one scan exceeds a driver-settable threshold for dot density (step S7305). Unless the dot density for any one scan exceeds the threshold, no special processing is needed because such low amounts of ink are being ejected onto the recording medium that the possibility for smear is greatly reduced. On the other hand, if step S7305 determines that the print dot density for any one scan exceeds the driver-settable threshold, then flow branches to step S7306 in which the smear timer is set to a driver controlled value. Since the smear timer is now non-zero, the smear timer will be decremented in accordance with the processing of FIG. 73B, explained above.

Figure 74:
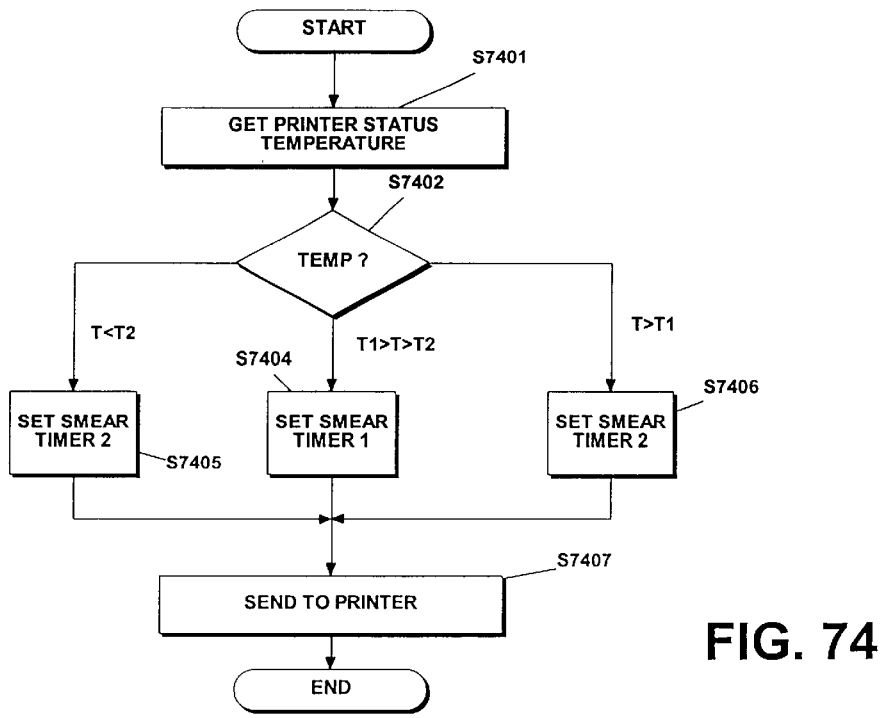
FIG. 74 is a flow diagram illustrating how the print driver sets the value for the smear timer.
Figure 75:
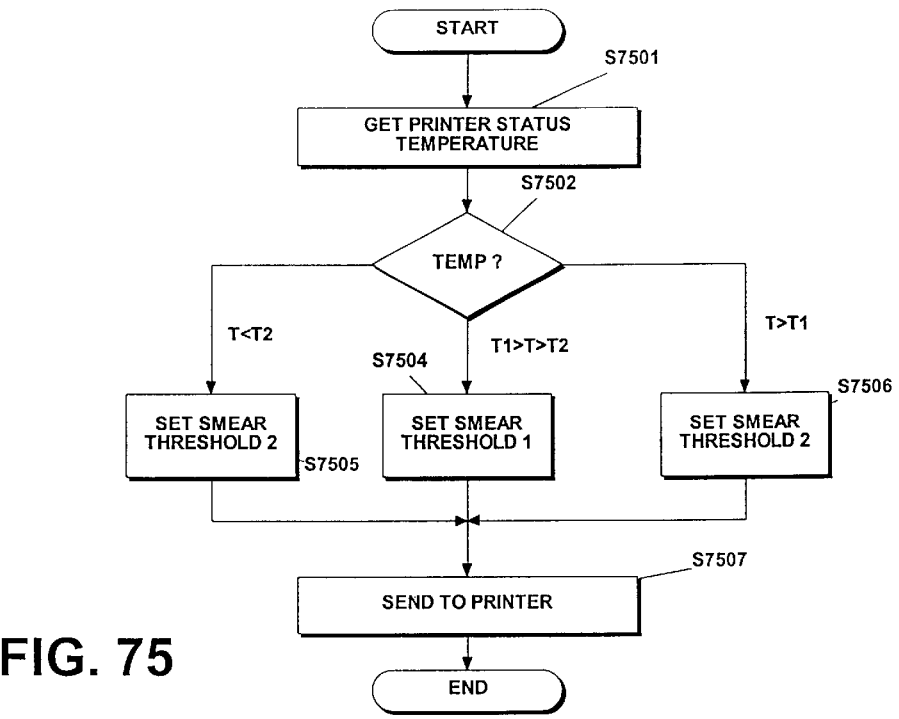
FIG. 75 is a flow diagram illustrating how the print driver sets the density threshold for smear control.

As will be appreciated in consideration of the following explanations of FIGS. 74 and 75, both the driver-settable print density threshold and the driver-controlled smear timer value are determined in accordance with printer status, thereby achieving a control in smear parameters based on printer status.

Returning to FIG. 73A, step S7307 determines whether an end of page has been reached, until which flow loops back up through step S7304. If end of page has been reached, then if the printed page is the last page (step S7309), the currently-printed recording medium is simply ejected (step S7310). On the other hand, if the currently-printed recording medium is not the last page, then flow branches to step S7311 which checks to determine whether the smear timer has yet been decremented to zero. Until the smear timer has been decremented to zero, the currently-printed recording medium is not permitted to be ejected. However, as soon as the smear timer has been decremented to zero, then flow advances to step S7312, where the currently-printed recording medium is ejected to the eject tray, a new recording medium is loaded from the supply tray, and flow loops back up to step S7304.

FIGS. 74 and 75 are flow diagrams illustrating how print driver 84 sets the value for the smear timer, and sets the density threshold for smear control, based on current status of printer 10. Thus, in FIG. 74, driver 84 calculates the value of the smear timer based on printer status and sends the value of the smear timer to printer 10. Specifically, in step S7401, driver 84 obtains printer status in the form of printer status temperature TenvL. Step S7402 tests the value of the temperature to determine whether it is in a nominal range between $T_1$ and $T_2$. Typical values for the range are between 15° C. and 35° C. If the printer status temperature TenvL is within the range $T_1$ and $T_2$, then the smear timer is set to a first value which contemplates short ink dry times coupled with lowered probability of ink smear (step S7404). On the other hand, if the printer status temperature TenvL is outside the range of $T_1$ and $T_2$, then driver 84 selects a second smear timer value which is larger than the first smear timer value, and which contemplates both longer ink drying times coupled with higher probability of smear. In step S7407, driver 84 sends the selected smear timer value to printer 10.

FIG. 75 illustrates process steps by which driver 84 modifies the dot density threshold based on printer status, and sends the modified value to printer 10. Thus, in step S7501, driver 84 obtains printer status in the form of printer status temperature TenvL. In step S7502, driver 84 tests the printer status temperature to determine whether it falls within a range of $T_1$ to $T_2$, such as between 15° C. and 35° C. If the printer status temperature falls within the range of $T_1$ to $T_2$, then a first density threshold value is selected which contemplates relatively fast ink drying times coupled with a correspondingly high density threshold. On the other hand, if the printer status temperature falls outside the range $T_1$ to $T_2$, then flow advances to steps S7505, or S7506, as appropriate, in which the smear threshold is set to a second value lower than the first value, which contemplates relatively long ink drying times coupled with a correspondingly lower density threshold. In step S7507, driver 84 sends the selected density threshold to printer 10.

10.4 Automatic Sheet Feed (ASF) Speed

Figure 76:
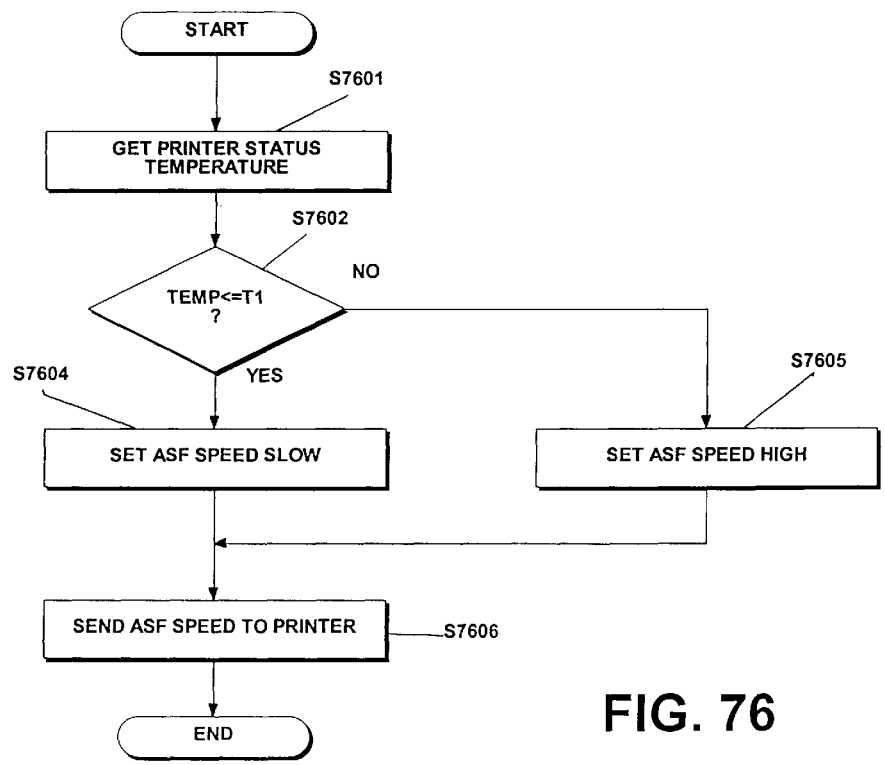
FIGS. 76 and 77 are flow diagrams for explaining how the print driver modifies speed at which the printer feeds sheets from the feed tray.
Figure 77:
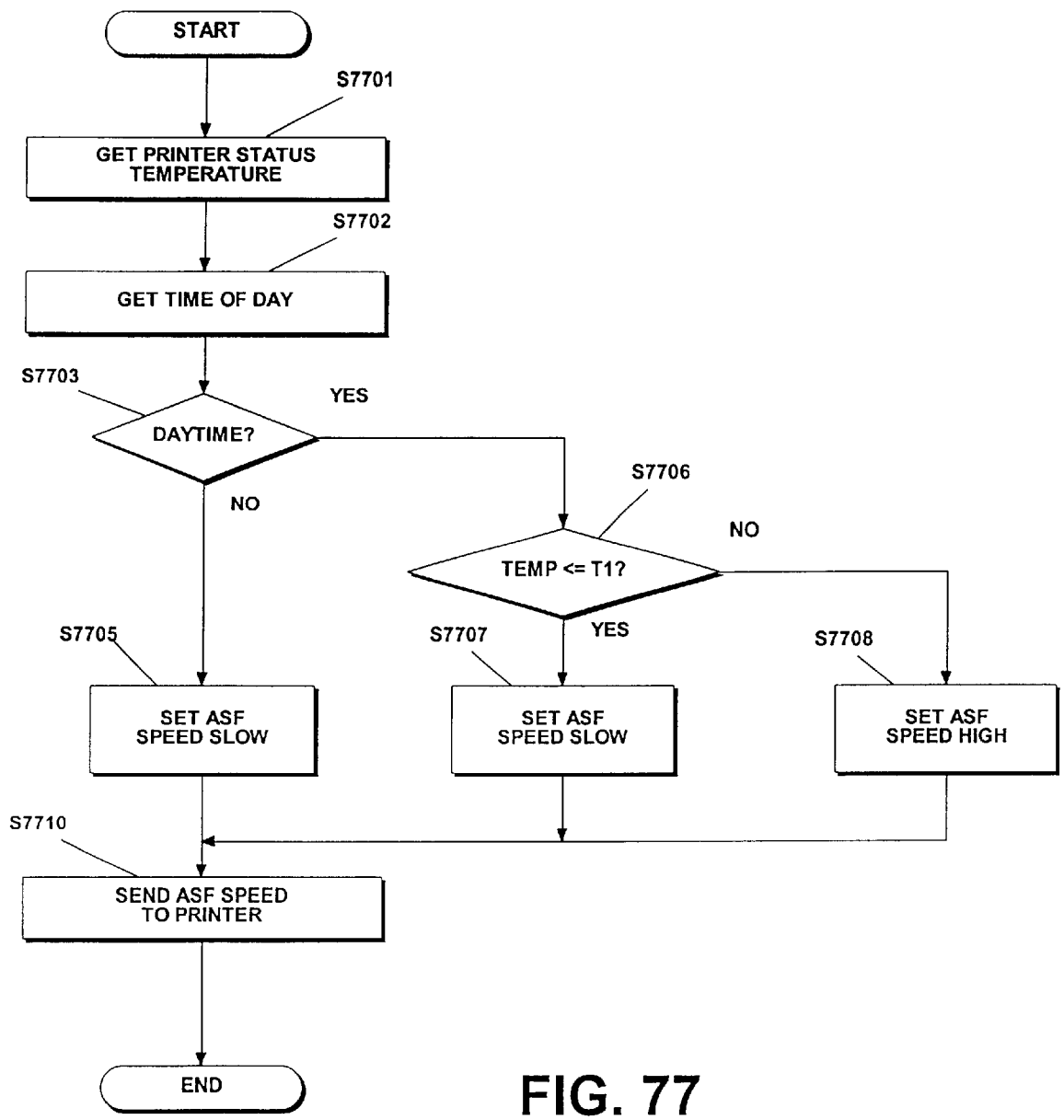

FIGS. 76 and 77 are flow diagrams for explaining how print driver 84 modifies speed at which printer 10 feeds sheets from the feed tray, based on printer status or based on printer status and current environment of computing equipment 1.

In the embodiments of FIGS. 76 and 77, printer status that is used to modify feed speed is the printer status temperature TenvL. Specifically, at lower temperatures, sheets in the feed tray tend to be more slippery, because of a combination of reduced friction at lower temperatures coupled with a hardening of the rubberized sheet feed rollers in printer 10. Accordingly, at lower temperatures, a slower but more certain feed speed is selected; on the other hand, at higher temperatures, a quicker feed speed is selected because of the relative ease at which recording media are fed.

Thus, as shown in FIG. 76, in step S7601 print driver 84 obtains printer status temperature TenvL from printer 10, and in step S7602 determines whether the temperature is below a predetermined threshold such as 18° C. If the printer status temperature is less than or equal to the determined threshold, then the speed at which sheets are fed by the automatic sheet feeder is reduced to a slower speed (step S7604). On the other hand, if the temperature is high enough, meaning that recording media may be fed with greater certainty even at a high speed, then print driver 84 selects a high speed for automatic sheet feeding.

In step S7606, print driver 84 sends the selected feeding speed to printer 10, using a parameter in the [LOAD] command.

FIG. 77 illustrates an embodiment in which both the printer status and the current environment of computing equipment 10 are used in coordination by driver 84 so as to select the speed of the sheet feeding. Specifically, in the embodiment of FIG. 77, a slower (and consequently less noisy) speed of feed is always selected at nighttime, as determined by print driver 84 from the current configuration of computing equipment 1. On the other hand, in daytime, a high feed of sheet feed is selected so long as printer status temperature is large enough; otherwise, a low speed of sheet feed is selected.

Thus, in step S7701, print driver 84 gets current printer status temperature TenvL, and in step 7702 print driver 84 obtains current configuration and time of day from computing equipment 1. In step S7703, print driver 84 determines, based on time of day, whether it is nighttime, for example, by comparing time of day to determine whether it lies in the range of 5:00 a.m. to 10:00 p.m. If time of day is outside the normal daytime range, then flow advances to step S7705, in which a slow speed for sheet feed is always selected.

On the other hand, if in step S7703 the print driver 84 determines that it is not nighttime, then flow advances to step S7706 in which print driver 84 determines whether printer status temperature TenvL is high enough so as to select a high speed of sheet feed. If printer status temperature is large enough, then a high speed is selected (step S7708), whereas if temperature is not high enough, then a low speed is selected (step S7707).

Flow then advances to step S7710 in which print driver 84 sends the selected speed of sheet feed to printer 10 using a parameter in the [LOAD] command.

10.5 Prefire Timing

Figure 78:
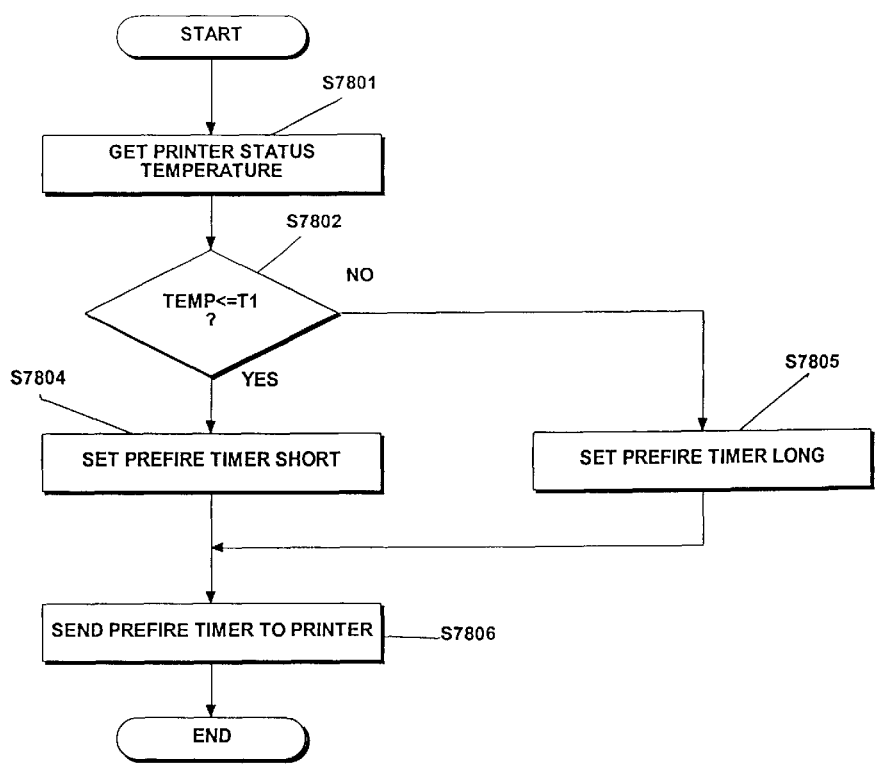
FIG. 78 is a flow diagram for explaining how the print driver modifies the operational parameter of the printer that controls the timing for pre-fire operations.

FIG. 78 is a flow diagram for explaining how print driver 84 modifies the operational parameter of printer 10 that controls the timing for prefire operations, based on status of the printer.

In the embodiment of FIG. 78, the printer status that affects prefire timing is printer status temperature TenvL. Specifically, at lower operating temperatures, ink tends to be more viscous, meaning that more frequent prefirings are needed; consequently, a lower prefire timing interval is selected. On the other hand, at higher operating temperatures, ink is less viscous, meaning that less frequent prefirings are needed with a correspondingly higher prefire timing interval.

Thus, in step S7801, print driver 84 obtains printer temperature status TenvL, and in step S7802 compares the printer status temperature to a fixed threshold such as 18° C. If the temperature is less than the threshold, then a default relatively short prefire interval is selected, such as prefiring every three seconds. On the other hand, if the temperature is larger than the threshold, then a relatively long prefire interval is selected, such as six seconds. In any event, flow thereafter advances to step S7806 in which print driver 84 sends the selected prefire interval to printer 10 using the [PREFIRE_CYC] command.

10.6 Delay of Manual Feed

Figure 79:
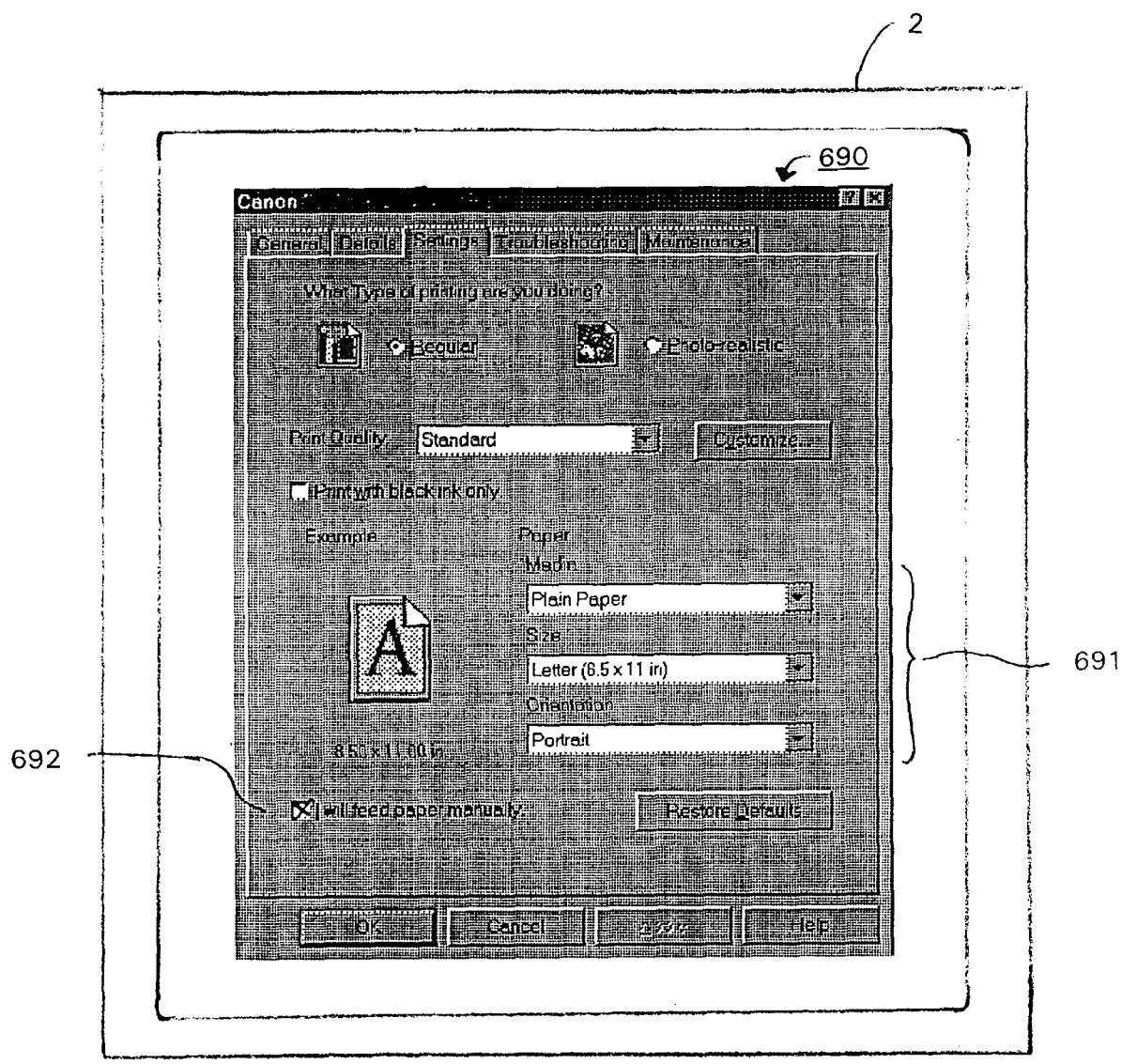
FIG. 79 shows a portion of user interface displayed by the print driver on the display.
Figure 80:
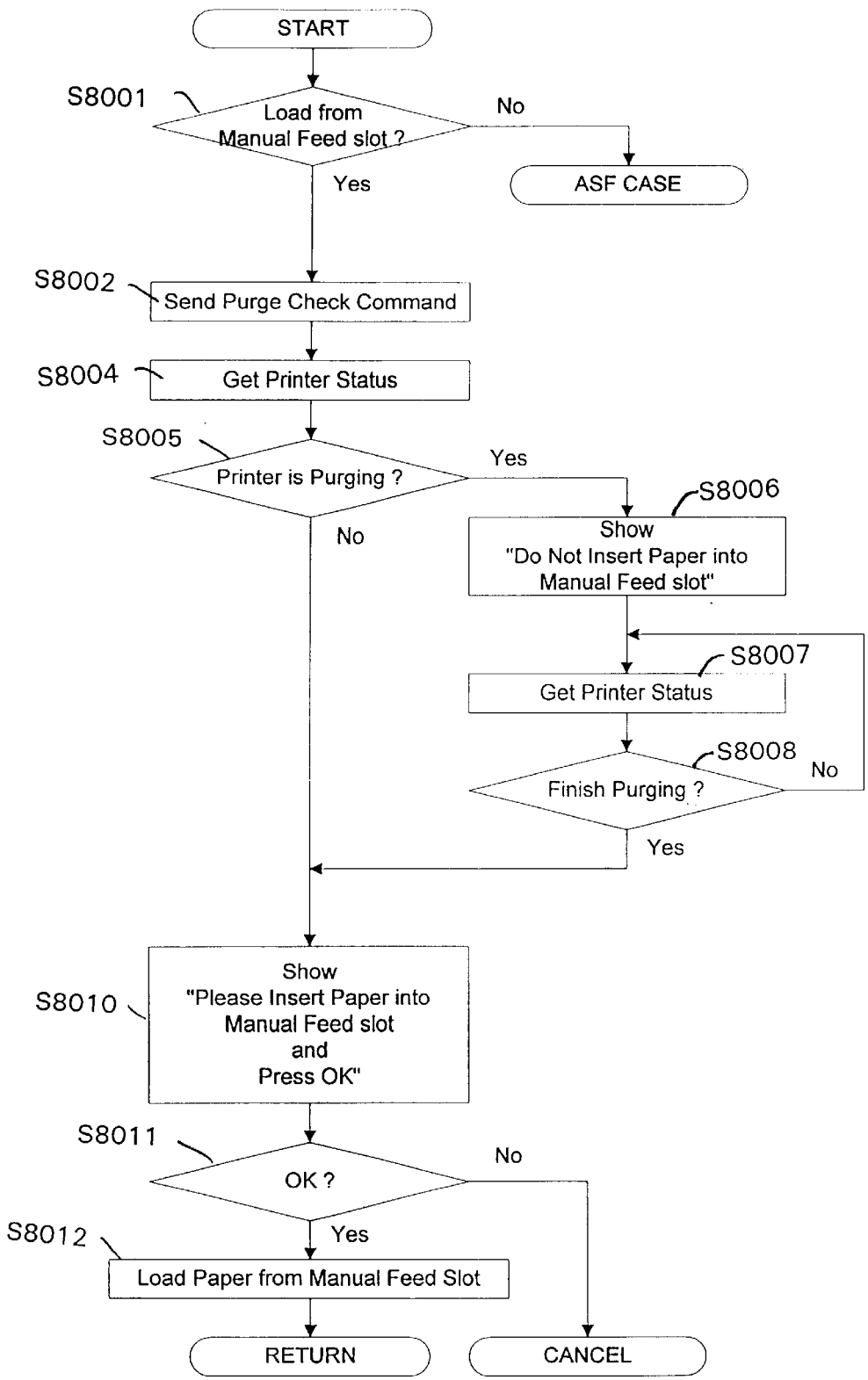
FIG. 80 is a flow diagram for explaining how the print driver modifies its own operation based on status of the printer.

FIGS. 79 and 80 are views for explaining how print driver 84 modifies its own operation based on status of printer 10.

FIG. 79 shows a portion of user interface 690 displayed by print driver 84 on display 2. FIG. 79 shows a "setting" tabbed dialog for user interface 690, and as shown in FIG. 79, the tabbed dialog includes a region 691 which permits the user to set media type, size and orientation, as well as a check box 692 which permits the user to specify that he will feed paper manually and that automatic sheet feed operations should be bypassed. Upon selection of check box 692, the print driver will command printer 10 so as to cause media inserted at manual feed slot 17 (see FIG. 3) to be drawn into printer 10, rather than automatic sheet feeding from supply tray 14.

However, as explained in connection with FIGS. 5A and 5B, a single motor 34 is utilized for many different functions including line feed operations for a currently-printing sheet, sheet feed operations for a sheet from feed tray 14, and purging operations in purge unit 46. It is therefore possible for a user to encounter difficulties if he attempts to feed a sheet manually before the printer is ready, for example, before the printer has completed a purge operation.

According to this embodiment of the operation, therefore, print driver 84 modifies its operation based on status of printer 10, so as to display a message requesting the user to delay manual insertion of a sheet until the printer has completed a purge operation, in situations where print driver 84 has been set to a manual feed configuration (through check box 692) and current status of the printer indicates that a purge operation is on-going.

Thus, referring to FIG. 80, in step S8001, print driver 84 determines whether check box 692 has been selected by the user, thereby setting the print driver into the manual feed mode. If the check box has not been selected, then automatic sheet feeding proceeds in accordance with operations described above.

On the other hand, if manual feed mode has been selected, then in steps S8002 and S8004, print driver 84 obtains status from the printer so as to determine whether a purge operation is on-going. If in step S8005 the print driver 84 determines that a purge operation is not on-going, then flow proceeds directly to step S8010 in which the print driver displays a message to the user on display 2, signifying to the user that a sheet should be inserted manually into the manual feed slot. On the other hand, if a purge operation is on-going, flow branches to step S8006 in which print driver 84 displays a message on display 2, signifying that the user should delay insertion of a sheet into the manual feed slot. Specifically, and as explained above, because a single motor is used both for purge operations and sheet feed operations, manual insertion of a sheet into the manual feed slot during purge operations might possibly result in a failed sheet feed operation.

The message of step S8006 remains displayed until printer status returned from the printer to print driver 84 signifies that the purge operation has been completed (steps S8007 and S8008). When printer status indicates that the purge operation has been completed, flow advances to step S8010 where, as before, print driver 84 displays a message to the user signifying that it is safe to insert a sheet into the manual feed slot.

In step S8011, print driver 84 waits for the user to signify that he has inserted a sheet into the manual feed slot, whereafter flow advances to step S8012 in which print driver 84 commands printer 10 to load paper from the manual feed slot using the [LOAD] command.

10.7 Purge Speed

Figure 81:
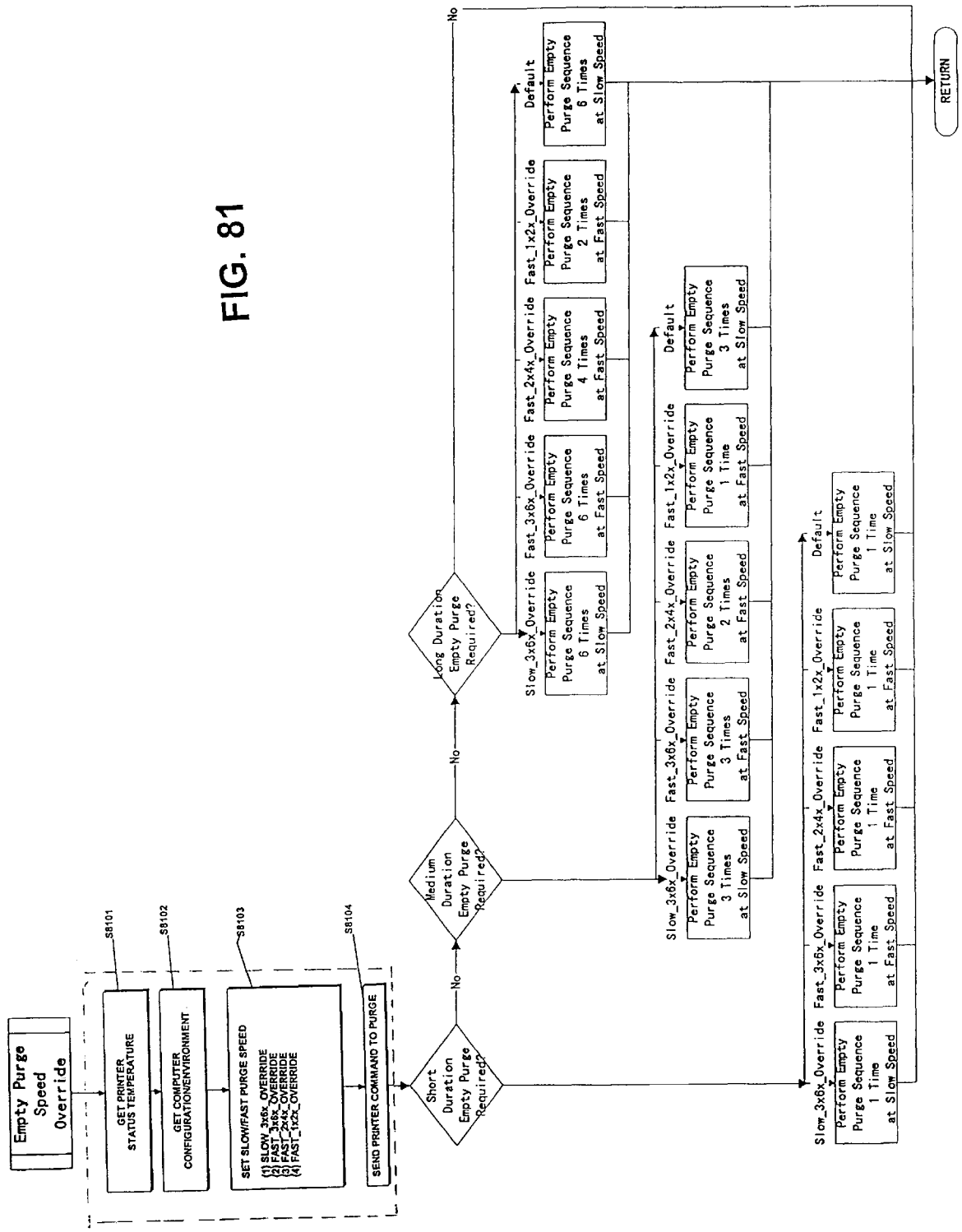
FIG. 81 illustrates modification of purge speed in the printer.

FIG. 81 illustrates modification of purge speed in printer 10 by print driver 84 based on status of printer 10 or based on status of printer 10 coupled with current configuration of computing equipment 1.

Operations in FIG. 81 that are performed by print driver 84 are delineated with dotted line 695. As shown within those dotted lines, functions performed by print driver 84 include a step to obtain current status of printer 10, to obtain current configuration of computing equipment 1, to modify purge speed so as to achieve either a slow purge speed or a fast purge speed, and to command a purge operation.

In more detail, in steps S8101 and S8102, print driver 84 obtains printer status temperature TenvL and configuration information for computing equipment 1. In step S8103, print driver 84 sets the purge speed. The purge speed is set based on the printer status temperature, or based on the printer status temperature coupled with the current configuration of computing equipment 1. Specifically, and as shown in connection with similar operations for selection of sheet feed speed in FIGS. 76 and 77, purge speed can be selected based only on printer status (for example, a high purge speed for a quick purge at the low ink viscosities that occur at high printer status temperatures), or based on printer status temperature coupled with time of day (for example, a low and quiet purge speed for nighttime operations, and a purge speed selected based on printer status temperature for daytime operations).

In step S8104, and at times when printer purging is needed, print driver 84 causes the printer to execute purge operation, for example, by transmission of a [RECOVER] command.

In response to receipt of a command for purging, printer 10 is controlled by print controller 110 to execute purge operations as shown in FIG. 81, in accordance with either the slow or the high speed set by the print driver.

By virtue of the foregoing arrangement, good purge results are obtained, even at a high purge speed that results in a quick purge operation, since the purge speed is selected based on printer status and is consequently tailored for specific aspects of the printer status.

10.8 Compression Mode

Figure 82:
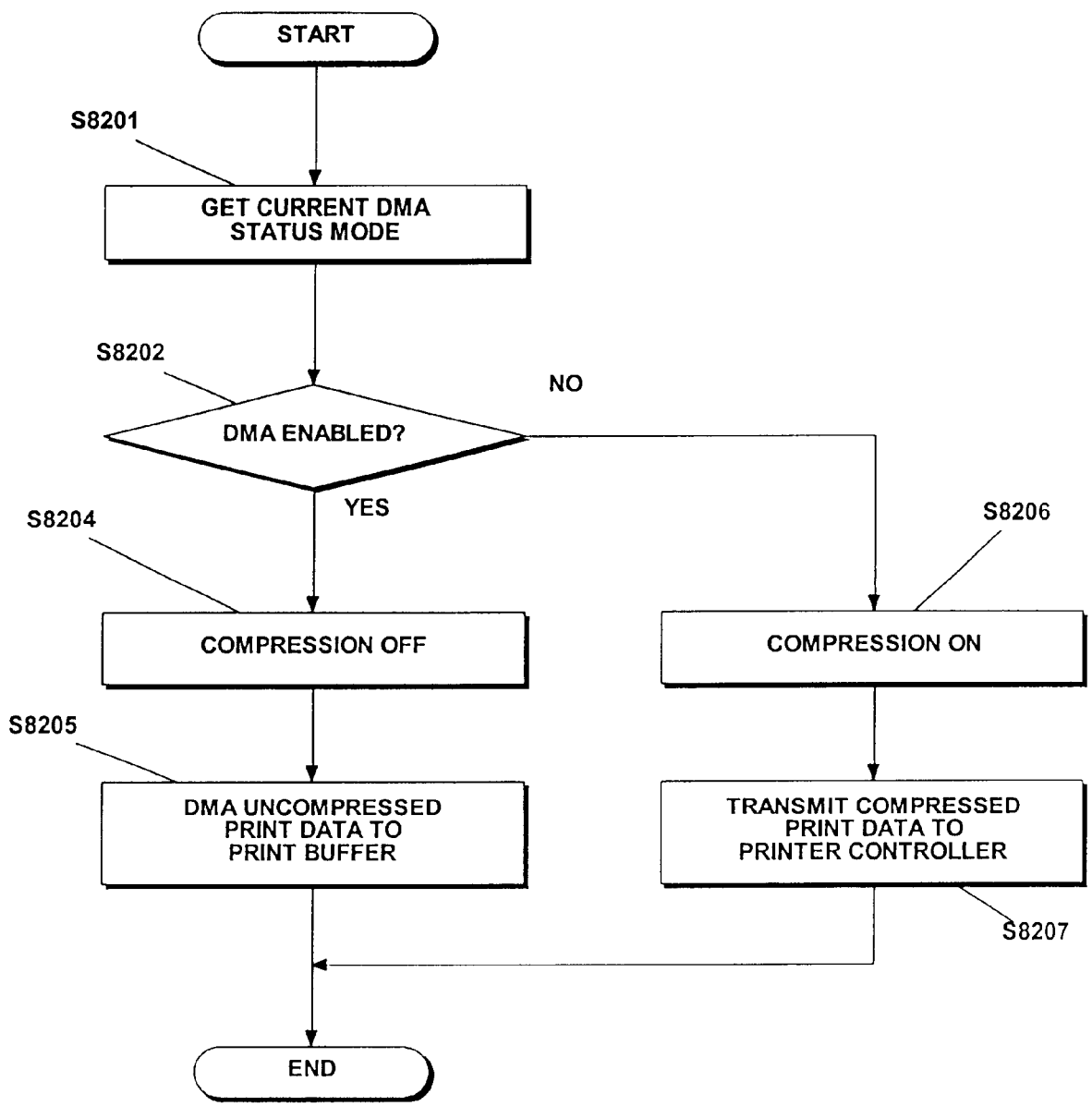
FIG. 82 illustrates modification of print driver operations.

FIG. 82 illustrates modification of print driver operations based on status of printer 10. Here, modifications of the print driver operations concern modifications over whether or not compression of print data is performed prior to transmission of such print data to the printer. The decision as to whether or not compressed data is sent is made based on printer status, which in this case is printer status that indicates whether or not DMA (direct memory access) is enabled in the printer firmware.

By way of explanation, print data compression is performed as a default operation in print driver 84 so as to compress and thereby minimize the amount of print data that is transmitted to the printer. Although transmission time is minimized by transmitting compressed data, time is also expended in compressing the data on the print driver side, and in decompressing the data on the printer side.

If DMA mode is enabled in the printer firmware, then print driver 84 is able to send print data directly to print data buffer 109, ordinarily without the involvement of print controller 110. In DMA mode, the time needed to deposit uncompressed print data directly into print data buffer 109 is less than the amount of time to compress print data, to transmit compressed print data, and to decompress the print data into the print data buffer. Accordingly, if print driver 84 determines that DMA mode is enabled in the firmware for printer 10, then print driver 84 modifies its operation by transmitting uncompressed data directly into print data buffer 109, rather than by compressing the print data and transmitting the compressed print data to controller 110. FIG. 82 illustrates this operation.

Thus, in step S8201, print driver 84 obtains printer status in the form of status information that indicates whether firmware in the printer has a DMA capability and whether such a capability is enabled. If driver 84 determines that DMA mode is enabled (step S8202), then print driver 84 turns off print data compression (step S8204), and DMA's uncompressed print data directly to print data buffer 109 (step S8205). On the other hand, if print driver 84 determines from the printer status that DMA is not enabled, then print driver 84 maintains its default mode of operation, whereby it compresses print data prior to transmission (step S8206) and transmits compressed print data to print controller 110 (step S8207).

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A print driver executable on computing equipment connectable to a printer driven by the print driver over a bi-directional interface, said print driver comprising:

a querying segment to query the printer to obtain current status over the bi-directional interface, the current status including printer temperature, the querying segment querying in response to initiation of a print job on the computing equipment;

a modifying segment for modifying default functionality, which includes a default color correction table, of said print driver in accordance with the printer temperature, a modified color correction table results in an amount of ink ejection by the printer that is different from an ink ejection amount of the default color correction table;

a data generating segment for generating print data in accordance with the modified color correction table; and a sending segment for sending the print data generated by said data generating segment to the printer over the bi-directional interface.

2. A print driver executable on computing equipment connectable to a printer driven by the print driver over a bi-directional interface, said print driver comprising:

a querying segment to query the printer to obtain current status over the bi-directional interface, the current status including printer temperature, the querying segment querying in response to initiation of a print job on the computing equipment;

a modifying segment for modifying operational parameters used in the printer so as to reduce smear in accordance with the printer temperature; and a sending segment for sending the modified operational parameters to the printer over the bi-directional interface.

3. A print driver according to claim 2, wherein operational parameters for reducing smear include smear density threshold.

4. A print driver according to claim 2, wherein operational parameters for reducing smear include smear time delay between page ejections.

5. A print driver executable on computing equipment connectable to a printer driven by the print driver over a bi-directional interface, said print driver comprising:

a querying segment to query the printer to obtain current status over the bi-directional interface, the current status including printer temperature, the querying segment querying in response to initiation of a print job on the computing equipment;

a modifying segment for modifying a sheet feed speed operational parameter in the printer in accordance with the printer temperature; and a sending segment for sending the modified operational parameter to the printer over the bidirectional interface.

6. A print driver executable on computing equipment connectable to a printer driven by the print driver over a bi-directional interface, said print driver comprising:

a querying segment to query the printer to obtain current status over the bi-directional interface, the current status including printer temperature, the querying segment querying in response to initiation of a print job on the computing equipment;

a modifying segment for modifying a printer prefire timing intervals operational parameter in the printer in accordance with the printer temperature; and a sending segment for sending the modified operational parameter to the printer over the bi-directional interface.

7. A print driver executable on computing equipment connectable to a printer driven by the print driver over a bi-directional interface, said print driver comprising:

a querying segment to query the printer to obtain current status over the bi-directional interface, the current status including printer temperature, the querying segment querying in response to initiation of a print job on the computing equipment;

a modifying segment for modifying a printer recovery operation speed operational parameter in the printer in accordance with the printer temperature; and a sending segment for sending the modified operational parameter to the printer over the bidirectional interface.

8. A print driver according to claim 7, further comprising an obtaining segment to obtain time of day from the computing equipment, and wherein said modifying segment modifies the printer recovery operation speed operational parameter in the printer in accordance with both current temperature and time of day.

9. A print driver executable on computing equipment connectable to a printer driven by the print driver over a bi-directional interface, said print driver comprising:

a querying segment to query the printer to obtain current status over the bi-directional interface, the current status including status of a recovery operation in the printer, the querying segment querying in response to initiation of a print job on the computing equipment;

a modifying segment for modifying functionality of the print driver in accordance with current status of the recovery operation; and a sending segment for sending the modified functionality to the printer over the bi-directional interface.

10. A print driver according to claim 9, wherein modification includes a step to display a warning message to a user to delay insertion of a manually fed sheet into the printer.

11. A print driver executable on computing equipment connectable to a printer driven by the print driver over a bi-directional interface, said print driver comprising:

a querying segment to query the printer to obtain current status over the bi-directional interface, the current status including firmware capability of the printer, the querying segment querying in response to initiation of a print job on the computing equipment;

a modifying segment for modifying a format of print data transmitted over the bi-directional interface in accordance with firmware capabilities of the printer; and a sending segment for sending print data of the modifies format to the printer over the bi-directional interface.

12. A print driver according to claim 11, wherein said modifying segment selects a format of uncompressed print data when the firmware capabilities include capabilities for direct memory access, and selects a format of compressed print data when the firmware capability does not include capability for direct memory access.

13. A method in a print driver executable on computing equipment connectable to a printer driven by the print driver over a bi-directional interface, the printer being driven by the print driver in accordance with default functionality, said method including steps according to any of claims 1 to 12.

14. Computer executable process steps stored on a computer readable storage medium, the computer executable process steps for effecting a print driver over a bi-directional interface, the printer being driven by the print driver in accordance with default functionality, said computer executable process steps including steps according to any of claims 1 to 12.

15. A storage medium for storing computer executable process steps to effect a print driver over a bi-directional interface, the printer being driven by the print driver in accordance with default functionality, said process steps including steps according to any of claims 1 to 12.

* * * * *

UNITED STATES PATENT AND TRADEMARK OFFICE
CERTIFICATE OF CORRECTION

PATENT NO. : 6,594,028 B1
DATED : July 15, 2003
INVENTOR(S) : Akihiko Hamamoto et al.

It is certified that error appears in the above-identified patent and that said Letters Patent is hereby corrected as shown below:

Column 7,
Line 22, "context of a" should read -- context of --.

Column 28,
Line 35, "This parameters" should read -- Parameter information --.

Column 30,
Line 32, "are" should read -- is --.

Column 36,
Line 5, "step" should read -- (step --.

Column 37,
Line 6, "a the" should read -- a --.

Column 49,
Line 44, "This" should read -- Those --.

Column 50,
Line 50, "TempNewPos an" should read -- TempNewPos is an --.

Column 51,
Line 41, "TempNewPos an" should read -- TempNewPos is an --.

Column 52,
Line 47, "interrupts" should read -- interrupt --.

Column 53,
Line 11, "is step" should read -- in step --.

Column 54,
Line 11, "require" should read -- required --.

Column 63,
Line 32, "preformed" should read -- performed --.

Column 65,
Line 63, "preformed" should read -- performed --.

UNITED STATES PATENT AND TRADEMARK OFFICE
CERTIFICATE OF CORRECTION

PATENT NO.     : 6,594,028 B1
DATED          : July 15, 2003
INVENTOR(S)    : Akihiko Hamamoto et al.

It is certified that error appears in the above-identified patent and that said Letters Patent is hereby corrected as shown below:

Column 68,
Line 67, "ink" should read -- in --.

Column 69,
Line 32, "preformed" should read -- performed --.

Column 72,
Line 10, ")reference" should read -- (reference --; and
Line 14, "operation" should read -- operations --.

Column 82,
Line 65, "(such a" should read -- (such as --.

Column 83,
Line 25, "so-obtained" should read -- so obtained --.

Signed and Sealed this

Twenty-fifth Day of November, 2003

JAMES E. ROGAN
*Director of the United States Patent and Trademark Office*